US007349838B2

(12) United States Patent
Summers

(10) Patent No.: US 7,349,838 B2
(45) Date of Patent: *Mar. 25, 2008

(54) MANAGEMENT TRAINING SIMULATION METHOD AND SYSTEM

(76) Inventor: Gary J. Summers, 16135 NW. Schendel Ave., Apt. L, Beaverton, OR (US) 97006

( * ) Notice: Subject to any disclaimer, the term of this patent is extended or adjusted under 35 U.S.C. 154(b) by 558 days.

This patent is subject to a terminal disclaimer.

(21) Appl. No.: 10/880,923

(22) Filed: Jun. 30, 2004

(65) Prior Publication Data

US 2005/0004789 A1 Jan. 6, 2005

Related U.S. Application Data

(63) Continuation-in-part of application No. 10/141,997, filed on May 8, 2002, which is a continuation-in-part of application No. 09/364,280, filed on Jul. 30, 1999, now Pat. No. 6,236,955, and a continuation-in-part of application No. 09/364,489, filed on Jul. 30, 1999, now Pat. No. 6,408,263.

(60) Provisional application No. 60/141,738, filed on Jun. 30, 1999, provisional application No. 60/094,900, filed on Jul. 31, 1998.

(51) Int. Cl.
   *G06F 9/45* (2006.01)
(52) U.S. Cl. .................. 703/22; 434/107; 703/6; 706/920; 706/925
(58) Field of Classification Search ............... 703/22, 703/2, 6; 434/107, 188, 322, 362, 365, 367, 434/369, 373; 705/1, 7, 10, 28, 29; 707/100, 707/101, 102; 706/920, 925, 927, 932, 934
See application file for complete search history.

(56) References Cited

U.S. PATENT DOCUMENTS 5,041,972 A 8/1991 Frost
5,056,792 A 10/1991 Helweg-Larsen et al.

(Continued)

OTHER PUBLICATIONS

Campbell, T.L. Optimal Decision Making in a Complex Business Simulation, IEEE proc. Of 22.sup.nd Annual Hawaii int'l. Conf. On System Sciences, Jan. 1989. vol. 3. pp. 822-831.

(Continued)

*Primary Examiner*—Paul Rodriguez
*Assistant Examiner*—Jonathan J Teets
(74) *Attorney, Agent, or Firm*—Darby & Darby, P.C.

(57) ABSTRACT

Developing decision-making skills of a user through practice in a simulated environment comprises defining a simulated situation to be influenced by the user including a set of objects that are represented by an attribute-characteristic representation, presenting information concerning a current state of the simulation, obtaining decisions from the user that at least partially determine object designs to be evaluated, evaluating an object design using a value function having multiple optima, updating the simulation with the results from the evaluation, and permitting continued practice by selectively repeating several of these steps. A system executes simulation software that simulates such a situation on a processor, and includes evaluation software for selecting and evaluating design objects by applying a value function having multiple optima. At least one terminal and communication links are provided for information transfer and implementation of the simulated situation. Diagnosis of the user's cognitive approach is also disclosed.

41 Claims, 78 Drawing Sheets

U.S. PATENT DOCUMENTS

| | | | |
|---|---|---|---|
| 5,240,419 | A | 8/1993 | deGyarfas |
| 5,310,349 | A | 5/1994 | Daniels et al. |
| 5,326,270 | A | 7/1994 | Ostby et al. |
| 5,574,889 | A | 11/1996 | Jindo et al. |
| 5,737,581 | A | 4/1998 | Keane |
| 5,829,983 | A | 11/1998 | Koyama et al. |
| 5,887,154 | A | 3/1999 | Iwasa et al. |
| 5,957,699 | A | 9/1999 | Peterson et al. |
| 5,974,246 | A | 10/1999 | Nakazawa |
| 6,015,348 | A | 1/2000 | Lambright et al. |
| 6,134,539 | A | 10/2000 | O'Connor et al. |
| 6,157,808 | A | 12/2000 | Hollingsworth |
| 6,236,955 | B1 | 5/2001 | Summers |
| 6,292,830 | B1* | 9/2001 | Taylor et al. ............... 709/224 |
| 6,408,263 | B1 | 6/2002 | Summers |
| 6,430,526 | B1* | 8/2002 | Toll .............................. 703/1 |
| 6,634,950 | B2 | 10/2003 | Yoshimi et al. |
| 6,755,659 | B2 | 6/2004 | LoSasso et al. |
| 6,931,365 | B1 | 8/2005 | Mehta et al. |
| 6,938,048 | B1* | 8/2005 | Jilk et al. ................... 707/102 |
| 6,939,137 | B1 | 9/2005 | Colaio |
| 6,941,255 | B2 | 9/2005 | Kennon et al. |
| 6,944,596 | B1 | 9/2005 | Gray et al. |
| 6,983,236 | B1* | 1/2006 | Karlovac et al. ............. 703/22 |
| 2001/0039002 | A1 | 11/2001 | Delehanty |
| 2003/0059760 | A1 | 3/2003 | Tojek et al. |
| 2003/0084015 | A1 | 5/2003 | Beams et al. |
| 2004/0138934 | A1 | 7/2004 | Johnson et al. |

OTHER PUBLICATIONS

Capitalism [online]. Games Domain Review, 1996 [retrieved on Sep. 30, 1999].

Business Simulation [online]. Strategic Management Group, Inc. 1999 [ret. Sep. 30, 1999].

Powerim Constructor 2.5 [online]. Vison Works 1999 [ret. Sep. 30, 1999].

Powersim [online] Powersim 1998 [retrieved on Sep. 30, 1999].

Capitalism Product Description [online]. Interactive Magic, 1996 [ret. On Sep. 30, 1999].

Robyn M. Dawes, Rational Choice In An Uncertain World, .sctn.. sctn.2. 1-2.3 (pp. 22-31), .sctn.6.5 (pp. 121-125), and .sctn..sctn.7. 1-7.8 (pp. 128-143), plus cover and abstract (1988).

Richard R. Nelson, "The Role of Knowledge In R&D Effciency," In The Quarterty J. of Econ., pp. 453-470 (1982).

Volker Nissen, Management Applications and Other Classical Optimization Problems, in Handbook of Evolutionary Computation, Thomas Back et al., .sctn.F1.2, pp. F1.2:1-50 plus cover (1997).

Jose Lobo et al., "Landscapes: A Natural Extension of Search Theory," from Santa Fe Inst. Website, pp. 1-33 plus abstract and cover (1999).

Stuart Kauffman et al., "Optimal Search on a Technology Landscape," from Santa Fe Inst. Website, pp. 2-40 plus abstract and table of contents (1998).

Philip Auerswald et al., "The Production Recipes Approach to Modeling Technological Innovation: An Application to Learning by Doing," from Santa Fe Inst. Website, pp. 1-42 plus Tables 1-10, Figs. 1-24, cover and abstract (1998).

Daniel Kahneman et al., "California of Probabilities: The State of the Art," in Judgement Under Uncertainty; Heuristics and Biases, Chapter 22, pp. 306-334 plus cover (1982).

Bernard Manderick, et al., "The Genetic Algorithm and the Structure of the Fitness Landscape," in Proc. of the 4th Intl Conf. on Genetic Algorithms, Belew and Brookes, eds., pp. 143-150 (San Mateo, California: Morgan Kauffmann Publishers, 1991).

Bernard Manderick, "Correlation Analysis," In Handbook of Evolutionary Computation, .sctn.B2.7.3, pp. B2.7:10-14 plus cover (New York: Oxford University Press, 1997).

Thomas Back, Evolutionary Algorithms in Theory and Practice, . sctn.3.4, pp. 143-144 and cover (New York: Oxford University Press, 1996).

Alden Wright, "Genetic Algorithms for Real Parameter Optimization," in Foundations of Genetic Algorithms, Gregory Rawlins, ed., pp. 205-218 (San Mateo, California: Morgan Kauffman Publishers, 1991).

Kate Juliff, "The Packing Problem," in Handbook of Evolutionary Computation, Thomas Back et al., ed., .sctn.F1.7, pp. F1.7:1-5 plus cover (1997).

Ralf Bruns, "Scheduling," in Handbook of Evolutionary Computation, Thomas Back et al., ed., .sctn.F1.5, pp. F1.7:1-9 plus cover (1997).

Darrell Whitley, "Permutations," in Handbook of Evolutionary Computation, Thomas Back et al., ed., .sctn.C1.4, pp. C1.4, pp. C1.4:1-8 plus cover (1997).

Steven Gold et al., "Modeling Market-and Firm-Level Demand Functions in Computerized Business Simulations," In Simulations and Games, vol. 15, No. 3, pp. 346-363 (Sep. 1984).

James M. Utterback, "Innovation and Industrial Evolution," In Mastering the Dynamics of Innovation—How Companies Can Seize Opportunities in Face of Technological Change, Chapter 4, pp. 79-102 plus cover (1994).

Peter Drucker, "Entrepreneurial Management," in Innovation and Entrepreneurship—Practice and Principles, Chapter 12, pp. 143-176 (New York Harper & Row, 1985).

Peter Drucker, "The Innovative Organization," In Management: Tasks, Responsibilities, Practices, Chapter 61, pp. 782-803 (New York: Harper Collins, 1973).

James Brian Quinn, "Managing Innovation: Controlled Chaos," In Harvard Business Review, pp. 73-84 (May-Jun. 1985).

Donald Frey, "The New Dynamism (Part 1)," in Interfaces, vol. 24, No. 2, pp. 87-91 (Mar.-Apr. 1994).

Lowell W. Steele, "Nurturing Innovation," in Managing Technology: The Strategic View, Chapter 11, pp. 263-288 (New York: McGraw-Hill, 1989).

Dennis Jennings, et al., "Informal Covariation Assessment: Data-Based versus Theory-Based Judgments," in Judgment Under Uncertainty: Heuristics and Biases, Chapter 15, pp. 211-230 (New York: Cambridge University Press, 1982).

Thomas F. Pray et al., "Modeling Radical Changes in Technology Within Strategy-Oriented Business Simulations," in Simulation and Gaming, vol. 22, No. 1, pp. 19-35 (Mar. 1991).

Richard D. Teach, "Demand Equations for Business Simulations With Market Segments," in Simulation and Gaming, vol. 21, No. 4, pp. 423-442 (Dec. 1990).

Steven C. Gold et al., "Technological Change and Intertemporal Movements in Consumer Preferences in the Design of Computerized Business Simulations with Market Segmentation," in Developments in Business Simulation and Experiential Learning, Nancy H. Leonard and Sandra W. Morgan, eds., vol. 25, pp. 156-167 (1998).

Steven Gold and Thomas Pray, "The Production Frontier: Modeling Production in Computerized Business Simulations," in Simulation and Games, vol. 20, No. 3, pp. 300-318 (Sep. 1989).

Precha Thavikulwat, "Modeling the Human Component in Computer-Based Business Simulations," in Simulation and Gaming, vol. 22, No. 3, pp. 350-359 (Sep. 1991).

Steven C. Gold, "Modeling Short-Run Cost and Production Functions in Computerized Business Simulations," in Simulation and Gaming, vol. 23, No. 4, pp. 417-430 (Dec. 1992).

Precha Thavikulwat, "Product Quality in Computerized Business Simulations," in Simulation and Gaming, vol. 23, No. 4, pp. 431-441 (Dec. 1992).

Steven C. Gold et al., "Modeling Demand in Computerized Business Simulations," in Guide to Business Gaming and Experiential Learning, Association for Business Simulation and Experiential Learning, Jim W. Gentry, ed., Chapter 8, pp. 117-138 plus cover (East Brunswick: Nichols/GP Publishing, 1990).

Gary J. Summers, "Analyzing Managers' Judgments and Decisions with an Educational Business Simulation," in Developments in Business Simulation and Experiential Learning, Sandra Morgan and Diana Page, eds., vol. 26, pp. 58-64 plus cover (1999).

Gary J. Summers, "Modeling Innovation as a Process of Design in Educational Business Simulations," in Developments in Business Simulation and Experiential Learning, Sandra Morgan and Diana Page, eds., vol. 26, pp. 146-152 plus cover (1999).

Stuart Kauffman et al., "Technological Evolution and Adaptive Organizations," in Complexity, vol. 1, No. 2, pp. 26-43 plus table of contents (1995).

Stuart A. Kauffman, "The Evolution of Economic Webs," in The Economy As An Evolving Complex System, Philip Anderson, Proc. of the Evolutionary Paths of the Global Econ. Workshop Held in Santa Fe, New Mexico, Kenneth Arrow and David Pines, eds., pp. 125-146 (Sep. 1987).

Richard R. Nelson et al., "Further Analysis of Search and Selection," In An Evolutionary Theory of Economic Change, Chapter 11 (Introduction and Part 1), pp. 246-262 plus cover (1982).

Gary J. Summers, "Industrial Dynamics: An Evolutionary Model for an Interactive Simulation," from Dissertation Submitted to the Graduate School of Northwestern University, pp. 1-166 (Jun. 1997).

Stuart Kauffman, "The Structure of Rugged Fitness Landscapes," In The Origins of Order: Self-Organization and Selection in Evolution, Chapter 2, pp. 33-67 (New: York Oxford University Press, 1993).

Capitalism Manual User's Guide (1995), Trevor Chan, Interactive Magic, Morrisville, North Carolina, Chapter 5; pp. 5-1 through 5-12.

"Modeling Industry Life Cycles for Behavioral Research in Management and Economics," Gary J. Summers, Ph.D, New Orleans, Louisiana, (Social Science Research Electronic Publishing, Inc. May 28, 1998 www.ssm.com) pp. 1-44 plus abstract.

"Adaptation on Rugged Landscapes Generated by Iterated Local Interactions of Neighboring Genes," Marc Lipsitch, Santa Fe Institute, Santa Fe, New Mexico (in Proc. of the 4th Intl Conf. on Genetic Algorithms, San Mateo, CA, Morgan Kauffmann, 1991), pp. 128-135.

Advisory Action mailed Aug. 8, 2007 from co-pending U.S. Appl. No. 10/141,997.

Request for Reconsideration filed Jul. 9, 2007 from co-pending U.S. Appl. No. 10/141,997.

Office Action mailed May 8, 2007 (made final) from co-pending U.S. Appl. No. 10/141,997.

Set of claims subject to rejection in U.S. Appl. No. 10/141,997 , 2007.

* cited by examiner $A_{two}=x_1$ $A_{two}=x_2$

Figure 5
A TWO ATTRIBUTE MULTIPEAKED VALUE FUNCTION

ATTRIBUTE ONE

|   | A | B | C | D |
|---|---|---|---|---|
| A | 5 | 4 | 10 | 1 |
| B | 8 | 6 | 3 | 4 |
| C | 7 | 1 | 5 | 12 |
| D | 2 | 9 | 6 | 2 |

ATTRIBUTE TWO

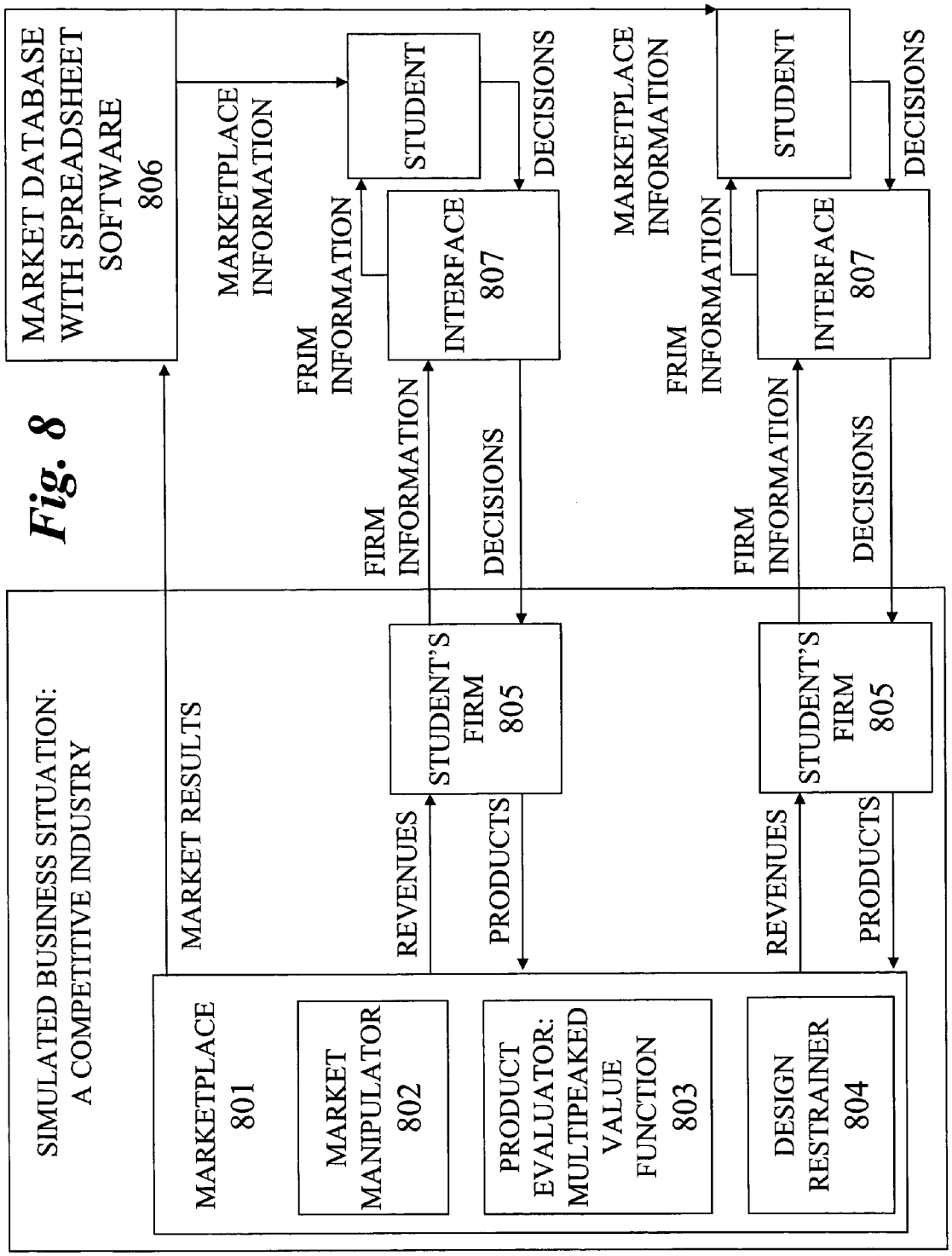

*Fig. 9*

Product: ASDFGHJKLL

| A | S | D | F | G | H | J | K | L | L |
|---|---|---|---|---|---|---|---|---|---|
| 901 | 902 | 903 | 904 | 905 | 906 | 907 | 908 | 909 | 910 |

Fig. 10

| CAPACITY TYPE | UNITS |
|---|---|
| QWERTYUIOP | 75 |
| ASDFGHJKLL | 25 |
| 1002 | |

BUDGET: $ 510.00

| COLUMN 1 | 2 | 3 | 4 | // | 9 | 10 | 11 | 12 | 13 |
|---|---|---|---|---|---|---|---|---|---|
| PERIOD | PRODUCT CHARACTERISTICS | | | | | | | FIRM | UNITS SOLD |
| 1 | Q | W | E | // | I | O | P | 2 | 35 |
| 1 | A | S | D | // | K | L | L | 2 | 28 |
| 1 | Q | W | E | // | B | N | T | 2 | 3 |
| 1 | X | Y | Z | // | H | F | V | 2 | 2 |

Fig. 12

| BUDGET: $ 10.00 | MANUFACTURE AND SHIP |
| --- | --- |
| 1201 | 1204 |

| PRODUCT | UNITS | UTILIZED CAPACITY |
| --- | --- | --- |
| QWERTYUIOP | 45 | QWERTYUIOP |
| ASDFGHJKLL | 10 | QWERTYUIOP |
| ASDFGHJKLL | 25 | ASDFGHJKLL |
| QWEUMHCBNT | 10 | QWERTYUIOP |
| XYZAIGGHFV | 10 | QWERTYUIOP |

1203

| CAPACITY TYPE | UNITS |
| --- | --- |
| QWERTYUIOP | 75 |
| ASDFGHJKLL | 25 |

COVARIATION CONTINGENCY TABLE

|  | SUCCESS IN THE MARKETPLACE | |
|---|---|---|
|  | YES | NO |
| MEMBER OF PRODUCT CLASS {XYZ######} YES | 5 | 20 |
| NO | 40 | 400 |

A FORM FOR PROVIDING SEARCH QUERIES

| COLUMN 1 | 2 | 3 | 4 | 5 | | 10 | 11 | 12 | 13 | 14 |
|---|---|---|---|---|---|---|---|---|---|---|
| FILTER | PERIOD | PRODUCT CHARACTERISTICS | | | // | | | | FIRM | UNITS SOLD |
| 1 | | Q | W | E | // | # | # | # | | |
| 2 | | | | | // | | | | | >10 |

SUBMIT

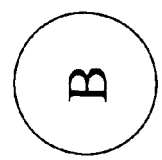
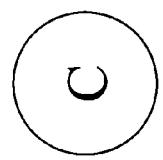
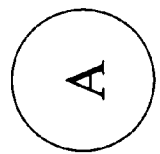
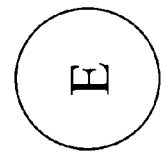
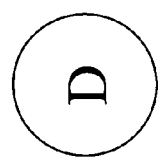
Fig. 24

*Fig. 25*

| Distance Between Vertices | | | | | |
|---|---|---|---|---|---|
| | A | B | C | D | E |
| A | --- | 130 | 70 | 120 | 75 |
| B | | --- | 50 | 150 | 185 |
| C | | | --- | 95 | 115 |
| D | | | | --- | 70 |
| E | | | | | --- |

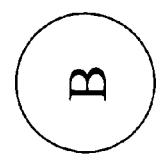
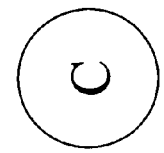
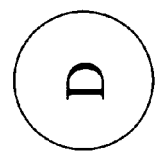
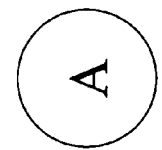
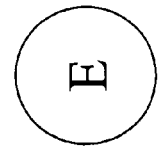
Fig. 26

Fig. 27

Distance Between Vertices

|   | A | B | C | D | E |
|---|---|---|---|---|---|
| A | --- | 130 | 140 | 120 | 75 |
| B |   | --- | 85 | 150 | 185 |
| C |   |   | --- | 65 | 140 |
| D |   |   |   | --- | 70 |
| E |   |   |   |   | --- |

*Fig. 29*

| Combination of Characteristics | Randomly Generated Contribution |
|---|---|
| 000 | 2 |
| 001 | 4 |
| 010 | 7 |
| 011 | 8 |
| 100 | 6 |
| 101 | 4 |
| 110 | 3 |
| 111 | 9 |

Fig. 30

| Combination of Characteristics | Randomly Generated Contribution |
|---|---|
| 000 | 2 |
| 001 | 4 |
| 010 | 7 |
| 011 | 8 |
| 100 | 9 |
| 101 | 2 |
| 110 | 4 |
| 111 | 1 |

Fig. 33

| Design Category | Effect | Market | Test | # of Samples | Cost |
|---|---|---|---|---|---|
| ##E## | Face | Male | Max. Value | 50 | $5,000 |
| ##E## | Face | Female | Max Value | 30 | $3,000 |
| #D### | Weight | Male | STD | 70 | $7,000 |
| HI##F | Liver Damage | Female | Ave. Value | 10 | $1,000 |
| EGGBH | Heart Damage | Female | Value | 1 | $100 |
| EGGBF | Heart Damage | Male | Value | 1 | $100 |
| ADADA | Strength | Female | Value | 1 | $100 |

*Fig. 34*

| Design Category | Effect | Market | Test | # of Samples | Estimate |
|---|---|---|---|---|---|
| ##E## | Face | Male | Max. Value | 50 | 43 |
| ##E## | Face | Female | Max Value | 30 | 62 |
| #D### | Weight | Male | STD | 70 | 14.2 |
| HI##F | Liver Damage | Female | Ave. Value | 10 | 25 |
| EGGBH | Heart Damage | Female | Value | 1 | 33 |
| EGGBF | Heart Damage | Male | Value | 1 | 27 |
| ADADA | Strength | Female | Value | 1 | 14 |

| Combination of Characteristics | Randomly Generated Contributions | | | |
|---|---|---|---|---|
| | Attribute 10 | Attribute 20 | Attribute 30 | Attribute 40 |
| 0 | 5 | | | |
| 1 | 2 | | | |
| 00 | | 7 | | |
| 01 | | 9 | | |
| 10 | | 3 | | |
| 11 | | 1 | | |
| 000 | | | 5 | 5 |
| 001 | | | 8 | 3 |
| 010 | | | 3 | 3 |
| 011 | | | 2 | 7 |
| 100 | | | 6 | 5 |
| 101 | | | 4 | 9 |
| 110 | | | 9 | 7 |
| 111 | | | 6 | 1 |

| Combination of Characteristics | Randomly Generated Contributions | | | |
|---|---|---|---|---|
| | Attribute 10 | Attribute 20 | Attribute 30 | Attribute 40 |
| 0<br>1 | 5<br>2 | | | |
| 00<br>01<br>10<br>11 | | 7<br>9<br>3<br>1 | 2<br>9<br>7<br>4 | |
| 000<br>001<br>010<br>011<br>100<br>101<br>110<br>111 | | | | 5<br>3<br>3<br>7<br>5<br>9<br>7<br>1 |

Fig. 46

The full attribute-characteristic representation for drug (IHGFE) for each effect and market segment

| Effect | Market Segment | AC-Representation |
|---|---|---|
| Face | Male | IHGFEAAA |
| Face | Female | IHGFEAAB |
| Weight | Male | IHGFEABA |
| Weight | Female | IHGFEABB |
| Strength | Male | IHGFEBBA |
| Strength | Female | IHGFEBBB |
| Heart Damage | Male | IHGFEACA |
| Heart Damage | Female | IHGFEACB |
| Liver Damage | Male | IHGFEDDA |
| Liver Damage | Female | IHGFEDDB |

A PROCESS FLOW FOR PURCHASING
PRODUCTION CAPACITY

Fig. 51

| Product | Production Capacity Type | # of Nonmatches | Unit Cost | Defect Rate |
|---|---|---|---|---|
| ABCDE | ABCDE | 0 | $1.0 | 0% |
| ABCDD | ABCDE | 1 | $1.5 | 10% |
| ABCED | ABCDE | 2 | $2.0 | 20% |
| ABBBB | ABCDE | 3 | $2.5 | 30% |
| ADDAA | ABCDE | 4 | $3.0 | 40% |
| BABBB | ABCDE | 5 | $3.5 | 50% |

Firm's Production Capacity — 5210

| Specificity | Units |
|---|---|
| ABCDE | 1,000 |
| ABDDE | 500 |
| DDECA | 1,500 |

Production Schedule — 5220

| Product | Capacity | Units | Cost | Defects |
|---|---|---|---|---|
| ABCDE | ABCDE | 600 | 600 | 0 |
| BCDDE | ABCDE | 300 | 750 | 90 |
| EDECA | DDECA | 1,200 | 1,800 | 120 |

5230  5240  5250  5260  5270

Manufacture Products — 5280

| Characteristic | Added Manufacturing Cost | |
|---|---|---|
| | At Start of Simulation | During Simulation |
| A | 5 | 5 |
| B | 10 | 10 |
| C | 15 | 15 |
| D | 50 | 5 |
| E | 75 | 10 |

Fig. 55 — A PROCESS FLOW FOR DIRECTING SEARCH TO NEW/DESIRED REGION OF SVF

*Fig. 58*

| Market Opportunities |||||
| --- | --- | --- | --- |
| Market Opportunity | Required Value | Expiration Date (Round) | Payoff ($1M) |
| M1 | 8.8 | 7 | 1.0 |
| M2 | 8.9 | 7 | 1.4 |
| M3 | 8.5 | 10 | 0.6 |
| M4 | 9.1 | 10 | 1.2 |
| M5 | 9.3 | 10 | 1.8 |
| M6 | 9.3 | 13 | 0.6 |
| M7 | 9.5 | 13 | 1.2 |
| M8 | 9.3 | 15 | 1.0 |
| M9 | 9.5 | 17 | 1.0 |
| M10 | 9.6 | 18 | 1.4 |

Fig. 59

Stage 1 Projects
Round 5

| Project # | Project Definition | Market Opportunity | Required Value |
|---|---|---|---|
| 11 | A## J# ## | M5 | 9.3 |
| 12 | ### G# #A | M5 | 9.3 |
| 13 | #H# ## #A | M7 | 9.5 |
| 14 | A## ## #G | M7 | 9.5 |

*Fig. 60*

Stage 2 Projects
Round 5

| Project # | Project Definition | Market Opportunity | Required Value |
|---|---|---|---|
| 7 | AC# ## ## | M3 | 8.5 |
| 7.1 | AC# #D G# | | |
| 7.2 | AC# FF ## | | |
| 7.3 | ACI #C ## | | |
| 9 | #C# ## #A | M3 | 8.5 |
| 9.1 | #C# BB #A | | |
| 9.2 | GCE ## #A | | |
| 9.3 | #CE #D #A | | |
| 10 | #B# K# ## | M3 | 8.5 |
| 10.1 | KBB K# ## | | |
| 10.2 | #B# K# DD | | |

*Fig. 61*

Stage 3 Projects
Round 5

| Project # | Project Definition | Market Opportunity | Required Value |
|---|---|---|---|
| 2.3 | ##D AC I# | M1 | 8.8 |
| 3.1 | ### CC IA | M2 | 8.9 |

Fig. 68

Project Statistics
Round 5

| Project | Payoff ($1M) | Rnds to Exp. | # of Tests | Ave. Value | Best Value | Value to Goal | Prob. of Success | Add. Inv. ($1,000) |
|---|---|---|---|---|---|---|---|---|
| Stage 1 | | | | | | | | |
| 2.3 | 1.0 | 2 | 15 | 8.29 | 8.64 | 0.16 | | |
| 3.1 | 1.4 | 2 | 12 | 8.55 | 8.75 | 0.15 | | |
| Stage 2 | | | | | | | | |
| 7 | 0.6 | 5 | 137 | 6.57 | 7.33 | 1.17 | | |
| 7.1 | | | 55 | 7.11 | 7.33 | | | |
| 7.2 | | | 30 | 5.14 | 5.83 | | | |
| 7.3 | | | 18 | 6.47 | 7.24 | | | |
| 9 | 0.6 | 5 | 74 | 6.81 | 7.50 | 1.00 | | |
| 9.1 | | | 15 | 4.45 | 6.23 | | | |
| 9.2 | | | 25 | 6.86 | 7.50 | | | |
| 9.3 | | | 12 | 6.88 | 7.13 | | | |
| 10 | 0.6 | 5 | 48 | 6.98 | 7.45 | 1.05 | | |
| 10.1 | | | 14 | 6.77 | 7.22 | | | |
| 10.2 | | | 17 | 7.15 | 7.45 | | | |
| Stage 3 | | | | | | | | |
| 11 | 5 | 1.8 | 15 | 4.98 | 6.32 | 2.98 | | |
| 12 | 5 | 1.8 | 21 | 5.66 | 6.92 | 2.38 | | |
| 13 | 8 | 1.0 | 29 | 5.32 | 7.02 | 2.48 | | |
| 14 | 8 | 1.0 | 18 | 5.87 | 7.12 | 2.38 | | |

Project Statistics
Round 5

| Project | Payoff ($1M) | Rnds to Exp. | # of Tests | Ave. Value | Best Value | Value to Goal | Prob. of Success | Add. Inv. ($1,000) |
|---|---|---|---|---|---|---|---|---|
| Stage 1 | | | | | | | | |
| 2.3 | 1.0 | 2 | 15 | 8.29 | 8.64 | 0.16 | 80% | 200 |
| 3.1 | 1.4 | 2 | 12 | 8.55 | 8.75 | 0.15 | 80% | 200 |
| Stage 2 | | | | | | | | |
| 7 | 0.6 | 5 | 137 | 6.57 | 7.33 | 1.17 | 40% | 650 |
| 7.1 | | | 55 | 7.11 | 7.33 | | | |
| 7.2 | | | 30 | 5.14 | 5.83 | | | |
| 7.3 | | | 18 | 6.47 | 7.24 | | | |
| 9 | 0.6 | 5 | 74 | 6.81 | 7.50 | 1.00 | 50% | 550 |
| 9.1 | | | 15 | 4.45 | 6.23 | | | |
| 9.2 | | | 25 | 6.86 | 7.50 | | | |
| 9.3 | | | 12 | 6.88 | 7.13 | | | |
| 10 | 0.6 | 5 | 48 | 6.98 | 7.45 | 1.05 | 40% | 700 |
| 10.1 | | | 14 | 6.77 | 7.22 | | | |
| 10.2 | | | 17 | 7.15 | 7.45 | | | |
| Stage 3 | | | | | | | | |
| 11 | 5 | 1.8 | 15 | 4.98 | 6.32 | 2.98 | 10% | 750 |
| 12 | 5 | 1.8 | 21 | 5.66 | 6.92 | 2.38 | 15% | 750 |
| 13 | 8 | 1.0 | 29 | 5.32 | 7.02 | 2.48 | 15% | 750 |
| 14 | 8 | 1.0 | 18 | 5.87 | 7.12 | 2.38 | 20% | 750 |

Project Scoring and Ranking
Round 5

| Weights (0-5) | | Payoff | Probability of Success | Expected Payoff | Additional Investment | Value To Goal | Rounds to Expiration | Total Score | Project Rank |
|---|---|---|---|---|---|---|---|---|---|
| Stage | Projects | | | | | | | | |
| 3 | 2.3 | | | | | | | | |
| 3 | 3.1 | | | | | | | | |
| 2 | 7 | | | | | | | | |
| 2 | 9 | | | | | | | | |
| 2 | 10 | | | | | | | | |
| 1 | 11 | | | | | | | | |
| 1 | 12 | | | | | | | | |
| 1 | 13 | | | | | | | | |
| 1 | 14 | | | | | | | | |

Total Scores

Fig. 71

Project Scoring and Ranking
Round 5

Total Scores — 7110

| Weights (0-5) | | Payoff | Probability of Success | Expected Payoff | Additional Investment | Distance To Goal | Rounds to Expiration | | |
|---|---|---|---|---|---|---|---|---|---|
| | | 5 | 0 | 0 | 3 | 0 | 0 | | |
| Stage | Projects | | | | | | | Total Score | Project Rank |
| 3 | 2.3 | 2 | | | 2 | | | 16 | 4 |
| 3 | 3.1 | 3 | | | 2 | | | 21 | 1 |
| 2 | 7 | 1 | | | 2 | | | 11 | 8 |
| 2 | 9 | 1 | | | 1 | | | 8 | 9 |
| 2 | 10 | 3 | | | 3 | | | 14 | 7 |
| 1 | 11 | 3 | | | 2 | | | 21 | 1 |
| 1 | 12 | 2 | | | 2 | | | 21 | 1 |
| 1 | 13 | 2 | | | 2 | | | 16 | 4 |
| 1 | 14 | 2 | | | 2 | | | 16 | 4 |

Fig. 74

Stage Costs and Success Rates
(All dollar figures in units of $1,000; 2 rounds = 1 year)

| | Stage 1 | Stage 2 | Stage 3 |
|---|---|---|---|
| Success Rate | 25% | 50% | 80% |
| Average Duration (Rounds) | 3 | 4 | 3 |
| Average Investment | 15 | 100 | 200 |
| Capitalized Average Investment @ 7% | 27 | 145 | 229 |
| Total Cost Per Successful Project | | | 921 |

Fig. 75 — A PROCESS FLOW FOR AN MTS TEACHING THE MANAGEMENT OF PRODUCT DEVELOPMENT PORTFOLIOS

*Fig. 76*

| Market Opportunities | | | |
|---|---|---|---|
| Market Opportunities | Required Value | Expiration Date (Round) | Payoff ($1M) |
| M1 | 8.8 | Expired | 1.0 |
| M2 | 8.9 | Expired | 1.4 |
| M3 | 8.5 | Satisfied | 0.6 |
| M4 | 9.1 | Satisfied | 1.2 |
| M5 | 9.3 | Expired | 1.8 |
| M6 | 9.3 | 13 | 0.6 |
| M7 | 9.5 | 13 | 1.2 |
| M8 | 9.3 | 15 | 1.0 |
| M9 | 9.5 | 17 | 1.0 |
| M10 | 9.6 | 18 | 1.4 |

Fig. 78

Project Decisions
Round 5

| Project | Stage | Status | Budget ($ 1,000) |
|---|---|---|---|
| New Projects | | | |
| 11 | 0 | Active | 30 |
| 12 | 1 | Promote | 100 |
| 13 | 1 | Cancel | 0 |
| 14 | 1 | Active | 10 |
| 7 | 2 | Active | 0 |
| 7.1 | 2 | Active | 45 |
| 7.2 | 2 | Active | 50 |
| 7.3 | 2 | Cancel | 25 |
| 9 | 2 | Active | 0 |
| 9.1 | 2 | Active | 75 |
| 9.2 | 2 | Active | 100 |
| 9.3 | 2 | Cancel | 0 |
| 10 | 2 | Active | 45 |
| 10.1 | 2 | Active | 60 |
| 10.2 | 2 | Promote | 140 |
| 2.3 | 3 | Active | 150 |
| 3.1 | 3 | Active | 170 |

Decisions Complete

Capital: $1,000,000

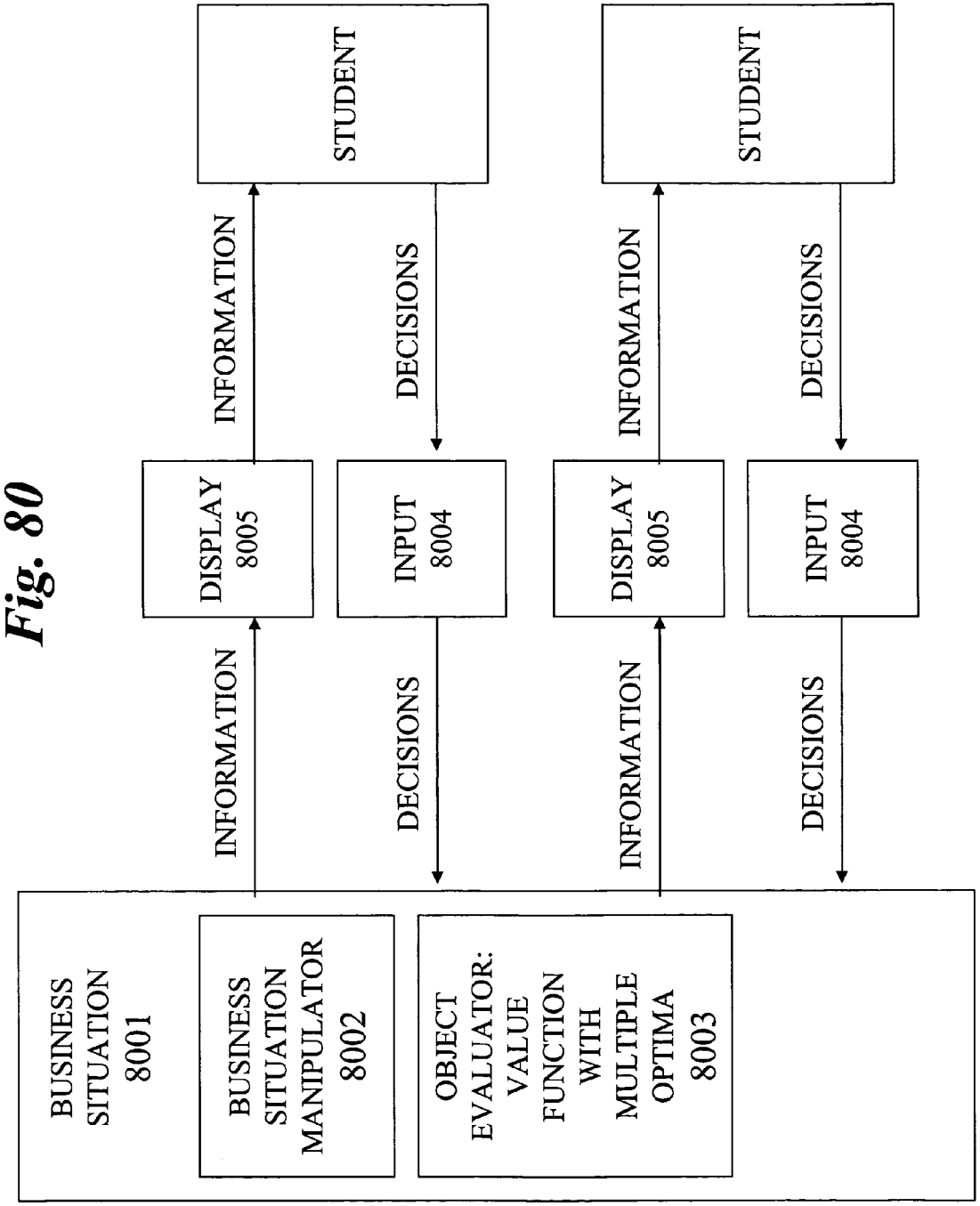

MANAGEMENT TRAINING SIMULATION METHOD AND SYSTEM

This application is a continuation-in-part of U.S. application Ser. No. 10/141,997, filed May 8, 2002, entitled "Management Training Simulation Method and System," now pending, which is a continuation-in-part of U.S. application Ser. No. 09/364,280, filed Jul. 30, 1999, entitled "Management Training Simulation Method and System," now allowed, and is also a continuation-in-part of U.S. application Ser. No. 09/364,489, filed Jul. 30, 1999, entitled "Management Training Simulation Method and System," now U.S. Pat. No. 6,236,955, and which further claims priority under 35 U.S.C. § 119(e) from U.S. Provisional Application Ser. No. 60/094,900, filed Jul. 31, 1998, and 60/141,738, filed Jun. 30, 1999, the disclosures of which are hereby incorporated by reference in their entireties as if set forth herein.

RELATED WORK

Gary J. Summers, "Modeling Innovation as a Process of Design in Educational Business Simulations," in *Developments in Business Simulation and Experimental Learning*, vol. 26 (1999): pp. 146-152;

Gary J. Summers, "Analyzing Managers' Judgments and Decisions with an Educational Business Simulation," in *Developments in Business Simulation and Experimental Learning*, vol. 26 (1999): pp. 58-64.

FIELD OF INVENTION

The present invention relates generally to management training simulations (MTSs), which are computer programs or board games that help managers learn to manage and to understand business. More particularly, the present invention involves a computerized management training method and system that effectively teaches the development and use of knowledge and provides training in managing strategy, risk, innovation, and core competencies, as well as analyzing and correcting a manager's decision making processes and identifying a manager's unique judgmental biases and errors. It provides tailored, individualized training in managerial judgment and decision making.

BACKGROUND OF THE INVENTION

MTSs are computer simulations that teach managers how to make better informed decisions. They present a manager with a lifelike situation simulated by a computer. The manager endeavors to improve the situation. To do this, he analyzes the situation and responds with a decision. The computer then calculates and displays the consequences of his decision. If the simulation closely approximates realistic situations, the manager learns how to confront those situations when they arise in the work environment.

MTSs are also called business simulations, business gaming, and business war games. Many business schools, corporate universities, consulting firms, training firms, and human resource departments use MTSs to teach a wide variety of subjects including marketing, finance, accounting, business strategy, supply chain management, and organization design.

There is a great need for this educational technology. People learn best from practical, hands on experience. Yet the primary source of such experience, one's business, is a difficult place in which to learn. Business experiments are not repeatable, decision consequences represent the outcomes of many influences, and the penalties for failure are potentially high. Business risks, costs, and complexity prevent a manager from engaging in the playful, mistake driven experimentation through which people learn best.

The predominant alternative to learning 'on the job' are books and classroom study. These methods are also limited. Applying intellectual knowledge to practice is extremely difficult. For example, no medical student is expected to move directly from Gray's Anatomy to surgery.

MTSs overcome the problems of learning 'on the job' and of classroom study. They are the ideal means for learning: experiments are repeatable while consequences are discernable and immediate. They condense years of experience into a few hours of study, thereby improving the learning that managers gain from their most limited resource—time. MTSs bridge the distance between intellectual understanding and practice (as cadavers do for medical students). They facilitate practical learning without risking "the patient"—one's career and company.

A manager will gain the following benefits by using MTSs to improve his management skill:

One can test his own strategies and intuitions—the student directs the lesson, rather than the lesson directing the student (as in traditional classroom learning).

MTSs provide more realistic exercises than those found in books or lectures, while still being less complex than real life situations.

MTSs can isolate critical skills. Managers can concentrate on improving these skills without being encumbered by the complexity of the real task.

The consequences of one's actions appear immediately and are easily discerned.

Unlike in one's actual job, there is no penalty for failure. One can experiment risk free.

MTSs facilitate testing ideas before real life implementation (called "what if" experiments).

MTSs increase communication by instigating discussion of strategy and operations and by illuminating business concerns.

FIG. 1 shows a most general architecture of an MTS. An MTS is composed of four parts: a display for presenting information about a simulated business situation (103); an input device for a person or team learning with the MTS (hereafter called a student) to input decisions into the MTS (104); a simulation of a business situation (101); and a business simulation manipulator (102) for calculating and producing the effects of students' decisions on the business situation. The arrows in FIG. 1 represent the movement of information and decisions in the MTS. The movement of information and decisions is best explained by describing the operation of an MTS. This is as follows: The display gathers information from the simulated business situation and displays this information for the students. After witnessing the information, the students make decisions. The students enter their decisions into the business situation via an input device. Upon receiving the students' decisions, the business simulation manipulator calculates the effects of the students' decisions in the simulated business situation. Information from the affected business situation is then displayed for the students.

An important class of MTS within the general MTS architecture depicted in FIG. 1 is the competitive industry MTS. In such MTSs the simulated business situation comprises a simulation of a competitive marketplace. Competitive industry MTSs teach the management of business functions where markets influence business results; for example, marketing, finance, and business strategy. For simplicity, I refer to competitive industry MTSs as MTSs and refer to the general case depicted in FIG. 1 as the 'general case' MTS.

FIG. 2 shows the architecture of an MTS. The simulated business situation is a competitive industry. The simulated competitive industry is composed of at least two types of components: a marketplace model (201) and at least one firm (204) controlled by a student. The marketplace model typically simulates, among other things, products, customers, market segments, and technology (described below). The marketplace model influences the structure and dynamics of the simulated competitive industry. Usually, each student manages a separate firm. Through their respective firms, students compete against each other for profits and market share in the marketplace. Each firm has several characteristics relating to business processes (for example, manufacturing capacity, the number of salespeople, operating capital, debt, and accounts receivable). The marketplace model and firm model determine the decisions required of students and the lessons learned. Depending upon the characteristics of the simulated marketplace and the simulated firms, MTSs might require that managers compete in several markets and/or manage one or more of several business functions (for example, finance, marketing, sales, customer service, and research and development).

To manage their firm and, specifically, to receive information and input decisions, students use an interface (205). This interface is typically an integration of the display and input devices shown in FIG. 1. However, some business simulations are played as board games (for an example see U.S. Pat. No. 5,056,792). In such board games, the firm model and market models are comprised of a visual display on the game board and a set of rules governing play and hence the display on the board. For example, a portion of the game board might represent firms. Chips placed on this portion of the board represent the firm's characteristics, such as the amount of inventory. Rules determine when chips are added or removed from the board. Another portion of the board represents the marketplace in a similar manner. When an MTS is played as a board game, the interface is the game board itself. Making this distinction, one versed in the art will recognize that the general descriptions of MTS given throughout this document apply to both board games and computer simulation MTSs.

The arrows in FIG. 2 represent the movement of information, revenues, and decisions in the MTS. The movement of these objects is most clearly explained by describing the operation of an MTS.

Each application of an MTS is called a learning session. A learning session progresses through rounds where each round consists of the following sequenced steps:

1. Each interface collects information describing its student's firm and the marketplace. The firm's characteristics constitute the information describing the student's firm. Information about the marketplace might include, for example, the products previously sent to the marketplace, the prices offered, sales volumes, and competitors' market shares. Each interface displays this information to its student.
2. Using the information presented by the interface, each student determines his firm's decisions for the current round. These decisions might include, for example, pricing products, purchasing manufacturing capacity, and producing products.
3. With an input means (for example, a keyboard or mouse) each student enters his decisions into the interface. The interface sends these decisions to the student's firm.
4. Each student's firm implements its student's decisions. The produced products are sent to the marketplace.
5. Having received the production from all the firms, the marketplace simulates the sale of all firms' products. This simulation might include, for example, evaluating firms' products and calculating demand. For these tasks, the marketplace model will contain a product evaluator (FIG. 2, field 203) for evaluating products and a market manipulator for calculating demand (FIG. 2, field 202). After the sales are determined, the sales' revenues are sent to the appropriate firm. After completing these five steps a round is complete. The next round begins with step one.

Simulation of Time: Simulations that progress through rounds are called synchronized simulations. This is because the decisions of users are synchronized. In synchronized simulations the manipulation of the simulated business situation occurs in fits and starts. When all of the decisions are received, the simulated situation is manipulated. Then, the manipulate stops and waits until all users submit their decisions for the next round.

Decisions need not be synchronized this way. Instead, the simulation can run continuously. FIG. 35 depicts a general case of an asynchronized simulation. It is the same as the simulation depicted in FIG. 1, with one exception. It has its own clock (3530) that keeps track of time in the simulation. For example, it might monitor a computer's clock and mark one day of simulated time every ten minutes. If the simulated situation includes a marketplace that opens daily (e.g., a retail store), the simulation calculates one day of demand and sales every ten minutes. These manipulations do not depend upon receiving decisions from students.

With an asynchronized simulation users need not submit their decisions at the same time. Users can make any decision and submit it to the simulation at any time. When the simulation receives a users' decisions, it incorporates them into its next manipulation of the simulated situation.

An asynchronized MTS presents students with an additional challenge. They must repeatedly query the simulation for data. They must do this to keep abreast of changes and actions taken by other users. Moreover, users must query the simulation and make decisions at a pace that "keeps up" with the simulation.

The following description focuses upon marketplace models and product design to facilitate the discussion of MTSs in general. MTSs require a marketplace model which represents both products and markets. MTSs typically require students to perform three tasks: (1) analyze the marketplace and competing firms, (2) design products and set prices, and (3) invest in business processes. The following describes generally how MTSs' represent products and markets and how they supply the structure required to facilitate the students' performance of their required tasks.

Products: Products in known MTSs generally include three types of product traits: business process traits, aggregate traits, and attributes. Business process traits represent the outcome of business processes, such as customer service level and delivery delays. Aggregate traits describe the whole product, such as product quality and product reliability. Attributes represent specific features comprising a product. Attributes can vary quantitatively (for example, amount of calories in one serving of a breakfast cereal) or qualitatively (for example, a product's color). The values that attributes can express are called characteristics. The set of characteristics that an attribute can express is referred to as the attribute's domain. The composite produced by the characteristics expressed by a product's attributes is called a product's design.

Product Classes: A product class is the set of products consisting of all the possible values for a product vector. Real world examples of product classes are sports cars and long distance phone service. A specific product is identified by its class and its traits. For example, suppose sports cars have three traits: customer service, delivery delay, and product quality. Suppose also that customer service and product quality are measured with a ten point scale. A specific product in the sports car product class is a sports car with a level five customer service, two week delivery delay, and a level seven quality.

To provide more realistic decision situations, some MTSs furnish several product classes, for example sports cars and luxury cars. Multiple product classes are defined by declaring their existence. For example, an MTS might declare three classes of products (classes A, B, C) by declaring three types of product vectors of the type described above. Each product class can have the same traits, but this is not necessary.

Markets: Demand for products is simulated in prior art MTSs using a demand function for a market manipulator (FIG. 2, field 202). In most MTSs, the market manipulator is a set of equations. For examples see: Steven Gold and Thomas Pray, "Modeling Demand in Computerized Business Simulations," in Jim W. Gentry (ed.), *Guide to Business Gaming and Experiential Learning*, Association for Business Simulation and Experiential Learning (East Brunswick: Nichols/GP Publishing, 1990), pp. 117-138. The market manipulator takes the firms' production as input and calculates the total size of the market and the share of demand for each firm. This demand is then compared to firms' actual production to determine sales. When equations are used, the parameters of the equations permit an MTS designer to adjust the industry and firm specific demand elasticities for each product trait. In addition, by using multiple sets of these equations MTSs can represent multiple market segments (for example, customers who value quality over timely delivery or vice versa) and/or multiple markets (for example, the Canadian and the United States automobile markets).

It is notable that, usually, the market manipulator does not directly receive product characteristics as inputs (as independent variables). Instead, a product's characteristics are used to produce a single number that represents a market's evaluation of a product's design. I call this number a product's value. The conversion is produced by a product evaluator (FIG. 2, field 203). In most MTSs, the product evaluator is an equation $v=h(a_1, a_2, \ldots a_n)$, where v is the value of a product, n is the number of attributes comprising products, and $a_1, a_2, \ldots a_n$ are the attributes that can express characteristics in the product. I call this equation a product value function. The product value function has the effect of removing a product's attributes from the product vector and replacing them with a single aggregate product trait: product value. The market manipulator accepts this trait as an input. As described in detail in the appendix, prior art MTSs evaluate product values using a distance value function.

Management Decisions: Students are told what product classes, market segments, and markets exist and the product traits comprising the products of an MTS. With this knowledge, students control a firm and compete in the simulated marketplaces by producing products from one or more of the declared product classes.

Each student manages his firm by performing the following tasks:

1. A student studies the predefined markets and the behavior of the other firms (his competitors). From this analysis, the student develops a business strategy or adjusts his previous strategy.
2. The student enacts his strategy by selecting the characteristics expressed by product attributes, by setting prices, and by distributing his firms' operating budget among business processes (for example, manufacturing, sales, advertising, and research and development). These investments are risky. If the strategy does not produce sufficient revenues, the return on investment will be negative. The firm will lose money and go bankrupt.

The tasks of market analysis, competitor analysis, and investment in business processes are described below.

Market and Competitor Analysis: Students analyze the marketplace through three methods:

1. Students analyze the marketplace results. They identify the prices, quantities, and product traits of products sold in the marketplace. From this information they estimate the size of market segments and the value that customers gain from each product trait.
2. In some MTSs students can supplement the marketplace information by purchasing computer generated marketing surveys. These surveys describe the characteristics of the simulated market (for example, demographic statistics) or the results of simulated standard marketing tests (for example, side-by-side product comparisons or focus group tests).
3. In some MTSs students can supplement the marketplace information by purchasing marketing reports. Among other qualities, marketing reports might list products, prices, new products, products that sold well, products that sold poorly, and sales volume by product type.

Students analyze competitors using two methods:

1. By analyzing marketplace results, a student can learn the market share, production, prices, and products of competitors.
2. Some MTSs supplement this information with a computer generated 'competitive intelligence' report that details competitors' behavior. It might state, for example, the average industry investment in production capacity or in research and development.

From a student's marketing and competitor analysis, he develops a business strategy. The business strategy states a focus on specific product classes, markets, and market segments. It states the desired values of product traits, prices, and production volumes. A student enacts his strategy with three decisions: set the attribute levels, set the prices of its products, and invest in business processes. These decisions are described below.

Setting Product Attributes and Price: Students set the characteristics expressed by their products' attributes. In setting characteristics, a student determines a product's design and is essentially designing a product in the simulation. The only restrictions on product design are the domains of the attributes. For example, quantitatively varying attributes might be bounded by minimum and maximum values. Likewise, qualitatively varying attributes might present students with a limited number of characteristics to choose from. Students also select their products' prices, subject to range limitations (for example, prices must be positive numbers).

Investing in Business Processes: Students improve their product's business process traits and aggregate traits by investing in their firm's business characteristics (for example, purchasing/scraping production capacity, retooling a factory, hiring new salespeople, or purchasing more advertising). The results are determined by equations that take the firm's characteristics and the student's investment decisions as the independent variables and yield the values of business process traits.

Equations giving a firm's characteristics can affect either business processes traits or firm characteristics, such as labor productivity. For examples of the use of equations in determining business process traits and firm characteristics, see: Steven Gold and Thomas Pray, "The Production Frontier: Modeling Production in Computerized Business Simulations," *Simulation and Games*, vol. 20 (September 1989): pp. 300-318; Precha Thavikulwat, "Modeling the Human Component in Computer-Based Business Simulations," *Simulation and Gaming*, vol. 22 (September 1991): pp. 350-359; Steven Gold, "Modeling Short-Run Cost and Production Functions in Computerized Business Simulations," *Simulation and Gaming*, vol. 23 (December 1992): pp. 417-430; and Precha Thavikulwat, "Product Quality in Computerized Business Simulations," *Simulation and Gaming*, vol. 23 (December 1992): pp. 431-441.

Modeling Innovation: The appendix provides a more detailed description of the prior art of MTS and also provides a general description of the prior art methods of modeling innovation, modeling technological advance, and the prior art product value functions.

Deficiencies of the Prior Art: The prior art MTSs suffer from six primary deficiencies:
1. The prior method of modeling innovation only simulates the outcome of innovation (success or failure). It does not model the processes that produce the outcome. Because of this, prior art MTSs do not offer students the opportunity to experience the process of innovating or the opportunity to learn how to manage innovation.
2. Representing only the outcome of the innovation process, the prior art method of modeling innovation does not represent the role of information, knowledge, and decision making in innovation. As a result, the prior art represents the management of innovation as an investment decision (how much to invest and when) rather than as a task of producing, exploiting, and managing knowledge.
3. The prior art method for simulating technological advance only simulates a small number of new opportunities. Real technological advances create a multitude of opportunities. Because of this deficiency, prior art MTSs cannot provide students with practice in managing through technological change. Moreover, this deficiency will adversely affect an MTSs' dynamics and simulation of competitive markets.
4. Because of the value function used by prior art MTSs, prior art MTS are suitable only for teaching the management of established businesses (low uncertainty situations). These situations include, for example, pricing, designing, positioning, and promoting products in established markets (i.e., basic marketing). This limitation on their effective use arises from three consequences of the value functions that they use:
   4.1. Students can choose any attribute, leave all other attributes unchanged, and increase a product's value by improving the characteristic expressed by the chosen attribute (assuming the chosen attribute is not already expressing its ideal characteristics). Because of this, a student can address each attribute independently.
   4.2. By making a series of small changes in a product's design, a student can produce a sequence of designs such that (1) each subsequent design increases product value and (2) the sequence ends with the ideal product. Furthermore, this property holds regardless of the order in which a student addresses the product attributes.
   4.3. The marketplace information produced by prior art MTSs is highly reliable.

Information about the value of products provides a lot of information about the value of all other products.

Because of these three qualities of prior art value functions, known MTSs are not suitable for teaching the management of entrepreneurial enterprises (high uncertainty situations). These situations include, for example, developing new core competencies, developing radical innovations, managing technological change, and reinventing one's business.

5. The prior art poorly models knowledge and knowledge concepts. Because of this, known MTSs cannot usefully address the role of knowledge in a student's decisions or management of his simulated firm (such as, innovation, core competencies, and the management of risk). Neither can the prior art represent the influence of knowledge on an industry's dynamics.
6. Prior art MTSs cannot illuminate nor analyze a student's decision procedures—even though changing these procedures is their goal. Because of this, known MTSs must teach through an indirect method. With repeated simulations of a decision situation, a student tests a variety of ideas and analyzes the consequences. When the consequences differ from his expectations, he is surprised. Through iterative trial, analysis, and surprise, he learns. With this indirect method, a student learns only as well as he invents ideas and induces lessons.

The present invention improves over the prior art by creating a new modeling relationship between a product's design and its value. The consequences of this change are great. Embodiments of the present invention can provide a superior model of innovation and technological advance, highlights the role of information and knowledge in management and in an industry's dynamics, and provides a means of explicitly representing a student's development and application of knowledge.

BRIEF DESCRIPTION OF THE DRAWINGS

The foregoing brief description, as well as other features and advantages of the present invention, will be understood more completely from the following detailed description of illustrative embodiments, with reference being made to the accompanying drawings, in which:

FIG. 5 depicts a multipeaked value function in a matrix representation, with the matrix entries representing the value of the function for differing combinations of two attributes;

FIG. 8 is a block diagram illustrating the architecture of an MTS in accordance with the present invention;

FIG. 9 illustrates a product in the illustrative embodiment;

FIG. 10 is a representation of a display presenting a firm's characteristics;

FIG. 11 is a representation of a display of a market database;

FIG. 12 is a representation of a display of an interface;

FIG. 15 is an illustration of a covariation contingency table;

FIG. 24 presents the vertices for a Traveling Salesman Problem (TSP)

FIG. 25 is a matrix of the distances between the vertices of the TSP of FIG. 24;

FIG. 26 shows the vertices of the TSP of FIG. 24 now in new locations as a result of altering the applicable value function that is used in a simulation configured in accordance with an embodiment of the present invention;

FIG. 27 is a matrix of the distances between the vertices of FIG. 26;

FIG. 29 is a table showing the contribution to design value of the attributes of FIG. 28 given the designs possible for the object in FIG. 28;

FIG. 30 is a table showing revised contributions for the attributes in FIG. 28, constituting an alteration of the nk-landscape function depicted in FIGS. 28 and 29;

FIG. 33 illustrates an exemplary form that can be used to submit R&D queries;

FIG. 34 illustrates exemplary results of processing a form such as shown in FIG. 33 in a given simulation;

FIG. 46 is a table giving the full attribute-characteristic representation for a design of a design object that has multiple values and two market segments;

FIG. 51 is a schedule for calculating manufacturing qualities by comparing product designs to capacities' specificities;

FIG. 52 illustrates a form for scheduling production and calculating manufacturing qualities;

FIG. 53 is a table giving the extra per unit cost of manufacturing as a function of the characteristics expressed by a product, with the table showing a cost schedule to use at the start of a simulation and a second cost schedule that takes effect during a simulation;

FIG. 58 is a table of market opportunities used in the illustrative embodiment;

FIG. 59 is a table of projects in stage 1 of R&D, used in the illustrative embodiment;

FIG. 60 is a table of projects in stage 2 of R&D, used in the illustrative embodiment;

FIG. 61 is a table of projects in stage 3 of R&D, used in the illustrative embodiment;

FIG. 68 illustrates the Project Statistics table that displays statistics about the projects in a product development portfolio, used in the illustrative embodiment;

FIG. 69 illustrates the Project Statistics table after the user has entered estimates;

FIG. 70 illustrates the Project Evaluation form used to evaluate projects in the illustrative embodiment;

FIG. 71 illustrates the Project Evaluation form after a user has evaluated projects;

FIG. 74 illustrates a table displaying R&D statistics, calculated at the end of a training session with the illustrative embodiment;

FIG. 76 is a table describing market opportunities during a training session with the illustrative embodiment;

FIG. 78 illustrates the Project Decisions form used when the illustrative embodiment is configured so that the user does not enter, nor need be aware of, design objects or object categories;

FIG. 80 is a block diagram illustrating an architecture in which a user's input decisions need not include object designs or object categories, in accordance with certain aspects of the present invention.

DETAILED DESCRIPTION OF CERTAIN EMBODIMENTS OF THE INVENTION

Figure 1:
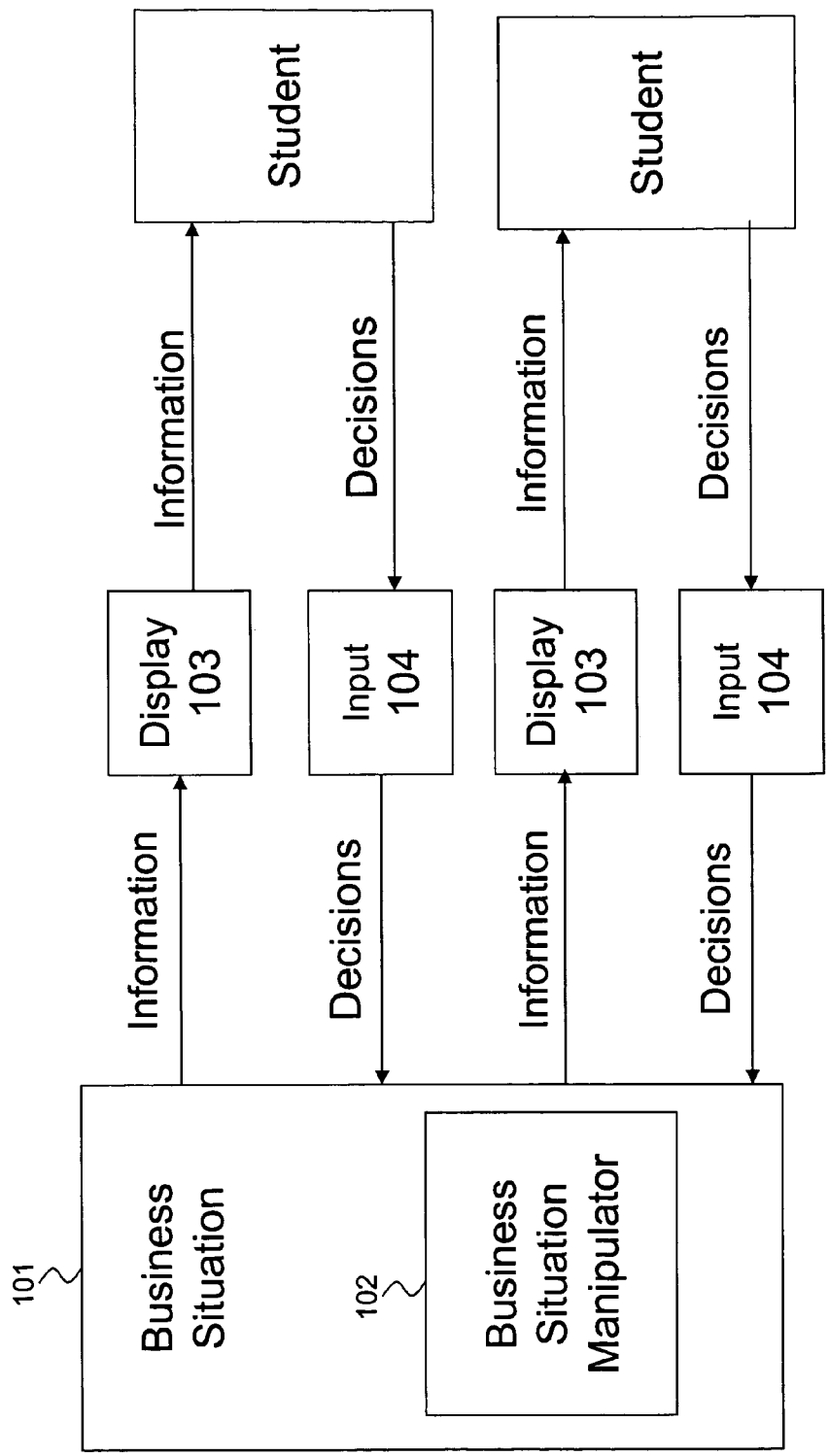
FIG. 1 is a block diagram of an MTS.
Figure 2:
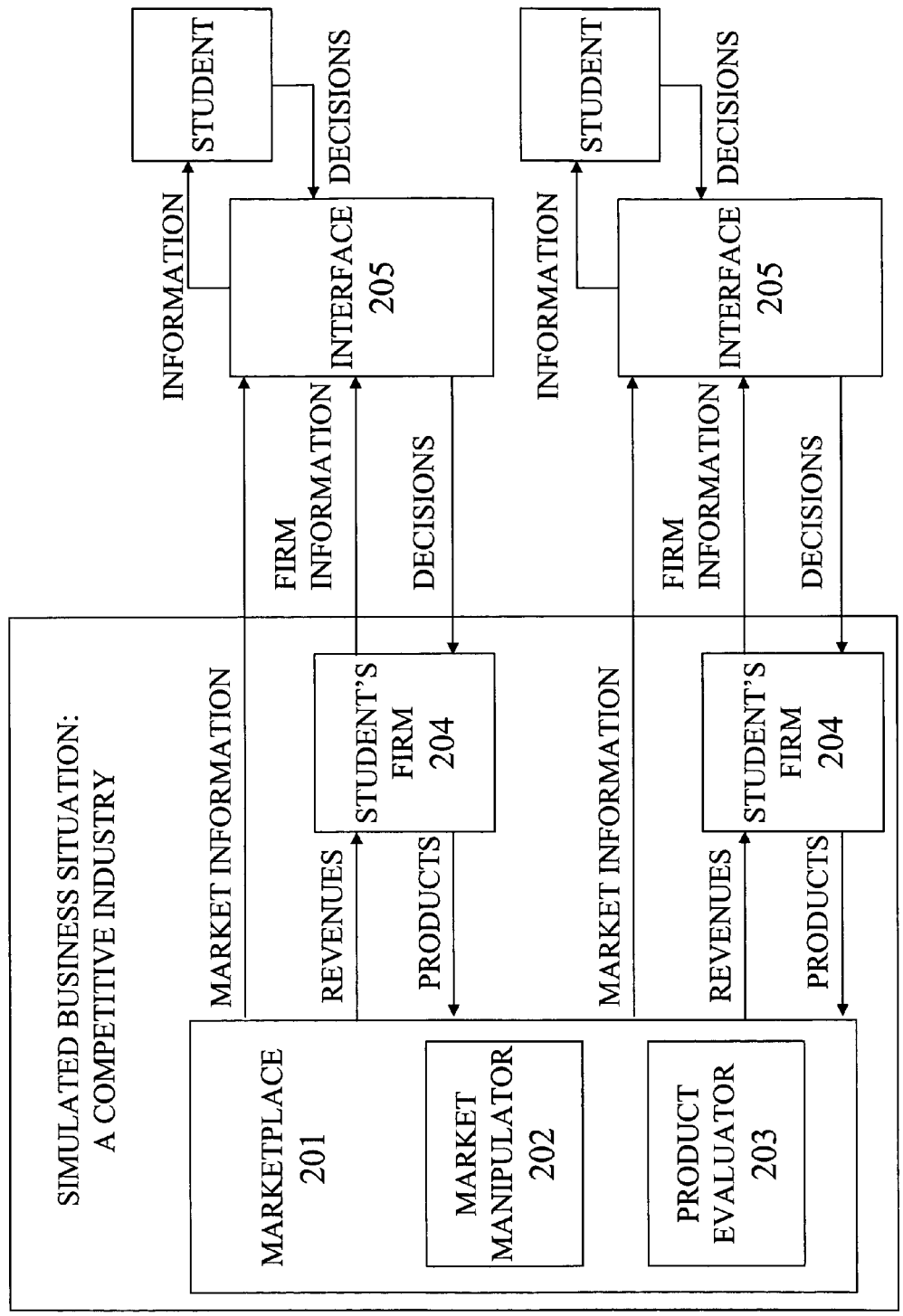
FIG. 2 is a block diagram of the standard architecture of a competitive industry MTS.

By way of overview, the present invention improves MTSs by building upon new ideas from the fields of evolutionary economics, evolutionary biology, and genetic algorithms, and from studies in the management of innovation. Primarily, and with additional important consequences, the present invention improves MTSs' modeling of information, knowledge, and innovation. For the purpose of exposition, the sections titled "Introduction and Definitions," "Illustrative Embodiment," "Ramifications," and "Embodiments that Make Two Great Improvements to MTSs" describe the specific class of MTSs called competitive industry MTSs. Those versed in the art will appreciate that the invention described herein also applies to MTSs that emphasize other business situations. Thus, the later section titled "The General Case" describes more general instantiations of the current invention. In addition, several sections further broaden the scope of this disclosure in addressing additional features, aspects, and issues that relate to simulations. These sections discuss embodiments of components on the invention (value functions and design objects), additional applications, a second illustrative embodiment, various hardware configurations, and flowcharts of some particularly useful embodiments.

An MTS, in accordance with the present invention, is a departure from prior art simulations in its use of attribute-characteristic representations of products, and the use of new product value functions. The use of product categories is also new. These concepts are introduced and defined below, and the consequences of incorporating these new features into MTSs are discussed thereafter in connection with an illustrative embodiment, ramifications, and two great improvements to MTSs.

Aspects of the invention are presented in eleven sections. The sections are as follows:

Section 1, "Introduction and Definitions," introduces fundamental components of the invention.

Section 2, "An Illustrative Embodiment: Competitive Search of a Product Value Function," describes an embodiment that is simplified to show how the main components function together.

Section 3, "Ramifications," describes important ramifications of the invention.

Section 4, "Embodiments that Make Two Great Improvements in MTSs," presents two of the major uses of the invention. These are simulating innovation and analyzing students' (users') decisions and judgments.

Section 5, "The General Case," illustrates that the scope of the invention exceeds the description of the illustrative embodiment.

Section 6, "Value Functions," describes various ways of using value functions.

Section 7, "Design Objects," describes various way of using design objects.

Section 8, "Additional Applications in MTSs," describes modeling marketing, technical advance, R&D, and manufacturing with the present invention.

Section 9, "An Illustrative Embodiment: Managing a Portfolio of Product Development Projects," describes another embodiment that shows the modeling of R&D and segmented object designs.

Section 10, "Hardware Configurations," describes various hardware configurations for running the invention on computers.

Section 11, "Flowcharts of Some Useful MTSs," presents flowcharts of some useful configurations of the invention.

What follows is an outline and presentation of these sections.

Section 1: Introduction and Definitions
1. Products
2. Product Categories
3. The Product Value Function
4. A Visual Metaphor
5. Correlation
6. Some Examples of Value Functions
    6.1 Quantitatively Varying Attributes
    6.2 Qualitatively Varying Attributes
    6.3 Dual Varying Attributes 7. Selecting Good Products
   7.1 Subject of an Optimization Problem
   7.2 Products with Components
   7.3 Visual Design Objects
   7.4 Chemical Formulas Section 2: An Illustrative Embodiment: Competitive Search of a Product Value Function
1. Marketplace Specifications
   1.1 Products
   1.2 The product Value Function
   1.3 The Market
   1.4 Technological Advance
   1.5 Royalties
   1.6 Manufacturing
2. Firms' Specifications
3. The Interface
4. Students' Tasks
   4.1 Marketing Analysis
   4.2 Management
5. The Market Database Specifications
6. The Operation of the Illustrative Embodiment
   6.1 Steps One, Two, and Three
   6.2 Step Four
   6.3 Step Five
   6.4 Initializing the Learning Session
   6.5 Simulating a Technological Breakthrough Section 3: Ramifications
1. Designing Products
2. Projects
3. Perspective
4. Innovation
5. Short- and Long-Run Strategies
6. A Continuum of Innovations, Incremental Through Radical
7. Technological Advance
8. Measurability of Information
9. Other Important Properties of Innovation
10. Explicit Representation of Knowledge
    10.1 Product Categories
    10.2 Perspective
11. Core Competencies
12. Industry Life Cycles
    12.1 Fluid Stage
    12.2 Transition Stage
    12.3 Stable Stage Section 4: Embodiments that Make Two Great Improvements in MTSs
1. Improvement 1: An MTS with Superior Modeling of Innovation
   1.1 Properties of Innovation
   1.2 Managing Innovation
2. Improvement 2: Personalized Decision Analysis and Training
   2.1 Covariation Assessment
   2.2 Categorization
   2.3 Judgment Section 5: The General Case
1. Manufacturing
2. Design Competition
3. Auction
4. Teamwork
5. Asynchronized Simulations Section 6: Value Functions
1. The nk-Landscpae
2. Evaluating a Portion of a Design
3. Using Other Information in an Evaluation
4. Multiple SVFs
5. Changing the Value Function Section 7: Design Objects
1. Design Objects are More General than Products
2. Object Categories
3. Segmented Design Objects
4. Segmented Design Objects and SVFs
   4.1 SVF Evaluates the Entire Design Object
   4.2 SVF Evaluates a Segment of a Design Object
   4.3 Different SVFs Evaluate Each Segment
   4.4 SVFs Evaluating Overlapping Segments
5. Examples of Using Segmented Design Objects
   5.1 Market Segments
   5.2 Teamwork
   5.3 Specialized Knowledge
   5.4 Interfirm Collaboration
   5.5 Pharmaceutical R&D
   5.6 Product Applications
6. System-set Attributes
   6.1 System Shocks
   6.2 Multiple Market Segments
   6.3 Changes in Consumer Tastes
   6.4 System Components
   6.5 Research and Development
7. Design Objects with Multiple Values Section 8: Additional Applications in MTSs
1. Modeling Manufacturing
2. Modeling Marketing
3. Modeling R&D
4. Simulating Technological Advances, or More Generally, Directing the Simulation to Subsets of Design Objects Section 9: An Illustrative Embodiment: Managing a Portfolio of Product Development Projects
1. Product Development Portfolio
2. Design Objects and SVF
3. The User's Goal
4. Projects and Portfolios
5. A Three Stage Portfolio
6. Research and Development (R&D)
7. Why Three Stages of R&D?
8. Promoting Projects, Canceling Projects, and Allocating Resources
9. Project Evaluation
10. Performance Evaluation
11. Architecture
12. Operation
13. Other Measures of Time
14. Hidden Attribute-Characteristic Representation and SVF
15. Diagnosis and Evaluation
16. Alternative Configurations Section 10: Hardware Configurations
1. Stand Alone
2. Multiple Computers with Floppy Disks
3. Network Configurations Section 11: Flowcharts of Some Useful MTSs
1. Flowchart for Evaluating a User's Design Performance
2. Flowchart for Developing a User's Decision-Making Skills These sections are next presented, in order.

Section 1: Introduction and Definitions

Products: Recall that some known MTSs describe products with attributes. For example, one may describe the design of an automobile with a list of attributes that includes physical qualities (such as color, size, and shape), features (such as antilock brakes and power windows), and abilities (top speed, city miles per gallon, highway miles per gallon). Using this representation scheme, automobiles are objects composed of the following attributes (style, engine type, drive train type, exterior color, window feature, brake feature, top speed, city mpg, highway mpg). Each attribute varies either quantitatively (for example, city mph and top speed) or qualitatively (for example style). Using a value function of a type described below, one can also have attributes that vary both qualitatively and quantitatively. An example of such an attribute is color. Color may vary qualitatively (for example, red, blue, and green) and in intensity (light blue to dark blue). One can represent intensity quantitatively with a number (for example, a ten point scale). I call an attribute that can vary both qualitatively and quantitatively a dual varying attribute. Including a dual variable attribute in the automobile example, automobiles are objects composed of the following attributes (style, engine type, drive train type, exterior color (intensity), window feature, brake feature, top speed, city mpg, highway mpg). A specific automobile is identified by the vector of characteristics (sports car, 4-cylinder engine, front wheel drive, blue exterior (intensity=5), . . . , electric windows, anti-lock brakes, 115 mph, 23 city mpg, 33 highway mpg). With this method, every product design is represented with a unique vector of characteristics. This method of representing a product's design is called an attribute-characteristic representation.

The attribute-characteristic representation is much more general than demonstrated by the preceding automobile example. The number of attributes in a product design can vary throughout a learning session and from product-to-product (like the way in which word length varies in a game of scrabble). Attributes can be real valued (such as top speed), integer valued (such as an integer scale of one to ten), or qualitative (such as a letters). In the case of qualitatively varying attributes, each attribute can express characteristics from different sets of characteristics (colors versus styles in the automobile example); characteristics from the same set, with duplications allowed (for example, letter combinations that produce words); or characteristics from the same set, without duplications (permutations). In addition, attributes can be diploid (such as dual varying attributes and the dominant-recessive genes made famous by Gregor Mendel's experiments with peas), triploid, or even more complex. Also, the attribute-characteristic method of accounting for a product's design can be recorded as a vector (as done above), with a matrix, as a single number, or through other suitable means.

The attribute-characteristic representation provides the means for representing all valid product designs. Recall that an attribute's domain specifies all of the possible characteristics that the attribute can express. The set of all valid product designs is produced by taking the cross-product of all the attribute domains (that is, taking every combination of characteristics).

The form of the attribute-characteristic representation is determined on a case-by-case basis with regard to the purpose of the MTS, the value function utilized (see below), and the available data structures.

Product Categories: A product set defined by product characteristics is called a product category. A notable quality of the attribute-characteristic representation of product designs is that one can readily define sets of products by characteristics. This quality is not important in prior art MTSs but, for reasons described below, is useful in the present invention. For qualitatively varying attributes, one defines a product category by the presence or absence of one or more characteristics. Three examples of product categories are (1) sports cars, (2) cars with four cylinder engines, and (3) sports cars with four cylinder engines. On the other hand, for quantitatively varying attributes, one defines a product category by specifying a range of values for the attribute. Three examples of such a product category are (1) cars with a top speed between 90 mph and 110 mph, (2) cars that have at least 20 city mpg, and (3) cars with a top speed between 90 mph and 110 mph and have at least 20 city mpg. In defining product categories, dual varying attributes are specified by the combining of the two methods illustrated above (for example, blue cars with color intensity between 3 and 7). A product category, therefore, can be defined based on the presence and/or the absence of attributes and can include any combination of qualitative or quantitative or other type of attributes.

The Product Value Function: The product value function assigns a value to each product. An important concept for understanding the kind of value functions used in the present invention is interactions. One can understand interactions by considering how attributes and characteristics contribute to a product's value. Interactions exist when an attribute's contribution to the value function depends upon the characteristics expressed by one or more other attributes. For example, how much value does a red exterior add to the value of a particular automobile? This question is difficult to answer. The value of a red exterior depends upon an automobile's style. It is highly valued on sports cars but not on limousines. In this example, the contribution-to-product value of a particular characteristic expressed by one attribute (here, exterior color) depends upon the characteristics expressed by other attributes (e.g., style). This effect is called an interaction and for some attribute-characteristics can be associated with "frustration."

Frustration occurs when improving one attribute's contribution to product value decreases the contributions of other attributes. Strong frustration exists when the effect decreases the total product value and such frustration makes product design a difficult task. In the automobile example, changing the characteristic expressed by the style attribute from sports car to limousine increases the contribution of the style attribute to the product's value. Simultaneously, this change decreases the contribution of the red color expressed by the exterior color attribute. In total, the value of the automobile decreases.

As used herein, a product value function in which interactions produce strong frustration and therefore exhibit multiple optima are referred to as "multipeaked value function" (see the glossary). The present invention uses multipeaked value functions in an MTS to more closely model, among other things, innovation. These functions can be found in optimization problems from a variety of fields, including combinatorial optimization, genetic algorithms, cellular automata, computer science, molecular biology, management science, and evolutionary biology. Specific examples of optimization problems that include a multi-peaked value function include designing the layout of an integrated circuit, finding the shortest tour connecting a set of cities, scheduling production in a factory, and finding a protein that catalyzes a particular reaction.

A Visual Metaphor: One can understand the multipeaked value function, and its difference from the prior art distance value functions described in the Appendix using a visual metaphor. Consider all possible product designs to lie along a horizontal surface, with similar products lying close to each other and dissimilar products lying far from other products. Assuming no dual varying or similarly complex attributes, if a product has n attributes, one would need an n-dimensional space to properly accomplish this task. A visual metaphor is appropriate for considering a two attribute product.

To complete the visual metaphor, a mark is placed above each product at a height equal to the overall value of the product that it resides above. When this task is completed, one has created a distribution of product values over the surface of the products. This multidimensional arrangement of products together with the distribution of product values is called a product space. The shape of the distribution of product values in a product space is called the product space's topology.

The product space's topology shows how design quality varies over the product space. The product space can be visualized as a mountain range with the most valued products lying on the surface beneath mountain peaks and the least valued product lying on the surface beneath valleys. The topology of the mountain range significantly affects the nature of students' task in an MTS and the dynamics of an MTS. Does the product space topology resemble Mount Fuji: a single peak, with broad, smooth slopes? Does the product space topology resemble the Rocky Mountains: many peaks of varying heights, valleys of varying depths, and sudden changes in altitude?

Figure 3:
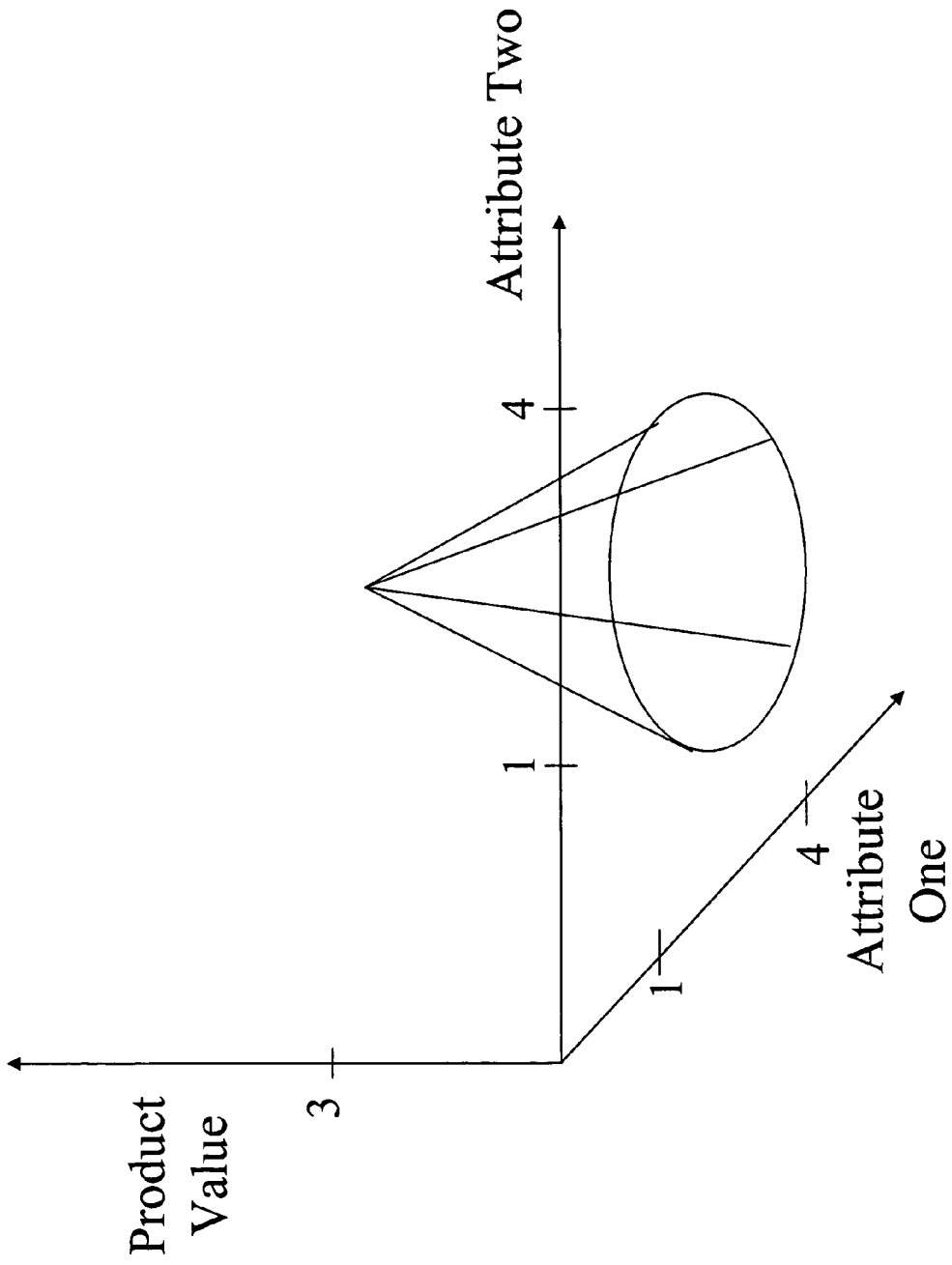
FIG. 3 depicts a single peaked value function.

In both the visual metaphor and the real multidimensional product space, the amount of frustration among attributes determines the topology of the product space. If there is no strong frustration (as in the prior art, where there is no frustration—see Appendix), the topology is Mount Fuji-like, that is, single peaked. FIG. 3 provides a two attribute example. In this figure, products have two attributes (plotted along two of the axes), each of which expresses a real number between one and four. The value function is single peaked like a pyramid or cone to pick two basic geometric forms. The product value varies from zero to three (along the third axis).

Figure 4:
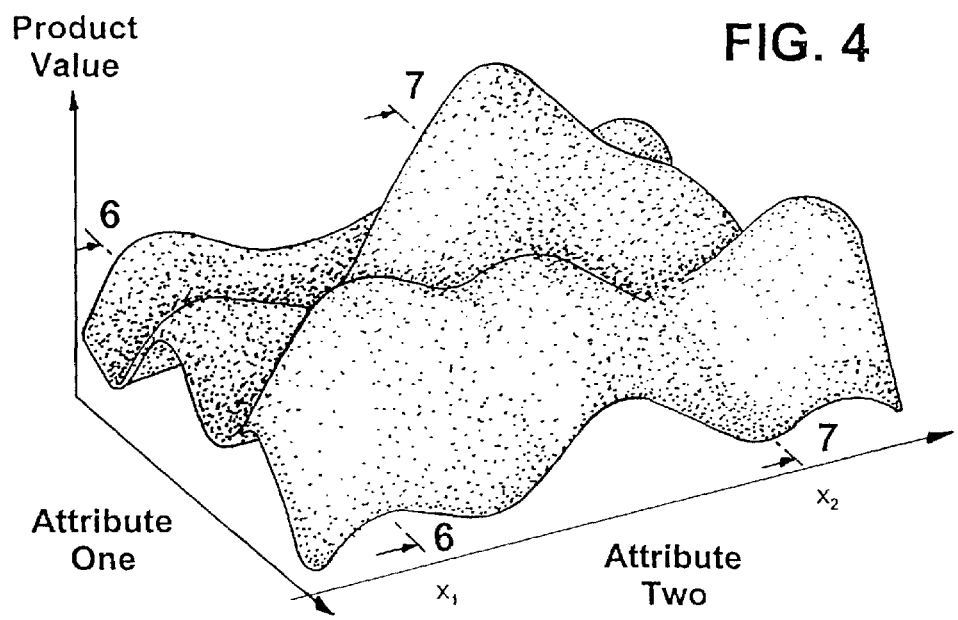
FIG. 4 depicts a multipeaked value function in a three-dimensional landscape representation of product value versus two attributes.

However, when strong frustration exists, the product space can have a multipeaked topology. In formal terms, a multipeaked value function has as least one local optimum, in addition to a global optimum. FIG. 4 provides an illustration of a two attribute, multipeaked value function in which the two attributes exhibit strong frustration. As described below, it is the complex topology that produces the unique qualities of the present invention. For a discussion of value function topography, see: Stuart Kauffman, *The Origins of Order: Self-Organization and Selection in Evolution* (New York: Oxford University Press, 1993), chapter 2.

In addition to its multiple optima, multipeaked value functions of the type used in the present invention possesses another property absent from smooth and some rugged value functions: an optimal product cannot be discovered by varying the attribute-characteristics independently. To illustrate this property, consider a product that has two attributes: $a_1$ and $a_2$, where each attribute expresses an integer between one and ten. Suppose that the product in the product space with the highest value has $a_1 = 3$. In the prior art value functions, for any value of $a_2$ three is the best choice for $a_1$. Because of this, students using prior art MTSs can find the best product by treating each attribute independently (see the appendix). In the example above, once a student has discovered that three is the best value for attribute one, he need not consider attribute one again. He can focus exclusively on finding the best value for attribute two. However, when a multipeaked value function is used, the best value for an attribute depends upon the characteristics expressed by other attributes. FIG. 5 demonstrates this quality.

Figure 6:
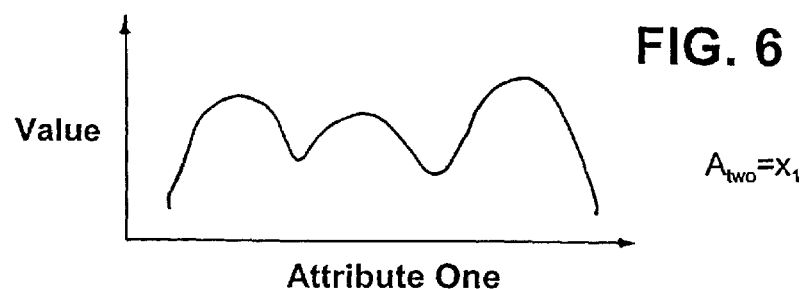
FIG. 6 depicts a 'slice' from FIG. 4 in a two-dimensional curve representation wherein one attribute is held constant.
Figure 7:
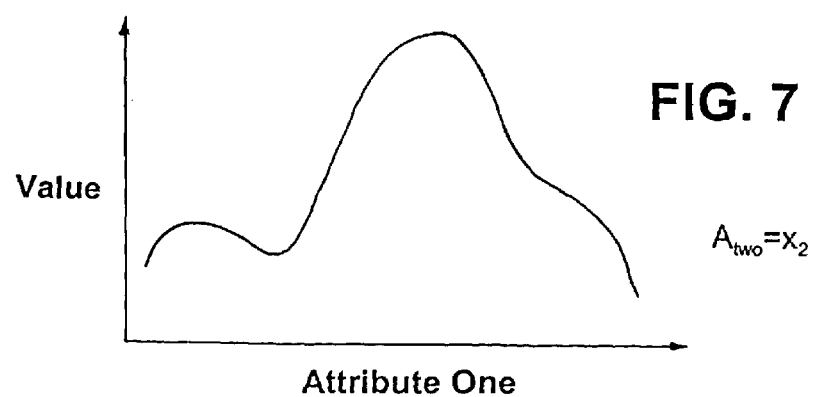
FIG. 7 depicts a 'slice' from FIG. 4 in a two-dimensional curve representation wherein one attribute is held constant.

FIG. 5 shows a value function for products that have two attributes, each expressing a characteristic from the set {A,B,C,D}. In FIG. 5, no two rows have their highest value in the same column. Likewise, no two columns have their highest value in the same row. FIGS. 6 and 7 illustrate this same quality for the value function depicted in FIG. 4. Each figure depicts a 'slice' that shows how the value function varies with $x_1$ for a different particular value of $x_2$. As can be seen, the best value for $x_1$ in FIG. 6 is not the best value for $x_1$ in FIG. 7. Because of this quality of multipeaked value functions, students cannot find the optimal product by considering each attribute independently. Instead, students must simultaneously consider several attributes, and this interaction of attributes has consequences described below.

Correlation: Correlation is a function of the product value function and is closely related to product space topology. In important embodiments of the invention, students will use their knowledge of the value of one product design to predict the values of others and the quality (fit) of their prediction depends on correlation. The capability of information about the values of products to predict the values of other products is given by measures of correlation. For this reason, measures of correlation are useful in selecting the value function that produces the information properties desired for a particular MTS.

The predictive capacity of information increases and decreases with measures of correlation. These measures show that single peaked value functions are highly correlated over the product space. Information about the values of products provides significant information about the values of many other products. For multipeaked value functions, correlation decreases with strong frustration. Specifically, if changes in product design or product category definition include changes to attributes that exhibit strong frustration, correlation will decrease faster than in single peaked value functions. For an example of this effect, see: Bernard Manderick, Mark de Weger, and Piet Spiessens, "The Genetic Algorithm and the Structure of the Fitness Landscape," in *Proceedings of the Fourth International Conference on Genetic Algorithms*, edited by Richard Belew and Lashon Booker (San Mateo, Calif.: Morgan Kauffman Publishers, 1991), pp. 143-150. As more or larger such changes occur, correlation will decrease even faster. Because of this quality, correlation on multipeaked landscapes is typically high for only small changes. Metaphorically, this means information is useful only in making localized predictions about the mountain range topology.

Students can use either of two methods to predict product values:
1. Students will use their knowledge of the value of a specific product to predict the resulting value of design changes. For example, how well does the value of the automobile (sports car, 4-cylinder engine, front wheel drive, blue exterior, . . . , electric windows, anti-lock brakes) predict the value of the automobile (utility vehicle, 4-cylinder engine, front wheel drive, blue exterior, . . . , electric windows, anti-lock brakes)? The capability of knowledge of the value of one product to predict the values of other products depends on how correlation varies with changes in a product's design.
2. Students may also use the value of products in a category to predict the values of products in another category. For example, what do strong sales of front wheel drive sports cars indicate about the values of rear wheel drive sports cars? The values of products in one category will be good predictors of the value of products in another category if the categories are correlated.

For each type of prediction, and for the purpose of selecting a value function for use in an MTS, appropriate measures of correlation exist:

To calculate the predictive capacity of knowledge of the value of a given product for the purposes of a design change, one uses an autocorrelation formula with changes stemming from the existing product design. For a description of the autocorrelation function, see Manderick, et al., supra. The autocorrelation function is usually discussed with reference to qualitatively varying attributes. For quantitatively varying attributes, one generates the required sequences of designs by iterative applications of the following steps:
1. randomly choose an attribute,
2. randomly choose a number from the set $\{-x, +x\}$, where x is small compared to the range which the attribute can vary, and
3. add the chosen number to the attribute's value. By using a small x, one ensures that the perturbation of the attribute is a small step in the 'mountain range.'

To measure the correlation between two sets of products, one performs the following procedure:
1. Form a set of products consisting of the union of the two product categories.
2. From the union, randomly choose several different products (the quality of the estimate increases with the number of samples).
3. Ascertain that each randomly chosen product is a member of at least one of the product categories. To calculate correlation, each of the randomly chosen products must be paired with a product from the other product category. Specifically, pair the randomly chosen product with the product in the other category that is most similar. If several products tie on this criterion, randomly select one of these products for pairing. In the case of qualitatively varying attributes, similarity is defined as having the greatest number of characteristics in common. In the case of quantitatively varying attributes, similarity is measured by a distance function, where products that are closer together are more similar.
4. For each pair of products, calculate the products' values.
5. From the pairs of product values, one can calculate the correlation between the two product categories using the standard equation from statistics.

To aid an MTS designer in selecting a value function, there are several useful correlation functions discussed in related academic research, as well as their relationship to product space topology, see: Manderick et al., supra; see also Marc Lipsitch, "Adaptation on Rugged Landscapes Generated by Iterated Local Interactions of Neighboring Genes, "in *Proceedings of the Fourth International Conference on Genetic Algorithms*, edited by Richard Belew and Lashon Booker (San Mateo, Calif.: Morgan Kauffmann Publishers, 1991), pp. 128-135; Stuart Kauffman, *The Origins of Order: Self-Organization and Selection in Evolution* (New York: Oxford University Press, 1993), pp. 63-66. Bernard Manderick, "Correlation Analysis," in Thomas Back, David Fogel, and Zbignies Michalewicz, *Handbook of Evolutionary Computation* (New York: Oxford University Press, 1997), section B2.7.3 (hereafter referred to as HEC).

Some Examples of Value Functions: The attribute-characteristic representation and the value function work together; however, in order to apply an attribute-characteristic representation, one must define a value function that can accept its form (that is its combination of qualitative, quantitative, and other, more complex attributes) or else the attribute-characteristic representation cannot be used in a model or simulation. "Management Applications and Other Classical Optimization Problems," by Volker Nissen in section F1.2 of HEC provides a list of references of academic articles that investigate the optimization of these kind of value functions. From reviewing these articles, one can find many examples of suitable value functions, some of which may be found to be suitable to the task upon experimentation. Some examples of suitable multipeaked value functions for modeling innovation include:

Quantitatively Varying Attributes: One can create a multi-peaked function by summing multiple single peaked functions, for example Gaussian distributions. The "after Fletcher and Powell" function described in Thomas Back's *Evolutionary Algorithms in Theory and Practice* (New York: Oxford University Press, 1996), offers another function for representing quantitatively varying attributes. In this case, each product attribute represents a coordinate axis. Using Back's formulas, one may incorporate any number of attributes. Such a function can be applied here to accommodate qualitatively varying attributes and dual varying attributes by coding one or more of the coordinate axes into a discrete representation. Genetic algorithms frequently convert a real numbered axis into a base two (bit string) representation. A description of this process is given in Alden Wright's, "Genetic Algorithms for Real Parameter Optimization," in *Foundations of Genetic Algorithms*, edited by Gregory Rawlins (San Mateo, Calif.: Morgan Kauffman Publishers). Using an analogous process, one can convert a real numbered axis into a discrete representation of any base and with any number of attributes.

Qualitatively Varying Attributes:
1. One can use any continuous multipeaked function to model qualitatively varying attributes by converting the axes into a discrete representation. For example, one can convert each axis of a two dimensional "function after Fletcher and Powell" function into hexadecimal representation that has six digits. This would produce a product that has twelve qualitatively varying attributes, each expressing sixteen characteristics. Nk-landscapes: Biologist Stuart Kauffman developed nk-landscapes in his research into to the properties of rugged value functions. For a description of nk-landscapes, see Stuart Kauffman's *The Origins of Order: Self-Organization and Selection in Evolution* (New York: Oxford University Press, 1993), chapter 2. The nk-landscape is particularly useful because its parameters permit one to easily adjust its correlation properties.

2. Many combinatorial optimization problems provide suitable value functions. For example, one can look to scheduling or packing problems for suitable functions. Ralf Burns's article "Scheduling," in section F1.5 of HEC describes scheduling problems and also describes, with references, several alternative attribute-characteristic representations that one may use with scheduling problems. Similarly, Kate Juliff's article, "The Packing Problem," in section F1.7 of HEC describes packing problems and also describes, with references, several alternative attribute-characteristic representations that one may use with packing problems.

Dual Varying Attributes: The product value function for representing dual varying attributes can be the objective function used in combinatorial optimization problem of a traveling salesman problem (TSP). "The traveling salesman problem is the problem of visiting each vertex (i.e., city) in a full connected graph exactly once while minimizing a cost function defined with respect to the edges between adjacent vertices. In simple terms, the problem is to minimize the total distance traveled while visiting all the cities [in a set of cities] and returning to the point of origin." Darrell Whitley, "Permutations," in section C1.4 of HEC, p. C1.4:1. When using the objective function of a TSP, the characteristics expressed by attributes are the destinations (cities) in the TSP.

In order to create dual varying attributes, in accordance with an aspect of the invention, one adds a reference point to the TSP. The intensity of any attribute is equal to the distance from the reference point. As students adjust the intensity of a dual varying attribute, the destination expressed by that attribute moves so that the new intensity equals the distance between the destination and the reference point. A product's value is then calculated with this new configuration of destinations. Note that with this method, any number of attributes can be converted from qualitatively varying attributes to dual attributes.

Selecting Good Products? What kind of products could the system just described represent? Building a simulation around a real product presents two problems. First, fitting a multipeaked value function to a real product's "value function" is problematic. Why should the real value function for automobiles be anything like a value function found in texts on genetic algorithms? Second, in many embodiments students seek the most valuable products. This means that students should not already know the topology of the multipeaked value function. Students might already know the value function of a real product; for example, most people already know that red is a bad color for limousines. When building an embodiment of this invention, one should create compelling products for which students do not know the topology of the multipeaked value function. The following are some useful examples:

1. Subject of an Optimization Problem: The product could be the subject of an optimization problem. For example, suppose one uses the objective function from a scheduling problem as the multipeaked value function. The products can be schedules. This has three good results. The product is real. The multipeaked value function realistically represents the product values. The value function is too complex for students to know it in advance.

2. Products with Components: One can build a fictitious situation from a known problem. One only needs a product with lots of interactions among its components. One example is a personal computer. In this case, the attributes represent system components and software (operating systems, device drivers, motherboard, microprocessor, RAM, hard drive, CD-ROM, and others). The characteristics are different types and brands of components and software. The interactions among the attributes simulate how different components work together. For example, the interactions between the RAM and processor can affect system performance. The characteristics should be fictitious. This way the students will not have preconceived knowledge or expectations about the multipeaked value function.

3. Visual Design Objects: Students might design a visual product, such as flowers or paintings (sold at a simulated auction). Using the flower example, attributes can be the number, size, color, and color pattern of the petals; the size, color, and color pattern of the stem; and the number, size, color, and color pattern of leaves on the stem. When designing a product, students can use a drawing program. The students need not see, nor even be aware of, the attribute-characteristic representation. The value function gives each flower a market value for a fictitious market. Again, the student must discover and learn about the interactions.

4. Chemical Formulas: The students can design chemicals, such as medicinal drugs, plastics, or solvents. This is a natural fit because the properties of many chemicals are determined by interactions among their constituent components (for example, reactions involving proteins). Students can even see the symbolic attribute-characteristic representation used by the simulation. As any organic chemistry textbook demonstrates, chemical formulas are strings of letters. In this embodiment, the value function describes how the interactions of component molecules affect the chemicals' properties. Properties can include, for example, ability to heal the sick (medicinal drugs), strength (plastics), stickiness (adhesives), or potency (solvents).

Section 2: An illustrative Embodiment:Competitive Search of a Product Value Function A basic MTS embodying the present invention is described with reference to FIG. 8. In the following discussion, products are described as including only one trait; however, they can include additional traits including business process traits and aggregates. Thus, in the following description, products have only qualitatively varying attributes. In addition, for simplicity, the interface is minimal, and firms have few characteristics. Though unembellished, the embodiment shows how to incorporate multipeaked value functions in an MTS. From this example one can construct more sophisticated MTSs, including product definitions which include system-set attributes.

FIG. 8 displays the architecture of an MTS in accordance with the invention. Many of the components are similar to those of a conventional MTS: a marketplace (801), a plurality of firms controlled by students (805), and interfaces (807). In addition, however, the MTS in this embodiment includes a market database (806) which contains records of each product's sale in all rounds of a learning session. With this additional information, students can analyze the entire history of the marketplace.

Preferably this embodiment comprises two programs and a spreadsheet file:
1. Program #1 models the (a) marketplace (801) and (b) firms (805) and (c) provides an interface (807) for each student.
2. Program #2 is a spreadsheet program for viewing and analyzing the marketplace results (for example, Microsoft Excel or Lotus 123).
3. A spreadsheet file defines the market database (806) containing a record of all of the marketplace results.

The functionality and operation of these components are discussed next.

Marketplace Specifications

Products: Products are comprised of an arbitrary number of attributes (e.g., n=10). Each attribute varies qualitatively and can express one of twenty-six characteristics. These characteristics are represented by the letters of the alphabet. For example, the sequences 'ASDFGHJKLL' and 'QWERTYUIOP' are different products. FIG. 9 displays the product 'ASDFGHJKLL' having ten fields (901-910). The letter in each field is the characteristic expressed by (that is, the instantiated value of) the corresponding attribute in the product 'ASDFGHJKLL'.

The Product Value Function: In this illustrative embodiment the value of a product is calculated with an nk-landscape function, although other multipeaked value functions can be used. An nk-landscape has four parameters that are important for the illustrative embodiment. These are (1) the number of product attributes, n, (2) the number of characteristics that each attribute can express, b, (3) the average number of interactions per attribute, k, and (4) the arrangement of the interactions over attributes. The third and fourth parameters make nk-landscapes particularly useful. They permit adjusting the amount of interactions, frustration, and correlation in the nk-landscape. By adjusting k one can achieve an appropriate multipeaked value function for use in an MTS, as described next.

The values of n, k, and b are selected to produce an appropriate product value function. As the number of product attributes, n, increases, the variation in product values decrease. For this reason, products in the illustrative embodiment preferably have fewer attributes and a greater number of characteristics. This allows for sufficient variation in product values while still presenting students with a sufficiently difficult design problem.

In the embodiment described herein, n=10, b=26, and k should have a value of $2 \leq k \leq 4$. One can arrange interactions evenly over attributes. This produces a value function with high correlation for small changes in product design (for example, a change of a single characteristic) and low correlation for more substantial design changes. From these recommendations, one of skill may adjust the values of the n, k, and b parameters to suit their particular MTS needs.

The Market: In the marketplace model of this illustrated embodiment, products have only one trait: product value. A market manipulator 802 accepts product value as its independent variable and calculates demand each round. To calculate demand, the market manipulator preferably uses a set of equations as described in U.S. Provisional Application Ser. No. 60/094,900, filed Jul. 31, 1998, or the Gold and Pray system of demand equations. Steven Gold and Thomas Pray, "Simulating Market-and Firm-Level Demand Functions in Computerized Business Simulations," Simulations and Games, vol. 15 (September 1984): pp. 346-363.

Technological Advance: At the start of a learning session, the illustrative embodiment restricts the domains of one or more attributes, thereby limiting product design to sufficiently low valued products (for example, only characteristics 'A' through 'G' are allowed in product designs). Students compete by designing products with the allowed characteristics. During the learning session, the restrictions are relaxed, either incrementally (a few characteristics each round) or altogether (all restrictions removed in a single round), as described below.

Royalties: Define products as similar if they differ by less than a predetermined number of characteristics. A product is new to the marketplace if (1) it is appearing in the marketplace for the first time and (2) no similar products have appeared in the marketplace. If a firm produces a product that is new to the marketplace it has rights to the product and all similar products. This means that, for a limited number of rounds, if competing firms produce the product or a similar product, they must pay a royalty to the inventing firm. The duration and size of the royalty are adjustable parameters, set at the start of the learning session. One versed in the art can readily set the royalty parameters as desired and/or to fit real-world industry practice.

Manufacturing: Each unit of production capacity is best suited for manufacturing a particular type of product. This is called its specificity. Production capacity's specificity is designated by a product design. For example, capacity of type ASDFGHJKLL is best suited for producing the product design ASDFGHJKLL. Producing any other type of product increases the variable cost of production. For example, let Z represent the number characteristics in which the design of a product to be manufactured differs from the specificity of the production capacity used in the production. Let Y be the base unit variable cost, and let d be a constant. The cost for producing each unit of product is:

$$\text{Unit variable production cost} = (d*Z) + Y$$

The value of d is set by the illustrative embodiment at the start of the learning session.

Production capacity is purchased/scraped in blocks of capacity (for example, one hundred units). The cost of a block is constant over all specificities and throughout the learning session. The same is true of the scraping value. Similarly, the base variable production cost is constant over all product designs and throughout the learning session. One versed in the art can readily set the manufacturing parameters as desired and/or in accordance with real-world examples.

Firms' Specification

In the illustrative embodiment, all firms are controlled by students. As shown in FIG. 10, firms have two characteristics: (1) a budget 1001 and (2) production capacity 1002 of identified specificity and unit capacities. The firm of FIG. 10 has a budget of five hundred and ten dollars and two types of production capacity. The firm has seventy-five units of capacity of specificity QWERTYUIOP and twenty-five units of specificity ASDFGHJKLL. With this capability, this firm can produce one hundred units of products each round (assuming its budget covers the variable costs of production and royalties).

In addition to production capacity, firms have three routines or methods. (Firms are programmed as objects in an object oriented programming language). These routines (1) update the firms' budget, (2) update the firms' product capacity, and (3) send the firms' products to the marketplace.

The Interface

Each student has one interface. The interface has four fields for recording a student's decision. It also has routines for sending information to a student's firm (e.g. by posting the results from a form). (The interface is programmed as an object in an object oriented programming language).

Students' Tasks

Marketing Analysis: Each round, the marketplace results are recorded in the market database. Using charts, graphs, and/or any means that they deem appropriate, each student analyzes the market database.

Management: Based on his analysis of the market database, each student (1) analyzes the marketplace result, (2) designs products, (3) chooses products to manufacture, (4) buys and sells production capacity, and (5) determines production schedules. In steps 1 and 2, the student is trying to identify the best designs, the "peaks" of the value function. Referring to the mountain range metaphor, this act of iteratively designing and testing products to determine the best is called searching the value function.

The interface helps a student keep track of his decisions. FIG. 12 depicts an interface. The interface contains four fields:

1. Field 1201 shows the student's firm's budget.
2. Field 1202 shows a student's firm's production capacity. The left side lists the specificity of the production capacity. The right side lists the units of capacity. FIG. 12 depicts two types of capacity: QWERTYUIOP with seventy-five units and ASDFGHJKLL with twenty-five units ("Units").

A student purchases/sells production capacity by increasing/decreasing the maximum production listed in the right column. The student can also purchase new production capacity by adding a new row to the list. This method must be used when purchasing production capacity with a specificity that differs from the firm's current production capacity. As a student purchases/sells production capacity, the interface automatically adjusts his firm's budget (displayed in field 1201).
3. In field 1203 a student enters his firm's production schedule for the current round. In its three columns, the student lists the products to be produced, the production amounts, and the capacity utilized. FIG. 12 shows five entries. Notice that separate entities are required whenever the product or utilized capacity differs. As a student develops a production schedule, the interface automatically adjusts his firm's budget (displayed in field 1201).
4. Field 1204 is the 'manufacture and ship button.' When satisfied with his production decisions, a student uses a mouse to 'click' on this button. This signals that his decisions are complete. If the production decisions have not reduced the budget to negative values, the interface sends the student's production decisions to his firm.

A negative budget means that the student's production decisions require more capital than the student's firm has in the current round. If a student tries to 'manufacture and ship' with a negative budget as determined by a script, function call, or applet; in a conventional manner, the interface alerts the student to the problem. The student can then adjust his capacity and production schedule accordingly.

The Market Database Specifications

The market database is a spreadsheet file on a student's computer. FIG. 11 shows a market database. Firms' production are listed in rows, with each row listing a specific type of product produced by a firm. The first column of this file lists the period that products were sent to the marketplace. The next ten columns specify the product type by listing its characteristics. Column twelve lists the firm that produced the products. Column thirteen lists the number of products sold in the marketplace.

The Operation of the Illustrative Embodiment

This embodiment generally progresses through the five steps of prior art MTSs which are repeated each round. In addition, this embodiment also requires two additional steps that occur only once during a learning session. First, the illustrative embodiment initializes the learning session before the initial round. Second, the illustrative embodiment simulates a technological breakthrough during the learning session. Below, I describe the five steps repeated each round and then I describe the two additional steps.

Steps One, Two, and Three: The first three steps of the illustrative embodiment consist of each student (1) analyzing the marketplace information, (2) making decisions for his firm, and (3) sending these decisions to his firm through the interface. This includes the following tasks:

1. Each student views and analyzes the market database for the purpose of designing products and setting a production schedule for the round. To accomplish these tasks, students utilize charting, graphing, intuitive heuristics, and/or other means that they deem useful. This can include hypothesizing product categories and perspectives, as described below. For simplicity, this embodiment does not record or analyze this process.
2. Based upon their analysis of the market database, each student designs new products for his firm.
3. Choosing from the products previously offered to the marketplace and from his new designs, each student selects products to manufacture in the current round.
4. Each student determines the production volume for each product that he will manufacture. If desired, each student can buy new production capacity or sell unused production capacity. When making production decisions, a student cannot exceed his firm's budget. Students should account for the cost/revenue of buying/selling production capacity, the variable production costs, and royalties.
5. Using the interface, each student sends his production plans to his firm.

Step Four: After the interface sends a student's production plans to his firm, the illustrative embodiment causes for each firm (1) an update to its production capacity, (2) an update in its budget, and (3) sends the products and production volumes of that firm to the marketplace.

Step Five: The marketplace receives the production from the firms. Using an nk-landscape function as a product value function described above, a product evaluator (FIG. 8, field 803) evaluates each product. After products are valued, the market manipulator (FIG. 8, field 802) takes the products' values as input and calculates demand using either the equations in the aforesaid provisional patent application or a Gold and Pray system of demand equations. From the demand and firms' production, the marketplace calculates sales. The marketplace then records the results in the market database and sends the revenues to the appropriate firms. Subsequently, the firms' routines update their budgets accordingly.

After completing these five steps, the round is complete, and the next round, if any, begins with step one. As the rounds iterate, students compete by searching the value function to find, and manufacture, the best products. For this reason, this embodiment is a competitive search of the product value function. Initializing the Learning Session: Before a learning session can begin, the computer must initialize the learning session. To accomplish this, it performs the following steps:
1. The computer gives each firm a starting budget.
2. The computer simulates a round of sales and places the results in the market database. This is done so that the market database will contain analyzable data for the first round of a learning session (data as used herein includes the singular). To simulate sales, the computer randomly generates a sufficient number of products and 'manufactures' a predetermined number of each product. The computer then calculates sales using the procedure presented above. The results are placed in the market database, listing the round as zero. No revenues are sent to firms.
3. So that the illustrative embodiment can simulate an industry life cycle in later rounds, the design restrainer (FIG. 8, field 804) restricts the domains of one or more product attributes so that students can only design products of sufficiently low value. To do this, the computer searches randomly (or with an algorithm such as a genetic algorithm) for a product of sufficiently low value. Once one is found, the computer identifies a correlated set of products. The computer does this by identifying the attributes that affect the greatest number of other attributes (the most interactive attributes). The domain of each of these attributes is restricted to one characteristic: the characteristic that it expresses in the identified low value product. At the start of the learning session, only the product designs that conform to these constrained domains are valid designs.

Simulating a Technological Breakthrough: Through competition, students will settle on a category of products from the initially valid set of product designs. Once this occurs the number of innovations in each round will decrease. The decrease occurs because as designs improve it becomes more difficult, and therefore costly, for students to find better designs from the same product category. The illustrative embodiment monitors the rate of innovation. When the rate of innovation is sufficiently low, the design restrainer, 804 of FIG. 8, as implemented by the central computer, 2010 of FIG. 20, or instructor, 2020 of FIG. 20, expands the domains of the product attributes that have been restricted. This simulates a technological breakthrough. The design restrainer can restore the full domain of the attributes in a single round or does so piecemeal over several rounds. As domains expand, students can search through the larger set of allowable products. When all of the restrictions are removed, students can search the entire product space.

Section 3: Ramifications

The MTS of the illustrated embodiment changes the simulation of innovation and technological advance. It also fundamentally affects the students' tasks of analyzing marketplace results and designing products. As these tasks are central to many MTSs, other tasks that an MTS demands of students are also affected, as well as the dynamics of the simulated industry. These ramifications are described below.

Designing Products: Students design products by selecting the characteristic expressed by each product attribute. When designing products, students face two problems. First, there are an enormous number of designs. In the described embodiment, for example, products can have ten attributes with each attribute expressing one of twenty-six characteristics. Thus, students can choose from $26^{10}$ unique products. A student can consider only a small number of these possibilities. Second, attributes interact and produce strong frustration. Because of this, students cannot optimize design by considering each attribute independently. Instead, each student must discover valued combinations of characteristics.

One strategy to efficiently design high value products is to hypothesize and evaluate product categories. By using product categories, a student greatly simplifies the design problem and learns decision making skills in the process. He can evaluate the potential of an entire category of products rather than evaluate every single product. Specifically, a student evaluates a category by observing the marketplace performance of a few products from that category. If the product category shows potential (its products fair well in the marketplace competition), the student concentrates his effort and investment in that category. If the category evaluates poorly, the student hypothesizes new categories that he believes will produce better results and implements those revised designs in subsequent rounds.

Projects: In order to develop valuable products more quickly and efficiently, the student hypothesizes several product categories and searches within each one. The exploration of each hypothesized product category is called a project. A student can manage a portfolio of projects, deciding when to initiate new projects, when to cancel projects, and how to distribute his firm's budget among projects. Selecting product categories to search is an important decision. The product categories that a student focuses upon define his business.

Figure 13:
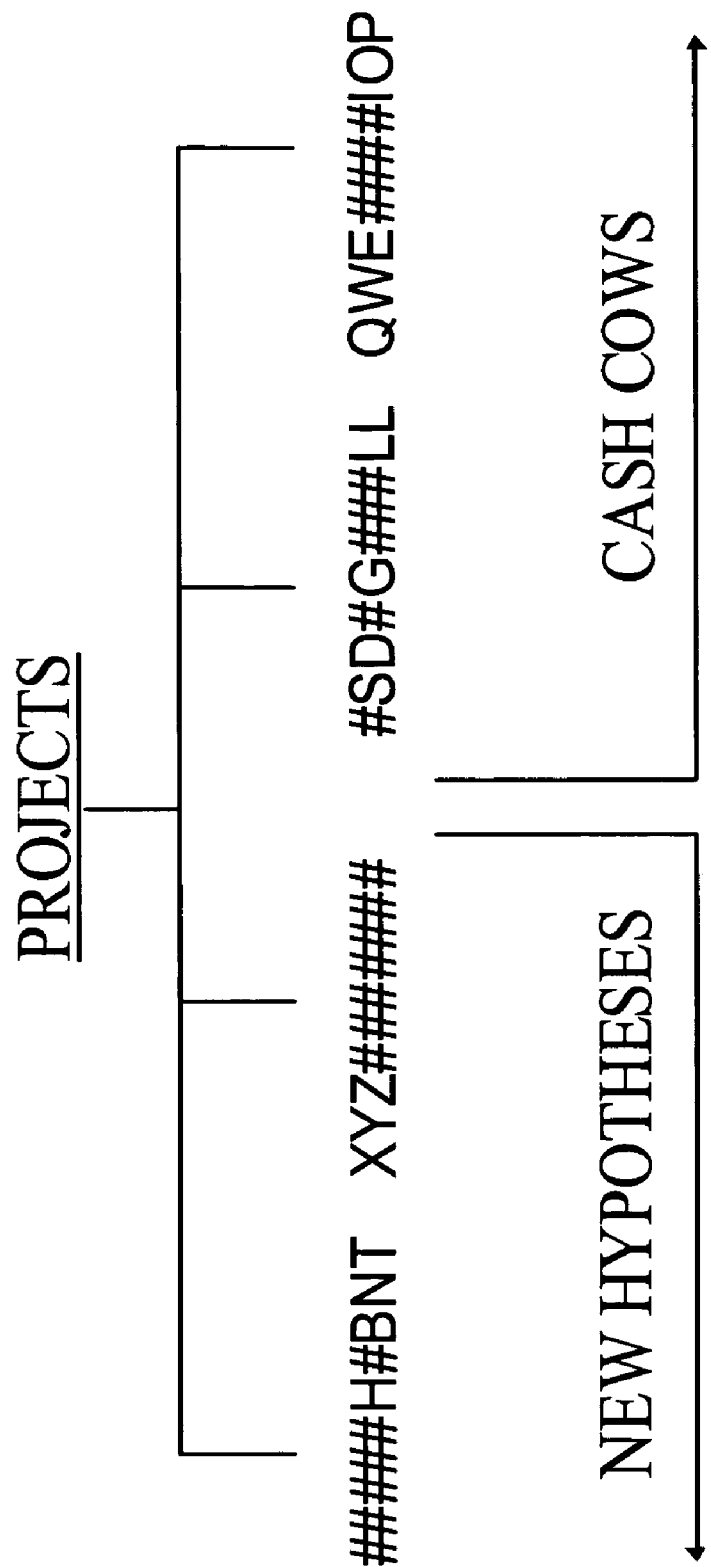
FIG. 13 depicts a student's portfolio of projects.

FIG. 13 depicts a firm's portfolio with projects defined upon qualitatively varying attributes; however, the portfolio can contain projects defined upon quantitatively varying attributes or other types of attributes. In this figure, product categories are defined by listing the characteristics that define a category and placing a number sign in the remaining attributes. The number sign indicates that these attributes are not part of the category definition. For example, (ABC#######) represents the product category where the letters A, B, and C are expressed in the first, second, and third attributes, respectively. The products (ABCYHUK-MNR) and (ABCRDWSZGY) are members of this category.

FIG. 13 shows four projects. Projects (#SD#G###LL) and (QWE####IOP) are cash cows. They produce products that are successful in the marketplace. The student managing this firm exploits these product categories through production; they provide his firm's revenues. Although the student has two cash cows, competition compels him to search for higher value products. He must find higher value products more quickly and efficiently than his competitors or suffer a competitive disadvantage. Product categories (#####H#BNT) and (XYZ#######) are the student's hypotheses of product categories containing higher value products. Production from these projects will likely be small as the student focuses on evaluating these categories.

Perspective: Students need not randomly hypothesize product categories or randomly design products. Instead, they hypothesize product categories and design products after studying the marketplace results, for example, as may be provided in the marketplace database (see FIG. 11). In studying the marketplace results, students try to identify characteristics that contribute significantly to products' values. These characteristics can be identified by their appearance in products that are successful in the marketplace and their absence from products that are not successful in the marketplace. If a student desires information not provided by the previous marketplace results, he will experiment by manufacturing a small quantity of products and offering them to the marketplace. Having identified valued characteristics, a student will combine these characteristics to create products.

A student faces a difficult problem in analyzing marketplace information. The marketplace produces an enormous amount of information whether attributes vary qualitatively, quantitatively, or both.

To cope with the voluminous information, a student must select the information that is most effective and relevant to his business. One strategy for accomplishing this is evaluating only a few product categories. These categories might include, for example, the student's projects, potential projects, and product categories defining his competitors' products (as defined by the student). I call this set of product categories a student's perspective.

A perspective has the effect of categorizing the marketplace data. In doing so, it filters the market information, selecting the information that a student feels is most important. It is the means through which a student 'frames' the complex problem of competing, surviving, and profiting. It can be interpreted as a student's definition of the market. Different perspectives filter the marketplace results differently. Students with different perspectives will identify and miss different opportunities; evaluate product categories differently; and value information differently. Results that are surprising to one student might easily be anticipated by a student with a different perspective.

Innovation: Because students design products, innovation is defined in terms of product design. Specifically, an innovation is a product that differs from the previous products offered to the marketplace by at least one characteristic. A student's innovations will come from his strategy of search. For example, every product category possesses a unique distribution of product values. When a student determines the product categories that he searches, he determines the distribution of product values corresponding to the innovations that he may produce. The student determines whether he searches a barren category or one pregnant with innovations. Moreover, a student changes the product categories that he searches as he gains knowledge. As a result, innovation is primarily a function of a student's development and application of knowledge—i.e., knowledge management. In general, a student determines and modifies his search strategy and thereby affects the opportunities before him. In stark contrast, innovation in prior art MTSs have relied upon exogenously determined sets of new product designs coupled with innovation probabilities and are essentially an investment decision where spending more increases the probability of designing better products.

Short- and Long-Run Strategies: Innovating via perspectives and product categories creates a dilemma for students. A student can direct his efforts and investment towards product categories that the marketplace results have identified as most promising (categories that have done well in previous rounds). By exploiting this 'current' knowledge, a student immediately increases his firm's profits and the competitive pressure on his competitors. This is a short-run strategy. Alternatively, a student can take a long-run strategy and invest in discovering new product categories that contain higher value products (that is, new core competencies as described below). By developing new knowledge, a student can gain a large competitive advantage in future rounds. This requires time and investment, and there is a risk that no such product categories will be found. Balancing investment between these two alternatives is the quintessential knowledge management dilemma.

A Continuum of Innovations, Incremental through Radical: Using either the autocorrelation function with a specified product as a starting point, or by measuring the correlation between product categories, one can define a measurable continuum of innovation types. Consider the product categories containing a significant number of the products offered to the marketplace in previous rounds. Incremental innovations are innovations from product categories that are highly correlated with at least one of these product categories. Radical innovations are innovations contained in product categories that are not correlated with these product categories. Innovation type is measured by these correlations.

Because the innovation measure can be defined as either changes in a product's design or as a comparison of product categories, this measure is relevant to students when they design products and study the marketplace results. If a new product is an incremental innovation, analysis of previous marketplace results provides a good prediction of the new product's value. Incremental innovation can rely primarily upon market analysis. In contrast, previous marketplace results are poor predictors of the value of radical innovations. Because of this, inventing a radical innovation requires testing new products in the marketplace. Compared to incremental innovations, they require greater time and investment. Their development also carries a greater risk of failure. With little guidance from previous marketplace results, students may not find any successful radical innovations.

Incremental and radical innovations have an obvious relationship to the problem of exploiting knowledge versus developing new knowledge with the short-run vs. long-run strategies. Investing heavily in incremental innovation is the exploitation of current knowledge. It is a short-run strategy. Investing in radical innovation requires developing new knowledge. It is a long-run strategy.

It is important to note that every product is a member of many product categories. A product presents a group of n characteristics to the market. The number of combinations of characteristics evaluated by the market is the number of sets that one can create from n objects. This number is $2^n$. Whether a student sees an innovation as incremental or radical, or to what degree in between, depends upon the student's perspective as well as on the new product. A student with a good perspective will be able to reduce the risks and costs of innovation.

Finally, it should be noted that by using correlation measures to choose a product value function, an MTS designer can change the relative number of incremental and radical innovations available for students when designing products. As value functions become less correlated, the MTS presents students with fewer incremental innovations and more radical innovations.

Technological Advance: A technological advance is simulated by restricting and then removing restrictions on the valid product designs. Depending upon the specific form of the attribute-characteristic representation, this may include restricting/expanding the domains of the attributes or the number of attributes. In the illustrative embodiment, restrictions on the domains of attributes in product designs are applied and later removed. After a technological advance, multitudes of new products and product categories become available to students. Students compete by exploiting these new opportunities. Metaphorically, after a technological advance students can search new areas of the mountain range. Formally, after a technological advance, students can search new volumes of the multidimensional product space. Students will have to develop new definitions of the market (new perspectives) and new definitions of their firms' businesses (new product categories). In extreme cases, students will have to 'reinvent' their firms. This requires developing new knowledge while shedding the knowledge made obsolete by the technological advance.

Measurability of Information: One of the important properties that can be developed in embodiments of the present invention is that information can be measured. There may be several measures, each useful for a different purpose. Two useful measures are the reliability of information and population statistics. In the case of qualitatively varying attributes the new method is combinatorial and is congruent with the mathematics of information theory.

To understand the measure of information reliability, consider the task of product design. In determining product designs and in hypothesizing product categories, students might use their knowledge of the value of products in a category to predict the values of products in other categories. To borrow a real world example, "What do strong sales of sports cars indicate about the values of utility vehicles?" Alternatively, students might use their knowledge of the value of a single product to predict the effects of design changes to that product. In either case, the reliability of information measures this predictive capacity. It is given by the appropriate correlation measure: the autocorrelation function or the correlation between two product categories.

The measure and usefulness of population statistics can be understood by considering the students' task of evaluating a product category. In the terms of statistics, the products that are evaluated in the marketplace competition are samples from a population (the products in a product category). The students' evaluation of product categories via marketplace results is similar to a statistician's evaluation of a population via sampling. Because of this similarity, population statistics apply to analyze how students choose products to send to the marketplace (how students sample the population). In addition, population statistics apply to provide objective measures of the values of products in a product category (for example, confidence intervals). These objective measures are compared to a student's subjective estimates to identify biases in the student's judgment.

Other Important Properties of Information: By modeling the product space in accordance with the invention, the illustrated embodiment possesses several significant properties of the information, including:
1. The marketplace produces an enormous amount of information (as described above).
2. A student does not have enough of the information he desires. Marketplace results only estimate the values of products contained in a product category, or more generally the outcome of a search strategy.
3. The firm's budget does not permit exploring all choices. Based upon limited information, a student can only partially investigate a search strategy, for example investigating a few product categories. This makes success a matter of probability.
4. Product offerings produce both revenue and new information, and generally do so in an inverse relationship. That is, products that generate revenue produce little new information and products that produce new knowledge initially generate little revenue.
5. For every type of innovation, incremental through radical, previous marketplace results possess the proper reliability of information.

Explicit Representation of Knowledge: Product categories and perspectives provide a basis for categorizing products and information. In both cases, the categorizations are structures that embody knowledge.

Product Categories: Hypothesized product categories determine the innovations a student might design (it is the product space where he looks). They determine—from a probabilistic viewpoint—the efficiency of a student's search for valued products. Stronger knowledge (product categories containing higher valued products) permits discovering (1) valued products with less investment or (2) higher valued products given the same investment. Through product categories, knowledge promotes efficient innovation.

Perspective: Perspectives select the information from the marketplace database that evaluates product categories. Comparatively, stronger knowledge (a perspective that includes product categories which differ greatly in their products' values) can separate high value product categories from low value product categories with less information or provide a better prediction of product categories' values given the same amount of information. Stronger knowledge (1) reduces risk because students have superior identification of high value product categories and (2) reduces the investment needed to find high value product categories. Through perspectives, knowledge reduces the risks and costs of doing business.

In both cases, stronger knowledge means being able to more efficiently focus one's resources to satisfy the marketplace.

Core Competencies: When searching a product category, a student learns the valuable combinations of characteristics for that category (the characteristics that the '#' attributes shown in FIG. 13 should express). With this knowledge, the student can efficiently improve his products' designs. In the mountain range metaphor, the student is learning the topology of one area of the mountain range. When this situation exists, the student has developed a core competency.

One can record the development of a student's core competencies through statistical measures (measures of central tendency and variation) of the products that the student offers the market. For a set of products, one can measure a core competency with the vector $(A_1, A_2, \ldots, A_n, Var, \nabla)$. In this vector $A_1, A_2, \ldots, A_n$ is an archetype product. Its characteristics are the characteristics represented most often in the set of products. Specifically, for qualitatively varying attributes, $A_i$ is the characteristic expressed most often by the $i^{th}$ attribute. For quantitatively varying attributes, $A_i$ is the average value of the attribute. The variable Var measures the deviations of the actual products from the archetype. For quantitatively varying attributes, one can measure these deviations with a calculation of variance. In the qualitative case, one must first quantify the deviations. One can accomplish this with the concept of Hamming distance. The Hamming distance between two products is equal to the number of characteristics by which the products differ. For example, the Hamming distance between products (QWERTYUIOP) and (QWERTYUMNB) is three. In the case of qualitatively varying attributes, the variable Var is equal to the average of the Hamming distances between products in the set and the archetype product. The variable $\nabla$ represents the average value of the products in the set.

Figure 14:
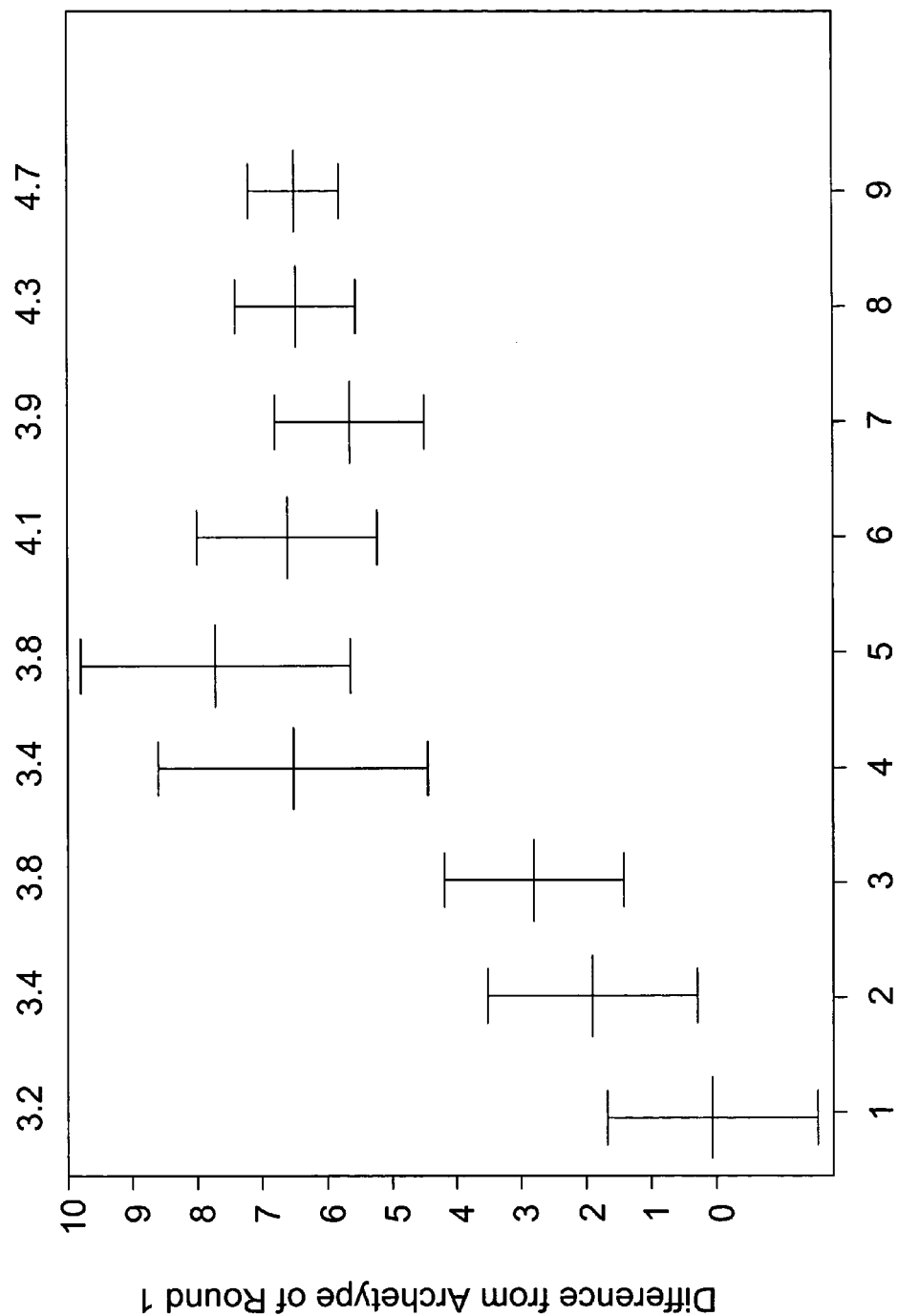
FIG. 14 depicts a measurement of a student's development of a core competency.

One can apply this measure of core competency to any set of products (for example, the products produced in a project, by a firm, or by all firms in a round of the learning session). By repeating this calculation over several rounds, one can track the evolution of core competencies. FIG. 14 depicts this application. The horizontal axis indicates the round. The vertical axis indicates the amount by which an archetype product differs from the archetype product in round one (the Hamming distance in the case of qualitatively varying attributes). The figures progressing across the graph represent the core competency measure $(A, A_2, \ldots, A_a, Var, \nabla)$. The center bar of the figure represents the archetype. The span of the figures represents the variation in products, Var. Above each figure along the top of the graph is the average value of the set of products, $\nabla$.

FIG. 14 shows considerable movement in the development of a core competency. The large change in archetype between periods three and four suggests that the student has changed his focus to a new product category. The decrease in variation after round five indicates that the student has begun focusing upon production rather than search. A student would do this when he finds high value products. The chart can also be considered a learning curve for learning to produce high valued products.

Alternatively, one can define core competencies with correlation. Recall, from the discussion of projects, a student can hypothesize product categories and search for valuable products within the categories. To identify core competencies, pair every project with every other project. For each pair calculate the correlation between the two categories. Then apply cluster analysis to identify groups of categories that are highly correlated. Each group constitutes a volume of the technology space in which information is useful. Each group of highly correlated categories is a potential core competency. As a student searches a category and learns to design valuable products, he develops one of these core competencies.

Industry Life Cycles: Economists and technological historians have researched the birth, development, and demise of industries. They found that most industries develop through a three stage pattern called an industry life cycle (the automobile, commercial aircraft, and the minicomputer industries are just a few examples). James Utterback's book *Mastering the Dynamics of Innovation* (Boston: Harvard Business School Press, 1994) describes industry life cycles in detail (see chapter 4). As a brief review, industry life cycles progress as follows:

1. Fluid Stage: An industry begins in the fluid stage. Many new firms enter and the number of firms operating in the industry increases. Radical product innovation and diverse product designs abound. Market share and profits change unpredictably. The profit margins of successful products are large. Technical and marketplace uncertainty are pervasive. The market's previous results poorly predict the industry's development.
2. Transition Stage: As an industry develops, uncertainty decreases and the industry enters the transition stage. Technologies and applications stabilize and product standards emerge. Incremental innovation becomes more important. The industry consolidates as waves of business failures and mergers sweep the industry. Only a handful of firms survive.
3. Stable Stage: Eventually an industry enters the stable stage. Market shares are relatively fixed. Innovations are incremental. Standard marketing, finance, and management analyses identify market changes, guide strategic planning, and predict the consequences of a firm's actions. Competition is over price, profit margins are slim, and prices reflect production efficiency. (Prior art MTSs are useful for simulating markets in the stable stage, but not in the fluid or transition stages). The industry remains in the stable stage until a technological breakthrough initiates a new life cycle.

In accordance with the illustrated embodiment, a technological breakthrough can initiate an industry life cycle when either the domains of the attributes or the number of attributes is increased. Initially, the most valued products that firms can produce are restricted to have sufficiently low values. The students compete with these choices. Innovation will decrease as students find the most valued products in this limited set. Once this occurs, the domains of one or more attributes or the number of attributes is increased, thereby simulating a technological advance. This will initiate an industry life cycle.

Section 4: Embodiments that Make Two Great Improvements in MTSs

Improvement 1: An MTS with Superior Modeling of Innovation

In a competitive industry MTS students guide a firm through a transition from a predecessor industry to a new industry. Such a transition simulates a technological breakthrough and concomitant displacement of an older technology (for example, the transistor destroying the market for vacuum tubes). By producing and using knowledge, students construct and adjust a portfolio of projects. Students must (1) define the market as the new industry develops; (2) build new core competencies and design new products; (3) protect against both short-run and long-run competitive threats; and (4) develop managerial rules appropriate for the industry's maturity (fluid, transition, and stable stages). Among other lessons gained by engaging in the simulation of a technological breakthrough, students learn the following:

Properties of Innovation: The process of innovation is unique among business functions. For descriptions of the characteristics of innovation and guidance on managing innovation see: Peter Drucker, *Management: Tasks, Responsibilities, Practices* (New York: Harper Collins, 1973) p. 782-803; Peter Drucker, *Innovation and Entrepreneurship* (New York Harper & Row, 1985) p. 143-176; Donald Frey, "The New Dynamism (Part 1)," *Interfaces*, vol. 24 no. 2 (March—April 1994): pp. 87-91; James Brian Quinn, "Managing Innovation: Controlled Chaos," *Harvard Business Review* (May-June 1985): pp. 73-84; and Lowell Steele, *Managing Technology: The Strategic View* (New York: McGraw-Hill, 1989): pp. 263-288. The most startling characteristic of innovation is its unpredictability. The successful application and design of a radical innovation, for example, is rarely predictable at the start of its development. This unpredictability is the source of four other principle characteristics of radical innovations:

1. High Failure Rate: Even with proper management, only a small fraction of innovative ideas become innovations.

In the illustrated embodiment, the fraction of successful innovations (successful new product designs) will vary with the type of innovation that a student pursues, the fraction of products with values higher than the products previously sent to the marketplace, and the intensity of competition in a learning session.

2. Path-Dependency: Innovation is path-dependent. Path-dependency means that (1) some paths of change will not get from state A to state B while others will and (2) the actions one takes today determine the choices one faces tomorrow (history matters).

In the illustrated embodiment, the mountain range metaphor provides a striking display of path-dependency. A student's sequence of product designs produces a 'path' winding across the product space. The knowledge a student develops and the direction he 'travels' depend upon the path that has been previously traversed (history matters). Moreover, the portion of the product space's topology that is correlated with a student's knowledge need not contain products that are competitive in the marketplace (not all paths lead to success). Techniques such as the previously described method of measuring core competencies provide means of measuring and displaying the 'paths' of students' product development.

3. Surprise: Along the path to success, or failure, lie unpredictable obstacles and beneficial 'tail winds.' These events surprise management.

In the illustrated embodiment, frustration produces this quality. Attributes that a student does not focus upon in his marketplace research can be highly interactive. A change in one of these attributes, in a student's or competitor's product designs, will significantly affect product value and marketplace competition. Since the student is not focusing upon the attribute, these results will be surprising to the student.

4. Probabilistic Success: When making decisions, there are always more options than resources. Compounding this difficulty, there is never enough information to confidently determine the best options. This situation makes success a matter of probability.

In the illustrated embodiment, a firm's budget will not facilitate sampling from all of the product categories that the student deems potentially profitable. In addition, marketplace results only estimate the values of products contained in a product category. Because of this, a student does not have enough of the information he desires.

Managing Innovation: Because embodiments of the present invention can reproduce each of these properties, students using an MTS in accordance with this aspect of the invention can experience and learn the characteristics of innovation. Students can also learn rules for managing innovation. At a most general level, the rules for managing innovation are as follows:

Market Focus: To be successful, an innovation must make an impact outside of the firm. It must affect a market.

Pursue Multiple Projects: At the start, each project looks equally inviting (or crazy), yet few succeed. To reduce one's risks, one must invest in multiple projects.

Match Investment to Knowledge: To further reduce risk, one should start an innovation project with small investments and only increase investment as uncertainty is reduced and information becomes more reliable.

Aim High: The successful innovation must pay for itself and several failures. In cases of substantial technological change, it will also provide the foundation of a company for many years. It is imperative that all innovations seek substantial success and aim for market leadership.

Innovation Requires its Own Measures: The tools used for managing a mature business are unreliable when applied to innovation. How can one calculate NPV when the design and application of an innovation is unpredictable? Moreover, the dynamics of innovation differ from that of the mature business. Five percent annual profit increases are unrealistic. Instead, there will be a period where there are no profits and, if successful, an ensuing period of rapidly increasing profits. Instead of using the accounting and control measures of mature businesses, one manages innovation projects through expectations and feedback. Expectations can always be defined and used to direct efforts—even when forecasting is unreliable.

Manage Innovation Separately from the Mature Business: When compared to the mature business, innovation projects appear inconsequential. They produce little or no revenue. Results and problems in these projects do not immediately affect a firm's performance. Though their immediate results do not impact the firm, innovation projects require valuable resources. For this reason, managers may not dedicate enough resources to the innovative project. For all these reasons, innovative projects must be managed separately from the mature business.

These rules contribute to success, but they are not sufficient. Implementing these rules requires judgment. Managers must determine which projects should be started; which, and when, projects should be cancelled; and determine when the firm should adjust its investment in a project. Managers must set aspiration levels; balance the risk of falling victim to a competitor's innovation with the risk of losing their investments in innovation; and negotiate the trade-off between flexibility and decision errors. With embodiments that have students make such decisions, students develop their judgment as they face these dilemmas in an MTS.

In learning these lessons, students will also confront and learn to manage, by interacting with the business situation through the user interface, the following issues:

Balancing the Risks of Lost Investment and Lost Opportunity: The risks of lost investment and lost opportunity are antithetical, as are the costs of their associated mistakes. How should a firm balance the current and future needs of the business? How does a firm maintain efficiency while also maintaining the flexibility that competition requires of the firm?

Managing in a Dynamic Industry: How much can a firm affect an industry's dynamics? How does one compare results to expectations when much of this analysis rests upon judgment? How does one evaluate a firm's wealth producing potential?

Portfolio Management: How many projects should a business pursue? How much diversity is advantageous, and how does diversity link to core competencies? What are good measures of innovative performance? How well do traditional financial calculations govern (for example, payback period, NPV, and ROI)?

Managing Change: How fast can a firm change its operating rules, core competencies, and product mix without endangering its survival? What kind of rules and measures result in change rather than stability? What rules effectively move resources from old opportunities to new ones? At what level of detail should one plan?

Improvement 2: Personalized Decision Analysis and Training

Prior art MTSs teach through an indirect method. A student tries various strategies, analyzes the results, and, hopefully, the MTS induces an improved understanding. This method of learning can be ineffective because a student learns only as well as he can invent strategies and induce lessons. In contrast, a direct method of teaching in accordance with another aspect of the invention analyzes a student's decisions and judgments in order to determine his unique, habitual judgment and decision strengths, errors, and biases. This cognitive analysis facilitates personalized training in critical thinking and business decision-making.

Potentially, MTSs are the ideal means of providing cognitive analysis and training. They present a student with well-defined problems and information that results in the receipt of well-defined answers. While necessary, these characteristics are insufficient. In order to provide personalized decision and judgment analysis, MTSs must meet two additional requirements. First, their design must facilitate measuring information and knowledge. Second, they must clearly relate the tasks demanded of students to cognitive functions that can be analyzed. Prior art MTS do not satisfy either of these two additional criteria. Embodiments of the present invention can satisfy both of them.

Means of measuring information and knowledge were described above. Embodiments of the present invention can clearly relate the tasks that they demand of students to cognitive functions. To understand the relationships, it is useful to recognize that in designing products students are actually competing to solve a complex optimization problem. Instead of using a scientist's powerful mathematical algorithms for this task, students use their own 'cognitive' algorithms. For example, embodiments of the invention can make students exercise three cognitive functions: covariation assessment, categorization, and judgment. The relationships between the students' tasks and these cognitive functions are described below.

Covariation Assessment: When students analyze the marketplace data, they are searching for correlations between combinations of product characteristics (product categories) and marketplace success. In cognitive psychology, this process is called covariation assessment. Experiments have tested peoples' covariation assessment in a variety of situations.

In one such experiment, subjects were shown several lists of paired variables and asked to estimate the correlation demonstrated in each list. Dennis Jennings, Teresa Amabile, and Lee Ross, "Informal Covariation Assessment: Data-Based versus Theory-Based Judgment," in *Judgment Under Uncertainty: Heuristics and Biases*, edited by Daniel Kahneman, Paul Slovic, and Amos Tversky (New York: Cambridge University Press, 1982): pp. 211-230. This task is similar to students' analysis of marketplace information in the illustrated embodiment. In this embodiment, the paired variables are products and sales volume. The psychological experiment shows dramatic results. Subjects' estimates vary widely and, on average, greatly underestimate correlation. Correlations must be at least 0.8 before subjects, on average, estimate a correlation as high as 0.5. These results occur because subjects simplify their task by looking at only a few entries on the list. Correlation is a quality of the entire set, and only exceptional rows accurately convey this quality.

This study suggests that when market results do not make facts obvious, managers can be easily misled by focusing their attention on a small set of information (for example, the striking success, the striking failure, firsthand experience, or benchmarking). In the illustrated embodiment, these errors can be recognized by the system, explained to the student in a report or other output, and corrected by the student to better avoid real-world errors. When market uncertainty exists, managers should rely more heavily upon decision rules and conduct a broad assessment of their firms' industry.

Another method that students might use to identify profitable product categories is to count the number of successful and unsuccessful products in a category. Psychological studies have also researched this method of correlation detection. Dennis Jennings, Teresa Amabile, and Lee Ross, "Informal Covariation Assessment: Data-Based versus Theory-Based Judgments," in *Judgment Under Uncertainty: Heuristics and Biases*, edited by Daniel Kahneman, Paul Slovic, and Amos Tversky (New York: Cambridge University Press, 1982): pp. 211-230. With this method, the information available to students can be placed in 2×2 matrix, as shown in FIG. 15. (In keeping with the illustrative embodiment, FIG. 15 shows a product class for the case of qualitatively varying attributes. FIG. 15 could readily be expanded to also illustrate other types of attributes). When assessing correlation from these types of tables, people typically use only a fraction of the information in the table. Most people either look at the number of counts in the upper left-hand quadrant (the yes-yes quadrant) or look at the counts in the top row. These two strategies can produce error. A proper assessment of the correlation requires using the information in all four quadrants of the contingency table (for example, comparing the fraction of successful products that are members of a category to the fraction of successful products that are not members of the category). By outputting contingency tables for the student to use and review, an embodiment of the present invention can teach students to use all of the product category information available to them (given their perspective). It can also illustrate the decision errors and the consequences of these errors that arise from using only partial information through the contingency table, shown above or in combination with a report or other output.

Categorization: Categorization is a technique commonly used by people to simplify their environment. This is exactly what a student does when he hypothesizes product categories and a perspective (defining his business and the market). A student's categorization will have a dramatic affect on his performance. To see this, suppose that each student associates each project within his portfolio with an estimate of its potential for producing profits. This estimate can be represented as a probability and updated each round. Different categorizations will incorporate marketplace results differently. Because of this, students' expectations will evolve differently even though they view the same marketplace results. This will lead to different assessments of opportunities and risks and different actions. With an appropriately designed embodiment of the present invention, one can analyze how students form and change their categorization schemes by tracking the product categories and perspective used by the student in each round and how students' categorizations and other decision-making choices affect their management decisions.

Judgment: During the course of a learning session a student must make the following project management judgments: the value of the products in a product category; the costs and time required to find valuable products; and the reliability of information. The student must also judge his portfolio's risk, capital requirements, and potential for producing profitable returns. Finally, a student must also assess his level of confidence in his judgments. Each of these judgments can be input into the model through the user interface.

In each round of a learning session, one can solicit each of these judgments from a student. Furthermore, for each of these judgments, one can estimate the true value by calculating correlations between product categories and utilizing population statistics. From these values, the MTS administrator can identify which of the student's judgments are habitually erroneous. The administrator can also investigate how these errors affect a student's project and portfolio management. With a suitable definition of risk, one can perform an analogous analysis of a student's risk management.

Judgment analysis can address both a student's decision making and the impact of his decisions on his firm. It can address the following questions:

How does the manager recognize and account for uncertainty, information of varying reliability, surprises and errors, and variation in performance?

How do knowledge, information, risk, and competition influence the manager's aspiration levels; assessment of opportunity, risk, and potential returns; and allocation of resources?

Are the manager's aspiration levels and resource allocations consistent? What causes convergence or divergence of aspirations, expectations, and actions?

How do the manager's decisions and judgments influence his business's capital requirements, risk, return, and adaptability?

Does the manager correctly judge his firm's influence on its industry?

In addition to addressing these questions, an advanced judgment analysis identifies and corrects errors which are typical human thinking, such as biases from anchoring, overconfidence, honoring sunk costs, and scenario thinking. For a description of these biases see the appropriate chapters of: Robyn Dawes, *Rational Choice in an Uncertain World* (USA: Harcourt Brace Jovanovich, 1988); and Daniel Kahneman, Paul Slovic, and Amos Tversky, editors, *Judgment Under Uncertainty: Heuristics and Biases* (New York: Cambridge University Press, 1982).

The following two examples illustrate decision errors that an appropriately designed embodiment of the present invention could identify and correct:

The Error of Overestimating the Likelihood of Contingent Events: Suppose that developing a new core competency requires developing new knowledge in four stages, each stage developing upon the previous one. Specifically, a student using the appropriately designed embodiment will first discover a good product category and then 'fine tune' the product design in three stages. Each stage will identify good characteristics for the '#' attributes.

Suppose that the firm has a 75% chance of successfully completing each step of the task. The firm has approximately a 32% chance of success ($0.75^4=0.316$). Because the firm will discover the combinations in succession, one can treat these discoveries as independent, conditional probabilities. Let A, B, C, and D stand for the first, second, third, and fourth discovery of valuable combinations of characteristics. The probability of success is therefore $prob(D)=p(A)*p(B|A)*p(C|B)*p(D|C)$.

Psychological studies of anchoring suggest that people overestimate the chance of success by as much as about 70%. This overconfidence can impact a firm by causing its managers to (1) bet on too few projects rather than building a diversified portfolio and (2) invest in projects long after development suggests that failure is nearly unavoidable.

The Influence of Sunk Costs on Judgment: All firms face two antithetical risks: lost opportunities (that competitors might exploit) and lost investment. Technological and market opportunities and competitors' strategies determine which risk dominates. In an effort to justify and honor previous, unrecoverable financial and psychological commitments (sunk costs), a manager might resort to adverse behavior, including (1) decreasing his estimate of the risk associated with previous commitments; (2) increasing his estimate of the benefits of previous commitments; and (3) utilizing selective attention. (Selective attention highlights information that supports one's position while dismissing contrary evidence). These effects promote resistance to change. Executives forgo profitable opportunities and unknowingly expose their firms to excessive risk.

Section 5: The General Case

Figure 18:
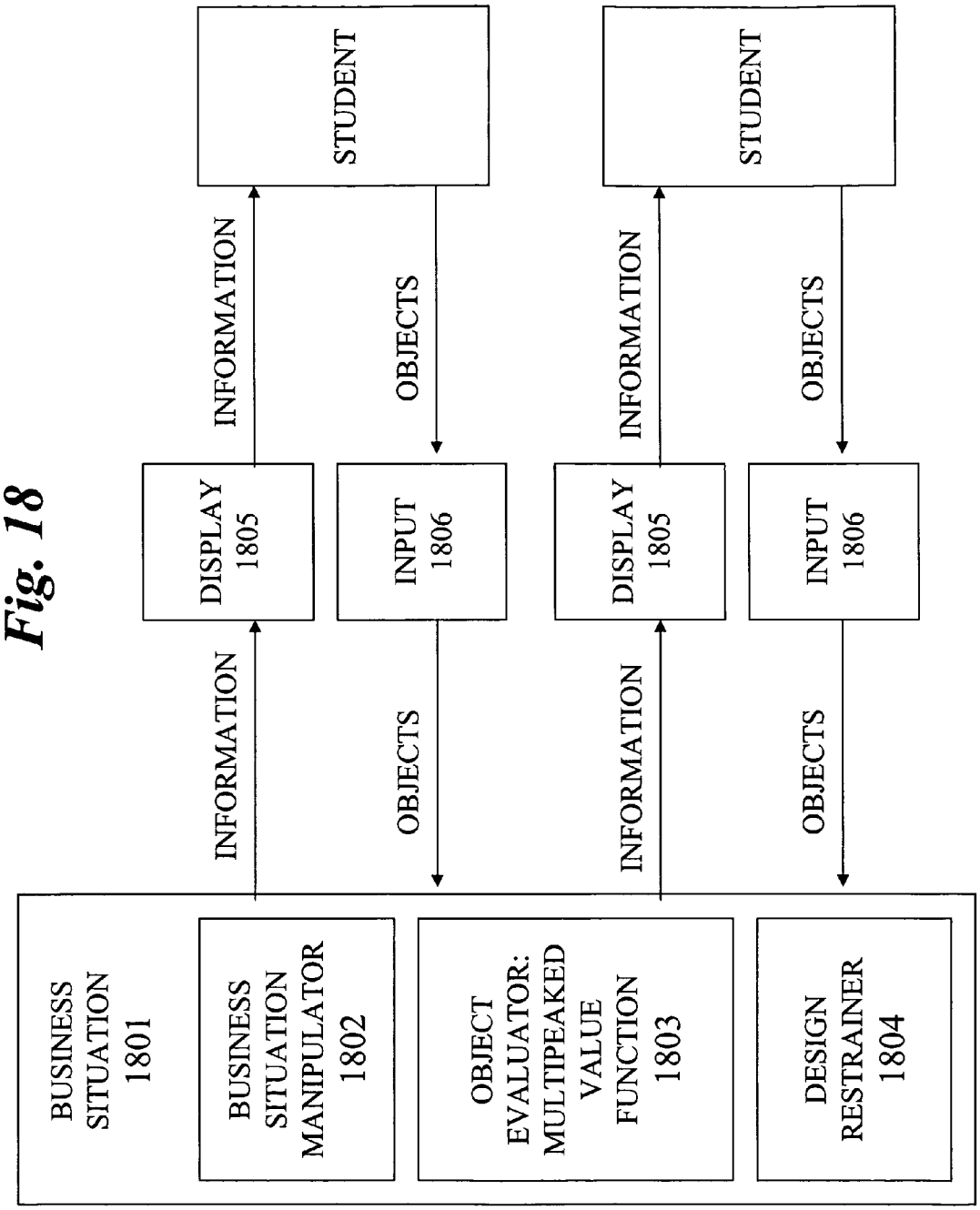
FIG. 18 is a block diagram illustrating the architecture of a 'general case' MTS in accordance with the present invention.

Those versed in the art will recognize that one can embody the present invention and qualities described above in a variety of MTSs including the 'general case' MTS depicted by FIG. 18. By incorporating the attribute-characteristic representation and the multipeaked value function into 'general case' MTSs, these MTSs will gain the ramifications, properties, and capabilities previously described. FIG. 18 depicts a "general case" embodiment of the present invention. Students participate in a simulated business situation 1801. Students receive information about the business situation via a display 1805. Based on their assessment of this information, students design objects. The objects are represented with an attribute-characteristic representation. Objects can be products, but they need not be. The more general situation where the attribute-characteristic representation represents design objects is described in Section 7, titled "Design Objects." Students input their object designs into the simulated business situation through an input device 1806. The simulated business situation evaluates the objects with a multipeaked value function 1803. A business situation manipulator 1802 takes the objects' values and calculates the objects' effects on the business situation. The results of the effects are displayed to the students through a display device 1805. A design restrainer is not necessary; however, if desired, a design restrainer 1804 can restrict and/or expand the range of valid object designs during a simulation.

This arrangement depicted in FIG. 18 can apply to a wide variety of business situations. These possibilities and variations include:

Manufacturing: The simulated business situation may include a simulated factory. In this case, the object designs are machines. The object values are the machines' capital to output ratios (or capital to labor ratios). Students design machines in an effort to invent more efficient machines and decrease manufacturing costs. The business situation itself can be simulated with two methods. One can simulate the factory with a set of equations. For an example of simulating production with equations see: Steven Gold and Thomas Pray, "The Production Frontier: Modeling Production in Computerized Business Simulations," *Simulation and Games*, vol. 20 (September 1989): pp. 300-318. Alternatively, one could simulate the factory with one of the many software packages made for simulating factories and production lines.

Design Competition: The simulated business situation is a competition between design teams. Students design a product. Given a predetermined number of trials, students compete to develop the best design. In this case, there is no market. Instead, the display shows students their designed products and the associated product values.

Figure 19:
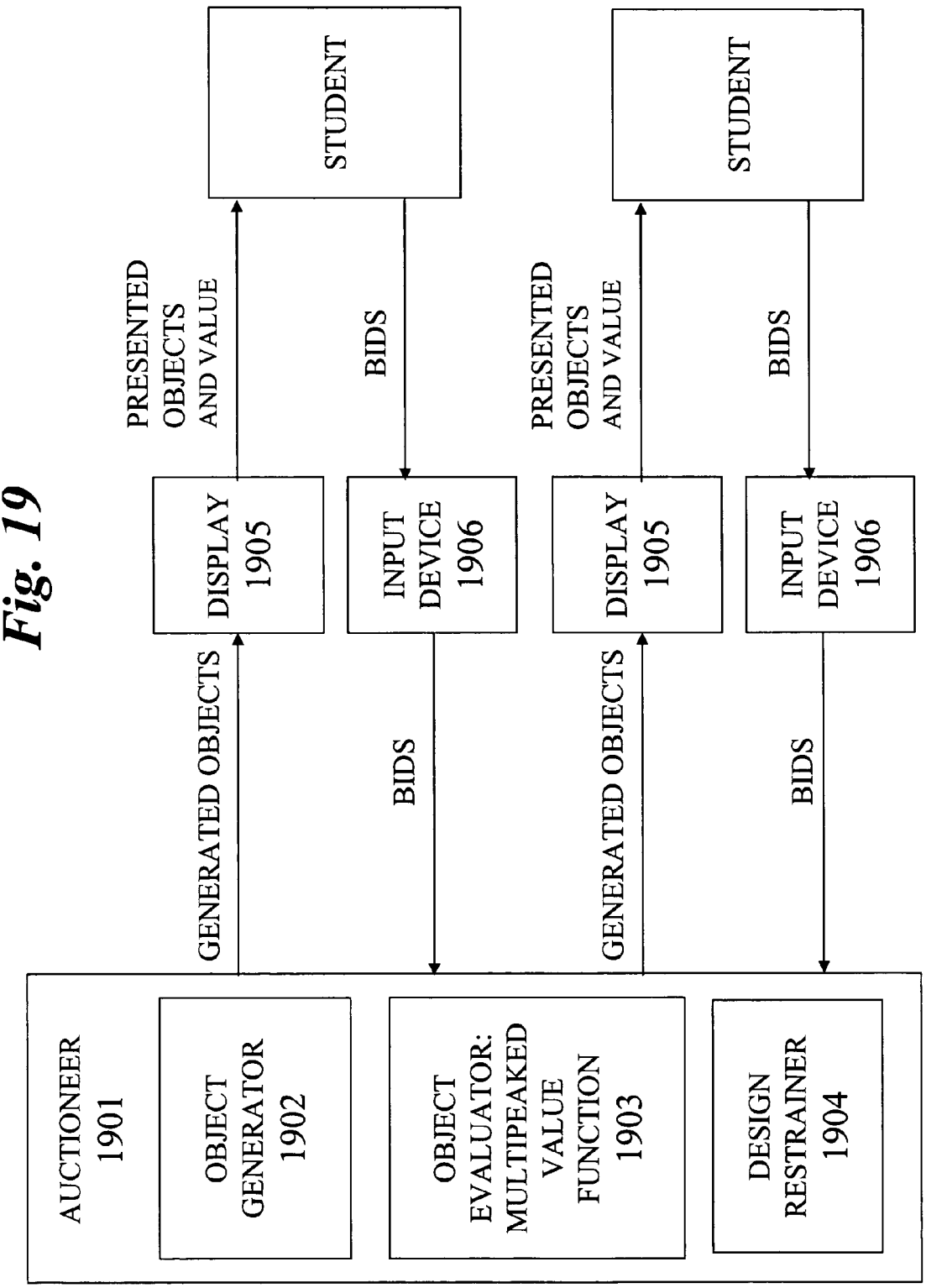
FIG. 19 is a block diagram illustrating the architecture of an auction MTS in accordance with the present invention.

Auction: FIG. 19 presents another embodiment based upon representing objects with an attribute-characteristic representation and evaluating objects with a multipeaked value function. This is the case of an auction. In the simulation of an auction, the 'auctioneer' 1901 creates objects 1902 and evaluates these objects with a multipeaked value function 1903. The display 1905 shows students the generated objects. Students bid for these objects, with the highest bid receiving the value of the object. The goal of students is to accumulate the most value. If desired, one can provide a design restrainer 1904 for restricting and expanding the valid object designs.

Team Work: A properly designed embodiment of the present invention can teach coordination and teamwork by having a team of students control a firm. Some students set 'corporate' strategy (design the general characteristics of the firm's portfolio and determine funding for projects) while other students propose projects and design products. To teach the importance of information and communication, one can limit the communication between the two groups.

Asynchronized Simulations: One can also embody the present invention in an asynchronized simulation.

This section illuminates the invention's broad scope. The following sections further illuminate the scope by presenting a multitude of configurations, examples, and applications. Sections 6 and 7 describe various configurations of value functions and design objects. Examples of many applications are given. Section 8 describes additional applications of the invention in modeling manufacturing, marketing, R&D, and technological advance. Section 9 presents another illustrative embodiment, which is a MTS for learning to manage a product development portfolio. Section 10 describes various hardware configurations, and Section 11 presents flowcharts of some useful applications.

Sections 6-10 present numerous examples of embodiments that are broader in scope than the "General" case described above. More generally, MTSs are simulated business situations in which users learn business, management, and decision-making skills by interacting with the system. MTSs are also used for diagnosis and evaluation, as described in section 9. The terms "MTS" and "Management Training Simulations" are to be understood as encompassing this broad definition, and not being restricted to the competitive industry or general case referred to above.

Furthermore, in sections 6-10 people using MTSs are described as users rather than students. The term "student" is meant to identify anyone using an MTS to learn, as defined in the glossary. However, the term "user" better denotes the concept, so the descriptions in sections 6-11 use the term "user."

Section 6: Value Functions

The presentation of multipeaked value functions discussed peaks, frustration, and interactions. To emphasize the role of interactions, an Interacted Value Function (IVF) is defined. To emphasize the role of "valleys" between local optima, an Interdependent-Attribute Value Function (IAVF) is defined. Both definitions appear in the glossary.

Further considering value functions, the multipeaked value function (MVF), as defined herein, has as its domain all products or objects in a given simulation. However, a value function need not apply to the entire set of object designs. A value function can cover only a portion of the designs. For example, a simulation might use several value functions, each covering a different set of design objects. A Value Function with Multiple Optima (VFMO) is a value function that has multiple optima and has as its domain a subset of the design objects in a simulation. The subset can be the entire set of design objects. (The domain of a VFMO need not be a proper subset of the set of design objects.) One of ordinary skill in the art should appreciate that the Selected Value Function (SVF), used in an MTS, can be a multipeaked value function, an interacted value function, a value function with multiple optima, or an interdependent-attribute value function and that the foregoing description should be understood as embracing all these types of value functions.

The nk-Landscape Function: Many value functions do not explicitly identify the interactions among attributes. The interactions are implicit in the function. The nk-landscape function explicitly identifies the interactions, and for this reason, it is useful for both illustrating and building MTSs embodying the invention. Because of its usefulness in illustration, it is described here and used in ensuing examples.

Figure 28:
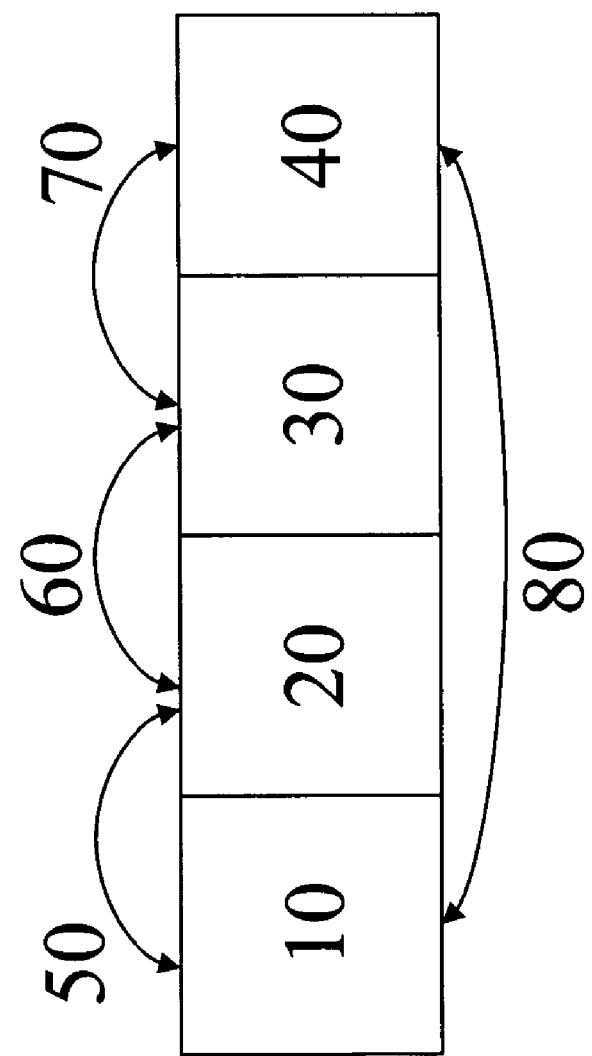
FIG. 28 illustrates an exemplary set of attributes and their respective interactions.

The illustrated embodiment uses an nk-landscape with ten attributes that can each express one of twenty-six characteristics. For the sake of demonstration, consider a simpler nk-landscape. Those skilled in the art can readily gain further description and illustration from *The Origins of Order* by Stuart Kauffman and section B2.7.2 of HEC. Suppose that each product design has four attributes that can each express a 1 or a 0. Suppose further that each attribute's contribution is affected by its neighbors. FIG. 28 displays the attributes and interactions. The attributes are labeled 10, 20, 30, and 40. The interactions are labeled 50, 60, 70, and 80. As one can observe, each attribute interacts with its neighbors. (The two end attributes are considered neighbors, a convention called "wrap-around.") An nk-landscape function assigns each design a value by adding the contribution of each attribute. It calculates the contribution of each attribute using a table, like that in FIG. 29. The left column of this table lists all of the combinations of characteristics for an attribute and the attributes that interact with it. (In this case an attribute and its neighbors). In the right column the table lists a randomly generated contribution for each combination of characteristics. Using FIGS. 28 and 29, we can calculate the value of any product design. Consider, for example, the product design 1101. The first attribute and its neighbors produce the pattern 111. FIG. 29 shows that this pattern has a contribution of 9. The second attribute and its neighbors produce a pattern of 110. It has a contribution of 3. The third attribute and its neighbors produce a pattern of 101. Its contribution is 4. The fourth attribute and its neighbors produce a pattern of 011, with a contribution of 8. In total, the design 1101 has a value of 9+3+4+8=24. Notice that in this example the attributes' contributions are randomly generated integers between 1 and 10. The randomly generated numbers need not be integers, but can be real numbers. Furthermore, the interval from which the randomly generated numbers are selected can be varied to meet one's needs. Also, the results of summing the attributes' contributions can be scaled as desired.

Figure 36:
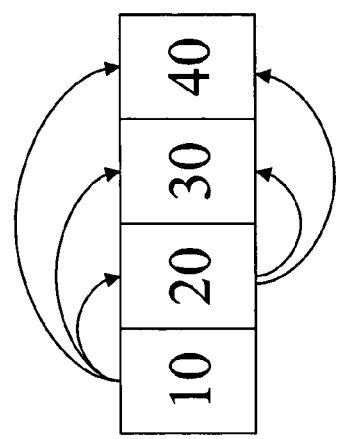
FIG. 36 is a diagram of an exemplary nk-landscape function, including a design object's attributes, interactions, and a table showing the attributes' contributions to value.
Figure 37:
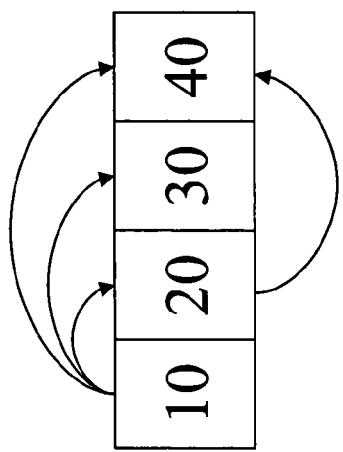
FIG. 37 is a diagram of modified version of the nk-landscape function depicted in FIG. 36 and a table showing the attributes' contributions to value.

The example is simple. The interactions are two-way: attribute 10 interacts with attribute 20 and attribute 20 interacts with attribute 10. All attributes interact with their neighbors, and each attribute uses the same data table. FIG. 36 shows a more complex situation. Interactions are one-way. Attribute 10 affects the contribution of attribute 20, but not vice versa. In FIG. 36 interactions are distributed asymmetrically, and each attribute has its own data table of contributions. To illustrate the use of this table, suppose one needs to calculate the contribution of attribute 30 in the design 0101. FIG. 36 shows that attribute 30 is affected by attributes 10 and 20. The characteristics expressed by attributes 10, 20, and 30 are "010." Looking at the column for attribute 30's contribution, the row for "010" gives a contribution of 3. With this example, one can show the flexibility of the nk-landscape. Rearranging the interactions requires only adjusting the table of data. For example, FIG. 37 shows the same design object as FIG. 36, except an interaction is removed. Attribute 20 no longer affects attribute 30. The table is modified to reflect this change.

A drawback of nk-landscapes is that the tables become large as the number of characteristics and interactions increase. Consider a design object where each attribute can express ten characteristics. Suppose that an attribute interacted with five other attributes. The table for this attribute would need one million entries (ten to the sixth power). Basically, as the number of interactions and/or characteristics increase, the size of the tables increases very fast. A complex nk-landscape function requires lots of computer memory.

There are two solutions to this problem. The first recognizes that much of the data in the tables is not needed. To see this, consider a design object with eight attributes that can each express twelve characteristics. There are nearly 430 million object designs. During a training session the simulation will only evaluate a tiny fraction of these designs, so most of the tables' entries will never be used. To take advantage of this fact, table entries should be created only when they are first needed. The entries are then stored for future use.

Unfortunately, this method can still require lots of memory, especially for long running simulations. In addition, it is cumbersome if one runs a simulation on a server and gives users access through client computers. Even worse, it is problematic if one transfers data between computers via a floppy disk or email. (See section 10 for a presentation of hardware configurations). Section B2.7.2 of HEC provides an alternative that overcomes all of these problems. It proposes a pseudo random function with a seed that designates the simulation. To evaluate objects' designs a computer need only the seed and the function (specified as code). There are no tables, because the nk-landscape function is completely coded as a formula.

Figure 38:
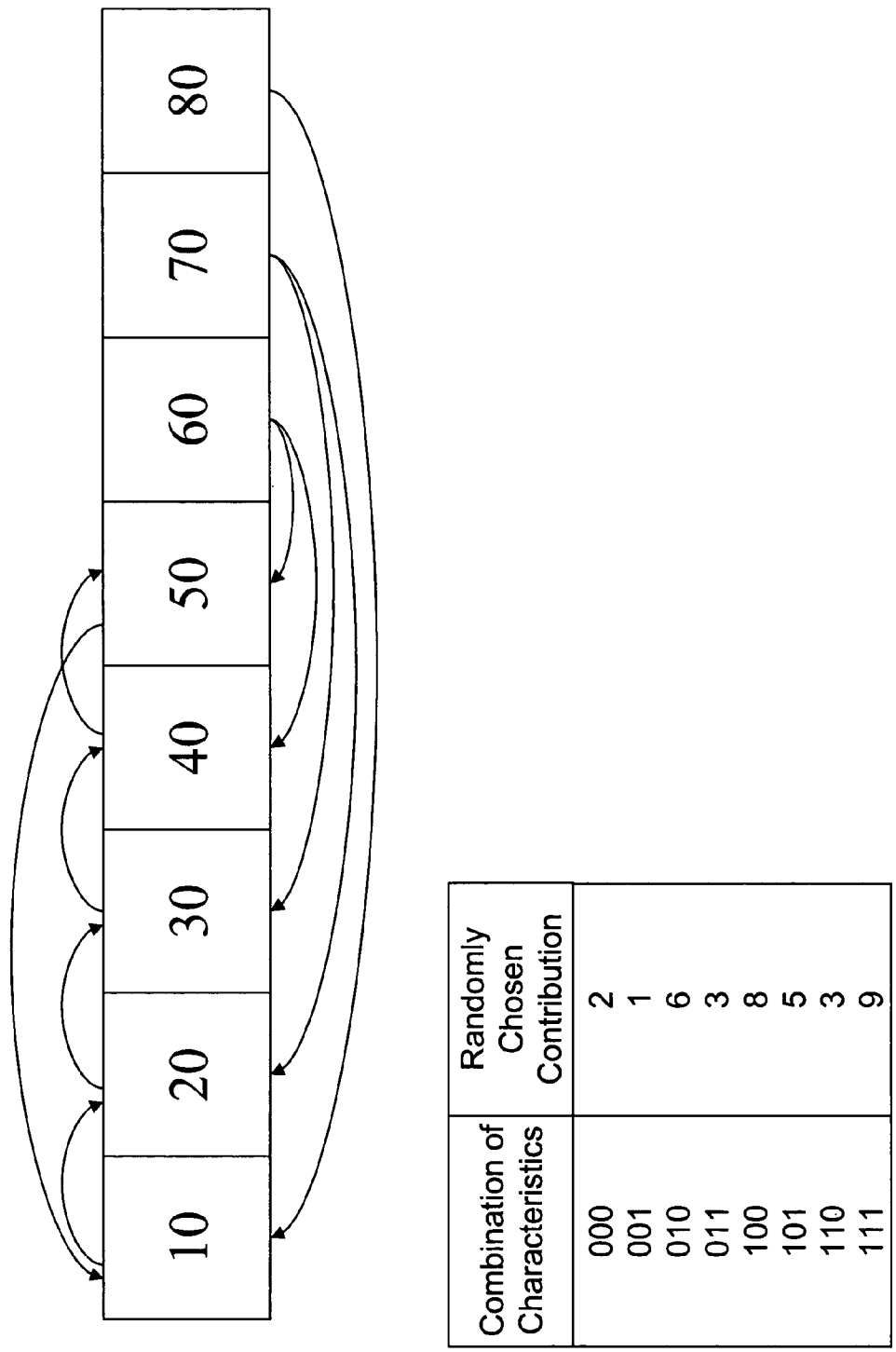
FIG. 38 is a diagram of an exemplary nk-landscape function where only some attributes contribute to the calculation of value, the diagram including a design object with eight attributes and interactions, and a table showing the attributes' contributions to value.

Evaluating a Portion of a Design: A SVF need not evaluate the entire design. It can evaluate a portion of the attributes. The other attributes need not be evaluated, can be evaluated by another SVF, or can be used by the simulation for other uses. FIG. 38 presents an example. It has eight attributes and the interactions depicted in the figure. The first five attributes are each affected by one neighbor and one of the attributes 60-80. Each of the first five attributes has its contribution determined by the table in FIG. 38. A simulation calculates the value of a design by adding the contribution of the first five attributes only. For a design 11101001 the value is 29=9+3+3+8+6. Notice that the attributes 6-8 affect the calculation, but they do not contribute to the value. This type of situation is useful when using segmented designs and system-set attributes (described below).

Using Other Information in an Evaluation: A SVF can utilize information in addition to a design. Consider the example from FIG. 38; attributes 60-80 can describe simulation qualities extraneous to the design. As described below, for example, they can represent market segments or other system-set attributes. Even attributes that contribute to a design's value (for example, attributes 10 and 20 in FIG. 38) can represent simulation qualities. In both cases, the SVF evaluates a user's design in the context of other factors.

Multiple SVFs: An MTS can use several SVFs. For example, design objects can be products and an MTS can simulate several markets. Each market can have an SVF to assign values to designs. The same product design will have a different value in each market.

Changing the Value Function: A simulation can change a value function during a simulation. For example, it can use one value function during the first five rounds of a simulation, and then it can use a different value function for the remaining rounds. More common, a simulation will alter a value function during a simulation. Altering the value function has the effect of deforming the topology of the space that users search. These changes might simulate changes in macroeconomic parameters, government regulations, consumer tastes, or other "shocks" to the simulated business situation. In any case, a user's knowledge of the SVF topography becomes somewhat obsolete, and he or she must adjust decisions and designs to the new topography. Such changes can be automatically initiated after a prescribed number of rounds in the simulation; after one or more of a statistically determined percentage or certain specific design objects have achieved a prescribed value; in response to exceeding or failing to achieve a prescribed overall or specific change in the value of objects at a given point in the simulation; in response to the use of certain information by a user (e.g., after purchasing a report); or otherwise in response to a programmed criterion or multiple criteria across a number of rounds or users.

The methods used to change the value function depend upon the specific function used in a simulation. The following examples use value functions named earlier in this specification. From viewing these examples, it can be understood by one of ordinary skill how to alter or change whichever value function is being used in a given simulation.

Changes in Value Function (Example 1), *The Traveling Salesman Problem*: Section 1, Introduction and Definitions, introduced the traveling salesman problem (TSP) as a value function. Recall: "The traveling salesman problem is the problem of visiting each vertex (i.e., city) in a fully connected graph exactly once while minimizing a cost function defined with respect to the edges between adjacent vertices. In simple terms, the problem is to minimize the total distance traveled while visiting all the cities [in a set of cities] and returning to the point of origin." Darell Whitley, "Permutations," in section C1.4 of HEC, p. C1.4:1.

For the purpose of illustration, FIGS. 24 and 25 present a simple TSP. In a simulation one would use a larger (more complex) TSP. FIG. 24 shows the five vertices of this TSP, labeled A, B, C, D, and E. FIG. 25 shows a matrix of the distances between the vertices. One can start a simulation with this configuration. Products are permutations of the letters A through E. For example, if a student designed the product (ABCED) its value (reading the distances from FIG. 25) would be 130+50+95+70+75=485. Note that users seek to maximize value, which differs from the classic traveling salesman problem in which value is sought to be minimized.

During the simulation, the value function can be altered by changing the location of the vertices. FIG. 26 shows an altered configuration. Vertex C has moved towards the bottom left of the figure. This changes the distances between the vertex C and the other vertexes. FIG. 27 shows the new distance matrix, with the changed entries in bold and italicized. Once the change is made, the simulation will use the altered value function of FIGS. 26 and 27. This will change the values of all product designs. For example, the product (ABCED) now has a value of 130+85+140+70+120=545. With the TSP, moving a small number of vertices or moving vertices a small amount produces a small alteration of the value function, whereas moving many vertices and moving vertices large amounts produces larger alterations of the value function.

Changes in Value Function (Example 2), an nk-landscape function: During a simulation the simulation might alter an nk-landscape function by randomly changing some of the contributions (some of the entries in the right column of FIG. 29). FIG. 30 presents an altered nk-landscape function from the example of FIGS. 28 and 29. Some contributions have changed. These are marked in bold and italicized. With this altered function, the product design 1101 now has a value of 1+4+2+8=15. By changing only a few contributions, one makes a small alteration in the nk-landscape function. The values of some product designs will change while other designs can still retain their original values. Changing a large number of contributions makes a large alteration in the nk-landscape function. If the alteration is large enough the values of all product designs can change.

Section 7: Design Objects

The section "Fundamental Components" introduced objects that are described by an attribute-characteristics representation. In the examples given, the objects were products (automobiles). The attributes expressed physical qualities (color), technological performance (top speed and city mph), features (window and brake features), components (engine type), and abstract qualities (style). Each product had a value that expressed the product's desirability in a simulated marketplace. In addition, the presentation of the attribute-characteristic representation illustrated important capabilities of the method. Design objects can vary in length. Attributes can vary quantitatively or qualitatively. An object can have different types of attributes, some varying quantitatively, some varying qualitatively, plus other more complex types. In addition, useful, but more complex design objects can include segmented objects, system-set attributes, and objects with multiple values, as discussed in this Section.

Design Objects are More General than Products

Figure 16:
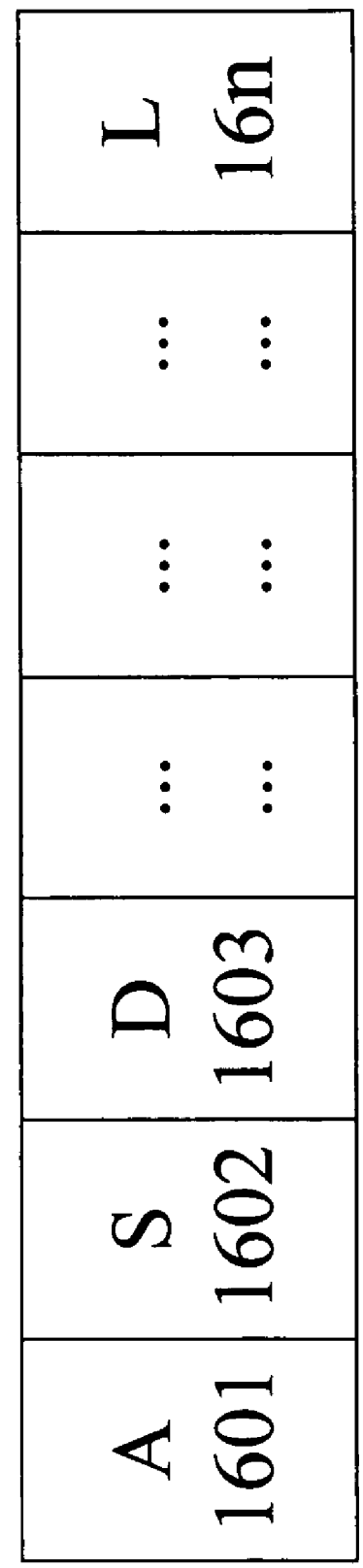
FIG. 16 illustrates an object in accordance with the present invention.
Figure 17:
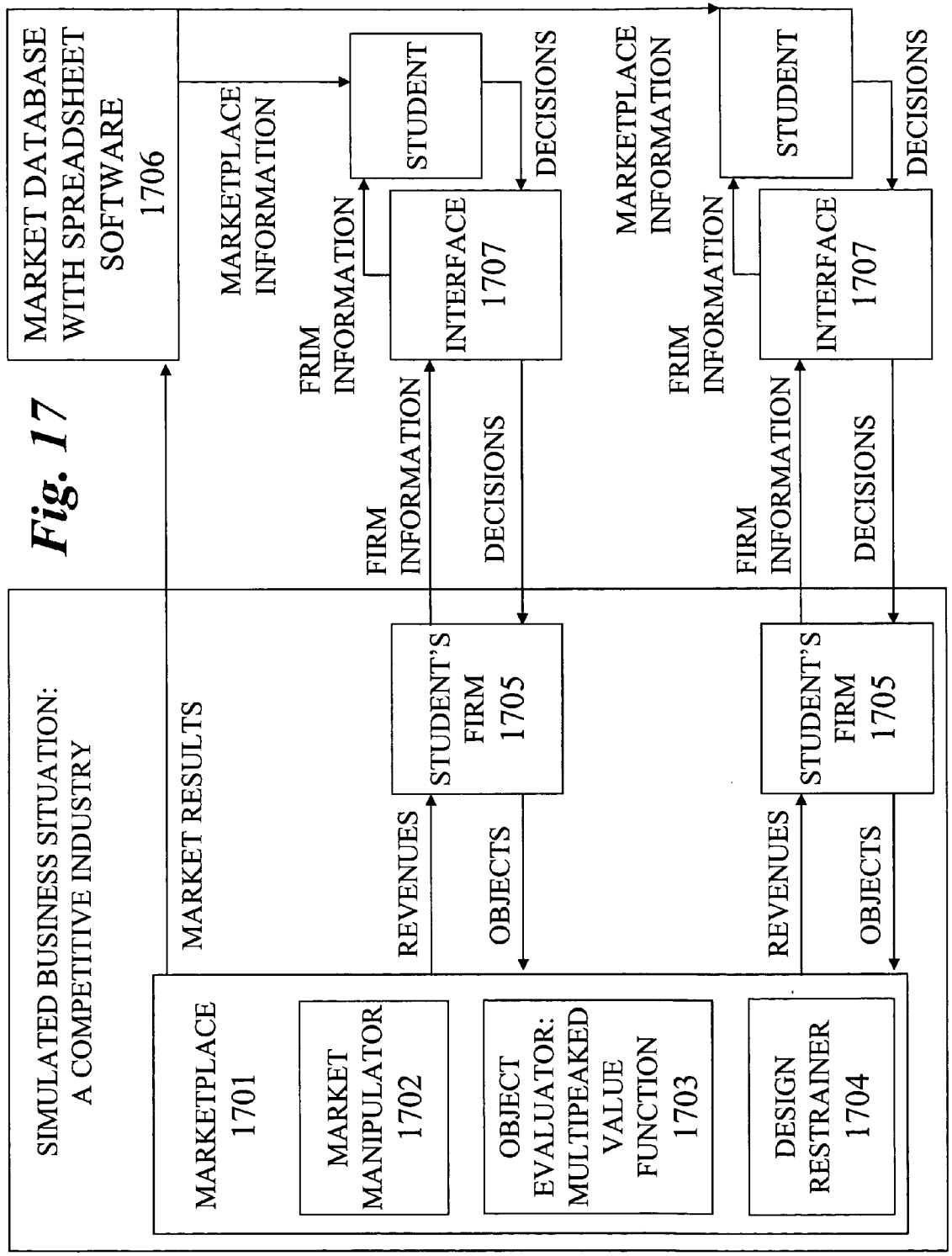
FIG. 17 is a block diagram illustrating the architecture of a competitive industry MTS in accordance with the present invention.

While the "Fundamental Component" and "Illustrative Embodiment" sections usefully depict objects as a set of products, the concept of an object is much more broad. The design objects in a simulation can be any set of objects represented by an attribute-characteristic representation. For example, it could be advertisements which are sent to a market and whose success is then gauged. FIG. 16 provides an illustration of such an object, having n qualitative attributes. FIG. 17 illustrates a block diagram of a simulated competitive industry for testing designs of objects in general.

Accordingly, the objects' values need not be market values (as in the illustrative embodiment). They can be any evaluation of a design object. In one particularly important case, the SVF assigns each object values representing technical performance. For example, consider an attribute-characteristic representation describing a laptop computer. The attributes are system components: battery type, screen type, processor type, operating system type, and others. The SVF determines the technical performance that arises from the interactions of the components. The technological performance includes: battery life, speed, heat production, and propensity to crash. In this example, the SVF does not determine market values. If desired, separate marketing equations determine market values from the technological performance (and possibly from other aspects of a simulation).

Using the attribute-characteristics representation and SVF to describe technology characteristics and performance (instead of product features and market values) is very powerful. For example, an attribute-characteristic representation can specify the design of a system and the SVF can determine manufacturing qualities of the design. A SVF might determine:

1. the amount of labor needed to build an object. Users can focus on finding designs that reduce the labor input (or any input).
2. a parameter that determines the object's "learning curve." Users can search for designs that have learning curves that rapidly reduce production costs.
3. a parameter for a curve that determines costs as one increases the scale of production. Users can search for designs that scale cheaply.
4. the "ease" of manufacturing, where ease influences manufacturing costs and the rate of production defects.
5. the lifetime of a product before it "wears-out."

Object Categories

The "Fundamental Components" section defines object categories as a set of objects defined by object characteristics, particularly defined by the inclusion or exclusion of characteristics. The "Illustrative Embodiment" and "Ramifications" sections illustrated this concept by using "#" to represent any characteristic in the domain of an attribute. For example, (#####), (ABC##), are (ABCDE) are all object categories. Extending this notation enables one to fully express the notion of object category.

An object category is any subset of the set of design objects. One can broaden the notation presented earlier so that one can identify any subset by the inclusion or exclusion of characteristics. Let a single quotation mark signify the absence of a characteristic. For example, (ABCDE') means all products with (ABCD) for the first four attributes and any characteristic except for "E" in the fifth attribute. Similarly, the category (####E') means all objects that do not have an "E" expressed by the fifth attribute.

In addition, object categories can be defined using the union and/or intersection of categories. For example, letting "U" stand for union, the object category (ABC##) U (ABA##) means all products where the first attribute expresses "A;" the second attribute expresses "B;" the third attribute expresses either "A" or "C;" and the fourth and fifth attributes can express any characteristic. With this expended notation, one can define any subset of the set of objects.

Segmented Design Objects

Figure 39:
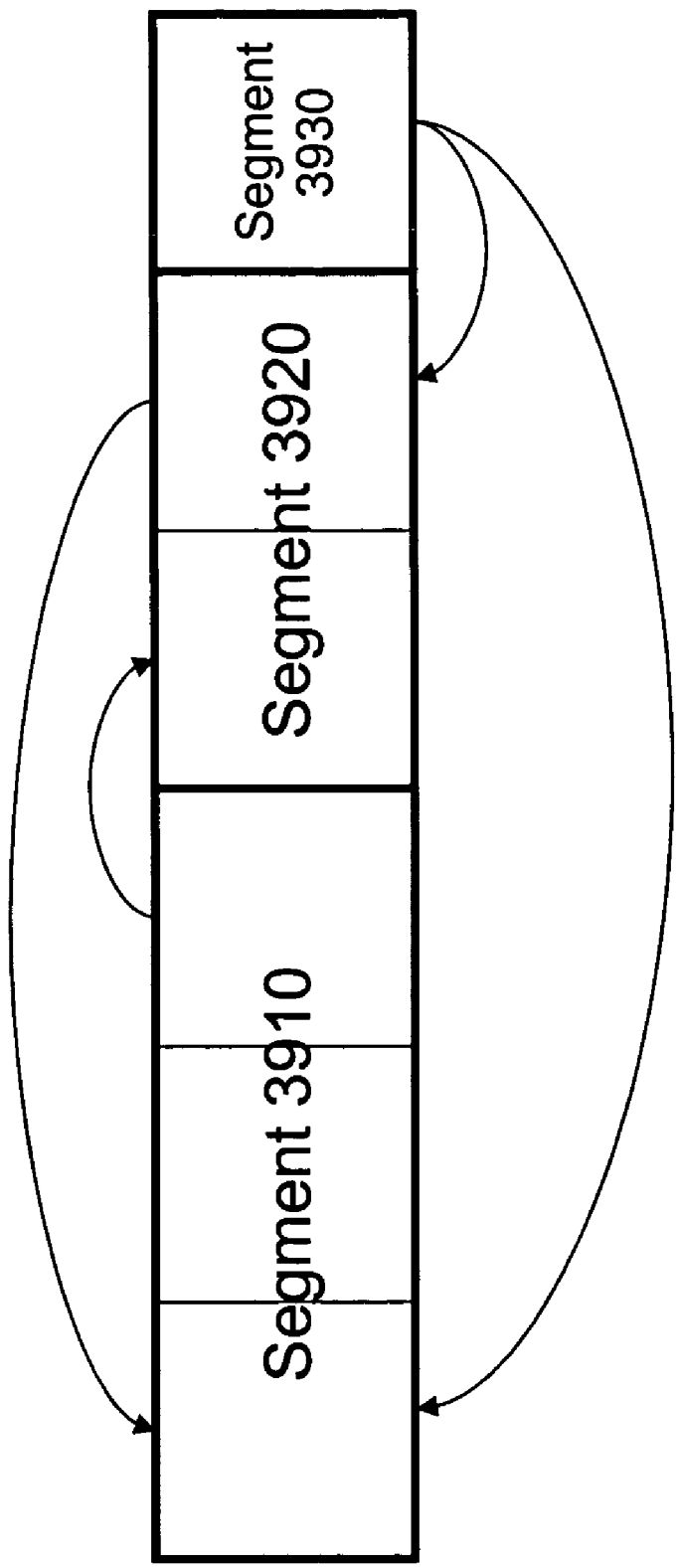
FIG. 39 is an exemplary design object having segments.
Figure 40:
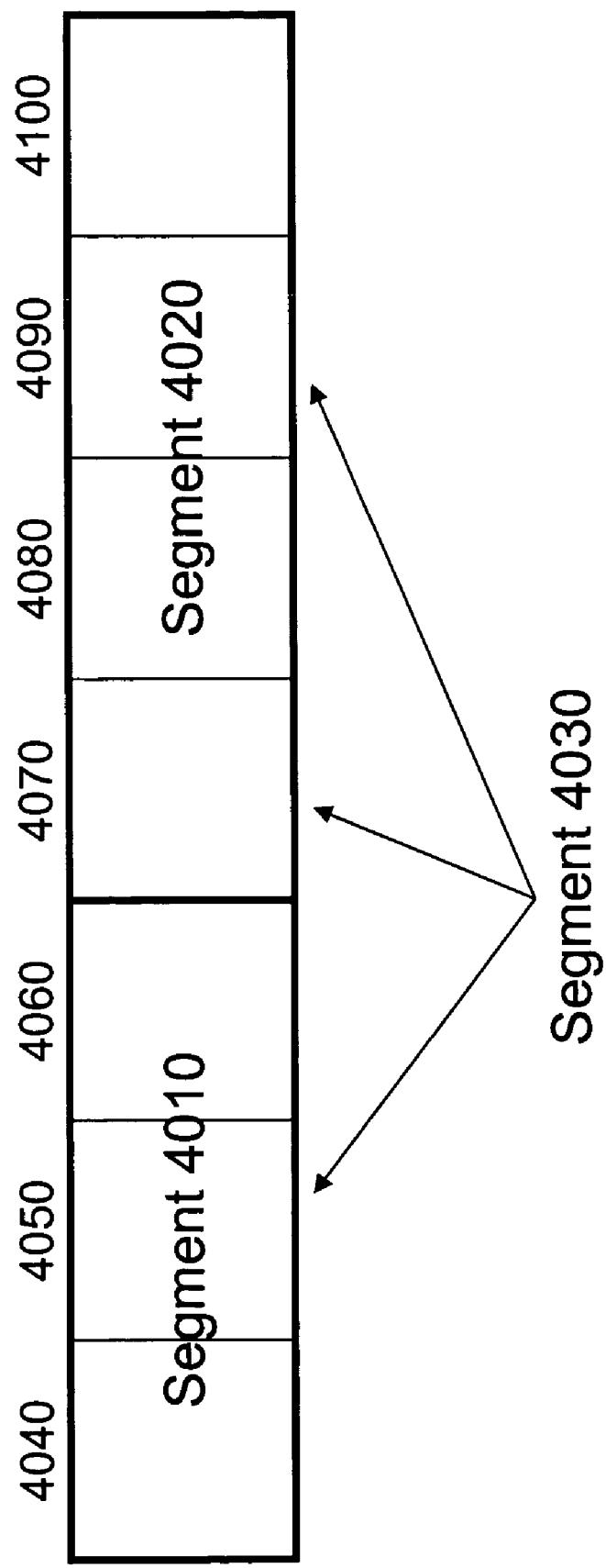
FIG. 40 is an exemplary design object having segments that are more complex that the design object depicted by FIG. 39.

Often, it is helpful to identify groups of attributes. Generally, a group of attributes can be associated with some aspect of the object, SVF, or another part of a simulation. FIG. 39 displays a design object that has three segments (3910, 3920, 3930). Note that the attributes in each segment are adjacent. Though often convenient, this is not necessary. Also note that the third segment has only one attribute. FIG. 40 gives a more complex arrangement. There are three segments (4010, 4020, and 4030) composed of seven attributes (4040, 4050, 4060, 4070, 4080, 4090, 4100). Segments 4010 and 4020 are adjacent. Segment 4030 comprises every second attribute: attributes 4050, 4070, and 4090. Each of these attributes are part of two segments.

Segmented objects can have two types of interactions. Intrasegment interactions are interactions between attributes in the same segment. Intersegment interactions are interactions between attributes in different segments. FIG. 39 illustrates some intersegment interactions. For clarity, intrasegment interactions are not pictured.

The concept of object categories applies to segments in addition to the entire object. Referring to FIG. 40, applying the category (AB##) to segment 4020 means the set of all segments 4020 where attribute 4070 expresses "A," attribute 4080 expressed "B" and attributes 4090 and 4100 expresses any characteristic. Similarly, the concept of object category can apply to two or more segments and up to the entire object.

Segmented Design Objects and SVFs

When design objects are segmented, the simulation can use value functions in various ways. Consider the following examples:

SVF Evaluates the Entire Design Object: The entire design can be the independent variable for the SVF.

Figure 41:
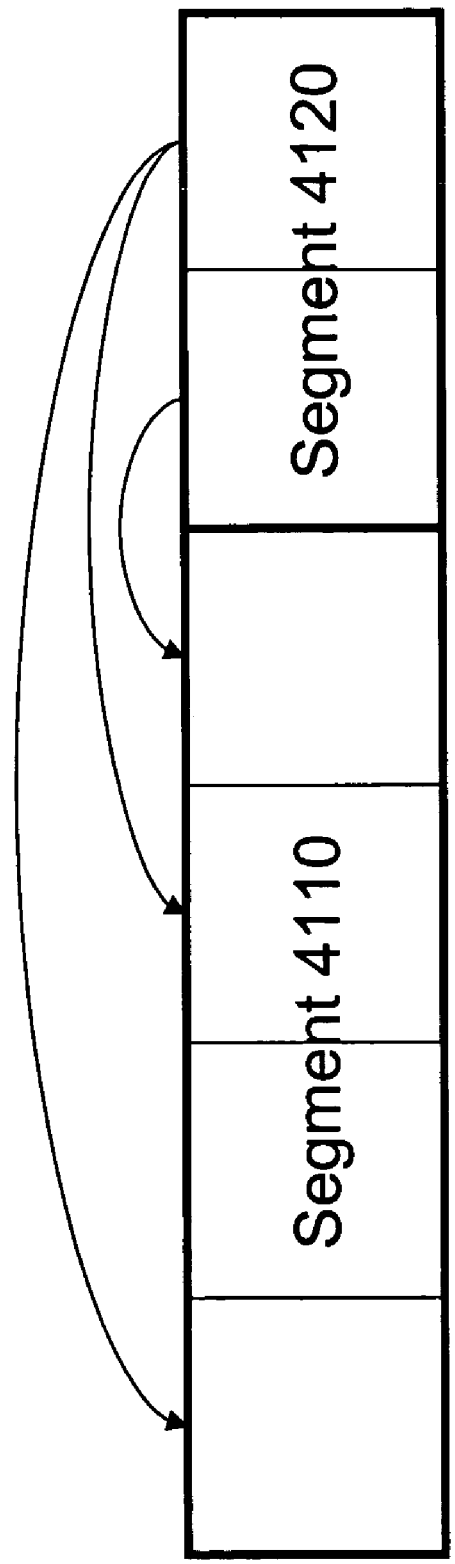
FIG. 41 is an exemplary segmented design object for an object where a selected value function evaluates only one segment.

SVF Evaluates a Segment of a Design Object: Alternatively, the SVF need only evaluate a segment of the design object. Consider FIG. 41, for example. A SVF can evaluate segment 4110 but not segment 4120. Segment 4120 can be evaluated by a different SVF or can play another role in the MTS. For example, it could be composed of system-set attributes (described below).

Different SVFs Evaluate Each Segment: Different value functions can evaluate each segment. As an example, different nk-landscapes can evaluate each segment of the design object in FIG. 42. A simulation can combine these evaluations into a single evaluation for the entire object. For example, one can calculate a object's value as the weighted sum of SVFs that evaluate each segment. This arrangement is useful because the simulation can adjust the weights during a simulation and change the relative importance of the segments. (This is another method of altering the SVF.) In another arrangement, single peaked functions can evaluate each segment. These functions can then be used as inputs to a SVF. The design object is still being evaluated by a SVF.

Figure 42:
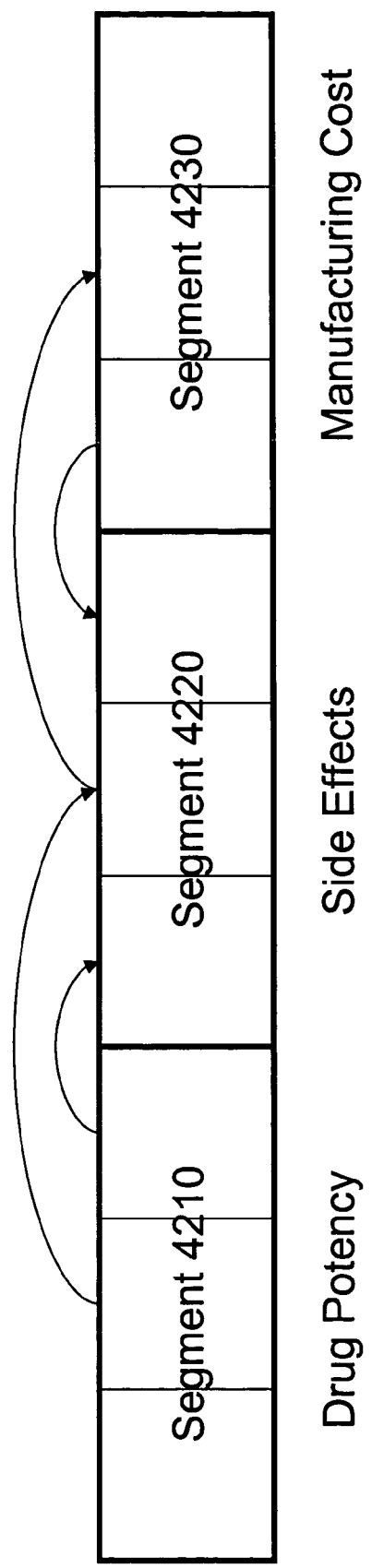
FIG. 42 is an exemplary segmented design object for an object where different selected value functions evaluate each segment of the object design.

When separate SVFs evaluate different segments the results need not be combined. The different SVFs can evaluate different aspects of the design object, and this is a means of assigning multiple values to an object. (Another method is described below). As an example, FIG. 42 shows a design object for a simulation in which users design medicinal drugs. The design object has three segments. There are intrasegment interactions (not shown) and intersegment interactions (shown). A different SVF evaluates each segment. The SVF evaluating the first segment gives the strength of a drug's healing effect. The SVF evaluating the second segment gives the strength of a drug's side effects. The SVF evaluating the third segment gives the cost of manufacturing the drug. A simulation user tries to design drugs with strong healing effects, weak side effects, and low cost manufacturing. Interactions make this difficult. For example, lowering manufacturing cost can adversely affect the healing and side effects.

When different SVFs evaluate different segments, the simulation need not evaluate each segment at the same time. In the medicinal drug example, users can focus their efforts on designing the first segment (drugs with strong healing effects). Later in the simulation they can design manufacturing segments specifically for the good healing effect designs (good segment 4210 designs).

There is one obstacle to evaluating segments at different times. Given the intersegment interactions, how can an SVF evaluate a segment if the user has not yet chosen the characteristics expressed in the other segments? FIG. 42 illustrates two solutions. Suppose that one wants to evaluate segment 4210, but the simulation user has not yet chosen characteristics to be expressed by attributes in segments 4220 and 4230? This is not a problem. The reason is that no segment affects segment 4210, although segment 4210 affects the other segments. FIG. 42 shows this by the arrows on the intersegment interactions. They go away from segment 4210.

Second, suppose one wished to evaluate segment 4220, but that the simulation user had not yet selected characteristics for segment 4210. The simulation could evaluate segment 4220 for a variety of randomly generated segment 4210 designs. The simulation would then use a measure based on these results, such as the average.

Figure 43:
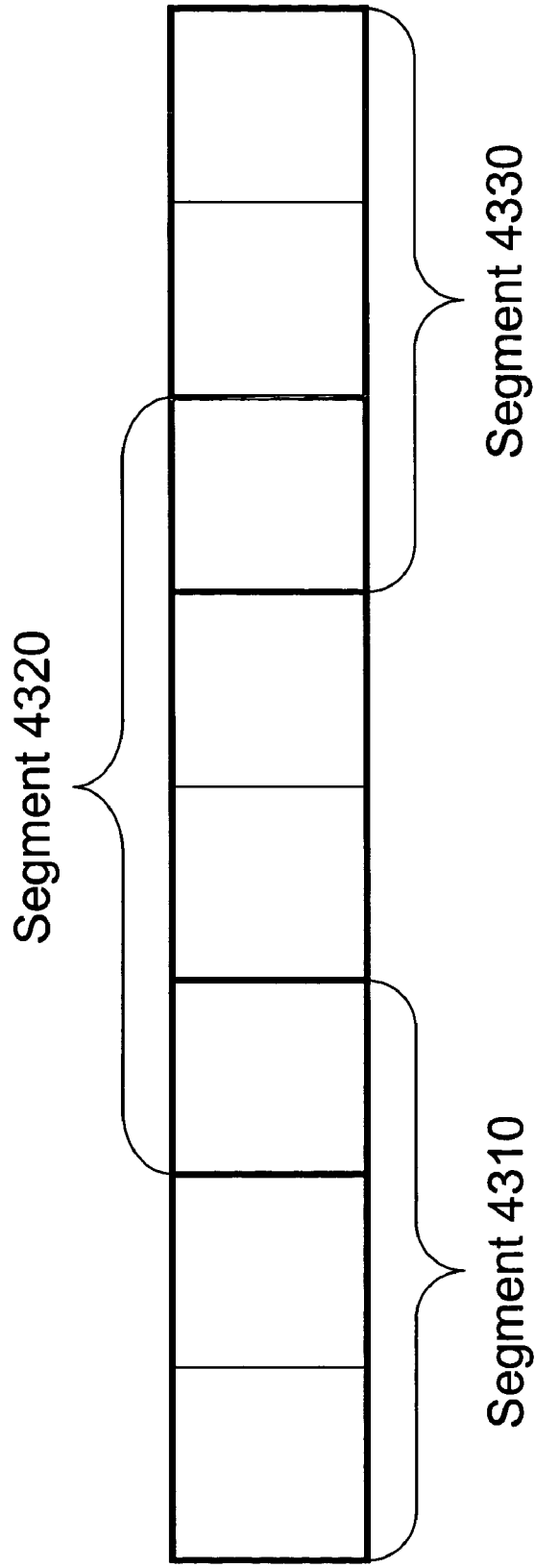
FIG. 43 is an exemplary segmented design object that has overlapping segments.

SVFs Evaluating Overlapping Segments: Another arrangement includes overlapping segments. FIG. 43 displays an example. Users design objects that have eight attributes and three segments (4310, 4320, and 4330). A different value function evaluates each segment. Notice that the third and sixth attributes are part of two segments. The segments overlap. The example in FIG. 40 is more complex. In this example, the entire segment 4030 overlaps with the segments 4020 and 4010. In addition, the attributes composing segment 4030 are not adjacent.

The overlapping segments produce interactions. Suppose that the design object from FIG. 40 is evaluated by three SVFs, one for each segment. Changing the characteristic expressed by 4070 affects the value of segments 4020 and 4030. If done with skill, one can use these interactions to help design the simulation. In fact, one might be able to produce a SVF from these interactions.

Examples of Using Segmented Design Objects

Segmented objects add new functionally to MTSs embodying the present invention. Below the following examples are described: market segments, teamwork, specialized knowledge, interfirm collaboration, pharmaceutical R&D, and product applications.

Figure 44:
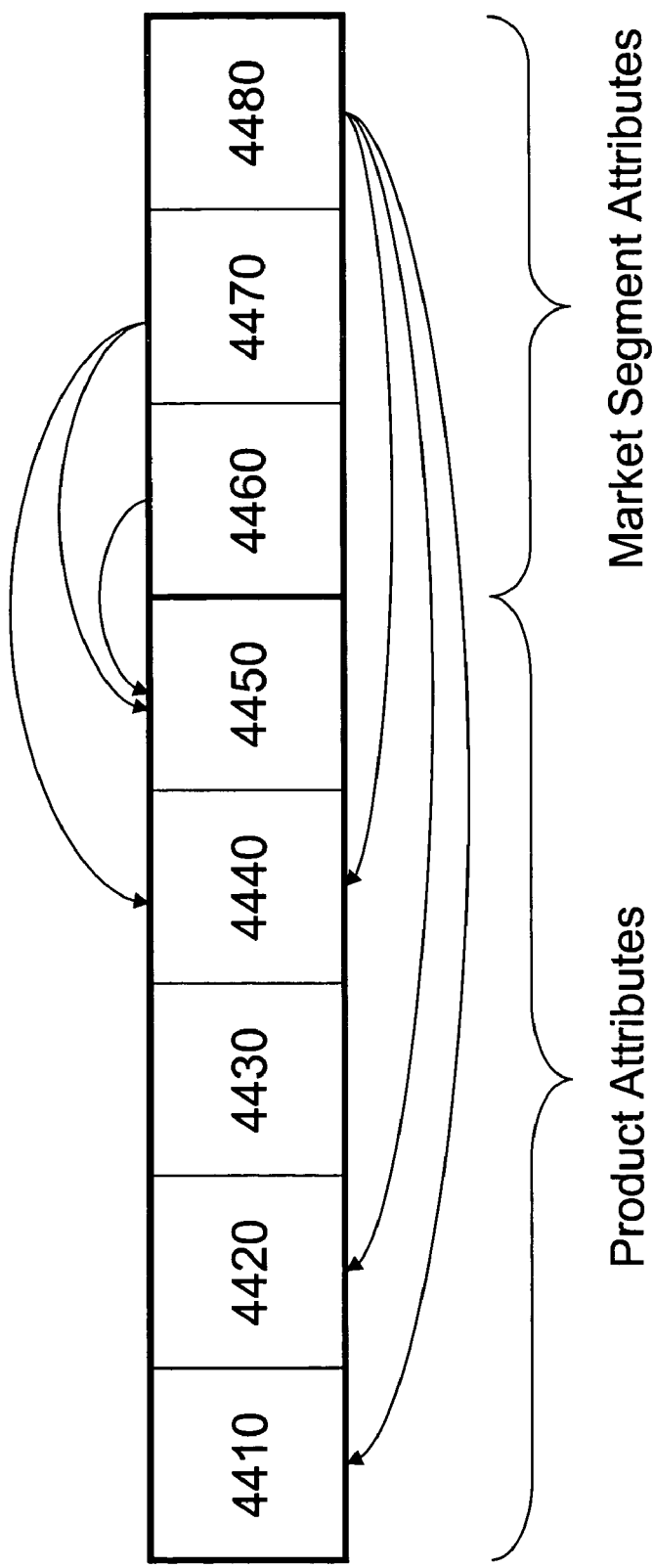
FIG. 44 is an exemplary segmented design object having a segment of product attributes and three market segment attributes.

Market Segments: A segment of the design object can represent a product and another segment represent market segments. FIG. 44 illustrates an example. There are five product attributes (4410, 4420, 4430, 4440, and 4450). There are three market segment attributes that represent market segments (4460, 4470. and 4480). The intersegment interactions enable the market segments to affect the values of design objects, thereby producing a different value for each segment.

For example, let (ABCDE) represent a product. Let (AAA), (AAB), and (BAA) represent market segments (which might represent teenagers, empty nesters, and senior citizens) or different product applications (for example applying glue to wood, plastic, or metal). Selling the product in all three markets produces three object designs: (AB-CDEAAA), (ABCDEAAB) and (ABCDEBAA). Evaluating these designs with a SVF would produce three different values. In other words, the value of the product depends upon the segment that is buying the product.

Notice that the market segment attributes in FIG. 44 display various levels of interaction. Attribute 4460 has only one intersegment interaction. Because of this, it has a small effect on product value. Switching a product from market segment (AAA) to (BAA) has a small effect on the value. In terms of product values, the market segments (AAA) and (BAA) are highly correlated. In contrast, attribute 4480 is highly interactive. Switching a product from market segment (AAA) to (AAB) will significantly affect its value. In terms of product values, the market segments (AAA) and (AAB) are poorly correlated.

During a simulation, the users do not see the symbolic representation of the market segment attributes. In fact, they need not be aware of market segment attributes. Users simply select a segment in which to sell some of their products. The simulation then "attaches," or concatenates, the symbolic representation for that segment. Alternatively, the computer can select the segment. An MTS might do this, for example, if it randomly generates customers entering a retail store.

Agent-Based Models: The illustrative embodiment presented above simulated a market. Design objects were evaluated by a multipeaked value function and the results were further processed by marketing equations. There are many systems of equations used to model markets in MTSs. For a review of equations for modeling markets see Steven Gold and Thomas Pray, "Modeling Demand in Computerized Business Simulations," in Jim W. Gentry (ed.), *Guide to Business Gaming and Experiential Learning*, Association for Business Simulation and Experiential Learning (East Brunswick: Nichols/GP Publishing, 1990), pp. 117-138.

In addition to systems of equations MTSs can also simulate markets with agent-based methods. With this technology, which can build upon research from the field of artificial life, agents simulate individual customers or groups of customers. Products are sent to a simulated market where customers and suppliers conduct business. Agent-based models can make good use of segmented design objects. For example, one segment can represent a product design and the other can represent a customer's tastes. Each agent holds a copy of the attribute-characteristic representation of its tastes. The simulation can then calculate the value of a product for a particular customer. The product design segment is determined by the product in question and the customer taste segment is determined by the agent (customer) in question. To evaluate a design for a particular customer the product segment and the customer taste segment are concatenated and then evaluated by a SVF. In this example, the method is similar to using the segmented design to represent market segments, except that agents play the role of market segments. The agent-based modeling offers great opportunities for MTS. Many of these opportunities are enhanced by using segmented object designs and SVFs.

Teamwork: The simulation divides a design object's attributes into several segments (for example, attributes one through five, six through ten, and eleven through fifteen). Each user designs one segment. The intersegment interactions represent the impact of one user's decisions on other users' designs. To design high value products, the users must coordinate their efforts and work as a team. The users' dependence on each other increases with the number of intersegment interactions.

For example, consider the pharmaceutical example of FIG. 42. One user can design the segment for healing. Another user can design the segment for side effects. A third user can design the segment for manufacturing. Intersegment interactions prevent the users from designing each segment independently. If each tries to optimize his or her segment independent of the others, the total will be suboptimal. The three users must work together.

The simulation can further influence and teach teamwork through various scoring methods. For example, the MTS can evaluate each user's segment with a SVF and also evaluate the total design with another SVF. Each user's score is a weighted average of the values of his or her segment and of the total design. By changing the weights, the simulation can induce various levels of cooperation.

Specialized Knowledge: Consider the medicinal drug example of FIG. 42. Suppose that a different SVF evaluates each segment. Suppose there are several users, each controlling a firm in the simulation. Though searching the three SVFs, a user can gain knowledge of the topography of one of the SVFs. He becomes an expert in designing low cost manufacturing, for example. This user can sell his expertise to another user. He can commit to designing the manufacturing segment for another user's main and side effect designs. Alternatively, he can sell manufacturing designs that fit well with a particular class of drugs (an object category of the first segment, second segment, or both). Likewise, he can make cross licensing agreements with users that have other expertise. For example, he can trade low cost manufacturing designs for designs that minimize side effects. Note that interactions between the segments means that segment designs should be adapted to each other. In the example, a particular manufacturing design might manufacture some drugs at low costs but others at high costs. The same statement is true when considering object categories, rather than individual designs. Some object categories for the manufacturing segment work particularly well with some object categories of the healing and side effects segments.

Interfirm Collaboration: A simulation can have each segment represent a component of a product. For example, the product can be a personal computer and the components can be the motherboard, processor, hard drive, etc. Each user controls a firm, and at the start of the simulation each firm designs and manufactures a different component. In efforts to produce the final product, firms can purchase other components, form alliances, or diversify their product development. Considering the alliances, firms can design components together and/or jointly manufacture and sell products. When designing products together, firms must adjust designs for the interactions among components.

Figure 56:
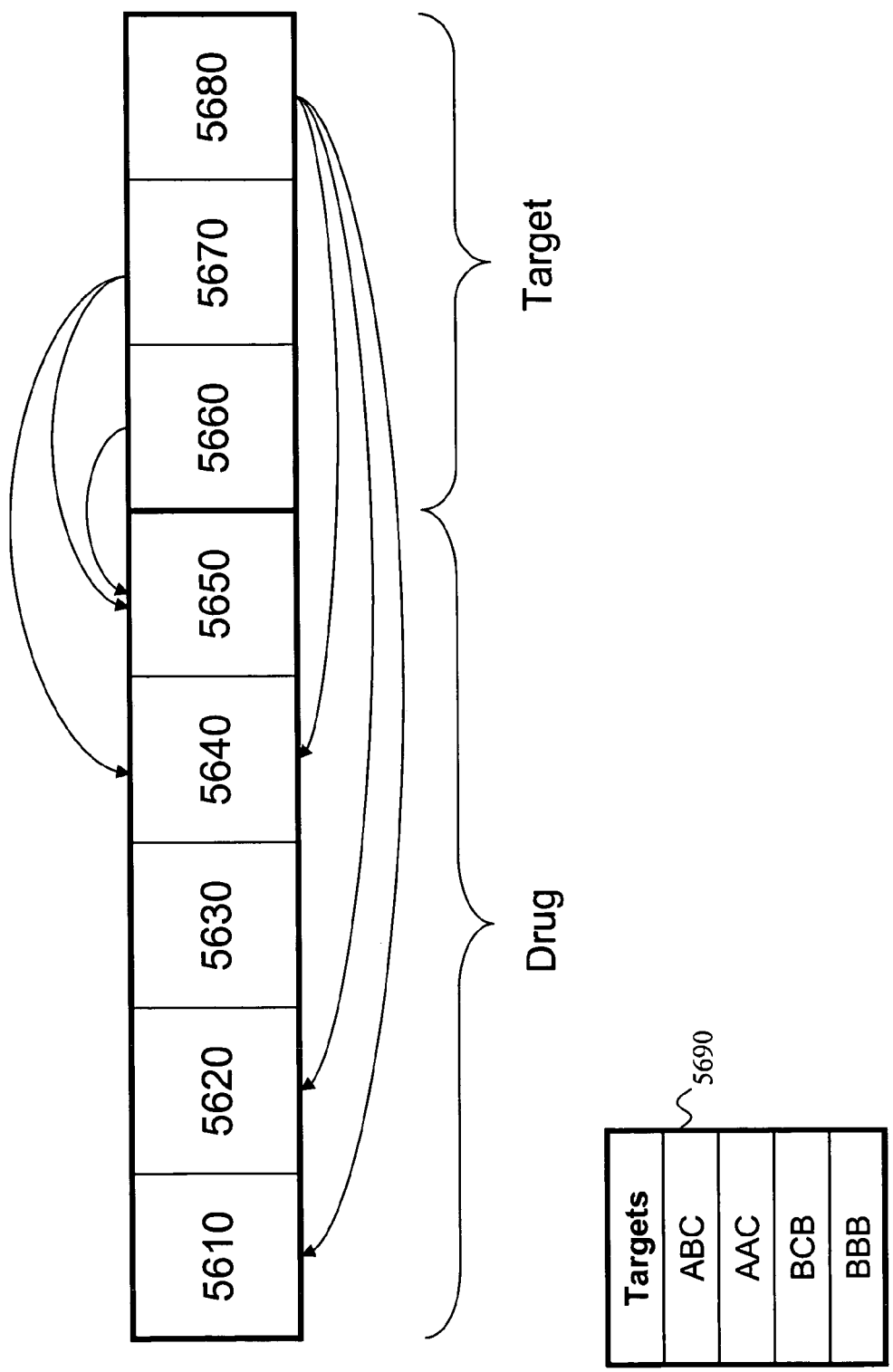
FIG. 56 illustrates a list of targets and a design object used for simulating pharmaceutical R&D, where one segment of the design object represents a molecule and the other segment representing the molecule's target, which is selected from the table.

Pharmaceutical R&D: Pharmaceutical scientists design drugs that interact with proteins in the body. Greatly simplified, the process has two steps. First, a protein is identified through research of a disease or protein reactions such as cell metabolism. This protein is called a target. Second, scientists design drugs to interact with the target in a desired way. One can simulate targets with segmented objects. FIG. 56 illustrates. One segment of attributes describes the drug (5610-5650), and another segment of attributes describes the target (5660-5680). During a simulation, when the user designs a drug he first selects a target from a list, as exemplified by part 5690 of FIG. 56. The target sets the characteristics of the target attributes (5660-5680). The user then designs a drug to interact with the target by assigning characteristics to the drug attributes (5610-5650). The value function evaluates the entire design, consisting of all the attributes (5610-5680). In this way, the user must design the drug for the selected target. During the simulation new targets could become available, representing scientific advances (further described below).

Product Applications: An object can have one segment representing product designs and another segment represents customers' applications of a product (call these attributes application attributes). Intersegment interactions represent the effect of product changes on the application and the effect of using an existing product in a new application. This configuration is useful for simulating:
1. different uses for a product or technology (e.g., computer performance in accounting, writing, multimedia, Internet, or other uses; the performance of a tire on different automobiles; or the effectiveness of a dry cleaning agent at dissolving various stains)
2. technical performance of a component embedded in various systems (e.g., the speed of a microprocessor in different computer systems; the life of a battery in different consumer electronics products)
3. Customer groups seeking products for different applications In addition, this arrangement enables the following simulations:
4. The MTS can intermittently change the characteristics expressed by the application attributes. This simulates changes in customer needs. Users must adapt their firm's products to these changes. The changes can vary in size from incremental to radical. These changes can be determined by a program in the MTS or by the MTS simulating customers who autonomously develop new applications.
5. Users can search for both new products and new applications of products. Users will manage both product research and market development.
6. By combining the enhancements just described, MTSs can more realistically simulate industry life cycles. For example, after a technological breakthrough, firms often must invent applications and educate customers to the benefits of these applications.

System-Set Attributes

Figure 45:
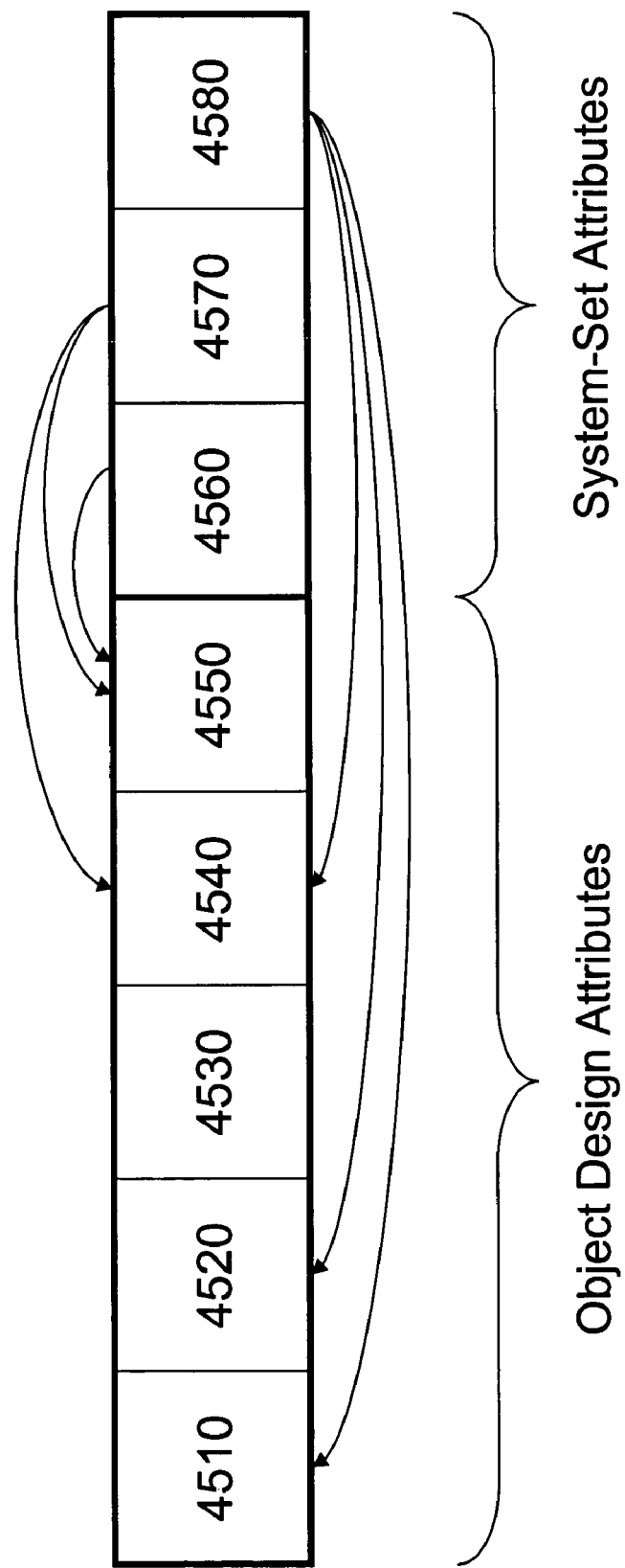
FIG. 45 is an exemplary segmented design object having a segment of design attributes and a segment of system-set attributes.

Sometimes, it is useful to let the simulation control one or more attributes or segments of a design object. When the simulation controls some attributes, these are called system-set attributes. Often, users do not see and are not aware of system-set attributes. FIG. 45 depicts an object with system-set attributes. There are five design attributes that the user controls in efforts to design desirable objects (4510, 4520, 4530, 4540, and 4550). There are three system-set attributes (4560, 4570, and 4580). The attribute 4580 is highly interactive with the design attributes. The attribute 4570 is less interactive, and the attribute 4560 is weakly interactive with the design attributes. To cause a small change in object valuations the simulation changes the characteristic expressed by attribute 4560. The new values will be highly correlated with the old, so users can respond to the "shock" with small design changes. To cause a medium change in valuations, the simulations changes the characteristic expressed by attribute 4570. To cause a large change in object values, the simulation changes the characteristic expressed by attribute 4580. The new object values will be poorly correlated with the old values. Once valuable products will become "worthless," and users must respond by making large design changes.

Some uses of system-set attributes include system shocks, multiple market segments, changes in consumer tastes, system components, and pharmaceutical R&D. Each of these is described below.

System Shocks: With system-set attributes MTSs can simulate shocks to the situation that they simulate. These shocks have the same effect as changing (or altering) the topography of value function (see the "Changing the Value Function," section, above). In many cases, this is an easier means of achieving the effect.

Multiple Market Segments: Sometimes the users do not decide which market segment to send a product to. In this case, the simulation will calculate a product's value for the different segments by using system-set attributes. The method is similar to the previously described method for representing market segments (see above). However, in this case the user does not decide which market segment evaluates a product. The simulation makes this determination and then sets the system-set attributes. An MTS would do this, for example, when simulating patients' reactions to drugs. The system-set attributes represent different population segments of patients.

Changes in Consumer Tastes: Suppose that the user designs cell phone covers. The system-set attributes can represent factors influencing market tastes. By intermittently changing the characteristics expressed by these attributes, the simulation simulates changes in consumer tastes. The simulation changes the characteristic of a weakly interactive system-set attribute (FIG. 45, attribute 4560) to simulate a small change in consumer tastes. A simulation might do this frequently, forcing users to "track" the market. A user tracks the market by manufacturing and selling a variety of designs, even if some are sold in small numbers. This enables the user to quickly identify and exploit changes in taste. The simulation can also change the characteristic expressed by a highly interactive system-set attribute (FIG. 45, 4580). This simulates a strong taste change. These changes occur periodically in "fad" markets.

System Components: In another example, the users see the system-set attributes and know what they represent. However, the users cannot change the system-set attributes. Suppose that users compete at designing a component in a complex system. The system-set attributes represent the other components of the system. For example, consider a personal computer. The system-set attributes represent the motherboard, processor, devices, and other components. The users must design an operating system to work well with them. Periodically, one of the other components changes. Some changes are small, for example an improved protocol for communicating with CD-ROM drives. The simulation simulates this by changing the characteristic expressed by a weakly interactive system-set attribute. Alternatively, personal computers can change processors. The simulation simulates this by changing the characteristic expressed by a strongly interactive system-set attribute. In both cases, the users must adopt their design to the new system configuration. Note: users need not see symbolic representation of designs. Users can see written descriptions or visual depictions of the other system components. In the current example, the simulation might display a picture of a motherboard with installed components.

As is common in the personal computer industry, users can receive beta versions of the new components before the switch. The user can create designs for the new component. However, the beta version differs slightly from the component that is later offered to the market. An MTS can simulate this situation with two system-set attributes. One attribute has many interactions with the design attributes. The characteristics of this attribute represent the different types of components (for example, processor types 1, 2, and 3). The other system-set attribute has few interactions with the design attributes. This attribute has several characteristics. These characteristics indicate the versions of the component, for example beta version, version 1, version 2, and so on.

Research and Development: Recall the description of pharmaceutical R&D. Once scientists design a drug to interact with a protein, the drug is tested in a laboratory, in animals, and then finally in human beings. The simulation can use system-set attributes to represent the different tests on a drug. The system-set attributes enable the simulation to calculate different results for the same drug design, depending on the type of test.

Design Objects with Multiple Values

Previously, I showed how to assign multiple values to design objects using multiple SVFs. One can achieve the same effect using a single SVF and either a segmented design object or system-set attributes. The following example illustrates. Suppose that the user must design a "fountain of youth drug." The drug is a string of five molecules, where each molecule is chosen from a set of nine possibilities. These possibilities are designated by the letters "A" through "I." This makes the attribute-characteristic representation of the drug a string of five design attributes that can each express a letter "A" through "I." There are 59,049 different designs (nine to the fifth power).

Suppose that "fountain of youth" drugs have five effects on patients:
1. Face: makes the patient's face more youthful looking (desired effect)
2. Weight: Reduces the patient's weight by reducing fat (desired effect)
3. Strength: Increases the patient's muscular strength (desired effect)
4. Heart Damage: kills some of the patient's heart muscle (unwanted side effect)
5. Liver Damage: destroys some of the patient's liver (unwanted side effect)

Figure 31:
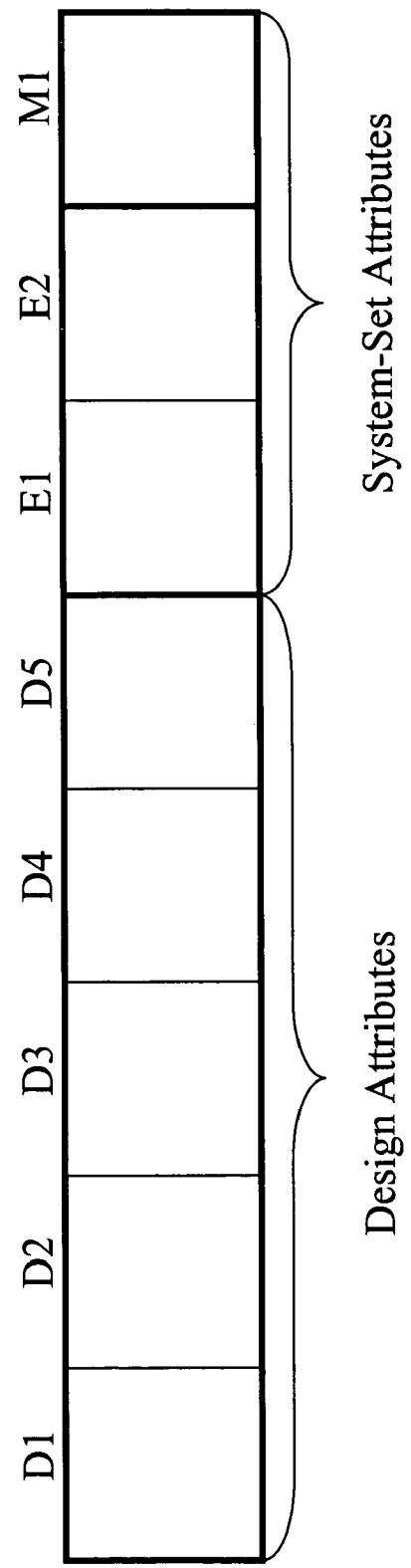
FIG. 31 illustrates an exemplary attribute-characteristic representation of an object in which there are multiple design and system-set attributes.

In addition, assume that the drug affects men and women differently. This creates two market segments: male and female. Drugs that work well in one segment might work poorly in the other segment. For any drug, the simulation must assign each design object values for five effects in two different markets—for a total of ten values. The simulation accomplishes this feat with three system-set attributes. Two of these attributes represent the drug's effects and the remaining attribute represents the market segments. In total, the attribute-characteristic representation now has eight attributes: five design attributes and three system-set attributes. FIG. 31 depicts the attributes. The five design attributes are labeled D1-D5. The two attributes used for assigning effects are labeled E1 and E2. The attribute used for assigning effects to each market segment is labeled M1.

The simulation uses the two effects attributes, E1 and E2, to represent each effect. Since there are five effects, the characteristic combinations are labeled (AA), (AB), (BB), (AC), (DD), each designating a possibility (AB means E1=A and E2=B). The simulation uses M1 to represent the markets. Specifically:
1. (AA)=Face
2. (AB)=Weight
3. (BB)=Strength
4. (AC)=Heart Damage
5. (DD)=Liver Damage
6. (A)=Men
7. (B)=Women While the label, which represents characteristics for the system-set attributes, can be arbitrarily assigned, it must be within the domain of the value function being used.

To set a value for an effect of a drug design, the simulation combines the system-set attributes with the user's design. Suppose, for example, that the user designs a drug (EFGHJ). To calculate the drug's Weight effect on a man the simulation evaluates the design (EFGHJABA) with the SVF. To calculate the drug's Heart Damage effect on a woman the simulation evaluates the design (EFGHJACB) with the SVF. In this way, the simulation uses system-set attributes to evaluate different effects of designs for different market segments. FIG. 46 shows the attribute-characteristic representation used by the simulation of this embodiment to calculate the five effects in each market segment for the drug design (IHGFE). It shows the full attribute-characteristic representation for the drug (IHGFE) for each effect and market segment.

Figure 32:
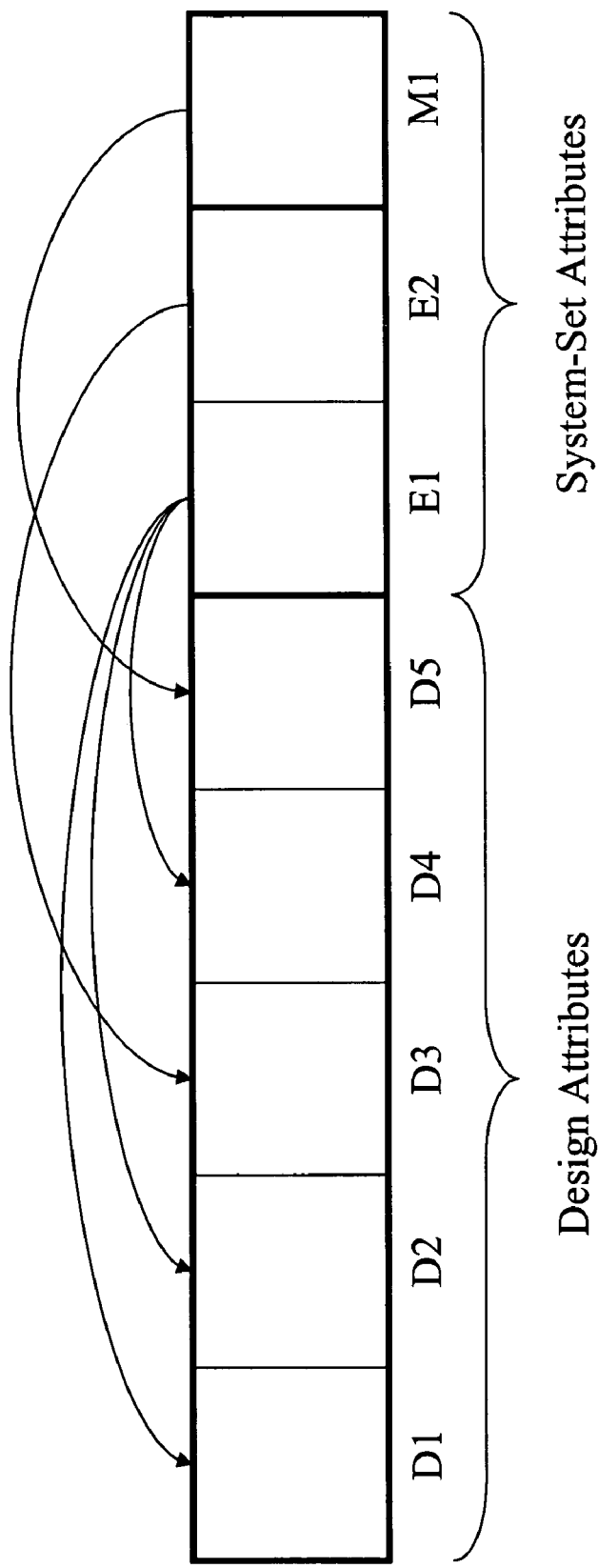
FIG. 32 illustrates hypothetical interactions of system-set attributes with design attributes (interactions of design attributes with design attributes are not shown) as are governed by the particular value function being used at a given point in time in a simulation.
Figure 35:
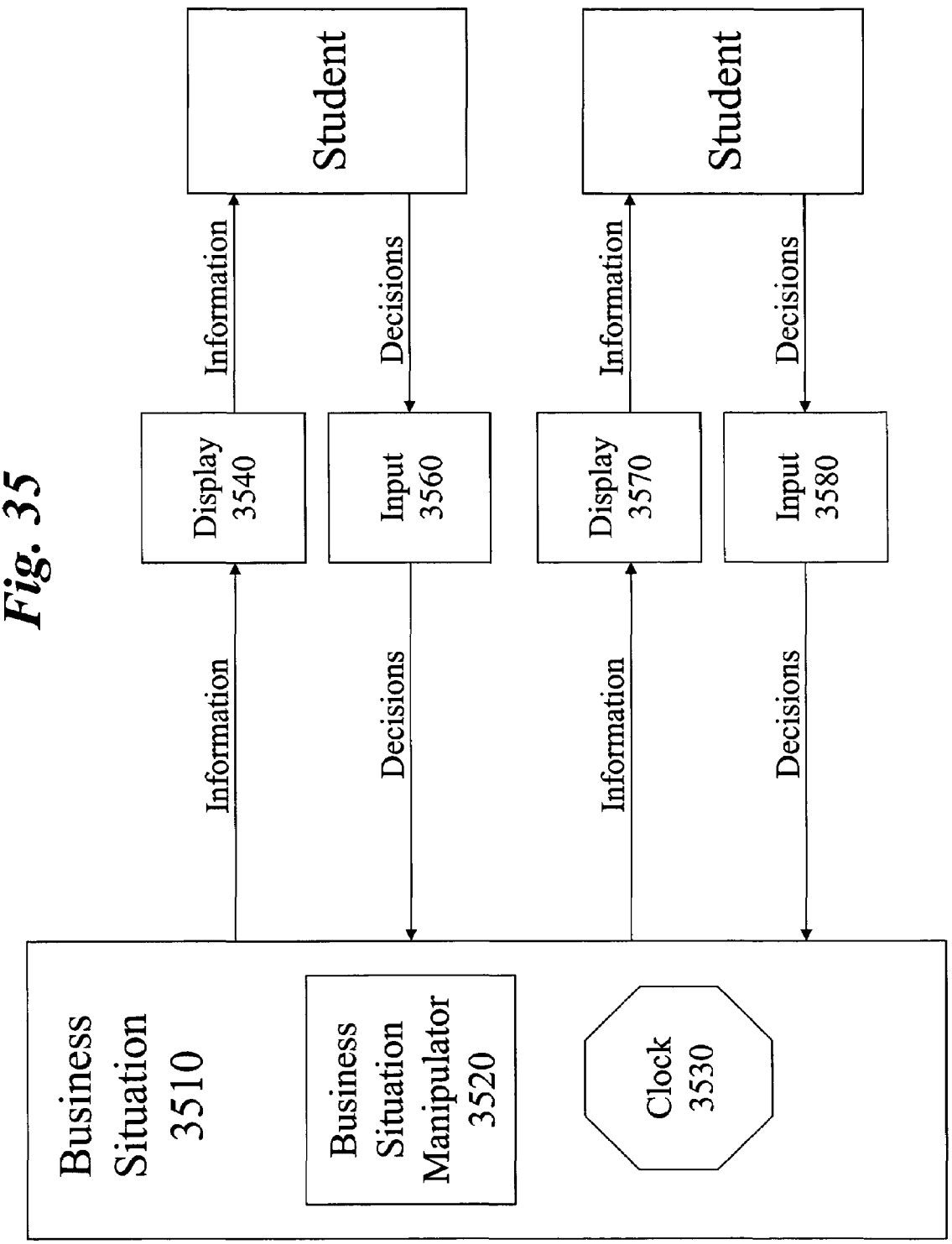
FIG. 35 is a block diagram of an asynchronous MTS.

With nine characteristics available for each attribute, the simulation could have represented all five effects with only one attribute that varies from A to E. Using two attributes allows the simulation to control the relationship between effects. The attribute E1 can have high interactions with design attributes, and E2 can have low interactions with design attributes. FIG. 32 depicts a hypothetical case where E1 interacts with three design attributes (D1, D2, D4) and E2 interacts with only one design attribute (D3). System-set attribute M1 affects design attribute D5. The interactions of design attributes with other design attributes are not shown in FIG. 32. Interactions are governed by the particular value function being used at a given point in time in the simulation (which value function can be altered or substituted for another, depending on the particular simulation being run).

With the interactions depicted in FIG. 32, Face (AA) and Weight (AB) effects will be well correlated over the set of drug designs. This is because they differ only in an attribute with low interactions (attribute E2); attribute E1 is "A" for both effects. Conversely, Weight (AB) and Strength (BB) effects differ in E1, which interacts with three design attributes. These effects will not be as well correlated over the set of drugs. The Liver Damage effect differs from all other effects on both E1 and E2. It might appear to vary independently from the other effects.

Section 8: Additional Applications in MTSs

The preceding sections describe how the use of the attribute-characteristics representation and SVFs creates MTSs with novel and outstanding properties. It can also produce equally novel and outstanding changes in the modeling of manufacturing, marketing, R&D, and technical advance. Section 8 describes these innovations.

Modeling Manufacturing

No prior art assigns an attribute-characteristic representation to production capacity. Instead, the prior art primarily considers modeling production functions. For examples see Steven Gold's and Thomas's Pray's paper "The Production Frontier: modeling production in computerized business simulations," in Simulation and Games, vol. 20, no. 3, September 1989, pp. 300-318. Also see Steven Gold's paper "Modeling Short-Run Costs and Production Functions in Computerized Business Simulations," in Simulation and Games, vol. 23, no. 4, December 1992, pp. 417-430.

Assigning an attribute-characteristic representation to production capacity enables a simulation to teach coordinating manufacturing with firm strategy. It makes manufacturing an important consideration in marketing, R&D, and other business decisions, as described below. The method readily adapts to a variety of situations that an MTS might simulate. The drawings and ensuring descriptions make this apparent.

Figure 47:
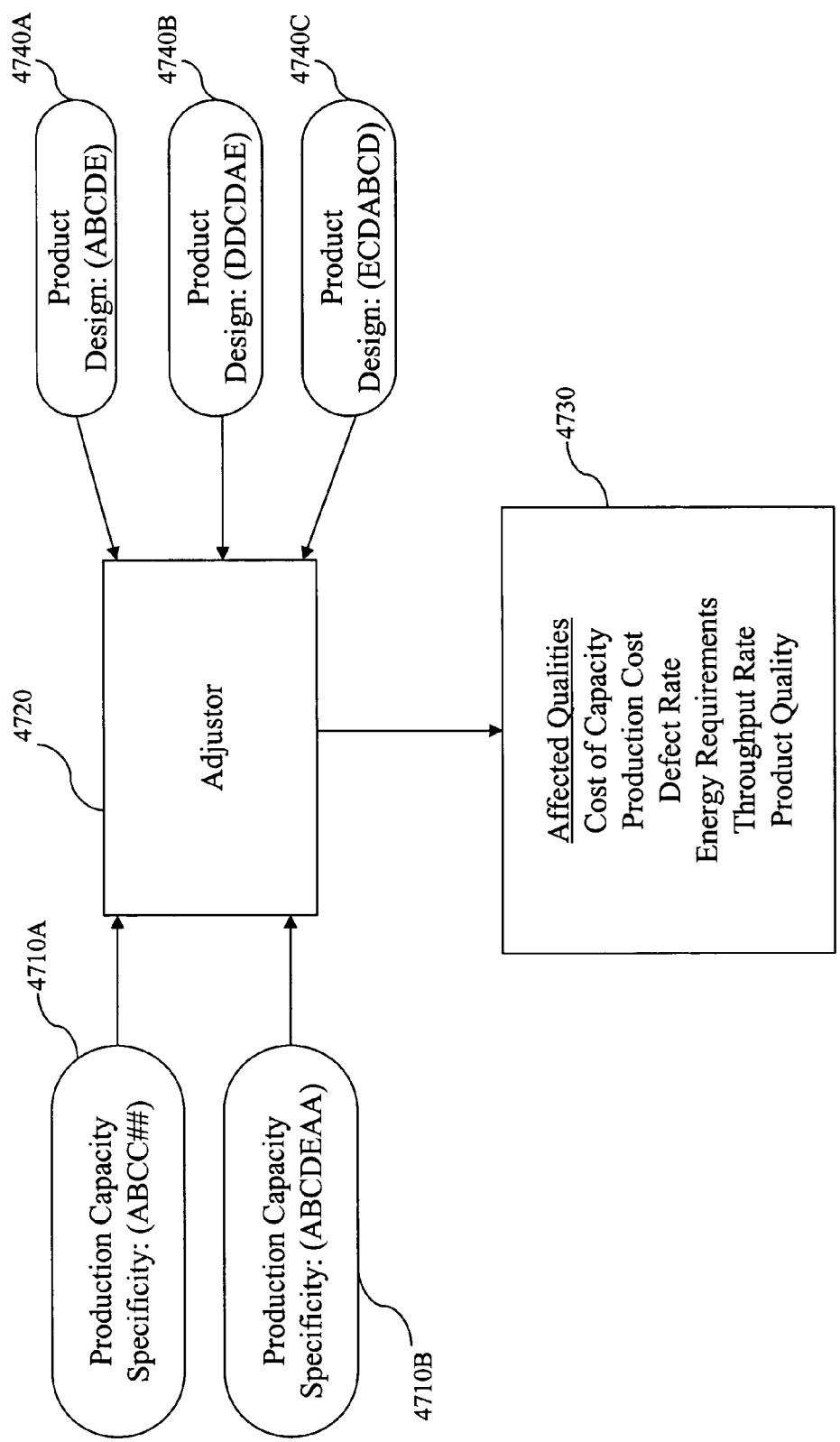
FIG. 47 is a block diagram showing the components used in modeling manufacturing with an attribute-characteristic representation.

Modeling Manufacturing, description of the method: FIG. 47 shows the three basic "parts" of the method. These are one or more production capacities, each with an assigned specificity (4710A and 4710B), an affector (4720), and affected qualities (4730). Production capacities are objects in a simulation, usually associated with a simulated firm. They constitute a potential to manufacture a finite number of products. For example, a production capacity might have a maximum production rate of 500 units per time period (for example, month, quarter, or year). This means that in each simulation time period it can produce at most 500 units of products.

One can assign an object category to a production capacity. Object categories are defined with an attribute-characteristic representation, and they are described in the Section 1, "Introduction and Definitions," in the subsections titled "Products" and "Product Categories." They are further described in Section 7, "Design Objects." The object category assigned to a capacity is called the capacity's specificity. The previously described illustrative embodiment taught assigning to production capacity an object design defined by an attribute-characteristic representation. An object design is actually an object category. It is a category that contains one object: the design itself.

Considering the other parts of FIG. 47, affected qualities are usually properties of manufacturing processes (per unit cost) or of capacities (maximum production rate). They can also be qualities of other objects and processes in a simulation, as illustrated below. The affecter observes the specificity of one or more capacities, and then it affects, or at least partially determines, one or more of the affected qualities. FIG. 47 also displays products (4740A, 4740B, and 4740C). This is because in an important application the adjustor compares the specificity of one or more capacities with the designs of one or more products being manufactured. The adjustor then affects qualities of the manufacturing process. FIGS. 48-52 describe the use of the method with several illustrative examples.

Figure 48:
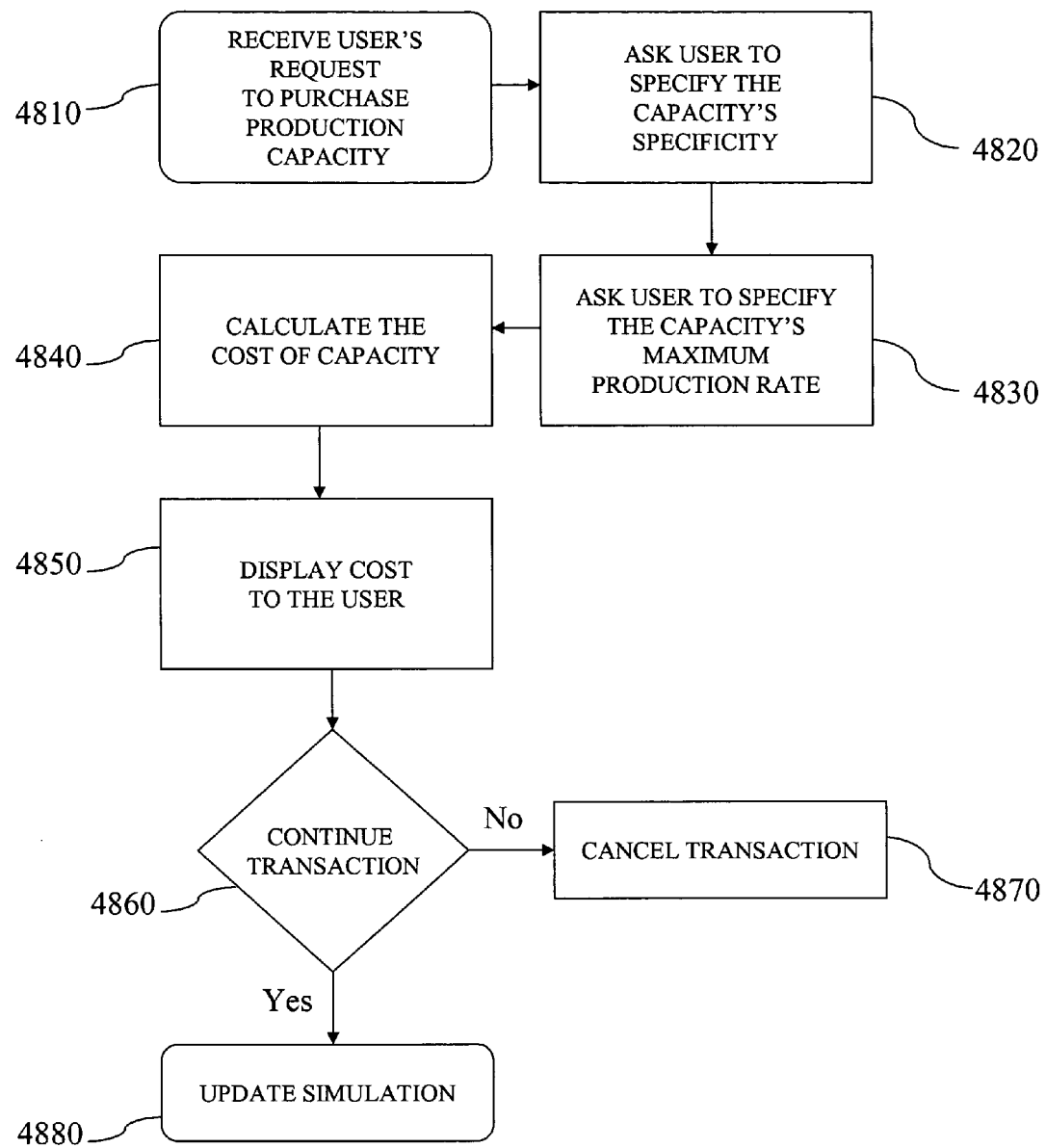
FIG. 48 is a process flow for purchasing manufacturing capacity.

Modeling Manufacturing, operation of the method: FIG. 48 is a flowchart showing how a simulation might assign a specificity to a production capacity. The simulation receives a user's request to purchase production capacity (4810). In response, the simulation asks the user to specify the capacity's specificity (4820) and the maximum production rate (4830). Having received this information, the adjustor (4720) can calculate various properties of the production capacity (4840). It then displays the properties to the user (4850). The user either cancels or accepts the transaction. On the user's request the simulation cancels the transaction (4870). If the user accepts the transaction, the simulation updates itself (4880). Typically, updating includes adding the new production capacity to the user's firm and diminishing the firm's budget.

A simulation can calculate the capacity's properties (step 4840) through a variety of methods. For example, production capacity with specificity defined as a large object category is more expensive. Capacity with specificity (AB###) costs more than capacity with specificity (ABC##). Production capacity with specificity (#####) is the most expensive. Capacity defined by an object design, for example (ABCDE), is the least expensive. Efficiency can be similarly defined. Efficiency decreases with the size of the object category. The capacity (#####) is the least efficient, and capacities defined by an object design, such as (ABCDE), are the most efficient.

Alternatively, the simulation can use a SVF to assign cost and efficiency. Capacities are then defined as object designs (object categories containing a single design), and their designs are inputs for a SVF. The SVF can calculate multiple qualities as described in the section titled "Design Objects with Multiple Values." With this arrangement, the user must design specificities that have lower costs and higher efficiencies. The user must engage process innovation. The complexity of the SVF and the user's knowledge of the SVF determine the difficulty of designing production capacity for a particular product.

Figure 49:
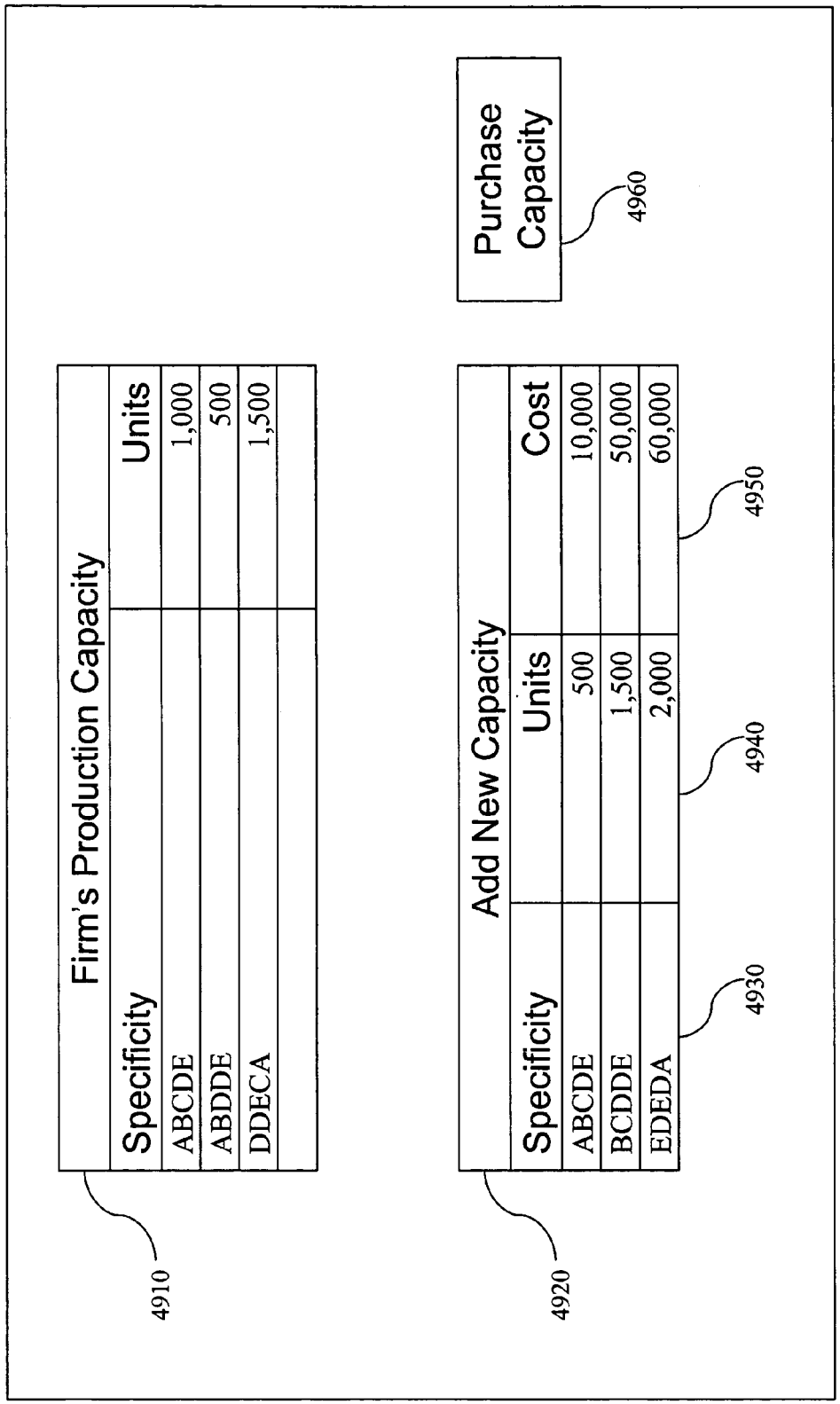
FIG. 49 illustrates a form for purchasing manufacturing capacity.

FIG. 48 depicts the purchasing process sequentially. The user can complete the entire process by completing a form. FIG. 49 illustrates an example. The form lists the firm's current production capacity (4910). It also includes fields for a user to add new capacity (4920). There are rows of fields so that the user can purchase several types of capacity simultaneously. To make a purchase the user inputs the capacity specificity and the maximum production rate (4930 and 4940). The form automatically calculates and displays the costs (4950). When the user is satisfied, he clicks on the "Purchase Capacity" button (4960), and the simulation affects (effects, if you mean makes happen?) the purchase.

Figure 50:
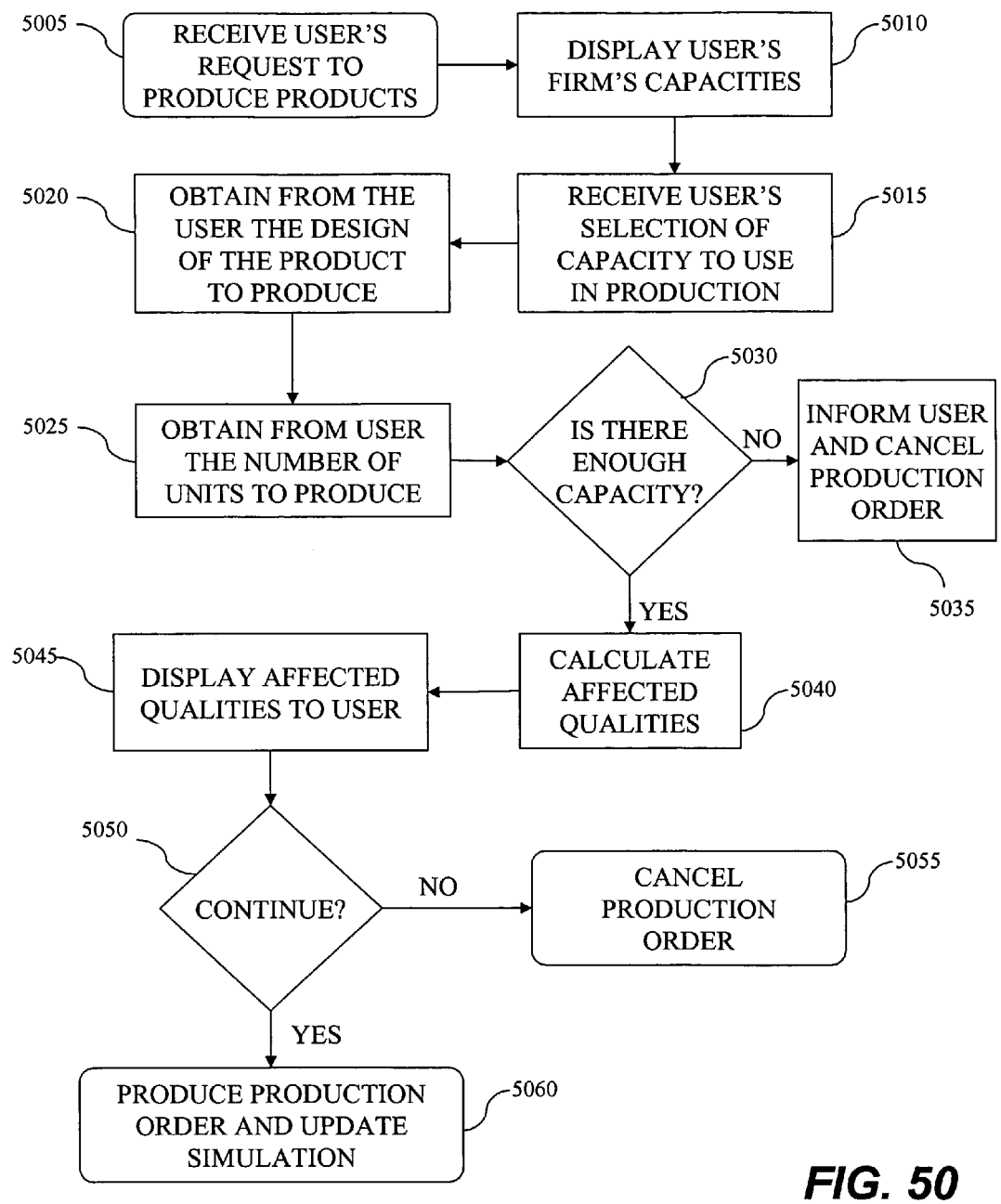
FIG. 50 is a process flow for calculating manufacturing qualities.

While the cost of production capacity is calculated at the time of purchase, other manufacturing qualities are determined when products are manufactured. FIG. 50 displays a flowchart describing how the simulation determines such qualities. The process begins when the simulation receives a user's request to place a production order (5005). The simulation shows the user his firm's production capacities (5010). The user selects which capacity to use for manufacturing (5015). The simulation then asks the user for the design of the product to produce (5020) and the number of units to produce (5025). After receiving this information, the simulation determines if the order exceeds the selected capacity's maximum production rate (5030). If the order is too large, the simulation informs the user and cancels the production order (5035). If the selected capacity can fill the order, the simulation calculates the manufacturing qualities (5040). This calculation uses the product's design and the production capacity's specificity. The simulation then presents the results to the user (5045), and asks if the user wishes to place the production order (5050). As the user requests, the simulation either cancels the production order (5055) or produces the products and updates itself (5060). The updates typically include marking the capacity as utilized, placing the produced products in the firm's inventory, and deducting the cost of production from the firm's budget.

A simulation can calculate the qualities of production (step 5040) through a variety of methods. Consider the following three examples. For each example, suppose that the user orders 300 units of product (ABCDE) and 100 units of product (BBCDE). Suppose that production has two qualities: per unit cost and defect rate.

In the first example the user intends to manufacture the products using production capacity with specificity (ABC##). The simulation determines if the products are members of the object category (ABC##). If the product is a member, the production cost is $1 per unit and the defect rate is zero. If the product is not a member, the production cost is $1.50 per unit and the defect rate is 10%. The product (ABCDE) is a member, so producing 300 units costs $300. There are no defects. The product (BBCDE) is not a member of the object category (ABC##). Producing 100 units costs $150 and produces 10 defects. Only 90 products are fit for sale.

In the second example the production capacity's specificity is (ABCDD). The simulation calculates per unit cost and the defect rate by comparing a product's design to the capacity's specificity. It counts the number of characteristics that do not match. The unit cost equals $1+$0.5*(# of nonmatches). The defect rate is 0.1*(# of nonmatches). FIG. 51 illustrates this calculation for five different products. Producing 300 units of (ABCDE) costs $450. There are 30 defective units. Producing 100 units of (BBCDE) costs $200. There are 20 defective units.

In the third example, the production capacity's specificity is (DDCCE). The simulation calculates per unit production cost and defect rate using a SVF. The simulation starts by concatenating a product's design with the capacity's specificity. This produces the sequences (ABCDEDDCCE) and (BBCDEDDCCE). These sequences become inputs to SVFs. One SVF evaluates the concatenated designs to give the unit cost, and the other SVF evaluates the concatenated designs to give the defect rate. Alternatively, a single SVF can calculate both qualities using the techniques described in the section "Design Objects with Multiple Values." This third example is particularly useful in MTSs in which the user designs new products. He or she must also design the manufacturing capacities for the new product.

FIG. 50 illustrates a sequential process of determining manufacturing qualities. Instead of taking sequential steps, the user can complete the entire process by completing a form. FIG. 52 illustrates an example. The form displays the user's firm's production capacities (5210). It also contains a production schedule, where the user places production orders (5220). The production schedule contains rows of fields in which the user enters production orders. Each row has five fields for information. In the first field the user enters the product he wishes to produce (5230). In the second field the user enters the capacity used for the production (5240). The capacity is identified by its specificity. In the third field the user enters the number of units he intends to produce (5250). After the user enters this information, the simulation checks if the user's firm has capacity sufficient for the order. If the firm does not have enough capacity, the simulation informs the user. Otherwise, the simulation calculates the production cost and the number of defects for the order. It displays these values in the appropriate fields (5260 and 5270). The user views the costs and number of defects, and he can change the order if desired. The user can enter additional orders, and when satisfied with all of them, he clicks the "Manufacture Products" button (5280). The simulation then updates itself accordingly.

Modeling Manufacturing: some variations of the method: Those skilled in the art will recognize that the method supports a great variety of configurations. Here are some examples:

Specificity: In the examples above the attribute-characteristic representation defining production capacity has the same number of attributes and the same set of characteristics as the attribute-characteristic representation defining products. This need not be the case. Furthermore, being an object category, the specificity can vary in all of the ways that the attribute-characteristic representation can vary and all the ways that object categories can be defined.

Affected Qualities: The affected qualities can be virtually any quality related to manufacturing. They can be manufacturing qualities, such as per unit costs, defect rates, energy requirements, raw material requirements, yields, throughput rate, and time required for manufacturing. They can be qualities of production capacities, such as cost, maximum production rate, and products that the production capacity can or cannot manufacture. The affected qualities can also be qualities of manufactured products, such as quality, reliability, or weight. The affected qualities can be product attributes that change their expressed characteristic during a manufacturing process. The affected qualities can even be attributes in the definition of the product capacities, so that the act of manufacturing changes the specificity of the production capacity.

The affected qualities can also be qualities of objects that are not directly involved in manufacturing or objects that are not involved in manufacturing. For example, the affected qualities can be qualities of a firm, such as worker safety or worker morale. The affected qualities can be environmental qualities, such as pollution resulting from manufacturing. The affected qualities can also be qualities of customers, such as the propensity to purchase. (Think of customers smelling the aroma emanating from a barbeque restaurant.)

Affecters: The examples above illustrate the use of a product's design and a capacity's specificity in calculations of manufacturing qualities. Obviously, an infinite variety of calculations can use these inputs. The calculation can also include additional inputs, such as the age of the production capacity, the variety of products being produced, or the products previously produced by the capacity.

Operation: One may implement the method in a great variety of ways. For example, instead of letting the user define a capacity's specificity the user can select from a list of available production capacities. This can represent buying manufacturing equipment from a vendor's product line or buying manufacturing capacity from the "second-hand" market.

Other Production Processes: The production process need not be manufacturing a product. For example, it could be manufacturing materials for use inside the firm, such as building prototypes or laboratory equipment used in R&D.

Components of Manufacturing Processes: Other known simulations represent the manufacturing process itself, with assembly lines, work stations, and work in progress inventory. These models are often made with discrete simulation or system dynamics technologies. In this case, one can assign one or more factory components (e.g., assembly lines, machine, and/or work stations) a specificity defined by an object category. The affected qualities can be the qualities of the components (speed of operation); of the components' operations (amount of scrap, production of heat); or of work in progress inventory (number of defects). As the qualities propagate through the simulated manufacturing system, these can influence "downstream" processes and the overall manufacturing process. They can affect queue lengths, throughput, machine breakdowns, and the flexibility and efficiency of the system.

Modeling Manufacturing, ramifications: Generally, the new method improves business simulation by making manufacturing management essential to business strategy. Manufacturing becomes an important consideration in marketing. Modifying a product affects manufacturing, possibly increasing costs or decreasing product quality. Moreover, changing production levels, extending a product line, or discontinuing a product can adversely affect production. Marketing decisions might require additional investment in production capacity. Because capacity is an unrecoverable "sunk" cost, buying capacity is a risky decision.

The user must also consider manufacturing when making R&D decisions. In a simulation, technical advance can make products obsolete. Therefore, technical advance can render a firm's production capacity worthless. Also, a user might have to discover the best specificity for decreasing manufacturing cost or improving some other affected quality. He must engage in process R&D.

By affecting other qualities of the firm (employee morale) and the firm's environment (pollution), a user must consider manufacturing in making other decisions for his firm. In all of these ways—affecting marketing, R&D, and other decisions—the method firmly integrates manufacturing into the user's strategic decision-making.

While the previous description of modeling manufacturing offers specific examples, these should not be construed as limitations on the scope of the invention, but rather as an exemplification of some embodiments. Accordingly, the scope of the invention should be determined not by the embodiments illustrated, but by the appended claims and their legal equivalents.

Figure 79:
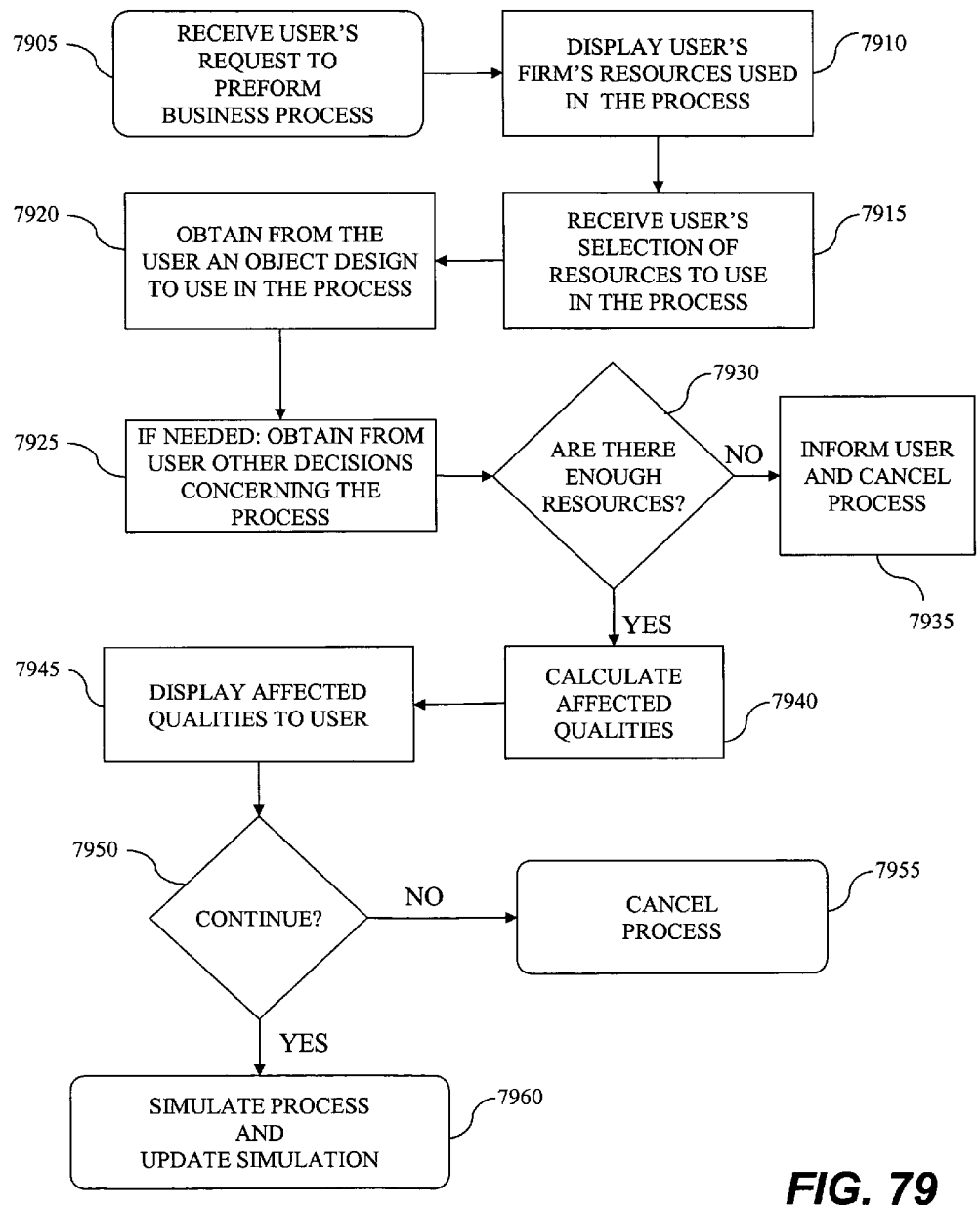
FIG. 79 is a process flow for calculating qualities of a business process that uses resources.

In General Terms: The method is can be used to model other business processes, in addition to manufacturing. Referring to FIG. 47 one can illustrate the method in general terms. There is a set of objects or object categories represented by an attribute-characteristic representation (4740A, 4740B, and 4740C). The objects and/or object categories can also have qualities that are not part of the attribute-characteristic representation. There are one or more resources that process objects and/or object categories (4710A and 4710B). The resources represent a part or process in a simulated business situation, for example a machine that processes raw materials or an R&D laboratory. Each resource has a specificity. Specificities are defined by an attribute-characteristic representation and can be an object design or an object category. Recall, an object design is an object category containing one object. The term object category therefore includes the term object design. In addition to specificity, the resources can have other qualities, such as a finite capacity. These other qualities can be at least partially determined by a resource's specificity. There are also affected qualities (4730). Affected qualities can be qualities of the resources, qualities of the objects, the outcome of the process being simulated when objects are processed by resources, or other qualities of the simulated business situation. Affected qualities can even be attributes in the attribute-characteristic representation describing the objects and/or the resources specificities. There is also at least one adjustor (4720). The adjustor uses the specificity of one or more resources and the attribute-characteristic definition of one or more objects or object categories being processed by the resources to at least partially determine/adjust at least one affected quality. To ftu-ther illustrate the general application of this method, FIG. 79 presents the flowchart of FIG. 50, recast in with general terms.

The examples above illustrate how an adjustor might affect affected qualities when design objects are being processed. This is useful for illustrating models of manufacturing. Those versed in the art will recognize that similar calculations can be made when object categories are being processed by resources. Processing object categories is useful for modeling business processes such as R&D. Here are four examples of comparing object categories to resources' specificities and then adjusting affected qualities.

First, a previous example illustrated a resource defined by an object category and objects to be processed defined by object designs. One can repeat the example where resources are defined by object designs and the objects to be processed are defined by object categories. As a second example, suppose a resource has a specificity (ABC##) and it processes object categories (BBC##) and (ABC#E). The category (ABC#E) is contained in category (ABC##). This is because all of the design objects in (ABC#E) are in (ABC##). The object category (BBC#E) is not contained in (ABC##). Therefore, the adjustor will decrease the cost of processing (ABC#E) and increase the cost of processing (BBC#E). As a third example, the adjustor can compare object categories with a resource's specificity and count the number of attributes expressing the same symbol. Consider the resource and object categories in the previous example. The specificity (ABC##) and (BBC#E) match three of five symbols. The specificity (ABC##) and resource (ABC#E) match four of five symbols. Processing the category (ABC#E) will cost less than processing category (BBC#E). As a fourth example, the adjustor can count the number of nonmatches occurring in attributes not expressing "#." For example, (ABC##) and (BBC#E) have one nonmatch, while (ABC##) and (ABC#E) have zero nonmatches. For further illustration, (ABC##) and (###DC) match zero nonmatches. The cost of processing can increase with the number of nonmatches. Clearly, those versed in the art can conceived of various methods for an adjustor to compare object categories to resources specificities and then adjust affected qualities.

Modeling Marketing

Recall that markets can be modeled with systems of equations or with agent-based methods. Agent-based methods can take exceptional advantage of the attribute-characteristic representation of objects, for example by exploiting segmented objects as previously described. Whichever model is used, the results are that object designs are evaluated with a SVF and the results are used in a simulation of a market. The term "market model" covers both system of equations and agent-based models of markets. Using this term, design objects are evaluated by a SVF and the results are used in a market model.

In prior art, MTSs users "conduct" market research by buying reports. These reports typically list the products sold and the sales volumes, prices, and market shares of each product in each market segment. These reports are generated by the MTS, so users do not actually conduct market research. Simulations using agent-based market models enhance this method by enabling users to survey and/or "interview" the agents representing customers. One embodiment of the present invention improves upon the prior art by integrating the attribute-characteristic representation of objects into the prior art methods of modeling market research.

Generally, whatever the market model, the market data is recorded by the MTS, perhaps being held in a database. Users can query this data. One unique capability that can be included in an embodiment of the invention is defining database queries with object categories and/or receiving search results that are categorized by object categories.

Figure 23:
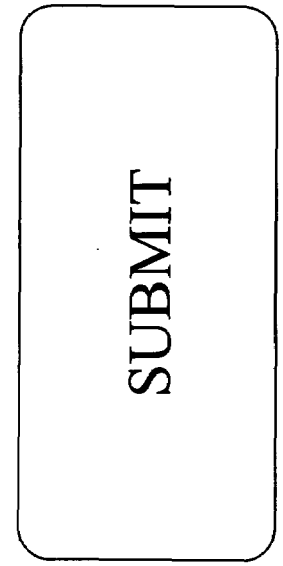
FIG. 23 illustrates a form for providing search queries of the marketplace.

FIG. 23 illustrates the new method with an example based on the illustrative embodiment (see Section 2). FIG. 23 presents a form for providing search queries of the marketplace. First and second filters are illustrated, along with a submit button. The first filter includes product characteristics "QWE." A second filter includes the search criteria ">10" under the column labeled "Units Sold." The user can submit one or both of these filters to the MTS for accessing a limited set of data from a substantially larger collection of marketplace performance data on particular product designs. If the marketplace data of FIG. 11 were the data in the marketplace and the filters of FIG. 23 were applied to that collection, several different data looks could result. If only filter 1 were used, then the marketplace data would return the information from the first and third rows of FIG. 11 because those two rows include the product characteristic string "QWE" in columns 2, 3, and 4, respectively. On the other hand, were filter 2 used against the data in FIG. 11, then the data in rows one and two would be obtained because the number of units sold in those two rows exceed 10. Thus, a student entering in the first filter would obtain different information about the marketplace than a student who entered in filter two, and a student who entered in filters one and two would obtain yet a different set of information about the marketplace. Marketplace performance data that can be obtained includes, but is not limited to: the number of units that were sold in the marketplace, the market share, the market ranking, and price information. The data retrieved from the marketplace data preferably requires an expenditure from the firm's budget, and the user must decide how much to spend for marketplace performance data. Thus, for example, each filter may be associated with a separate charge, or each interrogation of the marketplace performance data may have a set charge.

Many types of queries are possible. For example, queries can be defined on any of the following criteria: a product (object) category; a range of rounds (or time) in the simulation; one or more designated market segments; and one or more designated firms; and sales performance defined on volume, revenue, or market share. The results could include a wide variety of information including the following: market share per round; sales per round; total sales in all rounds; and a market segment's percentage of all sales in the simulation. One skilled in the art can think of other query parameters and results.

With agent-based market models embodiments of the current invention provide new capabilities. Users can query agents with queries defined on object categories and/or receive query results that are categorized by object categories. For example, a user can survey the market to learn how the market values a particular category of products. The user submits the product category to the MTS. The MTS then randomly generates several products from this category and randomly selects several agents (i.e., customers). Each agent evaluates each of the randomly generated products. All of the evaluations are averaged and the result is returned to the user. Notice the obvious fact from population statistics. As more products are evaluated by more agents, the estimate becomes more accurate. An MTS might have the user set the investment in the market survey. A greater investment increases the number of products and agents sampled.

Whatever the market model, the key to the new method is that either queries are defined on object categories or the query results are defined on or presented as object categories. Recall that an object design is also an object category. Note also that queries to a database of market information extract information that was determined by evaluating an object design with a SVF. Usually, the evaluations are subsequently processed with marketing equations. Queries to agents in an agent-based model have to generate the information to be returned, and this generation requires evaluating at least one object design with a SVF. In one case the evaluation of the object design occurs before the query and in the other case the evaluation occurs after the query. In either case, the information returned is derived from the evaluation of at least one object design by a SVF, even when the evaluation is subsequently processed by marketing or other equations.

Recall the previous discussion on object categories in Section 7. When modeling market research with this method, object categories can be defined using any of the methods described in Section 1, "Introduction and Definitions," and in Section 7, "Design Objects."

Modeling R&D

The term "R&D" refers to the process of developing new technologies and products. It covers everything from basic science, to product development, to modifying an existing product. An example of basic science is pharmaceutical research to create new drugs. An example of product development is designing the next generation of a microprocessor. An example of altering a product is adjusting the tread pattern of a tire to improve traction when driving in snow. The term "R&D" even includes work incidental to technology and product development. For example, it includes process R&D, which is research and development of manufacturing methods for new technologies and products. As another example, it also includes managing the R&D process, such as reviewing projects and managing a portfolio of product development projects.

The attribute-characteristic representation and the SVF enable sophisticated simulations of R&D. It is particularly useful when using the attribute-characteristic representation to represent technology and the SVF to assign technological performance. One represents R&D in the simulation by permitting users to search the SVF for good designs. In some simulations the user is searching for designs with high values, and in other simulations the user is searching for designs with low values. Still, in other simulations the user can search for designs with values close to some desired value. Generally, the term "good" refers to the user's goal when creating designs.

A user might search with two general methods, either in combination or exclusively:

1. Submitting object designs: The user submits a design and the simulation returns information derived from the value of the design. When submitting designs, a user is searching the SVF for designs with high value. The user can have several choices pertaining to search strategy. The user might submit designs one at a time, utilizing the information gained from each submission to help determine the next submitted design. Alternatively, the user might submit several designs at once to rapidly gain a wealth of information. The user might mix the two strategies, submitting a different number of designs in each submission. Finally, the user might submit designs that vary greatly or that share many of the same characteristics. That is, the search might be broad or narrow.

2. Submitting object categories: The user submits a object category and the simulation returns information derived from one or more objects contained in the category. For example, the simulation might evaluate several designs in the category and return the average value. This method of searching the SVF also permits several search strategies. The user can submit one category at a time or several design categories. These categories may be defined on few characteristics (broad categories that contain many designs) or defined on many characteristics (narrow categories containing few designs). Submitted categories can be similar (a focused search) or dissimilar (a broad search). Finally, the user can mix these choices and manage a portfolio of categories.

In both cases, the manner in which a user submits a design or category (that is, sequentially or in groups) can pertain to the actual submission or to various measures of time (e.g., simulation rounds). Likewise, the information returned to the user can be returned immediately, at the end of a round, several rounds in after the user makes the submission, or according to another scheme.

The information returned to the user can vary with the purpose/design of the simulation. For example, if the user submits designs the simulation might return the actual design value, or it might simply indicate if the design's value exceeds a threshold value. Alternatively, the simulation might indicate whether a design is more or less valued than a previously submitted design or other benchmark. In any particular simulation, the response to such submissions is prescribed by a rule or algorithm.

Since a category identifies a set of objects, submitting an object category permits returning additional types of information. The simulation might return estimates of the average value of designs in the category, the variance of values for designs in the category, the highest/lowest value of designs in the category, the percentage of designs in the category with values exceeding a threshold or benchmark, or some other prescribed statistical determination.

When designs have values for several effects/markets (see the section "Design Object with Multiple Values," above) the simulation can return information about one or more effects/markets. In this case, and all others mentioned, the simulation can determine which information to return and/or the user can request the type of information returned.

R&D Costs: Under any scenario, information requests might be costly, and many cost schemes are possible. When submitting individual designs, the user might be charged for each submitted design and for the type of information requested. The user might also be charged different amounts for different information. In the "Fountain of Youth" drug example, information about the "Weight" effect might be costly while information about the "Face" effect might be cheap. The difference represents the costs of different R&D tests. Similarly, a test that determines if a design's value exceeds a threshold might cost less than a test that returns the design's value. The cost might depend on other factors, such as the number of characteristics by which a submission differs from previous submissions.

The category case presents additional cost schemes. A user might be charged for each category submitted or a cost that depends upon the number of designs contained in a category. The user might be allowed to select the accuracy of information received about a category. If the simulation returns an estimate describing the values of designs in the category (e.g., average value) then the larger the number of samples, the greater the cost. The user might select the designs used in the sample. Alternatively, the simulation chooses them on a prescribed basis, say, randomly.

In another variation, the cost is a function of the characteristics of the submitted design, category, or of the characteristics of the samples used to evaluate a given category. For example, the function represents the cost of purchasing, producing, using, or assembling characteristics. So, as an illustration, if the design represents a personal computer, some components are more expensive than others to purchase, install, and/or test within the system. Sometimes testing two components is more expensive when the components are used together in the same design, as opposed to testing them separately.

An Illustration: FIG. 33 illustrates a form for submitting design categories and object designs in a model of R&D. The figure utilizes the example of designing a drug, introduced in the previous discussion of system-set attributes. The user conducts R&D to learn information about categories of drugs. A category can be general or consist of a single drug. The user lists the categories of interest in column 1 of the table. In column 2 he lists the effect of interest. Column 3 lists the market, and column 4 lists the tests. Illustratively, the tests include estimating the maximum effect value found from drugs in the category (Max. Value); estimating the standard deviation of the effect value over drugs in the category (STD); estimating the average effect value over the drugs in the category (Ave. Value); and measuring the effect value for a specific drug (Value). The entries made by the user in each of these claims is preferably guided by information provided to the user by the simulation, so that the user is presented with and aware of the options to enter. In column 5 the user lists the number of samples taken from a category when conducting a test. Column 6 shows the costs of the tests. The data in column 6 is calculated by the simulation and is based on the entries in columns 1-5. It is preferably shown to the user for approval prior to submitting the categories and designs for processing.

Reading across the first row of FIG. 33, the user wants to test drugs in the category (##E##) for the Face effect in the Male market. He wants to estimate the maximum effect value of the drugs in this category, and he instructs the simulation to estimate the maximum value by taking 50 random samples from the category. The computer calculates the cost of this test (at $100 per sample) and displays this for the user. The user can add as many rows to the chart as he wishes, and when complete, he submits this chart to the simulation.

The simulation receives the request, deducts the costs from the user's firm, and processes the request with a SVF. The simulation returns a form with a table like the one depicted in FIG. 34. This table is similar to the previous one, but the last column gives the results of the tests. In this example, drug effects are measured on a scale from 1 to 100. The user will use these results when deciding whether to study a category further, search a category for good drugs, or manufacture a drug for market. R&D Resources: R&D often requires resources, and managing these resources is an important part of R&D management. These resources often focus on a particular technology, so their purchase represents a strategic commitment to a particular technology. For example, pharmaceutical R&D requires scientists and laboratory equipment best suited for specific areas of research.

An MTS can simulate this quality of R&D by having a user purchase R&D resources. The resources can be suited only for testing a specific design or category of designs. Testing other design categories and designs is either infeasible or incurs penalties. The penalties can include, for example, increased cost, decreased accuracy of results, or needing greater time to perform the tests. To avoid penalties the user must purchase new R&D resources that are suited for designs and categories that will be tested. Additionally, R&D resources might have a capacity that limits the number of R&D tests in a given duration (e.g., a simulation round). Users must purchase additional resources to increase their R&D capacity.

Figure 57:
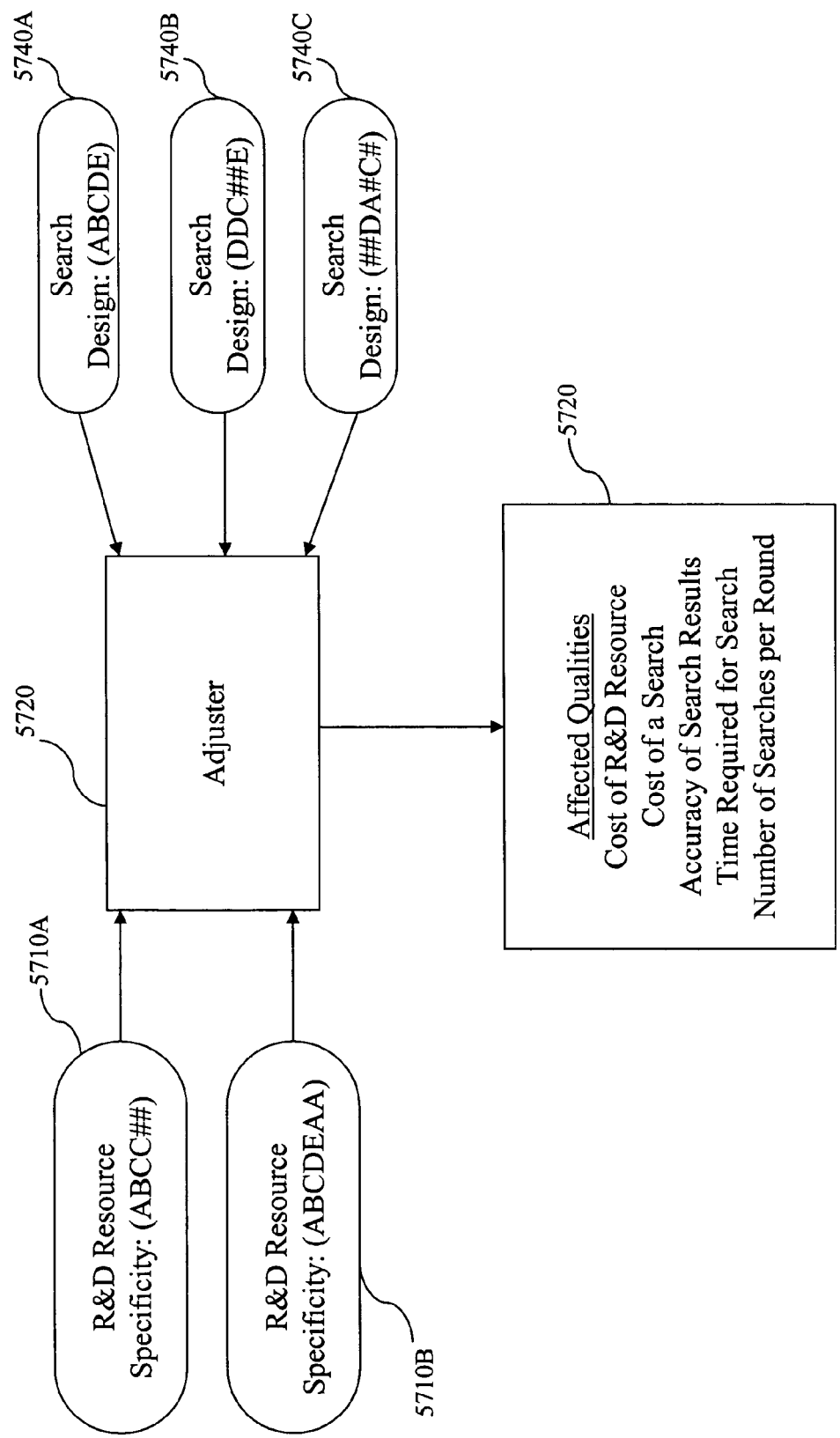
FIG. 57 is a block diagram showing the components used in modeling R&D resources with an attribute-characteristic representation.

The current method of modeling R&D can also model R&D resources. It uses the same method described above for representing manufacturing capacity. Recall that the method of modeling manufacturing included production capacities, affected qualities, and an adjustor. The adjustor changes affected qualities based upon the specificities of production capacities. When calculating the adjustments the adjuster can also consider the design of products being produced by the production capacity. When modeling R&D resources the R&D resources play the role of production capacities, and they are assigned specificities defined with design categories. They can also have capacity that limit the number of "searches" that they can perform in a give time period. The affected qualities can be any quality related to R&D, such as the cost of R&D resource, the cost of searching the SVF, and the accuracy of the tests. The object categories and object designs that the user submits to search the SVF play the role that products do in the method of modeling manufacturing. As with the method of modeling manufacturing, the adjustor does the work. It considers the specificity of the R&D resource and affects the affected qualities. In some cases it will also consider the object designs and object categories to be processed. To illustrate this method of modeling R&D resources, FIG. 57 shows the components of the method. A comparison with FIG. 47 shows the parallels with the method modeling of manufacturing. The method of modeling manufacturing was also illustrated by FIGS. 48-51. A comparison of FIGS. 47 and 57 enables one to readily recast FIGS. 48-51 to illustrate the method of modeling R&D resources.

A noteworthy case occurs when the user submits an object category to be evaluated and the simulation evaluates the category by evaluating numerous object designs from the category (described above). Each design that is evaluated can be compared to an R&D resource's specificity. Affected qualities are adjusted based upon these comparisons.

Patents: Optionally, a given simulation can permit a user to apply for a patent on a design so as to prevent other users' firms from benefiting from that particular design. Such a simulation emulates patent law by barring patent protection or allowing it depending upon, for example, whether a design was described in a prior report that was published or issued to another firm in the simulation, or sold commercially prior to requesting patent protection, or on the basis of other real-world rules. The scope of any simulated patent is defined by the particular design submitted for patent protection by that user. The scope can cover other designs that differ in one or more characteristics, if the simulation so permits. The simulation includes, in this embodiment, rules to decide when a given design is within the scope of a firm's patent. For example, a patent might cover a particular design plus all designs that differ only by the characteristic expressed by a particular attribute.

Segmented Design Objects: The method of modeling R&D can use all of the techniques described in Section 6, "Value Functions," and Section 7, "Design Objects." The technique of segmented design objects is particularly useful, especially when this technique is used to assign multiple values to objects. The simulation can let a user research each segment by itself, rather than tackle the entire design at once. For example, a user can research good designs for the first segment, ignoring the second segment. The user can then research good designs for the second segment, ignoring the first segment. Finally, the user can combine the segments and then make design adjustments in response to the affects of intersegment interactions. Other arrangements are possible, as suggested in the preceding section on segmented designs.

Alternatively, firms can develop specialization (e.g., core competencies) in certain segments, and a firm can seek to patent its new-found knowledge and prevent other firms from utilizing the patented segment(s). A rule base can emulate existing laws to bar patent protection or allow it depending on, for example, whether the segment was described in a prior report that was published or issued to another firm in the simulation, or sold commercially prior to requesting patent protection.

Reverse Engineering: The method of modeling R&D can also model reverse engineering. To illustrate, suppose that several users compete in a simulation of the pharmaceutical industry. Each user manages a firm which designs and markets drugs, such as the "Fountain of Youth" drugs illustrated in the section "Design Objects with Multiple Values." An MTS could let each user see the all the drug designs that are sent to the market. In contrast, each drug can be marketed under a trade name. A user knows the formulas of drugs produced by his own company, but he must reverse engineer drugs produced by competitors.

Reverse engineering can be simulated in two ways. First, and most simply, a firm can pay a price to have a drug's design revealed. Second, a user can buy filters. Filters are objects that tell whether a design is within a particular object category. By purchasing and testing drugs with various filters, a user can determine the formula for a drug. For example, a user can test a drug with the filter (A####). A positive response means that the drug has an "A" expressed by the first attribute. The firm could further test the drug with the filter (AB###). After multiple attempts the user can learn the formula.

R&D Strategy: All of the aforementioned approaches may influence a user's strategy in developing, or searching for, improved object designs. An important subset of additional influences includes qualities of a business simulation that occur outside of a user's R&D. These include actions, including R&D, of competitors; the user's capability to appropriate the economic value of designs through complementary assets such as distribution channels; increases/decreases in market demand; changes in consumer tastes that favor some technical designs over others; and changes in the prices of raw materials, labor, or capital that might make some designs more or less costly to produce.

Of course, other possibilities exist, but in all cases the richness added allows the user to develop an R&D strategy for effective and efficient R&D. If raw materials costs increase, the user might search for designs that minimize the need for that material. If one technical/market effect is rare but essential, an efficient strategy might test designs first for that effect. In another variation, the attributes and characteristics available for design might change during the simulation. In other versions, the SVF itself might change during the simulation. In fact, this method of modeling R&D can use all of the designs and methods described previously, including those presented in the sections titled "Value Functions" and "Design Objects."

Unquestionably, the method above allows for both simple and sophisticated models for simulating the R&D. In fact, one could use this method to model other aspects of business, such as modeling market research. Generally, one can use this method for modeling research into the properties and applications of objects.

From the foregoing, it can be appreciated that a computer implemented simulation is described in which there is a set of objects represented by an attribute-characteristic representation and the act of a firm performing research and development is simulated. The simulation includes the steps of accepting one or more search requests from a user, the search request defined with a object category or object design (which is actually an object category that contains one object); evaluating at least one object in said set with a value function selected from the group consisting of VFMOs, MVFs, IVFs, and IAVFs; and selectively providing the user with information concerning said evaluation. One or more of these steps can be repeated a number of times, and possibly only a maximum prescribed number of times.

As well, a computer implemented system and a method for simulating the research and development process can comprise the steps of: defining a set of design objects which are represented by an attribute characteristic representation; defining a set of R&D resources with specificities defined as object categories in an attribute-characteristic representation; accepting one or more search requests from a user, defined by an object category of design objects; comparing the search request with the specificity of the R&D resource to affect/adjust researchable object candidates, costs, information produced, and accuracy, at least in part on the basis of the comparison; evaluating at least one design object associated with the request with a value function selected from the group of VFMOs, MVFs, IVFs, IAVFs; and selectively providing the user with information concerning said evaluation. Note: the design objects and R&D resources can have different attribute-characteristic representations. Alternatively, they can use the same attribute-characteristic representation.

While the previous description of modeling R&D offers specific examples, these should not be construed as limitations on the scope of the invention, but rather as an exemplification of some embodiments.

Simulating Technological Advances, or More Generally, Directing the Simulation to Subsets of Design Objects During the course of a simulation it can be useful to direct the user to one subset of design objects and then to direct the user to a new subset of design objects. "Directing" means that the simulation makes a subset of the design objects superior to other design objects in a way that is important to users' decisions. The subset with the superior qualities is called the enhanced subset of design objects. The most important application of this method is in simulating technological advances, but there are other applications of this method. These include simulating the opening of new markets, the development of new product applications, the depletion of raw materials, and changes in government regulations.

To see the effect of this method, consider R&D. The simulation directs the user to a particular subset of the design objects. The user performs R&D on these objects and learns combinations of characteristics that create valuable designs. Within this subset he can efficiently create good designs in response to the simulation. Later in the simulation the simulation announces a technological advance and directs the user to a new subset of design objects. The topography of the SVF for this new subset differs substantially from that of the initial subset. The user's knowledge of characteristic combinations is useless, and he must conduct additional R&D to develop new knowledge.

Before introducing specific techniques for directing a user to a subset of design objects, consider a general procedure. The term directing conditions refers to qualities of the simulation that make a subset of the design objects superior to other design objects in a way that is relevant to users' decisions. This superior subset of design objects is called the enhanced subset. A simulation can have a directing condition manipulator to manipulate the directing conditions and thereby adjust the enhanced subset. In this sense the directing condition manipulator "directs" users to different subsets of design objects. To illustrate, the directing condition manipulator creates an enhanced subset. When users make decisions, for example design objects, they will focus upon the enhanced subset. The directing condition manipulator can then alter the enhanced subset, thereby causing users to focus on a new subset. In this sense the directing condition manipulator is "directing" users to specific subsets of design objects.

Figure 54:
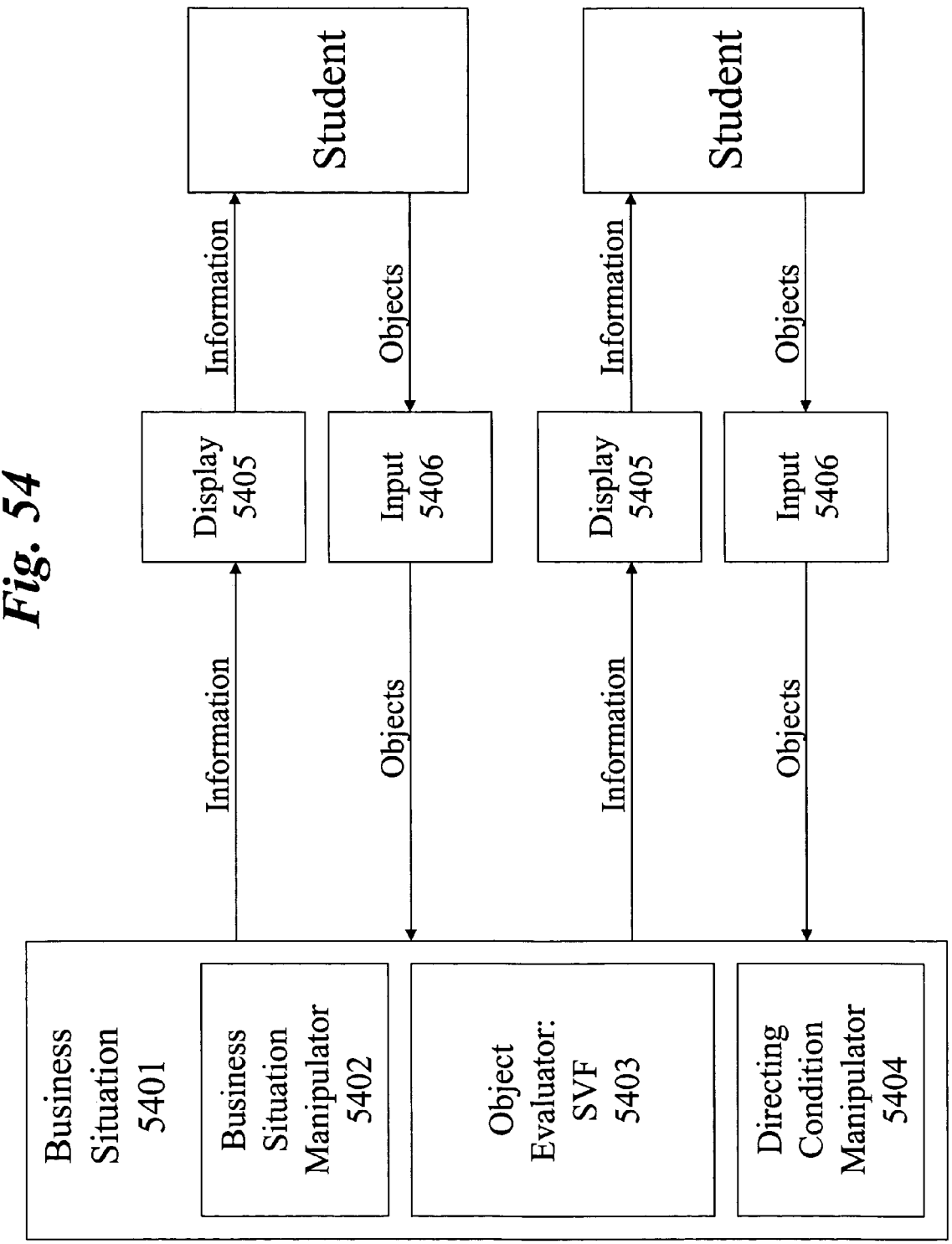
FIG. 54 is a block diagram illustrating the architecture of an MTS with a directing condition manipulator for simulating technological advances.
Figure 55:
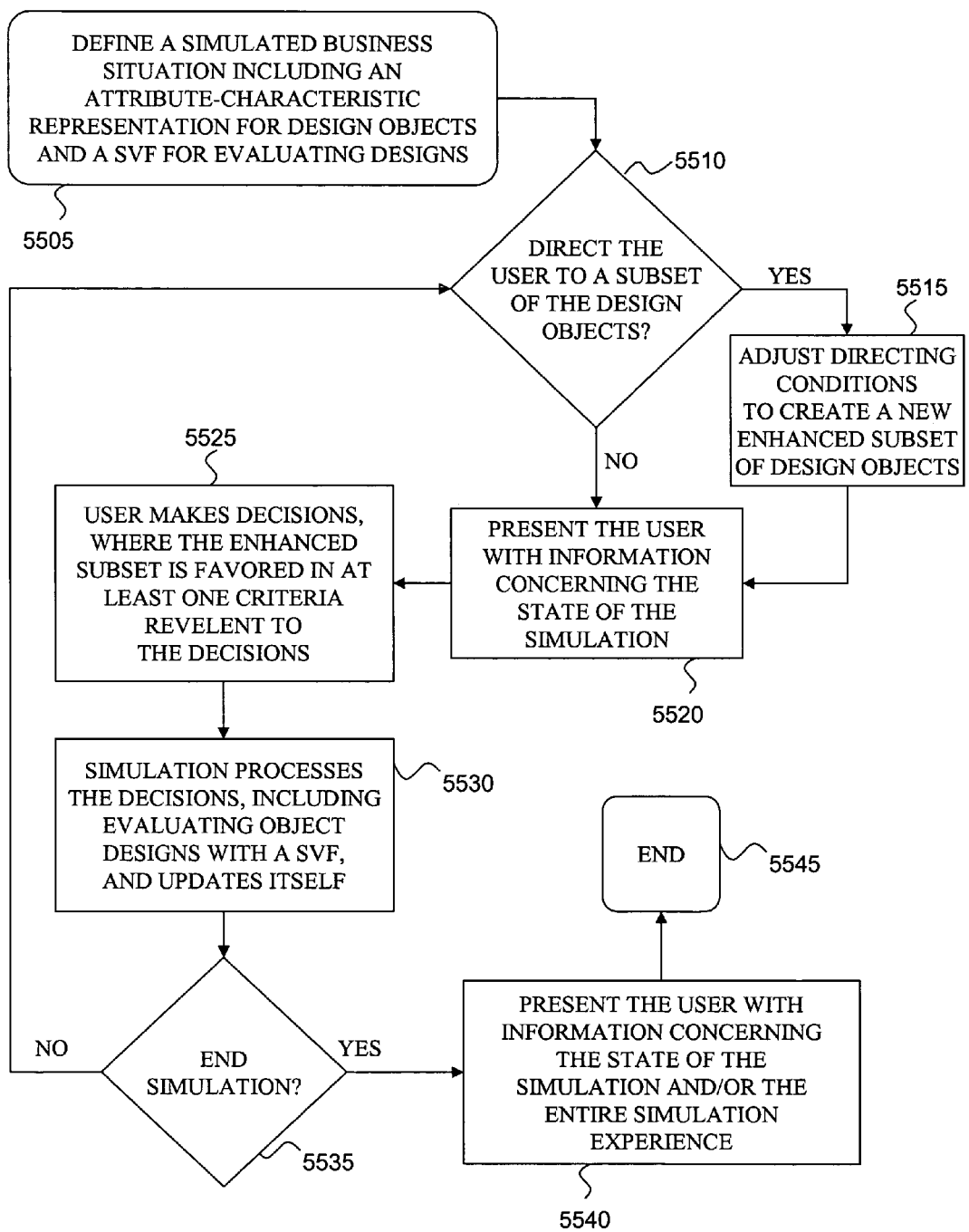
FIG. 55 is a process flow illustrating the integration of a directing condition manipulator into an MTS.

The directing condition manipulator is similar to the design restrainer depicted in FIG. 18. FIG. 54 illustrates this arrangement. To further illustrate its role in a simulation, FIG. 55 presents a flowchart showing how this method fits into MTSs. First, a simulated business situation is defined (5505). This situation includes a set of design objects represented by an attribute-characteristics representation and a SVF for evaluating designs. After the situation is defined, the simulation decides whether to direct the user to a subset of design objects (5510). For example, a simulation can start by directing users to a subset of design objects and then later direct users to a different subset. Examples of this are given below. If the simulation decides to direct users to a particular subset, a directing condition manipulator (part 5404 of FIG. 54) adjusts the directing conditions to create an enhanced subset of design objects (5515). After this step, or if no adjustments are made, the simulation presents information about the state of the simulation to the user (5520). After reviewing the information the user makes and submits decisions (5525). These decisions are influenced by the enhanced subset. In some cases the directing conditions can force the user to consider a particular subset of design objects, but in other cases, they will merely provide incentive (see examples below). After receiving the decisions the simulation will process the decisions and update itself (step 5530). The processing of decisions will include evaluating object designs with a SVF. A determination will then be made on whether to end the simulation (step 5535). A simulation can end on the user's request or because a predetermined state has been reached. If the simulation is to end, it can first present the user with information about the state of the simulation and/or about the entire experience (5540). Subsequently the simulation will end (step 5545). If the simulation does not end, it starts a new round at step 5510. Given its new state, the simulation determines whether to direct the user to a different subset of the design objects. This decision can be made based on an analysis of the simulation. For example, the simulation might do so if the amount of innovation has decreased or if the user has designed objects that meet a threshold value. Alternatively, the simulation can make the decision based on a predetermined plan. If the simulation decides to direct the user to a different subset of design objects, it adjusts the directing conditions to create a new enhanced subset of design objects (5515). The simulation then continues at step 5520.

The preceding presentation did not describe directing conditions or the manipulation of directing conditions. There can be many means of fulfilling these functions. The following are descriptions of three particularly useful methods: (1) manipulating the set of valid object designs, (2) manipulating parameters, (3) and manipulating segments of design objects.

Manipulating the Set of Valid Object Designs: The previous sections "An Illustrative Embodiment: Competitive Search of a Product Value Function" and "Ramifications" described a method of simulating technological advances. From these descriptions, it should be appreciated that a result of changing the domain of one or more attributes is that the set of valid designs for the objects is altered. The set of valid designs is the enhanced subset. The user is directed to these designs because other designs are invalid. Note that when all designs are valid the enhanced set includes all object designs. The directing condition is the quality of the design, valid or invalid. The directing condition manipulator is a mechanism for changing the set of valid designs during a simulation.

If the domain of a particular attribute is expanded to include additional characteristics, then the set valid designs, the enhanced set, is expanded. As a specific example, a manufacturing plant may have had resources to paint cars blue, red or white. As a result of a new source of paint, however, the plant can now also produce cars that are yellow. If the cars at the plant were defined by attributes, one for transmission (standard or automatic), another for air conditioning (yes or no), and one for color (red, blue or white) then the product space would be increased from 12 possible product designs to a total of 16 possible product designs by the introduction of the new color.

It should be understood that the set of valid designs can also be changed by increasing or decreasing the number of attributes in an attribute characteristic representation of the object. For example, the innovation of air conditioning could be added as a new attribute to an existing product line. Thus, in the preceding example, if cars of various colors and one of two transmission types comprised the set of valid designs, the introduction of the new attribute (air conditioning or no air conditioning) would double the set of valid designs.

The set of valid designs can also be restricted by requiring that a combination of characteristics always appear together. For example, a simulation might require that if the characteristic "A" is expressed in a design, then the characteristic "B" must also be expressed. A simulation could require that when a specific attribute expresses "A" another attribute must express "B." For example, all automobiles that have automatic transmissions must also have power steering. Alternatively, the simulation can require that a combination of characteristics never appear. For example, a simulation could require that characteristics "A" and "B" never appear in the same design. It could require that if a particular attribute expresses "A" that a different attribute cannot express "B." During a learning session, the simulation can removed or add such restrictions, thereby changing the set of valid designs.

The effect of any of these changes is to represent changes in design opportunities in the simulation. Just as the number of attributes or set of characteristics for a given attribute can be increased, they can likewise be constrained or decreased. Similarly, instead of removing restrictions on combinations of characteristics, a simulation can add restrictions. These changes decrease the set of valid designs, and they can simulate the effect of government regulation, a shortage of supplies, a natural disaster, and the like.

Such changes can be automatically initiated by the central server. (See Section 10, "Hardware Configurations," below.) For example, the domain of one or more attributes or the number of attributes in the attribute-characteristic representation of the object can be changed automatically in response to a determination of the amount of innovation in the designs being submitted by participants in the simulation. Thus, if the designs that are being submitted to the system for processing by the SVF are approaching maximum values, or not changing substantially from round-to-round, then the system can automatically increase either the number of attributes that can be used to define the objects or introduce new characteristic possibilities that the participants can use to improve their respective designs.

In the event that the domains or attributes are changed, the value of each valid design in the product space preferably remains unchanged. The value of each design would be affected, however, if the SVF were changed or if a characteristic expressed by a system-set attribute were changed.

Manipulating Parameters: Another method of directing the user to a subset of design objects is to provide parameters and/or qualities that impede a user from succeeding with one or more design objects. The unimpeded design objects are the enhanced subset. The parameters and qualities that impede success are the directing conditions. The mechanism that adjusts these parameters and/or qualities is the directing condition manipulator. By adjusting parameters, a directing condition manipulator can direct users away from the impeded design objects and to the enhanced subset. The different between this and the previous method is that the previous method makes some designs invalid. In this method all designs are valid. (Actually, one can consider the previous method an extreme case of this method. In the previous method the impeding conditions are so severe that some designs become invalid.) To illustrate this method, suppose that users design products that have five attributes. Each attribute expresses a letter "A" through "E." Suppose that at the start of a simulation each characteristic in an object design increases the manufacturing cost according to the schedule in FIG. 53, column 2. Accordingly, producing the product (ABBAA) incurs a cost of 35 per unit in addition to other manufacturing costs. The most expensive product to produce is (EEEEE). It costs an extra 675 per unit. At such a high cost, this product cannot be made profitably. The hindering condition, the cost of "E," directs the user to designs with low costs. These designs, the enhanced subset, are the designs without the characteristics "D" and "E."

During a simulation, the simulation can reduce the cost of characteristics "D" and "E." FIG. 53, column 3 gives new costs in effect after the change. The product (EEEEE) now costs an extra 50 per unit. Designs that had been unprofitable are now profitable, meaning that the enhanced subset has changed. Users can now profitably exploit a new subset of design objects, and the simulation's dynamics will become more active. The reduction in cost can simulate the effect from several types of events. Some possibilities are a technological advance, the discovery of a new supply of raw materials, and a change in government regulations or taxes.

The hindering condition need not be cost. It can be any parameter or quality that directs a user to a subset of the design objects. Here are some examples:

1. A simulation could adjust the values of designs. The adjustments would depend upon a design's characteristics. During the simulation the adjustments could be altered. For example, at the start of the simulation there could be a "conflict" between characteristics "D" and "E." All designs that contain both a "D" and an "E" have 10 points subtracted from their value. During the simulation, a technical advance removes the "conflict." Suddenly, all designs expressing "D" and "E" receive a 10 point increase in value.
2. A simulation could make R&D inaccurate for some designs. Without knowing the true values, using these designs is risky, and users will avoid them. Later in the simulations a technological advance could increase the accuracy of R&D. The risk of using these designs is reduced.
3. The set of manufacturing capacities and/or R&D resources is constrained in the same manner used to manipulate the set of valid object designs. Later in the simulation the constraints are released.
4. The simulation can start with a SVF where some designs have low values. During the simulation, the MTS can change the SVF to increase design values.

Those versed in the art will also realize one could institute this method with a boosting condition instead of a hindering condition, but that this is merely the same method.

Manipulating Segments of Design Objects: One can also direct users to a subset of the design objects by using segmented designs. Consider design objects that have system-set attributes. The system-set attributes constitute the directing condition, and the directing condition manipulator directs the user to a subset of object designs by changing the characteristics expressed by the system-set attributes. The enhanced subset is the set of design objects that have the system-set attributes in their current settings. By changing these attributes the directing condition manipulator directs the user to a new subset of design objects. After such a change the user "operates" in a different portion of the value function. This is true even if the user does not know of the system-set attributes. For example, suppose that a simulation has design objects that have five design attributes and two system-set attributes. Suppose at the start of a simulation the system-set attributes both express the characteristic "A." At the start of the simulation the enhanced subset is (#####AA). During the simulation the directing condition manipulator changes one of the system-set attributes to "B." The new enhanced subset is (#####AB).

Segmented designs provide other mechanisms for directing users to subsets of objects. As an illustrative example, consider pharmaceutical R&D. As described above, in the subsection titled "Examples of Using Segment Objects," which is in the section titled "Design Objects," one can simulate pharmaceutical R&D with a design object having two segments. One segment represents the drug being designed and the other represents the target. During a simulation a directing condition manipulator can add and/or removed targets. The addition of targets simulates scientific advances such as discoveries arising from genetics. Also, the directing condition manipulator can favor some targets over others by boosting the value of designs that use some targets and decreasing the value of designs using other targets. Generally, by adding and removing targets and by adjusting qualities of the simulation in response to targets, a directing condition manipulator can direct users to subsets of the design objects. Notice that this method is similar to two of the methods already described. Adding and removing targets is the similar to changing the set of valid designs. Adjusting the value of designs according to their target is similar to having a hindering or boosting condition. The use of segmented designs enhances these methods.

To further illustrate the usefulness of segmented designs to altering the enhanced subset, suppose that design objects represent products and product applications, as described in the subsection titled "Product Applications," in the section titled "Design Objects." One segment represents product designs and the other represents applications of products. The simulation can define market segments by having a finite number of applications, where each application is a different market segment. The simulation can direct users to subsets of design objects by changing the characteristic expressed by the attributes representing market segments. This represents a change in the application. For example, suppose the market for adhesives is described with a system-set attribute. This attribute represents the surface to which adhesives are applied. It can be "A" or "B" representing metal and plastic. Suppose that at the start of a simulation all customers use adhesives for binding metal. During the simulation some customers start using adhesives to bind plastic, thereby opening a new market segment. The simulation would affect this by changing the system set attributes for some customers from "A" to "B." Alternatively, both applications can exist at the start of a simulation. During the simulation the market segment for binding metal can shrink while the market segment for binding plastic grows.

Three Methods: The examples above illustrate three methods, or three types of directing conditions. First, the directing condition is a set of rules or calculations involving attributes and characteristics from the attribute-characteristic representation of objects. The directing condition manipulator adjusts these rules and/or calculations, and the enhanced set is determined by applying the rules and/or calculations. Second, the directing condition is the value function itself. The directing condition manipulator alters the value function, and the enhanced set is given by the value function topography. To illustrate with the mountain range metaphor, the enhanced set can be a set of designs sitting beneath a high, broad plateau. Third, the directing condition is the characteristics expressed by system-set attributes. The directing condition manipulator changes the enhanced set by changing the characteristics expressed by the system-set attributes. For example, the enhanced set can be the object category defined by the current setting of the system-set attributes. All other designs are impossible to create because the simulation controls these attributes. The system-set attribute method is based upon attributes and characteristics, so it can be considered an example of the first method. However, because it is particularly useful, one might consider this a distinct method.

MTS Dynamics Can Also Direct Users: The normal processes of an MTS can also direct users to a subset of design objects. The following example illustrates. Consider an MTS where users design and manufacture computers. Design objects represent computers. Attributes represent components, such as the mother board, microprocessor, and hard drive. Characteristics represent types of components, such as different types of microprocessors and hard drives. To manufacture computers users must purchase the components at prices given by demand curves. If users increase demand for a particular type of microprocessor, the price increases. This directs users to the subset of designs objects that lack this type of microprocessor.

As another example, consider a simulation where users design and sell glue. Suppose that glue is sold in two markets, industrial and consumer. Suppose that competition in the industrial market increases and as a result prices drop. Users might shift their design efforts to exploit the still profitable consumer market.

If normal MTS dynamics can direct users to subsets of design objects, why use a directing condition manipulator? The manipulator gives an MTS control over the dynamics of a simulation. Generally, it "reverses" the direction of causation. Instead of simulation dynamics directing users, a directing condition manipulator directs the users and thereby affects simulation dynamics. With a directing condition manipulator a simulation can cause users to face situations that are particularly important for practice and learning.

Section 9: An Illustrative Embodiment: Managing a Portfolio of Product Development Projects This illustrative embodiment serves three purposes. First, it illustrates another application of the present invention. Specifically, it presents an MTS for learning to manage a product development portfolio. Second, it illustrates different types of decisions that the user can make. The previous descriptions show users inputting design objects and/or object categories. This new illustrative embodiment illustrates this arrangement, but it also illustrates another arrangement. It shows a system where the users' decisions do not include submitting any design objects or object categories. Third, this illustrative embodiment shows additional uses of the present invention. It can be used to diagnose and/or evaluate business decisions, policies, and strategies. This illustrative embodiment is simple. It does not illustrate many of the methods previously described, such as a directing condition manipulator. It does not simulate manufacturing and uses the most simplistic model of a market. Those versed in the art can augment this illustrative embodiment with the methods previously described, simulations of manufacturing and complex markets, and/or other modifications.

Product Development Portfolio: A product development portfolio is a means of organizing product development. It helps a business to decrease the time needed to create new products, increase the number of new products a company creates, coordinate product development with business strategy, and manage risk. For an introduction to portfolio management, see chapter 1 of Portfolio Management for New Products by Cooper, Edgett, and Klienschmidt. Briefly, the product development portfolio contains product development projects. Projects can be anything from basic research in new science to modifying an existing product.

The job of portfolio management involves the following tasks: (1) keeping the portfolio full of high value projects, (2) allocating resources among projects, and (3) canceling and promoting projects. These tasks are preformed to meet market opportunities, keep pace with technical advance, and maximize the return on R&D investments. Managing the portfolio is difficult because each task affects risk, uncertainty, the probability of successfully creating new products, and the time required to create new products. Consider, for example, the following common mistake. New projects are added to the portfolio faster than existing projects are cancelled. As the number of projects in the portfolio increases, the portfolio becomes bloated. Resources are spread thinly and product development slows to a crawl. Capital must be committed for longer periods of time, increasing risk and capital costs. To get products through stage 3, managers respond to this problem by allocating more resources to projects producing incremental innovations. These projects can be finished quickly, but they produce little technical advance. Because of these errors, the product development portfolio requires too much capital, has a low rate of return, and is technologically uncompetitive.

The illustrative embodiment is an MTS for learning to manage a product development portfolio. Its description begins by describing design objects, the SVF and the user's goal. The illustrative embodiment's components are described next. When all of the components have been described, their integration and the operation of the illustrated embodiment are discussed. Finally, modifications and alternatives are described.

Design Objects and SVF: In this illustrative embodiment design objects are represented with an attribute-characteristic representation having two segments. One segment has seven design attributes and the other segment has two attributes representing the stage of R&D. Each design attribute can express one of eleven characteristics, represented by the letters A-K. Each R&D stage attribute can express one of two characteristics, represented by the numbers 0 and 1. The following are examples of object designs: (ABC DE FG 00), (DDG JH BB 11), and (KFD GE BA 10). However, where appropriate, this description will ignore the R&D stage attributes and present designs as in the following examples (ABC DE FG), (DDG JH BB), and (KFD GE BA). R&D stage attributes are described separately below. (Spaces between attributes make reading designs easier.)

The SVF for this illustrative embodiment is an nk-landscape function, and the configuration described here is the presently preferred configuration. Potentially, one could find a better configuration or even a better SVF. As previously described, the nk-landscape function has four important parameters: (1) the number of attributes, (2) the number of characteristics, (3) the average number of interactions per attribute, (4) and the arrangement of interactions over attributes. The attributes and characteristics have just been described, so consider the interactions. There are two types: (1) intrasegment interactions among the design attributes and (2) intersegment interactions through which the R&D stage attributes interact with the design attributes. These intersegment interactions are described below, so consider the intrasegment interactions. There should be enough intrasegment interaction among the design attributes so that the average number of interactions per design attribute is between 2 and 3. Since there are seven design attributes, there should be 14 to 21 interactions. Note that a two-way interaction counts as two interactions, and a one-way interaction counts as one interaction. The nk-landscape function can use a symmetrical or asymmetrical distribution of intrasegment interactions among design attributes. An asymmetrical distribution has consequences for R&D, described below. The SVF evaluates only the portion of the design object consisting of the design attributes, although the R&D stage attributes affect these evaluations. Finally, the SVF assigns designs a value from 0 to 10. For an nk-landscape with seven design attributes, this means that each attribute can contribute a value between 0 and 1.429 to a design's value. (For a discussion of nk-landscapes, one-way and two-way interactions, the distribution of interactions, and evaluating a portion of a design see Section 6, subsections titled "The nk-Landscape Function" and "Evaluating a Portion of a Design.")

The User's Goal: In the illustrative embodiment the user manages a product development portfolio of a simulated company. He designs products to fulfill a goal. The goal can be simple. For example, the goal can be to create a product with a value greater than a particular value. Alternatively, the goal can be to maximize the value of the best product designed within a limited budget, a set number of rounds, or a limited amount of time. In these configurations the user's success is measured by the value of his best object design. Simulations with these goals lack a simulated marketplace. This is noteworthy: the portfolio management MTS need not simulate a marketplace. Alternatively, a product development portfolio MTS can simulate a market. The user must then design products to exploit market opportunities. Given the techniques described herein (particularly in Sections 2, 7, and 8) and the previous art of modeling markets, one can develop sophisticated market models. The illustrative embodiment presented here uses a simple model of a market. This allows the user to focus on managing the product development portfolio.

The illustrative embodiment models markets as a series of market opportunities. Each opportunity has four characteristics: an identifying number, a required value, a payoff, and an expiration date. To exploit an opportunity the user must create a design that exceeds the required value before the expiration date. If the user accomplishes this task, he receives the payoff from that opportunity. For example, suppose there is an opportunity with a required value of 8.45, a payoff of $0.5 million, and expiration date of round 7. (Playing the simulation in rounds is described below). If the user can create a design with a value exceeding 8.45 by the end of round 7, the simulation credits his score with $0.5 of revenue. If the user cannot design such a product by the end of round 7, the opportunity expires and is lost. Because opportunities have required values and expiration dates, they present users with design goals and "windows of opportunity."

The required values should be high. To understand why, consider a random search for good designs. If a require value is higher than the value of only 30% of the object designs, finding a design that exceeds the required value is easy. Random search should succeed 70% of the time. Now suppose that a required value is higher than the values of exactly 95% of the object designs. Random search will succeed, on average, only 5% of the time. To make the simulation difficult, required values must exceed the values of a significant percent of designs. To help set required values, one can randomly sample from the value function and create a histogram of the design values. From the histogram one can estimate values that exceed any percentage of design values. In technical terms, one uses the histogram to estimate the percentile rank of a value. By raising or lowering the percentile rank of required values one makes the simulation more difficult or easier.

The simulation presents the user with a table of the simulation's market opportunities. The table is displayed on a form that the user can view throughout the simulation. FIG. 58 provides an example of a table of market opportunities. Each row presents a market opportunity. Column 1 lists the identifying numbers. The opportunities are numbered M1, M2, M3, etc, which stand for market opportunity 1, market opportunity 2, market opportunity 3, and so on. Column 2 lists the value required to exploit the opportunity.

Notice that the requirements tend to increase over time. After the user exploits an opportunity, he must create better designs to exploit the next opportunity. The third column lists the expiration dates, and the fourth column lists the payoffs. These are presented in units of $1 million.

Projects and Portfolios: Generally, the user's goal is to maximize his simulated firm's revenues while minimizing the cost of designing products. He should maximize the return on investment from product design. To do this he must create designs with high values, and he must do so before opportunities expire. Section 3 of this specification, titled "Ramifications," describes how users can create high value designs. Specifically, its subsections titled "Designing Products" and "Projects" explain the use of a portfolio of projects. Summarizing these subsections, the large number of designs and the interactions among attributes make designing objects difficult. The user can be more effective at designing high value objects if he focuses on a small set of design objects that contains high value designs. To accomplish this, the user proposes and evaluates an object category. Recall that a user evaluates an object category by evaluating several designs from the category. If these designs have high values the category might contain many high value designs. If this is the case the user focuses his efforts on designs in that category. If the category is not promising, the user proposes and evaluates another object category.

To illustrate, consider the illustrative embodiment. There are seven design attributes, and each one can express one of eleven characteristics, so there are nearly 19.5 million designs. Because of interactions between design attributes, finding the best of these designs is a difficult problem. To ease this task the user proposes and evaluates a category. For example, the object category (A## #C ##) contains approximately 160,000 objects. If evaluation suggests that the category contains high value designs, the user's task becomes much simpler. He need only search among 160,000 choices, and many of these are good designs. This method of simplifying search is given a name. An object category used to focus the design task is called a project. Using this name, the user proposes and evaluates projects. Projects that evaluate poorly are cancelled. Promising projects are retained.

Suppose a person considers one project at a time. Evaluating the category by evaluating only a few designs from the category creates uncertainty. The situation is analogous to the statistical process of population sampling, where a small sample is taken from a large population. The user can reduce uncertainty by testing more designs, but this is inefficient. The reason for using projects is to discover where to apply effort before expending considerable resources. The dilemma is resolved by using several projects simultaneously. The user can invest a small amount of resources in evaluating several projects. Using several projects decreases risk, because the user is not "putting his eggs in one basket." The user can then direct larger investments as the initial evaluations indicate. By dynamically allocating investment in response to information, the user can manage both risk and investment to maximize the effectiveness of product development. In sum, the user can start with several projects and dynamically allocate resources as the task of designing objects produces information. The user can both manage risk and efficiently design high value objects. The collection of projects is called a portfolio, illustrated in Section 3 by FIG. 13.

A Three stage Portfolio: The portfolio illustrated by FIG. 13 is too simple for modeling a product development portfolio. A product development portfolio can have stages. Projects are grouped by their goals or stage of development. For example, stage 1 might contain basic research projects, stage 2 might contain projects that turn basic research into new products, and stage 3 might modify products to meet a specific market opportunity. Generally, projects that are successful in one stage are promoted to the next stage. For example, if a basic research project is successful it is promoted from stage 1 to stage 2. The results of the research are now used to create a new product. If this stage 2 work is successful the project is promoted to stage 3, where the product is optimized for a particular market opportunity. If successful in stage 3, the project is promoted out of the portfolio and the new product is introduced to markets. Projects can fail at any stage of this progression, for example if the market opportunity changes or if technological development fails. Because of failures, a firm should have more projects in stage 2 than in stage 3 and more projects in stage 1 than in stage 2. In metaphor, the product development portfolio is often called a funnel. Numerous ideas are "poured" into stage 1 and a few new products emerge from stage 3.

The illustrative embodiment uses a three stage portfolio, similar to that just described. The portfolio is illustrated with three tables. These tables are presented to the user with a form that is available throughout the simulation. FIGS. 59-61 illustrate the tables with an example portfolio. FIG. 59 displays the projects in stage 1. FIG. 60 displays the projects in stage 2, and FIG. 61 displays the projects in stage 3. In these tables each row displays information about a project. Column 1 displays the project number. Projects are numbered in the order in which they are created. FIG. 59 shows projects 11-14. Projects 1-10 have either been cancelled or promoted to stage 2. Column 2 displays project definitions. Columns 3 and 4 display the projects' goals. When a project is created the user assigns it a market opportunity as a goal. Once an opportunity is assigned it cannot be changed. Column 3 shows the market opportunity that is the goal for each project. Column 4 shows the required value for the opportunity.

By looking at each figure one can understand how the three stages work together. To design objects, the user starts by conducting R&D (described below) to create initial hypothesizes of product categories that contain high value products. The user is instructed to hypothesize object categories defined on two attributes. These hypothesizes become stage 1 projects in the portfolio. FIG. 59 provides examples of stage 1 projects. The user will conduct R&D on these projects. Projects that look promising will be promoted to stage 2. Projects that do not look promising will be cancelled.

FIG. 60 provides examples of stage 2 projects. The goal of stage 2 is to further define the object category by "filling-in" two more attributes. For example, consider project 7 in FIG. 60. Project 7 was created in stage 1 with a definition of (AC# ## ##). Notice that this object category is defined on exactly two attributes. R&D on project 7 indicated that it held promise, and it was promoted to stage 2. In stage 2 the user conducted R&D and hypothesized that the object categories (AC# #D G#), (AC# FF ##), and (ACI #C ##) contain the high value objects in the category (AC# ## ##). These hypothesizes are called subprojects, and as illustrated, they must be defined on exactly four attributes and be contained in the project category (AC# ## ##). A first object category is contained in a second if every object in the subset of design objects specified by the first category is also in the subset of design objects specified in the second. For example, the object category (AB# #D G#) is contained in (AB# ## ##), but the object category (### ## D#) is not contained in (AB# ## ##). FIG. 60 numbers the subprojects as 7.1, 7.2, and 7.3. The subprojects are numbered in the order in which they were created. The user will conduct R&D on the subprojects, and if one of them looks promising the user will promote it to stage 3. When the user believes that project 7 cannot produce any more promising subprojects, he will cancel project 7. It is possible that none of project 7's subprojects will be promoted to stage 3.

FIG. 61 provides examples of stage 3 projects. To understand the data, consider the project in the first row: project 2.3. The project number reveals that the second project proposed in stage 1 was promoted to stage 2. Furthermore, R&D in stage 2 produced at least three subprojects. Subproject 2.3 was deemed promising and promoted to stage 3. Now in stage 3, the user conducts R&D on project 2.3 in order to identify the best designs contained in the project's definition. If the user finds a design that has a value greater than the project's goal, the project is successful.

Research and Development (R&D): The descriptions above refer repeatedly to R&D. How does the illustrative embodiment simulate R&D? It uses a simple version of the method described above in Section 8, subsection titled "Modeling R&D." Basically, a user submits designs to the simulation. The simulation evaluates the designs and records the results. In this illustrative embodiment the user must follow the following procedure. The user must first specify a project or subproject in which to conduct R&D. The user can then submit a design that is contained in the project's definition. Recall that projects are defined by object categories. A design is "contained in" a project if it is a member of the subset of design objects specified by the object category. For example, (A## J# ##) is the definition of project 11 (see FIG. 59). The design (ABC JD EF) is contained in project 11's definition. The design (BBC JD EF) is not.

Figure 62:
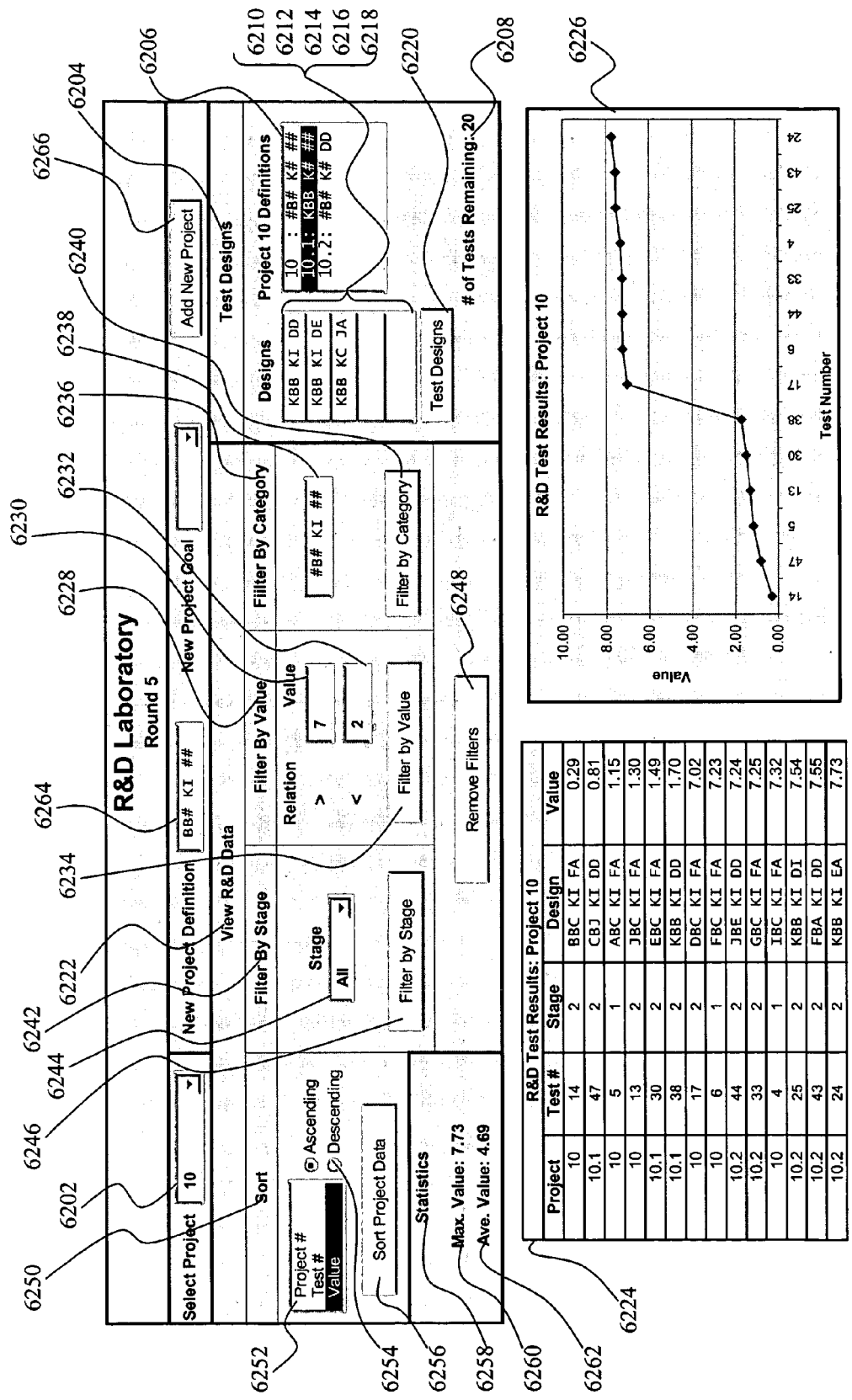
FIG. 62 is a picture of the R&D laboratory, used in the illustrative embodiment, which illustrates the testing of designs, the creation of a stage 2 subproject, and the use of filters and sorts.

FIG. 62 illustrates the form in which the user conducts R&D. It is called the R&D Laboratory. The first step in conducting R&D is selecting a project on which to conduct R&D. The user selects a project from a list presented by the Select Project combo box (6202). The list contains all of the projects in the product development portfolio plus a project called "New Project" that is used to create new stage 1 projects (described below). (The Select Project combo box is configured as a dropdown list box, so the user can select from the list but not type-in an alternate selection.) When the user selects a project, the R&D Laboratory updates its Test Designs area (6204). It also displays the selected project's definition in the Project Definitions list box (6206). A special case occurs when the user selects a stage 2 project. Recall that stage 2 projects can have subprojects. If a user selects a stage 2 project, the Project Definitions list box (6218) displays the definition of the project and all of its subprojects. Also, when the user selects a project from the Select Project combo box the Test Designs area displays the number of tests that the user can perform (6208). The number of tests is determined by the cost of testing designs and the budget for the selected project. For example, if project 10 has a budget of $100,000 and testing a design for a stage 2 project costs $5,000, then the user can test 20 designs. (Budgets and R&D costs are described below).

The Test Designs area of the R&D Laboratory is where the user tests designs. The user can only test designs that are contained in the selected project's definition. The Project Definition list box (6206) displays this definition as a reminder to the user. After the user has selected a project from the Select Project combo box, and in the case of a stage 2 project subsequently selecting a definition from the Project Definitions list box, the user can test designs. To test designs, the user enters the designs to be tested into the textboxes 6210, 6212, 6214, 6216, and 6218. The five textboxes enable the user to test up to five designs at once, although the user can also test fewer designs. After entering the designs the user clicks the Test Designs button (6220). The simulation checks each design to ensure that it is contained within the project's (or subproject's) definition. Acceptable designs are then evaluated with the SVF, and the results are stored by the simulation. After the test, the textboxes are cleared so that the user can perform more tests. The "# of Tests Remaining" is updated as well (6208).

FIG. 62 illustrates this procedure. Using the Select Project combo box, the user has selected project 10 (6202). The R&D Laboratory then listed the definition of project 10 and all of its subprojects in the Project Definitions list box (6206). (Recall that these project and subproject definitions were presented in FIG. 60.) The user has selected subproject 10.1, so he can test any design contained in the object category (KBB K# ##). The user has entered three such designs into the text boxes (6210, 6212, and 6214). When the user clicks the Test Designs button (6220) the simulation will evaluate the designs and store the results. It will then clear the textboxes and reduce the "# of Tests Remaining" to 17 (6208). Furthermore, the simulation can display the results in the R&D Test Results table and graph (described below). The user can then conduct more tests. If desired, he can use the Project Definitions list box (6206) to select project 10 or subproject 10.2 for the next tests. Alternatively, the user can use the Select Project combo box (6202) to select another project in which to conduct R&D.

How does the user decide which designs to test? The user reviews the results from a project's previous R&D tests, and he tries to identify combinations of characteristics that produce high value designs. The user then tests designs to assess his hypotheses. For example, suppose that the user is conducting R&D on subproject 10.1. Its definition is (KBB K# ##). After reviewing the results of project 10's previous R&D tests, the user might hypothesize that designs that end with "A" have high values. For subproject 10.1, this hypothesis is that designs in the object category (KBB B# #A) have high values. The user can assess this hypothesis by testing the designs in that category, for example (KBB KD AA), and (KBB KC EA), (KBB KD JA). If these designs have high values, the hypothesis might be correct. If the designs have low values, the user should review the R&D data again and develop a new hypothesis.

How does the user review the data from previous R&D tests? The remaining portions of the R&D Laboratory are for this purpose. These are the View R&D Data area (6222), the R&D Test Results table (6224), and the R&D Test Results graph (6226). First, consider the R&D Test Results table (6224). When the user selects a project from the Select Project combo box (6202) the results of all the project's R&D tests are displayed in the R&D Test Results table. If a stage 2 project is selected, all tests done for the project and all of its subprojects are displayed. Each row of the table presents the result of a test. The table has five columns. The first column shows the project or subproject in which the test was conducted. The second column lists the test number. The tests within a project are numbered so that the user can identify them easily. Tests are numbered in the order in which they were conducted, starting with the first test made when the project was in stage 1. Column 3 shows the stage that the project was in when the R&D test was conducted. Column 4 displays the designs that were tested, and column 5 displays the design values revealed by the tests. Now consider the R&D Test Results graph (6226). The graph shows the value of the tests listed in the table. The graph displays the data in the order that is presented in the table, with the first test in the table being at the extreme left of the graph and the last test in the table being on the extreme right of the graph.

Identifying good combinations of characteristics from a long list of data is difficult, so the View R&D Data area provides tools to filter and sort the data displayed in the R&D Test Results table and graph. The user can filter the data in three ways: by value, by object category, and by stage. To filter by value the user uses the area titled Filter By Value (6228). In this area there is a greater-than sign and a less-than sign. Next to each sign is a textbox for input (6230 and 6232). The user puts values into these fields and then clicks on the Filter By Value button (6234). For example, the user can put a 7 in the greater-than textbox (6230) and a 2 in the less-than textbox (6232). After pressing the Filter by Value button (6234), the R&D Test Results table (6224) displays only the tests of designs that have values greater than 7 or less than 2. If the user desires he can use only the greater-than criteria or only the less-than criteria. The user simply leaves one of the textboxes blank. For example, to filter for designs with values greater than 7, the user would leave the less-than textbox blank.

To filter R&D tests by object category the user uses the Filter By Category area (6236). There is a textbox in which the user types in an object category (6238). The user then clicks on the Filter By Category button (6240). The R&D Test Results table (6224) will now show only the tests of designs that are contained in the designated object category. FIG. 62 illustrates both the filtering by category and by value. The user has selected project 10 in the Select Project combo box (6202). Using the Filter By Category option, he has then filtered project 10's R&D tests for those contained in the object category (#B# KI ##). He has also filtered project 10's R&D tests with the Filter By Value option, selecting the designs with values greater than 7 and those with values less than 2. The R&D Tests Results table (6224) displays only the tests with designs that are in the category (#B# KI ##) and that have also values greater than 7 or less than 2. Notice that the R&D Test Results graph (6226) charts only the tests displayed in the table, so filtering affects both the graph and table.

Figure 63:
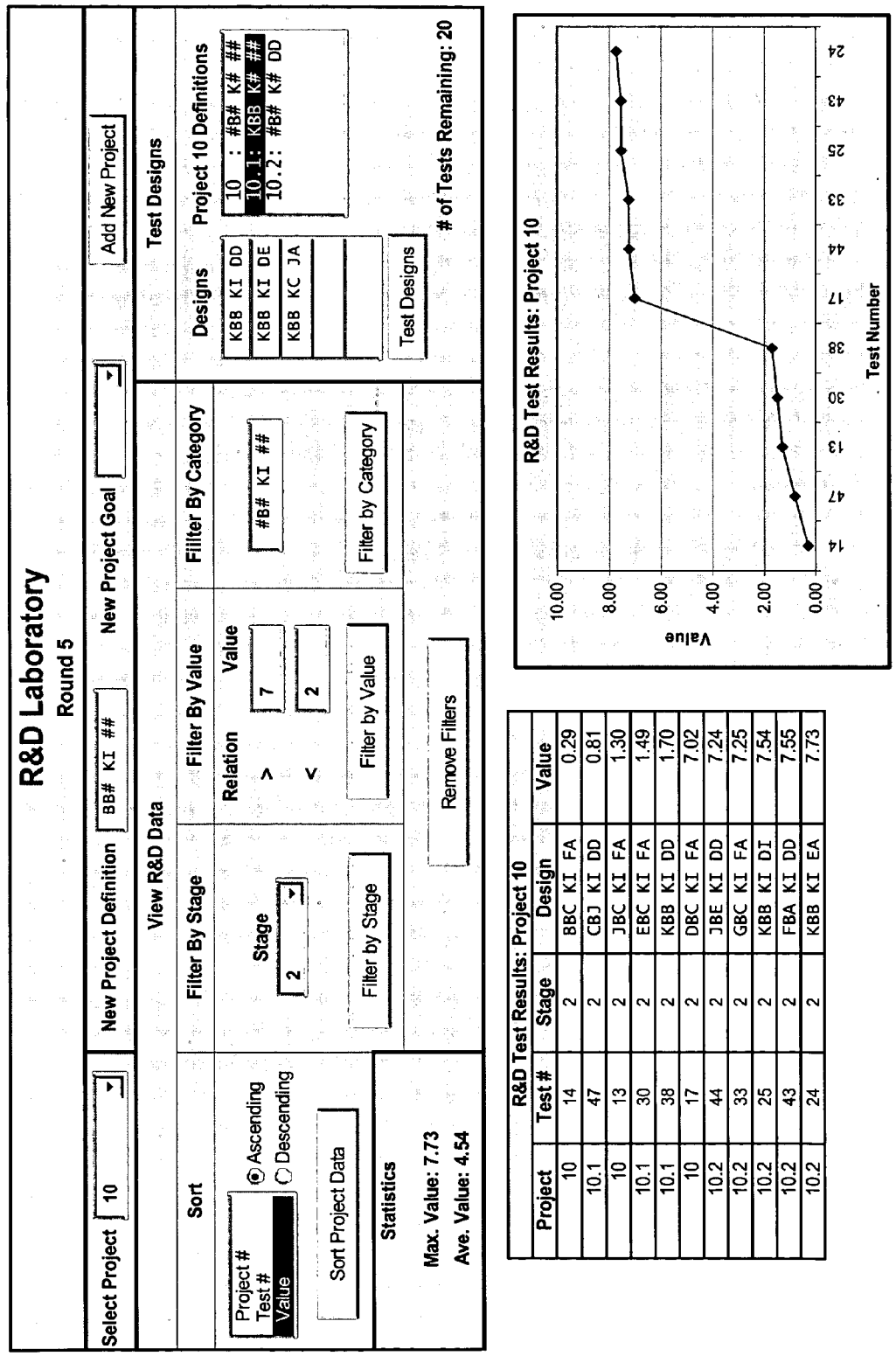
FIG. 63 is a picture of the R&D laboratory, used in the illustrative embodiment, illustrating the use of the stage filter.

The user can also filter R&D data by stage. The user uses the Filter By Stage area (6242). He selects the stage from the combo box (6244). (The combo box is configured as a dropdown list box.) The user then clicks on the Filter By Stage button (6246), and the R&D Tests Results table and graph will display only data from the selected stage. FIG. 63 illustrates. FIG. 63 has the same value and category filters that were applied in the example of FIG. 62. In addition, the user has also applied the Filter By Stage option to select stage 2 R&D tests. The R&D Test Results table now shows only the results of R&D tests conducted when project 10 was in stage 2, that are in the category (#B# KI ##), and have values greater than 7 or less than 2. When desired, the user can click on the Remove Filters button (6248), and all of the filters are removed. The R&D Tests Results table and graph will now display all of the project 10's R&D tests, and the user can then apply new filters to this data.

In addition to the filters, a user can sort the R&D test results that are displayed in the R&D Test Results table. The user uses the Sort area of the R&D Laboratory (6250). He can sort data by the project number, test number, or design value. The user selects the type of sort from a list displayed by a list box (6252). The user then determines whether the sort should be ascending or descending by selecting a choice from the option buttons (6254). The user then clicks the Sort Project Data button (6256) and the test results currently displayed in the R&D Tests Results table (6224) are sorted as specified. The R&D Tests Results graph (6226) is similarly affected. The example in FIG. 62 illustrates. Recall that FIG. 62 shows project 10's R&D results filtered by category and value. It further shows these results sorted by design value in ascending order.

To further analyze the R&D tests results, the Statistics area (6258) displays statistical information about the R&D results being displayed in the R&D Test Results table (6224). The Statistics area shows the maximum value (6260) and the average value (6262) of tests displayed in the R&D Test Results table. FIG. 62 illustrates. The tests that are displayed after the user has filtered the data, as described above, have an average value of 4.69, and the most valuable design displayed on the list has a value of 7.73.

In addition to conducting tests and viewing test data, the R&D Laboratory enables a user to add new projects to the portfolio. Only two types of projects can be added: stage 1 projects and stage 2 subprojects. First, consider stage 2 subprojects. Recall that a stage 2 subproject is defined by an object category that (1) is defined on exactly four attributes and (2) is contained in the object category that defines the project. To create a stage 2 subproject, a user first selects a stage 2 project to conduct R&D upon. He selects the project with the Select Project combo box (6202), as described above. After selecting a stage 2 project, the user sorts and filters the project's R&D data, and he tests designs to create new R&D data. The user performs these actions to identify a good object category for a subproject. When the user believes he has found a subproject definition that contains high value designs, he types it into the New Project Definition textbox (6264). He then clicks the Add New Project button (6266). The simulation checks to ensure that the subproject is defined on four attributes and is contained in the definition of the selected project. If this is the case, the subproject is added to the project. The new subproject is given a number and added to the Project Definitions list box (6206). The user can now conduct R&D for the new subproject. FIG. 62 illustrates. The user is conducting R&D on project 10, which is defined by the object category (#B# K# ##). The user has assessed the R&D data, and he proposes the subproject (BB# KI ##) by typing this definition in the New Project Definition textbox. Notice that the object category (BB# KI ##) is defined on four attributes and contained in the object category (#B# K# ###). When the user clicks on the Add New Project Button (6266), a new subproject will be added to project 10. The new subproject will be defined by the object category (BB# KI ##) and it will be numbered 10.3. The new subproject will be displayed in the Project Definitions list box (6206).

Figure 64:
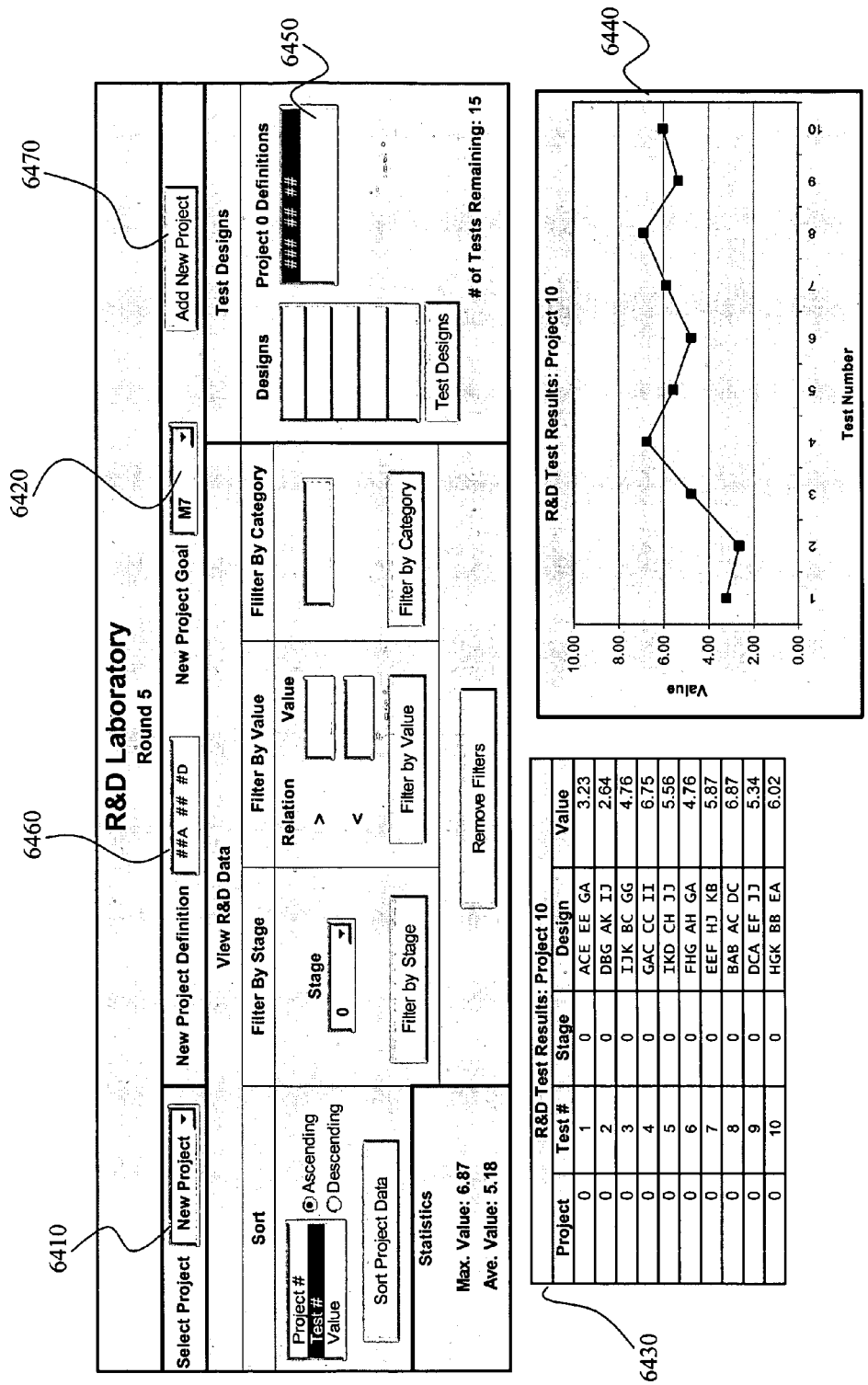
FIG. 64 is a picture of the R&D laboratory, used in the illustrative embodiment, illustrating the creating of a stage 1 project.

Now consider the task of creating new stage 1 projects, illustrated by FIG. 64. To add a new stage 1 project, the user must first select "New Project" from the Select Project combo box (6410). After selecting "New Project" from the Select Project combo box, the user selects a goal for the new project from the New Project Goal combo box (6420). This combo box lists all market opportunities that have not expired. (The combo box is configured as a dropdown list box). To help select a goal, the user can review the table of market opportunities (pictured in FIG. 58). After selecting a goal the user will view R&D Test Results. When "New Project" was selected, R&D test results from previous efforts at creating stage 1 projects filled the R&D Test Results table (6430) and graph (6440). One can think of "New Project" as a project itself, and each R&D test conducted when "New Project" is selected is part of this project. For the purpose of display in the R&D Test Results table, the project number and stage number for these tests are zero (see FIG. 64, part 6430).

To create the new project, the user filters and sorts the R&D test results searching for combinations of characteristics that produce high value designs. Specifically, he tries to identify an object category defined on exactly two attributes that contains high value designs. To aid this effort, the user can produce additional data by conducting R&D tests, using the Test Designs area. Because the user is not doing R&D within a project, but is doing exploratory research, the R&D tests are not constrained by an object category. Accordingly, the Project Definitions list box (6450) displays (### ## ##). When the user has identified a suitable object category, he types the category into the New Project Definition textbox (6460). In the example of FIG. 64 the user has entered (##A ## #D). The user then clicks the Add New Project button (6470). The simulation checks the new project definition. It if is defined on two, and only two attributes, it is accepted. If the definition is accepted, the simulation creates a new stage 1 project with the definition. The project is given a number and added to the table displaying stage 1 projects (previously depicted in FIG. 59). The project is also listed in the Select Project combo box (6410). However, the user cannot conduct R&D on the project until he gives the project a budget in the next round (budgeting is described below).

Why Three Stages of R&D? After seeing how R&D works, one can ask, "Why not conduct all R&D in a single stage?" The three stages are necessary because of two qualities of R&D. Before describing these qualities, the following terminology is defined for convenience. Testing a design in efforts to create a stage 1 project is called stage 0 R&D. Testing a design for a stage 1 project is called stage 1 R&D. Testing a design for a stage 2 project or subproject is called stage 2 R&D, and testing a design for a stage 3 project is called stage 3 R&D. Now consider the two qualities of R&D that give rise to stages. The first is cost. Testing a design is costly and varies with the stage of a project. Stage 0 R&D and Stage 1 R&D cost $1,000 for each design tested. Stage 2 R&D costs $5,000 for each design tested. Stage 3 R&D costs $25,000 for each design tested. The second quality is reliability. The reliability of R&D varies with each stage. Stage 1 R&D is not very accurate. There will be significant differences between the design values reported by stage 1 R&D and the true value of a design. Stage 2 R&D is more reliable, but still inaccurate. Stage 3 R&D is completely accurate, meaning that tests done on stage 3 projects will reveal the correct values of designs. Given this situation, the most efficient means of designing objects is to use the inexpensive stage 1 R&D to identify a large category of promising object designs. Stage 2 R&D is then used to narrow the category further. When the costly, reliable stage 3 R&D is performed, the user has narrowed the possibilities to a small set of promising candidates. This way, stage 3 R&D is not wasted on unpromising designs.

Figure 65:
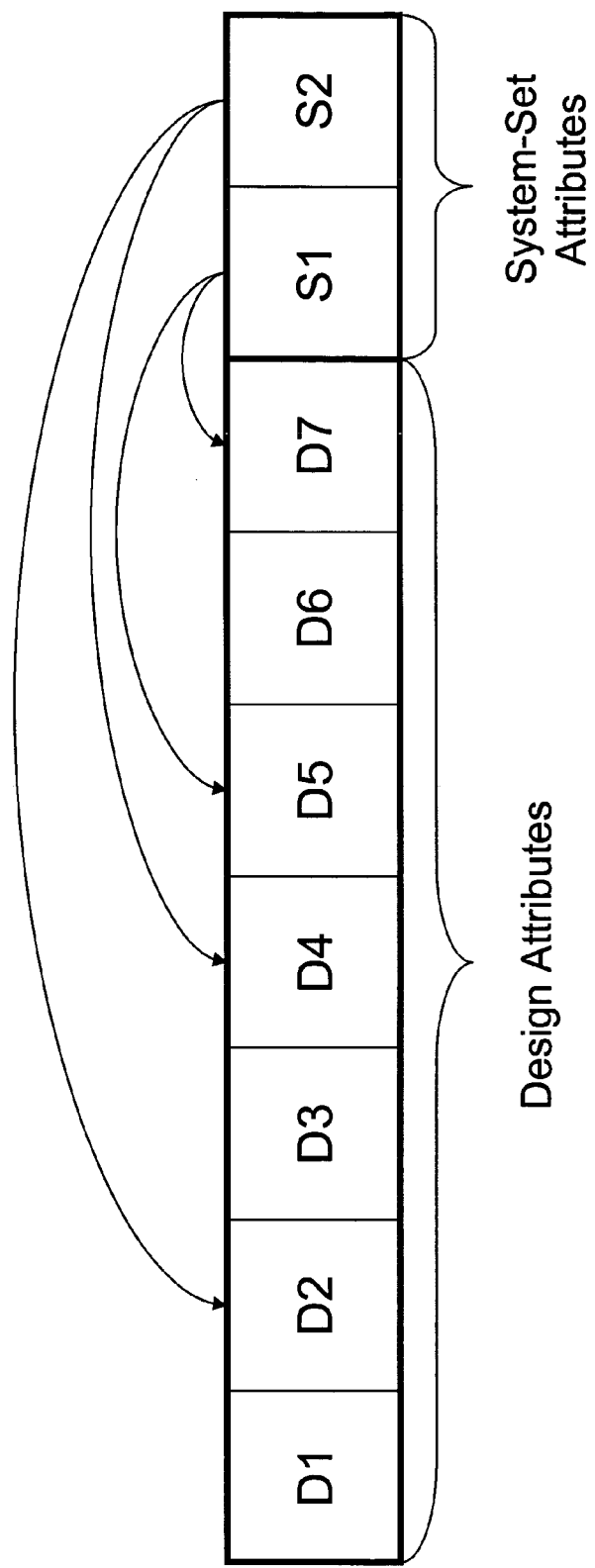
FIG. 65 is a diagram of the design objects of the illustrative embodiment, illustrating design attributes, system-set attributes, and intersegment interactions.

The simulation controls the accuracy of R&D using the R&D stage attributes. The R&D stage attributes interact with the design attributes as shown in FIG. 65. Notice that each R&D stage attribute interacts with two design attributes. R&D stage attribute S1 interacts with design attributes D5 and D7. R&D stage attribute S2 interacts with design attributes D2 and D4. When the simulation evaluates a design, it sets the R&D stage attributes according to the level of R&D. For stage 3 R&D both of the R&D stage attributes are set to one. For example, if the design (ADE GG JA) is tested in a stage 3 project, the simulation evaluates the design with its SVF and the attribute-characteristic representation (ADE GG JA 11). For stage 2 R&D, the R&D stage attribute S2 is set to zero. If the design (ADE GG JA) is tested in a stage 2 project or subproject, the simulation evaluates the design with its SVF and the attribute-characteristic representation (ADE GG JA 10). For stage 0 and stage 1 R&D both R&D stage attributes are set to zero. If the design (ADE GG JA) is tested in stage 0 R&D or stage 1 R&D the simulation evaluates the design with its SVF and the attribute-characteristic (ADE GG JA 00). The R&D stage attributes affect the results the evaluation of a design, so the same design will received different evaluations depending upon the stage of R&D.

The R&D stage attributes affect the accuracy of R&D. The simulation defines the true value of a design as the value given when both R&D stage attributes are set to one. Stage 3 R&D gives the true value. Because S2 interacts with two design attributes, stage 2 R&D gives inaccurate results. Stage 1 is even less accurate. Both R&D stage attributes are changed (from one to zero), and together they interact with four design attributes. The accuracy can be measured exactly with correlation. One can correlate the values assigned by stage 2 R&D with the values assigned by stage 3 R&D, and this is a measure of the accuracy of stage 2 R&D. One can also correlate the values assigned by stage 1 R&D with those assigned by stage 3 R&D. The calculations will show that correlation between stage 2 and stage 3 R&D is greater than the correlation between stage 1 and stage 3 R&D, so stage 2 R&D is more accurate.

While cost and reliability necessitate a staged model, the distribution of intrasegment interactions among the design attributes can accentuate the importance of the stage process. When interactions are distributed asymmetrically, the attributes affecting the most other attributes are called highly interactive attributes. They are critically important because changing the characteristic expressed by a highly interactive attribute greatly changes a design's value. Therefore, a user should use stage 0 R&D to discover which attributes are highly interactive and to identify good characteristics for these attributes to express. Stage 1 R&D should test the results. When a good project definition is found, stage 2 R&D and stage 3 R&D are used to "fill-in" the characteristics of the remaining attributes. In this way product development exploits the asymmetrical distribution of interactions.

Figure 66:
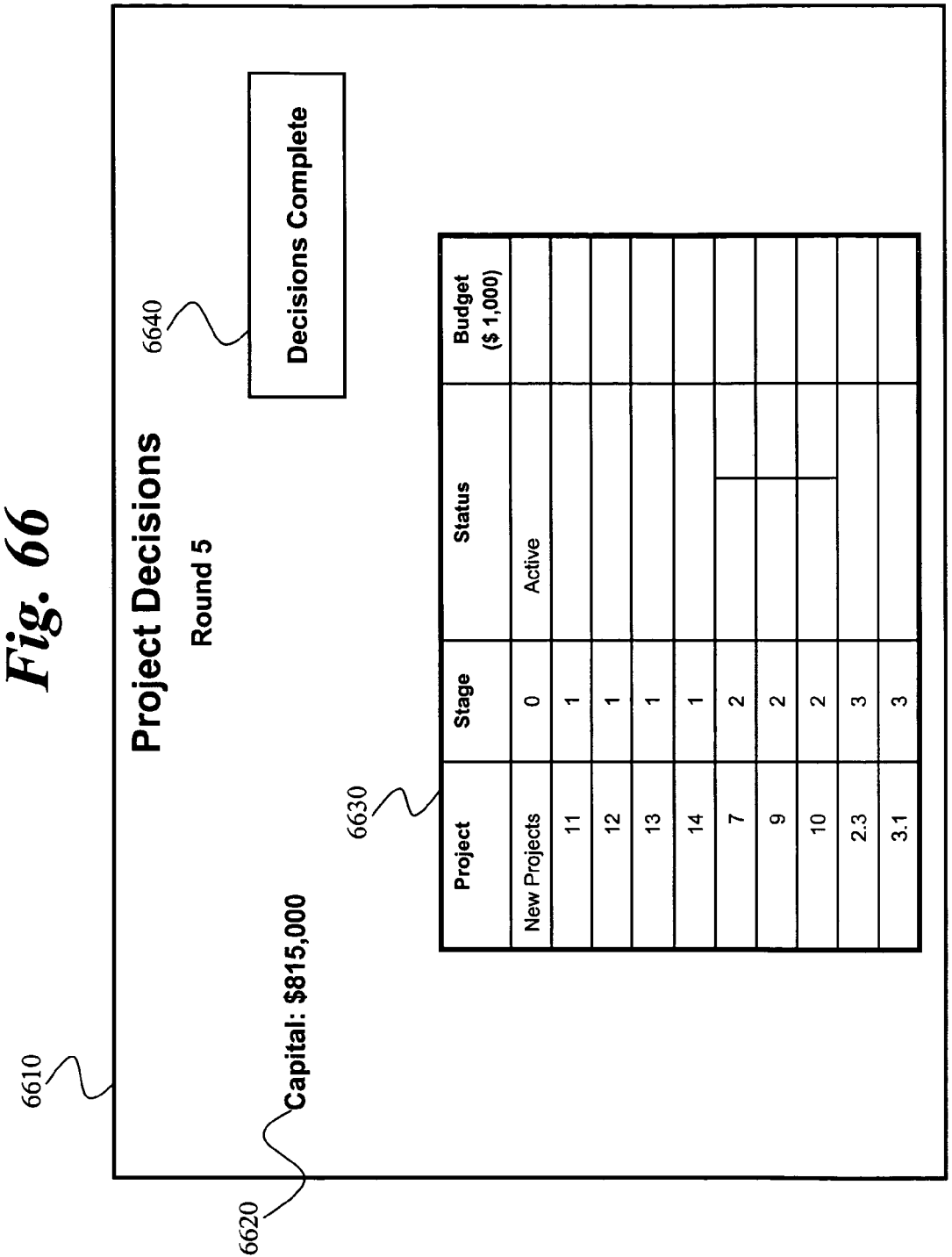
FIG. 66 illustrates the Project Decisions form in which the user of the illustrative embodiment enters decisions.
Figure 67:
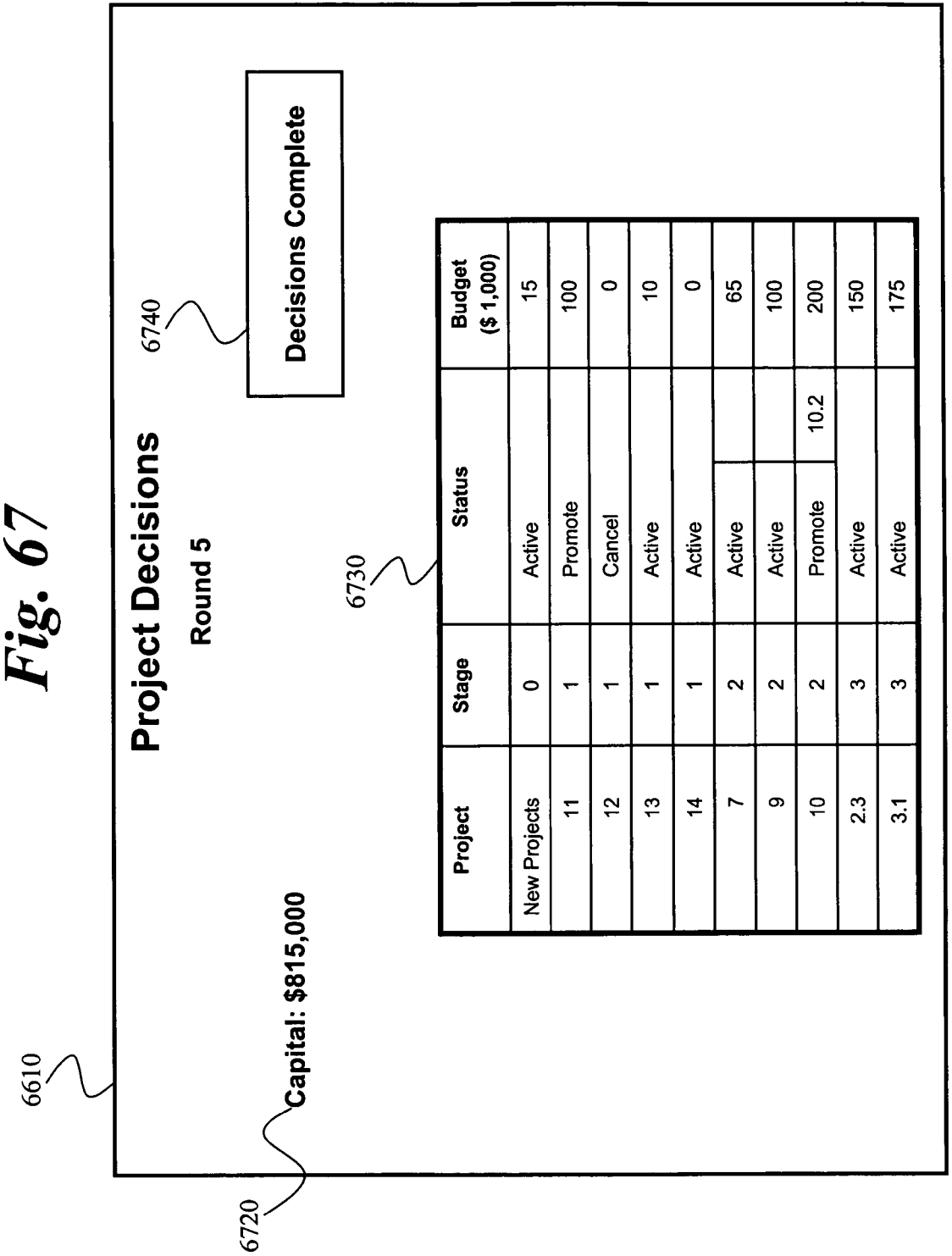
FIG. 67 illustrates a Project Decisions form after a user has entered decisions.

Promoting Projects, Canceling Projects, and Allocating Resources: The presentation above describes the three stages of the portfolio and how the user conducts R&D. To manage a product development portfolio the user must allocate capital to finance R&D. The user must also promote and cancel projects. The user accomplishes these tasks with the Project Decision form, as depicted in FIGS. 66-67. FIG. 66 shows the form where the user makes these decisions (6610). The form shows the amount of capital that the user can invest in his projects (6620). In the example in FIG. 66 this is $815,000. The act of distributing this capital to projects is called resource allocation. A user need not allocate all of the $815,000 of capital. Unused capital is not used later but is removed from the simulation. While investing less capital does not immediately help the user, it can improve the financial calculations made at the end of the simulation (described below).

The form also has a table for inputting decisions (6630). The table has one row for each project in the portfolio, plus a row that represents the task of conducting R&D to create new stage 1 projects. The first column of the table gives the projects' numbers. The second column gives the stage of the projects. The third and forth columns are where the user inputs decisions. The third column is titled "Status," and this is where the user inputs the status of each project. The user can affirm a project's status as active, or he can tell the simulation to cancel or promote a project. For stage 2 projects this column is split into two parts. If a stage 2 project is promoted, the user must tell the simulation which subproject to promote. The second part of the column is used to input this decision. The fourth column is titled "Budget." This is where the user inputs his resource allocation decisions. Because it is unique, consider the row of the table that represents the task of conducting R&D to create new stage 1 projects. The project's number is listed as "New Projects." Because this "project" is R&D for creating stage 1 projects, its stage is listed as zero. Because the user always has the option to fund the development of new stage 1 projects, its status is always "Active." This cannot be changed, however if desired, the user can allocate this task a budget of zero.

FIG. 67 shows a Project Decision form completed by a user. Decisions about promoting and canceling projects are in column 3 of the table (6730). The user kept projects 2.3, 3.1, 7, 9, 13, and 14 active. He cancelled project 12 and promoted projects 10 and 11. Project 10 is a stage 2 project, and he specified subproject 10.2 to promote to stage 3. Resource allocation decisions are in column 4. The user allocated the entire $815,000 budget. This allocation becomes the projects' budgets for the current round. For example, the user has allocated $10,000 to project 13. In the current round the user can conduct $10,000 worth of R&D on project 13, which will buy ten stage 1 R&D tests. There are several notable qualities of the allocation decisions. Stage 3 projects received more funds than stage 2 projects, and stage 2 projects received more funding than stage 1 projects. This reflects the costs of R&D for each stage. In addition, budgets of projects being promoted are funded for the next stage. Subproject 10.2 is being promoted to stage 3, so it received funding sufficient for a stage 3 project. Project 11 is being promoted to stage 2, so it received a budget sufficient for a stage 2 project. Project 14 received no funding, despite being active. This project is on "Hold." The user also allocated $15,000 to the task of searching for new stage 1 projects. Notice that no decisions are made regarding subprojects. Budgets for stage 2 projects include all the subprojects. The user will not decide how the money will be distributed over subprojects until he conducts R&D. For example, the user allocated $100,000 to project 9. When he conducts R&D on project 9, he will invest this capital in project 9's subprojects and in creating new subprojects. The allocation of the budget to these tasks is made while conducting R&D. Finally, after the user has imputed his decisions, he clicks the Decisions Complete button (6740). The simulation then allocates the capital to the projects, updates each project's budget, cancels projects, and promotes projects, as directed by the user. Cancelled projects are removed from the portfolio, and promoted projects are moved to the next level.

The description above shows how the user cancels and promotes projects. There are two circumstances in which the simulation, rather than the user, promotes and cancels projects. When either situation occurs, the simulation notifies the user with a message box. The first situation occurs when a market opportunity expires. The "window of opportunity" has closed, and all projects that have the opportunity as their goal are cancelled and removed from the portfolio. Second, if stage 3 R&D identifies a design that satisfies the project's goal, the project is successful. The simulation immediately promotes the project out of the portfolio, and the project's market opportunity is satisfied. In addition, all other projects that had this market opportunity as their goal are cancelled. A market opportunity can only be satisfied once. The remaining budgets of successful and cancelled projects are removed from the simulation, and the user is credited with the payoff from satisfying the market opportunity.

Note that the user must test the "winning" design with stage 3 R&D. Testing a "winning" design with stage 1 or stage 2 R&D is not enough. For example, suppose that the user has a stage 1 project, and he tests the design (ABC DE FG). Suppose that the design's true value exceeds the project's goal. Though the project was tested with stage 1 R&D, the project had not achieved its goal. Suppose that the user promotes the project to stage 2 and again tests the design (ABC DE FG). The project has still not satisfied its goal. Now suppose that the user promotes the project to stage 3, and again he tests the design (ABC DE FG). This time the project achieves its goal. The project is promoted out of the portfolio, and the user receives the payoff.

Project Evaluation: To help the user make promotion, cancellation, and resource allocation decisions, the simulation presents the user with a form containing a Project Statistics table, as illustrated in FIGS. 68-69. Consider FIG. 68. Each row presents information about a project. Furthermore, the projects are grouped by stage. Stage 3 projects are listed in the top rows (6810). Stage 2 projects are listed in the middle rows (6820), and stage 1 projects are listed in the bottom rows (6830). Dark bars separate the three stages (6840). Now consider the columns. Column 1 presents project numbers. Column 2 shows payoffs that projects will receive if they are successful. Column 3 shows the number of rounds before a project's opportunity expires. Columns 4-6 show the results of R&D tests. These statistics summarize the R&D tests performed in the project's current stage. For example, consider project 7. This is a stage 2 project, so the data in columns 4-6 report statistics about its stage 2 R&D only. The results of R&D tests done when project 7 was in stage 1 are not included in the statistics. Column 4 shows the number of R&D tests made for each project while in its current stage. Column 5 shows the average value of the designs in these tests. Column 6 shows the value of the best design among the tests. Notice that the statistics in columns 4-6 are given for stage 2 subprojects. Continuing with column 7, it shows the difference between a project's goal and the highest value found from the R&D tests of its current stage. Because statistics in columns 5-7 are calculated using the R&D from a project's current stage, these statistics incorporate the inaccuracies of the R&D for the stage. Columns 8 and 9 are described below.

To illustrate the data presented in Columns 1-7 consider project 7, depicted in row 3 of FIG. 68. Column 1 gives the project number. Column 2 shows that if the project is successful the payoff is $0.6 million. This is the payoff of the market opportunity M3, the project's goal (see FIG. 60). Column 3 shows that opportunity M3 expires in five rounds, at the end of round 10 (see FIG. 58). Column 4 shows that the user has conducted 137 R&D tests for this project since it entered stage 2. Column 5 states that the average value of these tests is 6.57. Column 6 shows that among these tests the design with the highest value has a value of 7.33. Notice that the statistics of columns 4-6 are also given for each of project 7's subprojects. For example, subproject 7.1 has received 55 of project 7's 137 R&D tests. The average value of these tests is 7.11, and the value of the best design tested is 7.33. Note that all of the data for project 7, and its subprojects, is from stage 2 R&D. Therefore, the data incorporates the inaccuracies of stage 2 R&D. Finally, column 7 shows the difference between highest value identified by stage 2 R&D and project 7's goal. The required value of M3 is 8.5. In project 7 the highest value identified from a stage 2 R&D test is 7.33, so the different between the best value and the goal is 1.17. This indicates how close the project is to achieving its goal, though the goal can only be achieved by stage 3 R&D, as previously described.

Columns 8 and 9 of FIG. 68 are for the user to fill in by estimating two values for each project. The user estimates the probability that each project will reach its goal. This includes success in the current stage and all subsequent stages. The estimates are entered in column 8. The user also estimates the amount of capital required to complete the project successfully. This includes investment in the current stage and all subsequent stages. The user enters his estimates in column 9. To make these estimates the user considers the data displayed in columns 1-7 of the Project Statistics table. In addition, the user can view R&D data for each project by using the R&D Laboratory. The user will sort a project's R&D data by test number to see how well R&D is progressing. Are the latter tests better designs than the initial tests? The user can also sort the R&D data by value. The user will consider whether the tested designs are the best in the category or if there is significant room for improvement. For example, when sorted by value in ascending order the data might produce the top of an S-curve. If this occurs, the user is unlikely to find designs with significantly higher values. FIG. 69 illustrates the Project Statistics table after the user has entered his estimates. Once this table is completed the user can use the data when making promotion, cancellation, and resource allocations decisions.

Though the Project Statistics table is useful for making decisions, the simulation provides another table to help the user. With this table the user scores and ranks projects. Scoring and ranking is a popular method of evaluating projects when managing a product development portfolio. Managers decide upon a set of criteria on which to measure projects. Each project is then scored on each criterion. A project's scores are then combined, usually as a weighted sum, to create a total score for the project. The projects are then ranked by their total scores.

The illustrative embodiment enables the user to perform this process with a Project Evaluation form (7010), illustrated in FIG. 70. The firm has a table (7020) and a Total Scores button (7030). First, consider the table. The user can score projects on six criteria. These are payoff, probability of success, expected payoff, additional investment, value to goal, and rounds to expiration. All of these criteria are on the Project Statistics form except for the expected payoff. The expected payoff is the payoff multiplied by the probability of success. Each criterion has a column in the table, as indicated by the column titles (7040). The row directly beneath the column titles is a row for assigning weights to the criteria (7050). The user should assign each criterion a weight on a scale of 0 to 5. A weight of 5 implies that the criterion is maximally important, and a score of 0 implies that the criterion should not be considered. The weights are used in the calculation described below.

The other rows of the table are for projects. Notice that each project, and its stage, is listed on the left side of the table (7060). In each project's row, in columns for the criteria, the user scores each project on a three point scale. A project gets 1 point if it measures poorly on a criterion. It gets 2 points if it is measures adequately on a criterion, and it gets 3 points if it is measures outstandingly on a criterion. The user is free to define poorly, adequate, and outstandingly any way he chooses. As an example, consider scoring projects for the payoff criterion. A project pursing a market opportunity with a payoff of less than $1 million can get 1 point. A project pursing a market opportunity with a payoff between $1 and $1.3 million can get 2 points, and a project pursing a payoff exceeding $1.3 million can get three points. For some of the criteria the user must consider a project's stage when scoring the project. This is because the stage significantly impacts how a project measures on some criteria. An example is the additional investment criteria. The additional investment needed by a stage 1 project is more than that needed by a stage 3 project. The stage 1 project must have enough funds for remaining stage 1 R&D plus funds to pay for subsequent stage 2 and stage 3 R&D. To score projects on the six criteria, the user will find the Project Statistics table (FIGS. 68-69) particularly helpful.

When all of the scores are assigned, the user clicks the Total Scores button (7030). The form calculates the total score for each project and displays the scores in the Total Score column (7070). In addition, the simulation ranks the projects by the scores. The project with the highest score gets a rank of one. The project with the second highest score gets a rank of two, and so on. The project rankings are displayed in the Project Rank column (7080). Total score calculation is a weighted sum. For each project, the simulation calculates its score by multiplying each of its criteria scores by its criterion's weight. The resulting weighted scores are added. FIG. 71 illustrates with a simple example. In this example, the user believes that payoff is maximally important, that estimated additional investment is somewhat important, and all other criteria do not matter. He has assigned the payoff criteria a weight of 5 and the additional investment criteria a weight of 3. All other criteria have a weight of zero. The user has scored each project on these two criteria with positive weights. After scoring the projects the user clicked the Total Scores button. The simulation responded by multiplying each score by the weight for its criterion and then adding the weighted scores. To illustrate, the score for project 3.1 is 3*5+2*3=21. The score for project 10 is 1*5+3*3=14. The simulation has also ranked by the projects by their total scores and displayed the rankings. Notice that several projects have the same score and thus the same rank. This occurred because the projects were scored on only two criteria. Finally, after clicking the Total Scores button (7110) the user can adjust project scores and criteria weights and then click the Total Scores to recalculate the totals and rankings. The user can repeat the procedure as much as desired.

The illustrative embodiment provides only two means of evaluating projects: the Projects Statistics table and the Project Scoring form. One versed in the art could devise other means. For example, a simulation can have a user make additional estimates about projects and use these estimates to estimate the net present value (NPV) and internal rate of return (IRR) for each project. The user can then use these financial calculations when making promotion, cancellation, and resource allocation decisions. The simulation could also provide bubble charts that graphically compare projects. For example, one axis of the chart could be payoff, the other axis of the chart could be the probability of success, and the size of the bubble could represent the additional investment needed. In fact, one versed in the art could design project evaluation means as complex and/or realistic as desired.

Performance Evaluation: Simulations of a product development portfolio can record decisions and simulation events during a training experience. A simulation can analyze this information and provide feedback to help the user learn. Those versed in the art can conceive of many types of analysis, especially for simulations that have realistic models of markets. This illustrative embodiment provides only a simple analysis. The embodiment records cash flows, specifically the R&D investments and revenues received each round for each market. The simulation also records project history, including each project's goal, stages, and outcome for each round of the simulation. When the simulation ends, it analyzes this data and presents the results to the user. The user can judge his success from this information.

Figure 72:
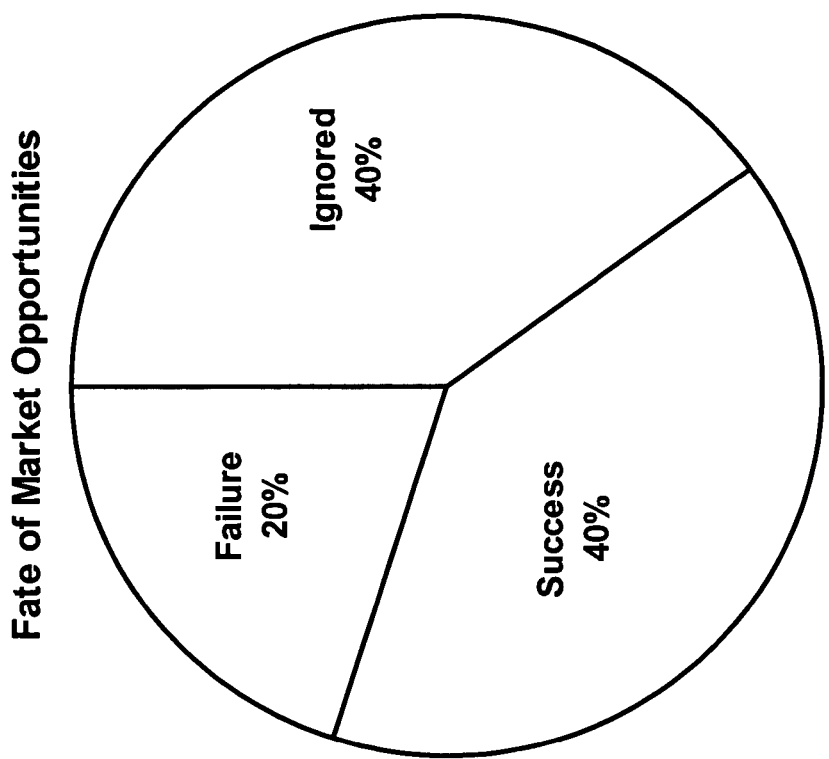
FIG. 72 is a pie chart illustrating the fate of market opportunities in a run of the illustrative embodiment.
Figure 73:
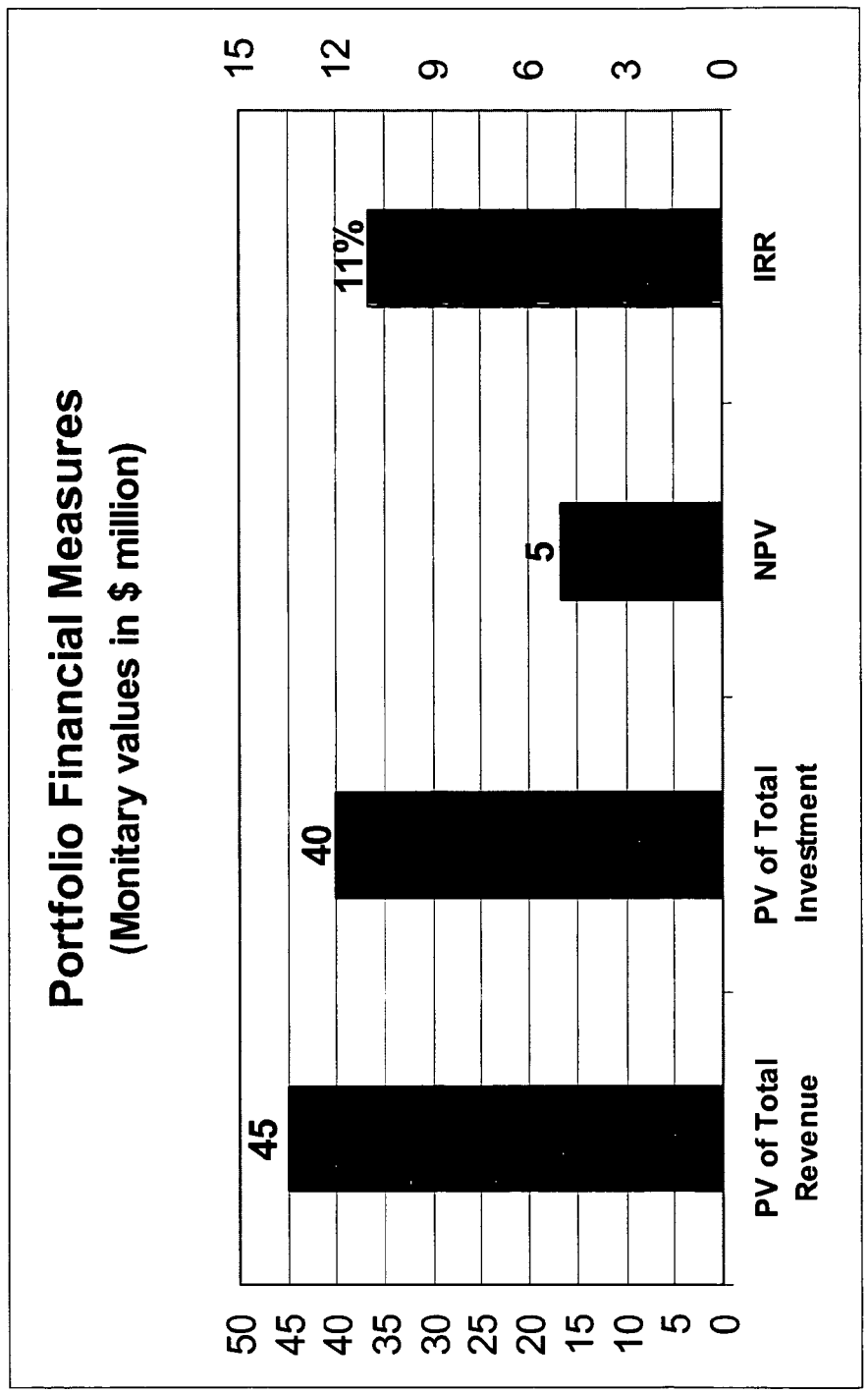
FIG. 73 is a chart illustrating financial measures calculated and charted at the end of a training session with the illustrative embodiment.

At the end of a simulation, the simulation presents the user with two charts and a table. FIG. 72 illustrates one of the charts. It is a pie chart the shows the fate of market opportunities. In this example, the user ignored 40% of the market opportunities. He successfully exploited 40% of the market opportunities and failed at exploiting 20% of the opportunities. FIG. 73 illustrates the other chart. Using the cash flow data, the simulation makes financial calculations. The simulation assumes that each round represents half a year and an annual discount rate of 7%. The simulation calculates the present value of all the payoffs from successful projects, the present value of all investments, the net present value (NPV) of all cash flows, and the internal rate of return (IRR) of product development. Notice that the graph depicted in FIG. 73 has two vertical axes. The axis on the left is for the present value calculations. The axis on the right is for the NPV and IRR calculations.

In addition to the charts the simulation also presents the user with a table. FIG. 74 illustrates the table. For each stage of R&D the table shows the project success rate, average duration of projects in that stage (measured in rounds), and the average investment in projects in that stage. The project success rate for a stage is the percent of projects that are promoted to the next stage. For stage 3 it is the percent of projects that successfully meet their goal. The average duration is the average time that a project is in a stage. The average investment is the total investment in a stage divided by the number of projects that were in the stage. These statistics are used in two calculations. First, the average duration and average investment data are used to capitalize the average investments. Investments are capitalized to the end of stage 3, when payoffs occur. The calculation assumes that one round represents half a year, the average investment in a stage is distributed equally over the average duration of a stage, and an annual discount rate of 7%. Second, the chart shows the average total cost of a successful project. To calculate this figure the simulation calculates the expected cost of one project, using the stage success rates and capitalized investments. It then divides this number by the probability of a project being successful. This accounts for the fact that, on average, several failures are required to produce one successful project.

Architecture: The illustrative embodiment must store and display data about market opportunities, projects, and R&D tests. This data is simple and can be stored in tables.

Furthermore, to fill the charts the simulation needs only a few types of queries to modify and read the data tables. For this reason, the illustrative embodiment could be programmed as a spreadsheet application, for example using Excel and Visual Basic for Applications. The program's architecture would be built around several tables of data. Other architectures are possible. For example, projects, market opportunities, and R&D tests could be objects. One of the properties of the project object would be a list of R&D tests conducted for that project. Another property of the project object would be a reference to a market opportunity object. In this way one can create the program in Visual Basic or another suitable programming language. Whether one uses a spreadsheet model or an object oriented programming model, the techniques needed to design and code the simulation are well known to those versed in the art.

Figure 75:
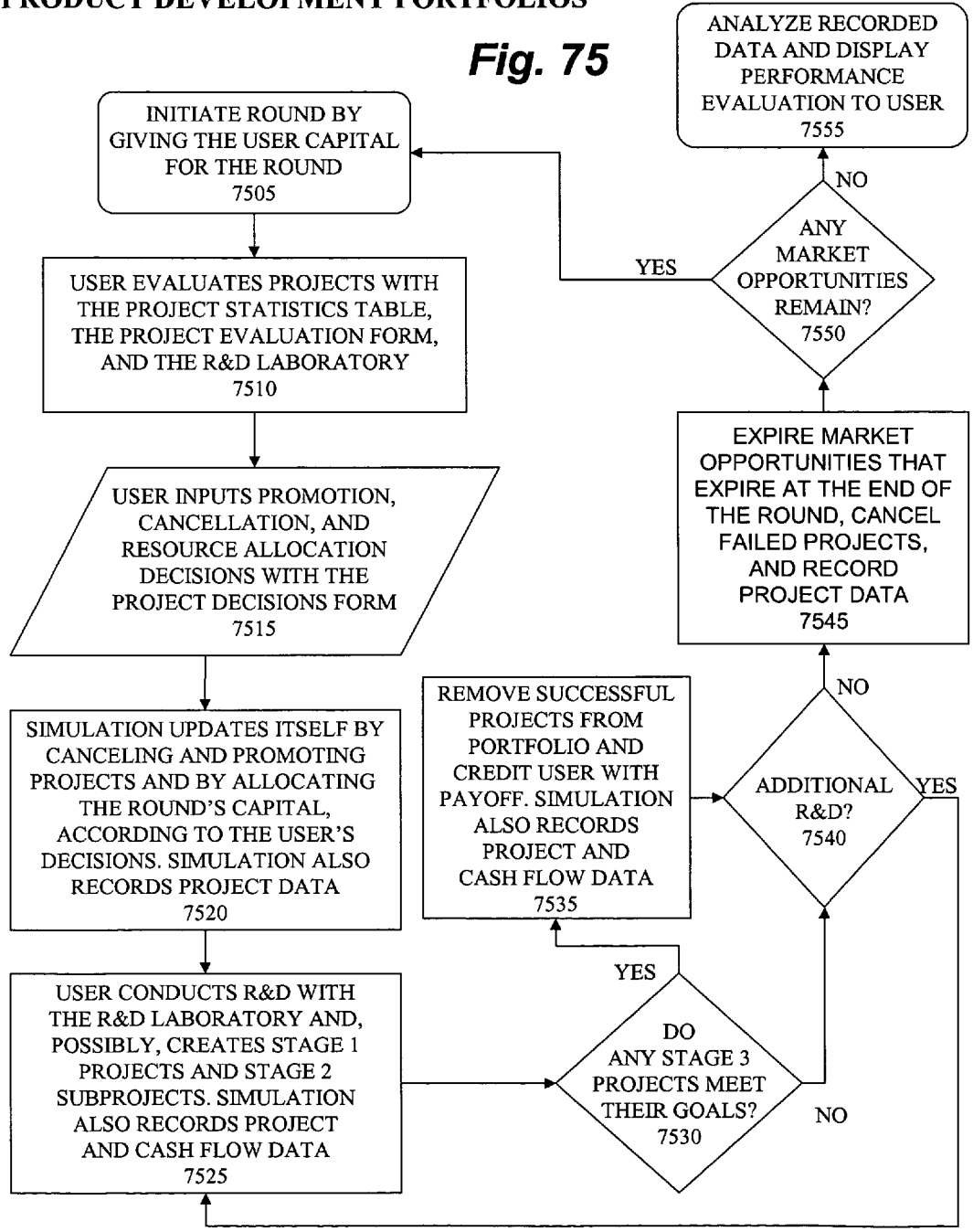
FIG. 75 is a process flow for using the illustrative embodiment to teach the management of a portfolio of product development projects.

Operation: The description above presents the R&D Laboratory and forms and tables for users to view the projects' data, evaluate projects, input decisions, and receive analysis and feedback. The following description shows how these components operate together during a simulation. FIG. 75 illustrates a round of the simulation. After the user has been introduced to the simulation, for example by presentation or manuals, a simulation begins in round 1 and proceeds with rounds until all market opportunities have expired. Then it ends. Each round begins with the user receiving capital for the round (7505). Note: In this simple simulation there is only one resource for users to allocate to projects: capital. More generally, users allocate resources, which can include capital, time, scientists, engineers, laboratory equipment, and/or other resource that are in limited supply. In the next step (7510), the user evaluates the projects using the Project Statistics table (FIGS. 68-69), the Project Evaluation form (FIGS. 70-71), and the R&D Laboratory (FIGS. 62-64). In the next step (7515) the user inputs promotion, cancellation, and resource allocation decisions using the Project Decisions form (FIGS. 66-67). The simulation then updates itself by canceling and promoting projects and by allocating the round's capital to the projects, according to the user's decisions. In addition, the simulation records data about the user's projects including their stage in the current round (7520). The user then conducts R&D with the R&D laboratory (7525). This may include creating new stage 1 projects and new stage 2 subprojects. When the user considers creating new projects, he might review the market opportunities (FIG. 58) and his portfolio (FIGS. 59-61). While conducting R&D on a stage 3 project, there exists a possibility that a design tested satisfies its project's goal. If this occurs the successful project is removed from the user's portfolio, the user receives the payoff, and the project's remaining budget is reduced to zero. The user is notified of these events. The user then continues to conduct R&D on his other projects until all projects' R&D budgets are spent. The simulation records data about projects and cash flows.

While these steps are integrated, for the sake of clarity, FIG. 75 illustrates them as separate steps. Each time a user tests a design (in step 7525) the simulation reduces the budget for that project and records the investment in its cash flow data. The simulation also monitors the test (step 7530). If the R&D test is for a stage 3 project and the value of the tested design satisfies the project's goal, then the project is successful. The simulation proceeds to step 7535. Otherwise the simulation proceeds to step 7540. Step 7535 updates the market opportunity and the user's portfolio to account for the project's success. Concerning the market opportunity, it is marked as "Satisfied" on the table displaying the market opportunities (see FIGS. 58 and 76). Furthermore, the user can no longer select this opportunity when creating new stage 1 projects. Concerning the user's portfolio, step 7535 removes all projects that had the market opportunity as their goal. The remaining budgets for these projects are reduced to zero, but not counted as invested. The user receives the payoff from the satisfied market opportunity. The simulation notifies the user of these events with a message box, and then the simulation records data about projects and cash flows. With this complete, the simulation progresses to Step 7040, where the simulation determines if the user has more R&D to complete. This occurs if there is still at least one project that has a budget sufficient to purchase more R&D tests. In this case, the simulation returns to step 7525.

If all R&D budgets are exhausted, the simulation moves from step 7540 to step 7545. The simulation identifies all market opportunities that will expire at the end of the round and marks them as expired. This has three consequences. Projects pursuing that market opportunity have failed. They are removed from the user's portfolio, and the user is notified with a message box. The simulation also records project data. Second, the table of market opportunities changes to indicate that projects have expired. To illustrate, FIG. 76 shows how the how the table in FIG. 58 would look in at the end of the eleventh round of a simulation. Third, when the user creates new projects he can no longer select expired market opportunities as the project's goal. After expiring the appropriate market opportunities, the simulation checks if there are market opportunities that have not expired (7550). If all market opportunities have expired, the simulation analyzes the recorded data and displays the performance evaluation to the user (7555). The simulation is then over. If at least one market opportunity has not expired, the simulation moves from step 7550 to 7505, and the next round begins.

The first few rounds of a simulation have particular qualities. They are used to fill the portfolio. At the start of the simulation, round 1, there are no projects in the portfolio. Therefore, the user does not evaluate the projects or the portfolio. Likewise, there are no promotion, cancellation, or resource allocation decisions. Effectively, steps 7510 and 7515 are skipped. The simulation moves from step 7505 to step 7520, where all capital for round 1 is invested in creating new stage 1 projects. Rounds 2 and 3 are also particular. In round 2 the portfolio contains only stage 1 projects, assuming the user created some in round 1. The user conducts R&D on these projects in round 2, and in round 3 he promotes some of them to stage 2. In round 4 the user promotes some stage 2 projects to stage 3. Round 4 is the first round which has projects in all three stages. Because the portfolio is not "full" until round 4, at the earliest, the capital for rounds 1-3 can be reduced. Round 1 can provide the user with enough capital for stage 0 R&D. Round 2 can provide the user with enough capital for stage 0 R&D and stage 1 R&D. Round 3 can provide the user with enough capital for stage 0 R&D, stage 1 R&D, stage 2 R&D. Beginning in round 4 the simulation provides enough capital for R&D in all stages.

Other Measures of Time: In the illustrative embodiment, the simulation progresses in rounds. This is not necessary, for there are other ways to mark time in a simulation. Simulation time can be fixed to real time. For example, one hour of real time can represent one quarter of a year in simulation time. Alternatively, R&D can mark time. For example, conducting 50 tests could require one quarter of a year. After every 50 R&D tests, the simulation advances to the next business quarter. Finally, the simulation need not keep track of time at all. The user can be given one large budget, and the simulation ends when the budget is exhausted. With any of these arrangements the user can view the forms and make decisions in any order. The step-by-step format described above need not be followed. For example, a user can evaluate projects while conducting R&D, and he can make decisions whenever and as frequently as he wishes.

Hidden Attribute-Characteristic Representation and SVF: Thus far, this specification has described MTSs where users design objects and/or object categories and then inputs them into the simulation. This need not be the case. The user can make decisions without ever designing/inputting object designs and object categories. In fact, the user need not be aware of the attribute-characteristic representation or of the value function. These can be internal components of the simulation that are affected by the user's decisions.

To illustrate such an arrangement consider some alterations to the illustrative embodiment. There is no R&D Laboratory, and the user does not conduct R&D. Because there is no R&D Laboratory, the user does not create or input object designs. Furthermore, FIGS. 59-61 do not display project or subproject definitions. With these changes, users never see an object design or object category, and they are not aware of the attribute-characteristic representation. The attribute-characteristics representation is an internal component of the simulation that is hidden from the user. The user knows projects only by their numbers and the statistics displayed by the Project Statistics table. The user's only decisions are promoting projects, canceling projects, and allocating resources.

Figure 77:
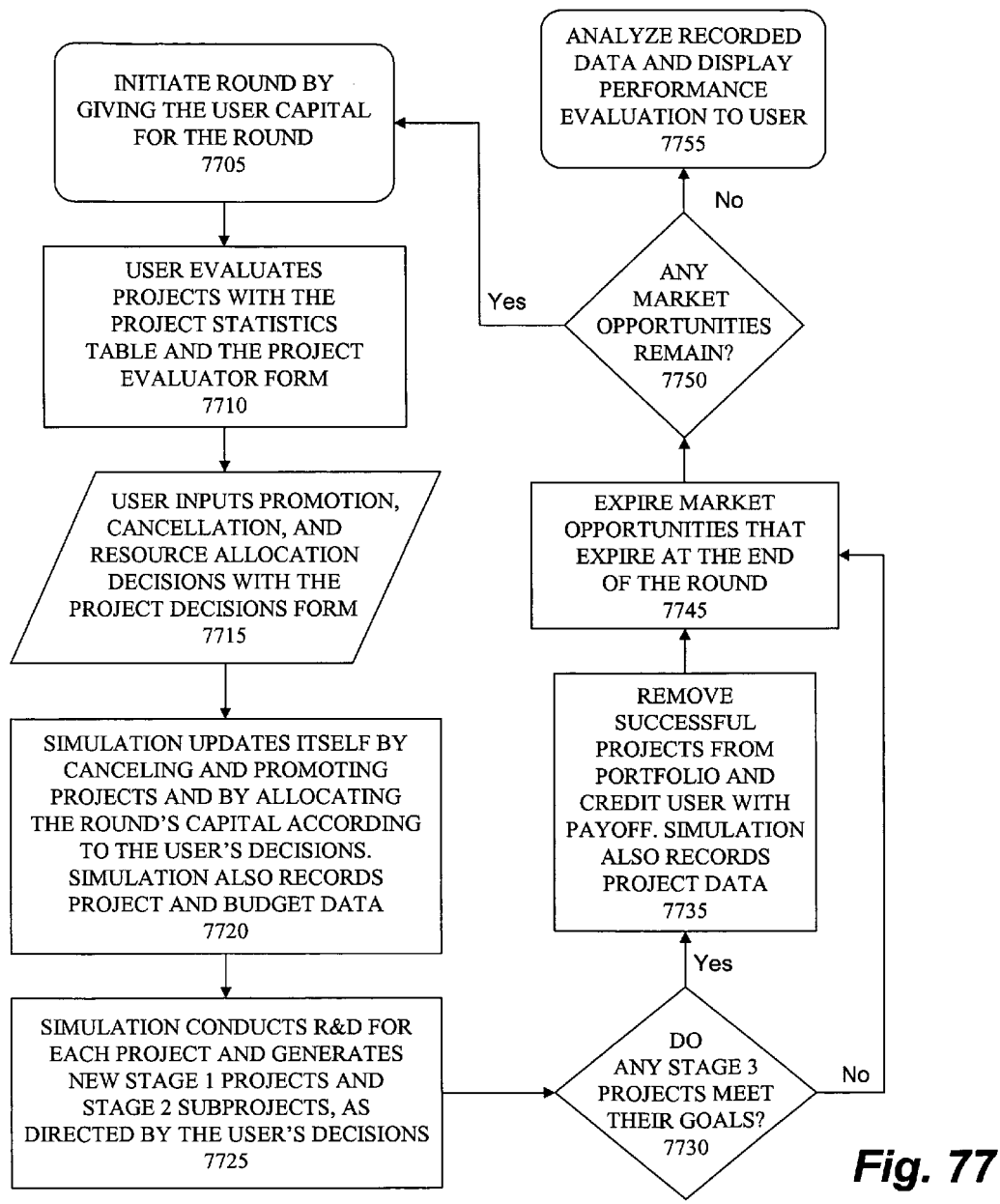
FIG. 77 is a process flow for using the illustrative embodiment configured so that the user does not enter, nor need be aware of, design object or object categories.

FIG. 77 shows how this altered embodiment operates. The operation is almost the same as the illustrative embodiment, but it includes a few changes, as noted. A round begins with the simulation giving the user capital for the round (7705). The user then evaluates the projects with the Project Statistics table and the Project Evaluator from (7710). If desired, the simulation can provide the user with additional information, so long as this information does not reveal project definitions or object designs. For example, the simulation could show, for each project, a histogram of the values of tested designs. These charts estimate the distribution of values for the designs contained in the projects. However, the user will not be aware of the concept of designs. To him the histogram just represents R&D results, without any explanation of how the results are produced. After reviewing project information and evaluating projects, the user inputs his promotion, cancellation, and resource allocation decisions (7715). The user inputs his decisions to the Project Decisions form depicted in FIG. 78. This is nearly the same as the Project Decision form depicted in FIGS. 66-67. In this case, however, the user makes promotion, cancellation, and resource allocation decisions for stage 2 subprojects, in addition to projects. After receiving the user's decisions, the simulation updates itself by canceling projects, promoting projects, and allocating resources over projects, as specified by the user (7720). The simulation also records data about the projects and budgets.

The simulation continues with step 7525. In step 7525 the altered embodiment automates R&D. This occurs "inside" the simulation, and the user does not see it. To automate R&D the altered embodiment must conduct R&D tests and create new stage 1 projects and stage 2 subprojects. First, consider the R&D tests. For each project the simulation randomly generates designs and tests them with its SVF. To illustrate, suppose that the user allocates $20,000 to project 11. Project 11 is a stage 1 project, and stage 1 R&D costs $1,000 per test. The computer will randomly generate 20 designs that are contained in project 11's definition and it then it will evaluate these designs with its SVF. Now consider creating new projects and subprojects. To create stage 1 projects the computer checks the budget allocated to "New Projects" in the Project Decision form. For each $10,000 allocated to "New Projects" the simulation will create one new stage 1 project. To create a stage 2 project, the simulation checks the capital allocated to each stage 2 project. For every $45,000 invested in a stage 2 project the simulation will create a subproject. Resources allocated to subprojects are not counted. For example, in FIG. 78 the user has allocated $45,000 to project 7, and another $75,000 to project 7's subprojects. The simulation will create one new subproject for project 7. To create new stage 1 projects and stage 2 subprojects the simulation uses the following procedures. To create a stage 1 project, the simulation asks the user to specify a market opportunity to be the project's goal. The simulation displays an input box for the user to input his decision. After getting the decision, the simulation randomly generates seven object categories, each defined on exactly two attributes. For each category the simulation randomly generates ten designs in the category, evaluates them with a SVF, and averages the results. The design category with the highest average value is added to the user's portfolio as a new stage 1 project. The process for creating a subproject for a stage 2 project is similar. Suppose that the user wants to create a subproject for project 10. The simulation randomly generates three object categories that are defined on four attributes and that are contained in project 10's definition. The simulation then evaluates the categories, as just described, and the category with the highest average value becomes the new subproject.

After conducting all R&D the simulation checks stage 3 projects to see if any met their goal (7730). If a project meets its goal, the simulation removes or promotes it out of the portfolio and credits the user with its payoff. The simulation also cancels all other projects that pursued the same market opportunity, and it marks the market opportunity as satisfied. This market opportunity cannot be the goal for any new projects. Finally, the simulation records these events for the post simulation analysis. Note that if two stage 3 projects satisfy the same market opportunity in the same round, the user receives only one payoff.

If there are no successful stage 3 projects, or after successful projects are removed, the simulation checks if there are market opportunities that expire at the end of the current round. If so, the simulation expires these market opportunities, as described above (7745). It then checks if there are any market opportunities that have not expired (7750). If so, the simulation starts a new round at step 7705. Otherwise, the simulation ends by analyzing the recorded data and displaying a performance evaluation to the user (7755).

In this altered embodiment the user does not design/submit objects or object categories. In fact, he never sees an object design or object category, and he can be completely unaware of their existence inside the program. Likewise, the user knows that projects are being evaluated, but he does not know that projects are defined as object categories or that project statistics are based upon evaluating object designs with a SVF. The user can be completely unaware of design objects, the attribute-characteristic representation, and the SVF. These are internal components that the user does not see. The simulation manipulates these components, and the user's decisions affect that manipulation. The altered embodiment is one example of this arrangement, but those skilled in the art can think of others. For example, instead of inputting decisions the user can input or select policies and rules that guide the simulation. Those versed in the art could modify the descriptions and techniques described in Sections 1-11 of this description so that the current invention and its embodiments do not require inputting object designs or object categories. FIG. 80 illustrates with a general architecture. Users input decisions into an input device (8004). The decisions are sent to a simulated business situation (8001) that contains a business simulation manipulator (8002) and an object evaluator (8003) that evaluates objects with a value function that has multiple optima. The business simulation manipulator uses the user's decisions to help select object designs to be evaluated by the object evaluator. Object designs are evaluated, and then the business simulation manipulator uses the result as it updates the business situation. Information about the new state of the simulation is sent to a display device (8005) and displayed to the user.

Diagnosis and Evaluation: MTSs are primarily used for training and learning, but they are used for other purposes too. One such application is diagnosing errors and problems in business decisions and policies. With the MTS, the user tests various policies, strategies, and decisions, and observes the results. Consider the illustrative embodiment. How poorly must a project perform before being cancelled? A user can test different policies. At the end of the simulation, the analysis presented in FIG. 74 shows how the policy affects the cost of developing a product. Another useful application of MTSs is evaluating policies, strategies, and decisions. Again, consider the illustrative embodiment. Call the market opportunities that expire in the early rounds of a simulation the "early opportunities." The market opportunities that expire in the later rounds are the "late opportunities." Suppose that a user runs the simulation multiple times. In some runs the required values of late opportunities are only slightly higher than the required values are early opportunities. In other runs the required values of late opportunities are considerably higher than that of the early opportunities. These two regimes represent markets where product performance must improve quickly and markets where product performance can improve slowly. With the illustrative embodiment, the user can test different portfolio management strategies and discover which strategies work best in each type of market. The MTS, in this case, is being used to evaluate business strategies. Clearly, diagnosis and evaluation are closely related to training and learning.

Alternative Configurations: The illustrative embodiment presents a basic design. One can modify this design and/or add any of the techniques described above. For example, one can use a sophisticated model of markets and add directing conditions and manufacturing. One can utilize the various techniques described above, including those described in section 6, "Value Functions," and section 7, "Design Objects." One can extend the illustrative embodiment to include multiple users who each manage a portfolio and who compete against each other to exploit market opportunities. Furthermore, the projects need not be product development projects, but can be research projects, for example projects exploring new technologies. Generally, the entire illustrated embodiment can be seen as a method for modeling a portfolio of research projects, which is more general than a portfolio of product development projects. The examples presented herein should not be construed as limitations on the scope of the invention, but rather as an exemplification of some embodiments. Accordingly, the scope of the invention should be determined not by the embodiments illustrated, but by the appended claims and their legal equivalents.

Section 10: Hardware Configurations

Some SVFs need not require a computer. An MTS built from such a SVF need not use a computer. For example, it might use charts or a calculator. This makes possible embodiments of the present invention in business simulation board games. However, most embodiments will use a computer. Without limiting the scope of the present invention, the following three computer configurations will be typical for the current invention: (1) stand alone, (2) multiple computers with floppy disks, and (3) computer network.

Stand Alone: An embodiment of the present invention could run on a single computer. The computer would have a program that includes a simulated business situation and the display. The display might include multiple forms or graphical displays to present information and receive inputs from a user.

Multiple Computers with Portable Memory Devices: Many MTSs use multiple computers and portable memory devices to ferry information between the computers. Usually, the portable memory devices are floppy disks, but other devices, such as flash memory, can be used. In this configuration, there is an MTS administrator and several teams of users, each team making decisions. The administrator has one computer running the simulated business situation. Each team of students has a computer running an interface program that displays results and accepts decisions.

Usually, these simulations are run in rounds, but this need not be the case. Each round begins with the administrator giving each team a floppy disk, or other portable memory device, with information about the simulated business situation. Each of the teams views the information with the interface program on its computer and makes decisions. The interface software then saves the decisions on the floppy disk. The teams then return their floppy disks to the administrator, and the administrator loads the decisions into the simulation running on his computer. The simulation then updates itself, according to the decisions, and writes information about its current state on each team's disk. The administrator then gives each team its disk, and the round repeats.

Figure 20:
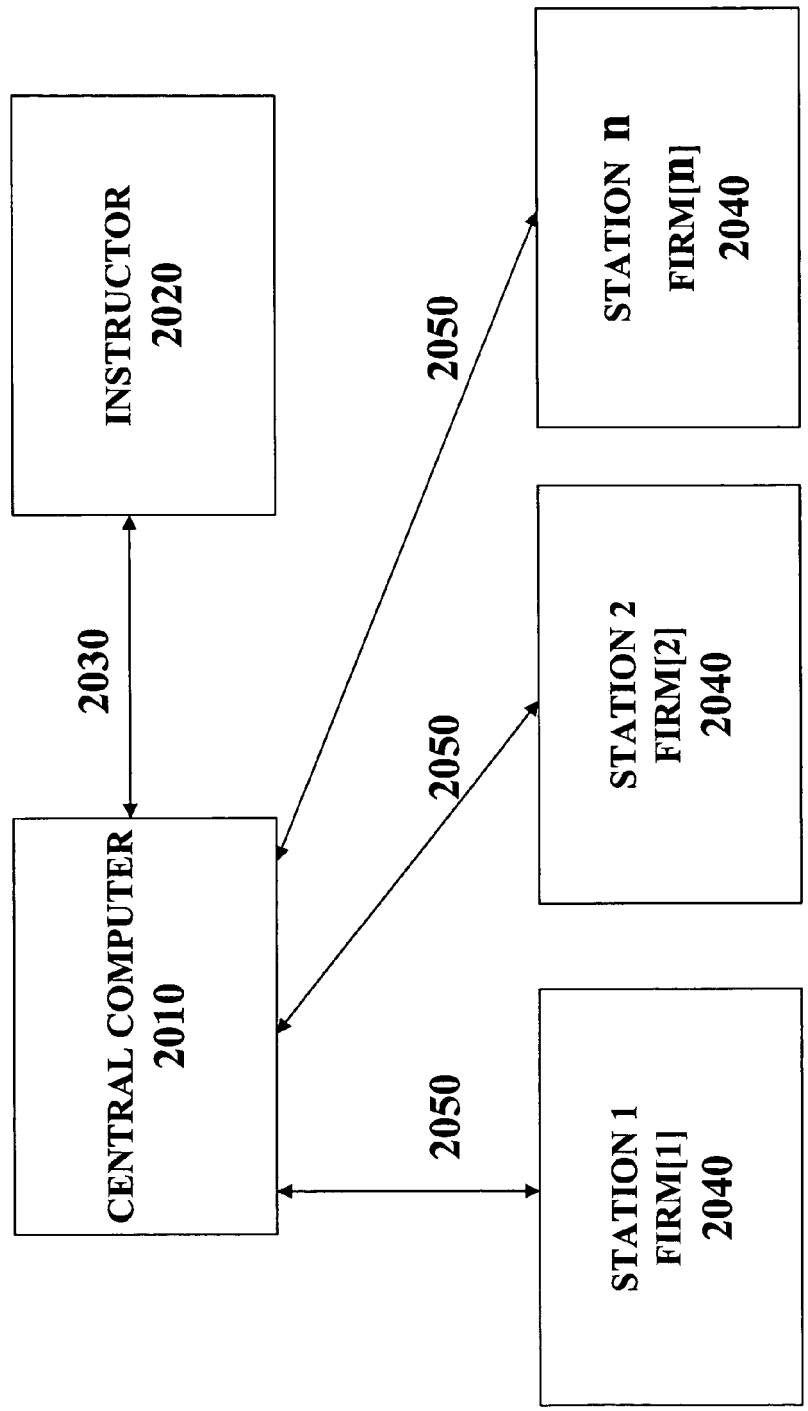
FIG. 20 illustrates a hardware arrangement for implementing the present invention.

Network Configurations: Floppy disks are cumbersome, have limited storage capacity, and require all participants to be in close proximity. MTSs overcome these problems by running over a network. FIG. 20 describes this with a generic network.

With reference now to FIG. 20, a hardware arrangement 2000 is illustrated including a central computer 2010 which is preferably configured to run a program which can be used to implement an embodiment of the system and method of the present invention. An instructor or leader responsible for running the simulation connects to the central computer through a main station 2020, for example, using a personal computer having a graphical interface suitable for entering the various inputs and displaying the outputs of the system.

The main station 2020 communicates with the central computer 2010 via a communication link 2030, for example, a modem or dedicated communication line. A plurality of stations 2040 are also connected to the central computer through respective communication lines 2050. Each station 2040 preferably comprises a personal or laptop computer such as one owned by the participant in the simulation. Preferably, each firm in the simulation (e.g., management training simulation) is controlled at one station 2040; however, a single station or user can control plural firms, or multiple stations can share responsibility for governing the activities of a single firm within the spirit of the present invention. The hardware arrangement 2000 of FIG. 20 illustrates a preferred arrangement in which each firm [x]is controlled by a respective station [x].

An important case of this configuration occurs when the clients are not always connected to the server. This happens when running a simulation via the Internet and e-mail is used to transfer files. (Essentially, email replaces the floppy disks described in a previous configuration). To see the problem, consider the nk-landscape function. Recall that it keeps data in tables, and these tables can become very large. For this reason, the tables are not created in advance, but are generated as they are needed. This creates a problem if clients that are not permanently connected to the server need access to the SVF "on demand." On demand access is preferable when modeling R&D in the manner previously described. The solution is to represent the nk-landscape function as an equation (see section B2.7.2 of HEC) and give the equation to each computer.

As this problem illustrates, an MTS can place a portion of the simulated business situation on the server and other portions with the clients. In fact, some portions can be duplicated on both. For example, a competitive industry simulation will often keep simulations of markets on the server. It will often keep the models of the firm(s) on the client computer(s). In this manner, the simulated business situation is spread over multiple computers in a network.

Section 11: Flowcharts of Some Useful MTSs

Those versed in the art will recognize that the preceding descriptions enable a wide variety of simulations. An MTS can include design objects representing objects, technologies, or other objects. The objects' can have any number of attributes, and the attributes can vary qualitatively, quantitatively, or in other ways. The attributes can be segmented, include system-set attributes, and have multiple properties. The simulated business situation can include simulations of R&D, manufacturing, or a competitive marketplace. It could also include simulated competitors, financial markets, accounting, supply curves for object characteristics, supply curves for manufacturing capacity, and simulations of other phenomena associated with business. Below are several flowcharts depicting some particularly useful configurations.

Flowchart for Evaluating a User's Design Performance

Figure 21:
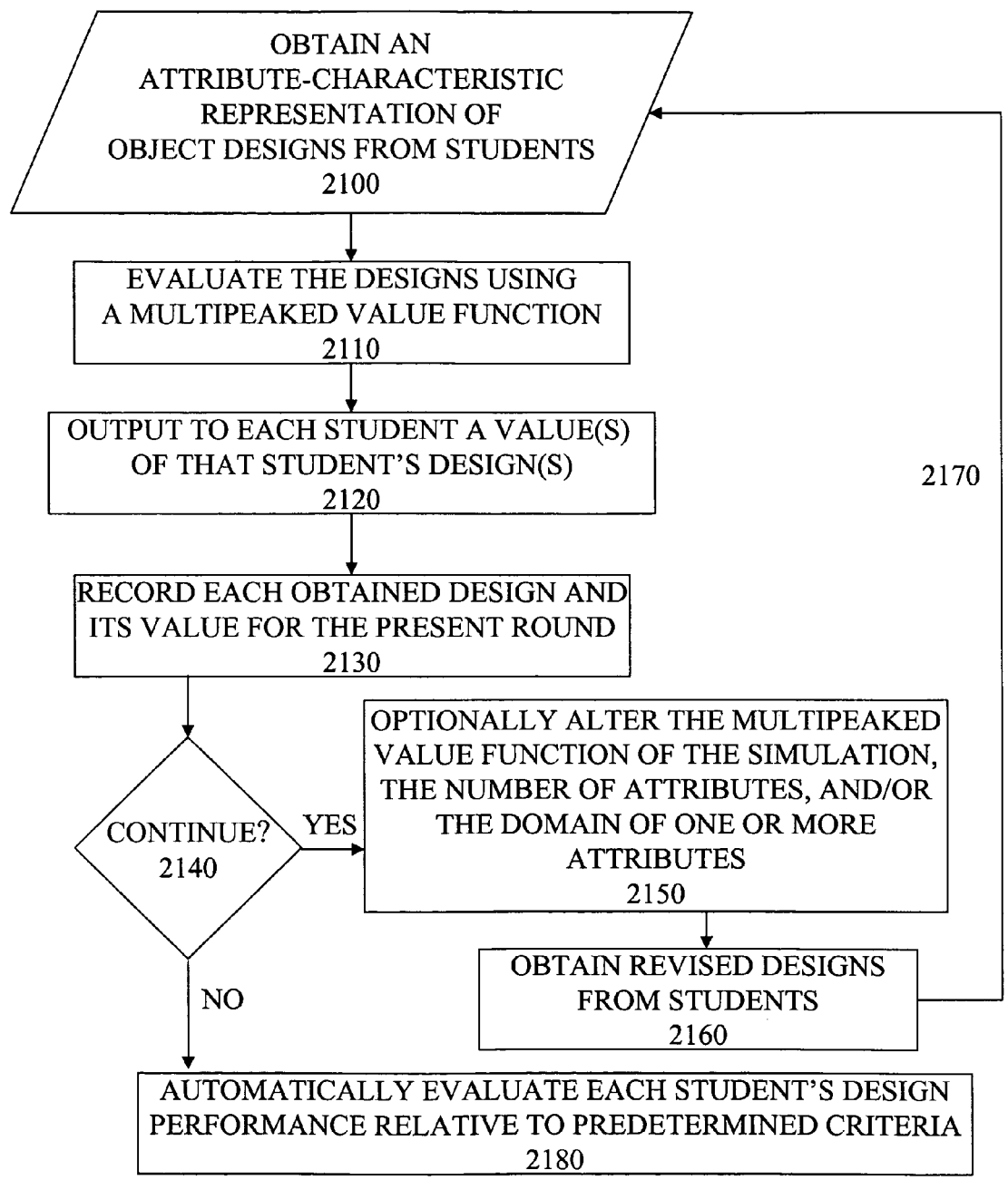
FIG. 21 illustrates a process flow for evaluating a student's design.

In accordance with one aspect of the present invention, the MTS can automatically evaluate the performance of a particular student's design or designs relative to predetermined criteria such as other student designs or bench mark levels established statistically or otherwise. With reference now to FIG. 21, a process flow for evaluating a student's design is described. The evaluation analyzes judgments made by the student as reflected in their object designs and changes from round to round made by the student as reflected in their object designs and changes from round to round in view of the information they obtain from the database and the filters they used. During the course of the simulation, the participant makes project management judgments, including, but not limited to, the value of the products in a product class; the costs and time required to find valuable products; the reliability of information; and his level of confidence in his judgments. The system monitors these judgments by analyzing forms submitted electronically. Each round of the simulation, one can solicit each of these judgments from a student. Furthermore, for each of these judgments the simulation can estimate the true value by sampling products and calculating correlations. From these values, the simulation administrator can identify which of the student's judgments are erroneous.

At step 2100, the system obtains an attribute-characteristic representation of one or more designs from each of the students participating in the simulation. Such designs are obtained by completing a form that preferably is presented electronically on the display screen at the stations 2040. For example, a user interacts with the various fields displayed through the interface illustrated in FIG. 12 and adjusts product design and capacity by submitting to the central computer (e.g., posting) his or her production decisions using the button 1204. On the server side, the form from the station 2040 is funneled to a cgi-bin or the like and processed by a conventional form processing software.

The central computer 2010 evaluates the designs posted by the students using a multipeaked value function, as at step 2110. The central computer outputs at step 2120 marketplace performance data to each student with respect to their respective designs. The marketplace performance data is communicated from the central computer over the communication lines 2050 to the stations 2040 and, more particularly, to the station which posted that particular design in the first place. Meanwhile, the designs of all students can be provided across communication line 2030 to the main station 2020 so that the instructor can review and monitor progress in the designs as the simulation proceeds. The central computer records in a memory each of the designs it obtains from the various stations 2040 along with the value computed by the multipeaked value function for the present round, as at step 2130.

Next, a determination is made as to whether the simulation is to continue, at step 2140. This simulation can continue for a predetermined number of rounds or until other predetermined criteria are satisfied. For example, a simulation may continue (1) until a set number of firms has gone bankrupt, (2) a certain number of rounds after a radical innovation was introduced into the marketplace, or (3) based on other criteria. In the event that the simulation is to continue, then, optionally, the multipeaked value function and/or the number of attributes and/or the domains of one or more attributes can be altered to simulate exogenous shifts in the marketplace. For example, when the multipeaked value function is altered, then the values for all objects in the simulation are affected. As another example, when the number of attributes and/or the domains of one or more attributes are altered, the simulation models the discovery of the new product, a shortage of raw materials, or government regulation.

At step 2160, the system obtains at step 2160 revised designs from the students along with other data respecting the simulation such as requests for reports, surveys, advertising budgets, budget allocations, revised production schedules, royalty payments, and the like. This information is obtained by posting a form as described above in connection with step 2100. The process flow then loops back to step 2110 and repeats so that the revised designs can be evaluated using the (optionally altered) multipeaked value function, with the results being output to the students and recorded at the central station.

In the event that the simulation is not to continue further, as tested at step 2140, the process flow instead branches to step 2180 at which step each student's design is automatically evaluated relative to predetermined criteria, as stated above.

This example was presented in the context of a simulated business situation, but this is not necessary. The student's task can simply be to design the best design object possible within a specified number of rounds or searches. The data collected by the simulation can include qualities of a students search. These qualities can be useful in studying cognitive psychology. Particularly, it is useful in studying the psychological processes described in the Section 4, "Embodiments that Make Two Great Improvement in MTSs." These processes are categorization, covariation detection, and judgment.

Flowchart for Developing a User's Decision-making Skills

Figure 22:
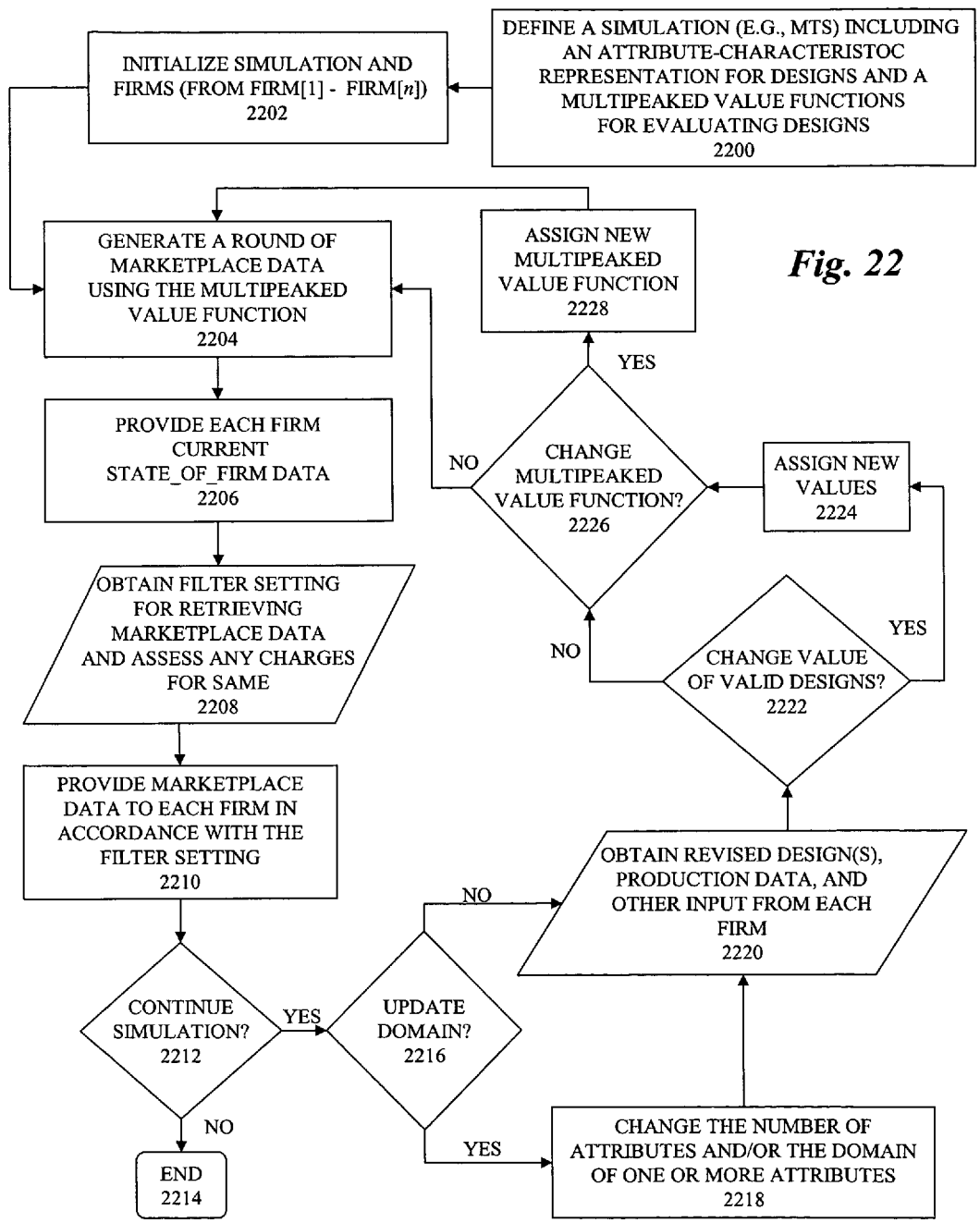
FIG. 22 illustrates a process flow for developing the decision-making skills of a user or for representing changes in design opportunities.

Turning now to FIG. 22, a process flow for developing the decision-making skills of a user or for representing changes in design opportunities is illustrated. At step 2200, a simulation such as a management training simulation is defined which includes an attribute characteristic representation for designs (e.g., products) and a multipeaked value function which is used for evaluating the design. In a preferred application, the designs are products that are to be sent to market by competing firms in a competitive business simulation.

At step 2202, the simulation and firms are initialized; that is, the starting settings for firm [1], firm [2], . . . , firm [n] are established. The initial set up of a firm can be as shown in FIG. 12 in which there is an existing budget and existing products and capacity, or the companies can start with no products or capacity and thereafter choose which products to make within the rules of the simulation. At step 2204, the system generates a round of marketplace data using the multipeaked value function. At step 2206, the system (e.g., central computer 2010) provides each firm (e.g., station 2040) current state_of_data.

In accordance with a description of modeling marketing (see Section 8, "Modeling Marketing MTSs"), the central computer receives from each station 2040 a filter setting which is used to guide the retrieval of marketplace data from the memory of the central computer. A filter setting can be provided by the participant by completing a form that includes the same type of information that is available through the marketplace data display shown in FIG. 11. Provided that the firm submitting the filter setting has sufficient funds (see budget 1201), then it will be provided with marketplace data in accordance with that filter setting at step 2210.

Thereafter, a determination is made at step 2212 as to whether the simulation is to continue, substantially as described above in connection with step 2140 of FIG. 21. If the simulation has reached its conclusion, then the process flow ends as at step 2214. Otherwise, the simulation continues at step 2216 by determining whether the domain of the attribute-characteristic representation is to be updated. Updates to the domain include either a change in the number of attributes, a change in the domains of one or more attributes, or both. Any such change, which is effected at step 2218, causes the product space to either be expanded or contracted, depending on whether the relevant parameter is being increased or decreased.

Regardless of whether the domain is updated, the process continues at step 2220 by obtaining from the user revised designs, production data, and other input from each firm, that is, from use station 2040. At step 2222, a determination is made as to whether a change in the value of any of the valid designs is appropriate. Such a change can reflect, for example, an exogenous shift in the product space such as a change in consumer preferences or inflation. In accordance with a feature of the invention, the central computer 2010 includes system-set attributes in the attribute-characteristic representation of the set of valid object designs. The system-set attributes can exhibit strong frustration with other attributes that are alterable by the user. When the system-set attributes are changed, the overall value of the product is impacted. This is manifested in the simulation as sudden change in the value of the object versus the value prior to the change. If the value is to be changed, then the system-set attribute is altered, and new values are assigned at step 2224.

Also, regardless of whether there is change in the value, a determination is next made at step 2226 as to whether the multipeaked value function itself is to be changed for a subsequent round. In some simulations, it may be desirable to utilize a different multipeaked function than an initial one, for example, a new function derived from the first multipeaked function. In such a simulation, a new function is assigned at step 2228. Regardless of whether such a new function is assigned, if the simulation is to continue, as was determined at step 2212, then a new round of marketplace data is generated using the present or current multipeaked value function, as described above in connection with step 2204. The process flow then proceeds as previously described, round-after-round, until an end of simulation condition is satisfied.

A management training system that can be used to implement the method of the present invention preferably includes a first computer having a processor and a memory and a network connection to a plurality of stations such as the arrangement shown in FIG. 20. The first computer (e.g., a central server) is configurable to define a simulated business situation and to process inputs from the user (e.g., stations 2040) using the multipeaked value function as described above. Each of the stations connected to the first computer executes an application software program which preferably permits the user at the station to produce one or more objects and to submit such objects to the first computer. Each of the objects has a design which is defined using attribute-characteristic representation. Each of the stations is connected to the first computer via a connection which permits the inputted object designs to be forwarded to the first computer. The connection also permits information concerning the object designs that are processed at the first computer to be transmitted back from the first computer to the plural stations. Preferably, the first computer can identify each of the plural stations and transmit to each specific or particular station information concerning a current state of the user's designs.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as being included therein.

GLOSSARY

Key terms are listed in alphabetical order.

"#": The number sign is used to create a compact notation for object categories. When displayed as a product attribute, a number sign signifies the entire range of object characteristics.

Aggregate Traits: Aggregate traits describe qualities of an entire product such as "quality", "reliability", "durability", and "value". Aggregate traits are valued with a numerical scale.

Attributes: Attributes are the types of features of a product's design such as physical qualities, components, and abilities. Attributes can vary qualitatively, quantitatively, or in more complex ways (e.g., dual varying attributes). An attribute is a variable and its characteristics (see below) comprise the domain or set of possible instantiations for the attribute.

Attribute-characteristic representation: A method of representing the design of an object as a collection of attributes. Each attribute expresses one characteristic from a set of potential characteristics.

Business Process Traits: Business process traits describe the qualities of products that arise from business processes, such as customer service and delivery delay.

Characteristic (product characteristic): Characteristics are the instantiation possibililties that an attribute can express. A characteristic of the "color" attribute can be the set of "blue," "green,"

Competitive Industry MTS: A competitive industry MTS is an MTS where one or more firms compete in a simulated marketplace.

Core Competency: A core competency is a strong capability of a firm. They permit a firm to differentiate its products from its competitors' products. This differentiation can be an important source of competitive advantage and profit. In the prior art students develop core competencies by heavily investing in a particular product trait. In the new method, students develop core competencies by discovering product categories with highly valued products and learning how these product categories correlate with other product categories.

Correlation: Correlation is a statistical property relating information about one area of the product space (a particular design or a product category) to other areas of the product space. It measures how well the values of the products in one area can predict the values of the products in other areas.

Demand Function: A demand function is an equation or set of equations that receives as its inputs (independent variables) decisions and outputs (e.g., products and/or advertisements) of a firm and determines sales of that firm's outputs.

Design Restrainer: A design restrainer adjusts the domain of product attributes and the number of product attributes in order to manipulate the set of valid product designs. The design retrainer can be an automated routine responsive to predetermined conditions or rules, or may be a person such as an administrator or simulation manager.

Distance Between Products: The distance between product measures the amount that two products differ. For example, for qualitatively varying attributes one might use a count of the number of attributes expressing different characteristics as a calculation of the distance between the products. Similarly, for example, for quantitatively varying attributes one might apply the mathematical calculation of difference to the attributes displaying different characteristics and then use this measure to calculate the distance between the products.

Distance Value Function: A distance value function is a function that assigns value as a monotonically decreasing function of the distance between a product and an ideal product. Distance value functions do not model frustration. They are single peaked.

Demand Elasticity: The demand elasticity is a number describing the percentage change in demand for one percent change in a factor that influences demand (for example, the price of a product). Demand elasticities can be calculated for industry demand (for example, how an industry's demand varies with the price of a product) and for firms (for example, how a firm's demand varies with the price of a product).

Design (Product Design): The specific characteristics expressed by a product's attributes constitute a product's design.

Domain: As used herein, is the set of possible characteristics an attribute can express.

Endogenously: "Endogenously" denotes that a property or event arises from the actions of students using an MTS. For example, the product categories that students focus upon when designing innovations are determined by students during the learning session. Because they arise from within the MTS, during a learning session, they are endogenous.

Exogenously: "Exogenously" denotes that a property or event is defined by the construction of the MTS. For example, in a prior art MTS, the relationship between investment and the probability of an innovation is given by the probability distributions built into the MTS. This relationship, therefore, is determined exogenously. In MTSs built with the new technology, the function relating investment to innovation depends upon a student's knowledge and decisions. This depends upon the student's use of the MTS and evolves throughout the learning session. In new technology MTSs the relationship between investment and innovation is not exogenous, but endogenous.

Firm: A firm is a company that competes in the simulated competitive industry. A student learning with an MTS manages a firm. Some MTSs also include firms managed by the computer.

Frustration and Strong Frustration: Frustration exists when changing the characteristic expressed by one attribute (1) increases the contribution that some attributes make to product value while simultaneously (2) decreasing the contribution to product value made by other attributes. When the result of frustration is a decrease in the value of the product, it is called strong frustration.

Ideal Product: The ideal product represents the product design most preferred by customers. Prior art MTSs use an ideal product to evaluate the designs of products that students send to the marketplace.

Information Reliability: The reliability of information measures how well information about the value of a product or product category predicts the value of other products or product categories. It is given by the appropriate correlation measure.

Information Theory: Information theory is a mathematical investigation of communication that defines communication signals and information with mathematically rigorous definitions. It is useful for calculating the amount of information produced by a marketplace and the amount of information utilized by a student.

Interacted Value Function (IVF): An interacted value function (IVF) is a value function that has multiple optima, a domain that includes a subset of designs from the attribute-characteristic representation, and which exhibits at least some degree of interaction between at least two attributes in the attribute-characteristic representation. The interaction can be any degree of frustration up to strong frustration. The domain can include all of the designs in the attribute-characteristic representation.

Interaction: An interaction occurs when the characteristic expressed by one attribute influences how a characteristic by another attribute contributes to a product's value. When this occurs, the first attribute interacts with the second attribute.

Interdependent-Attribute Value Function (IAVF): An interdependent-attribute value function (IAVF) is a value function having multiple optima, a domain that includes a subset of the designs from the attribute-characteristic representation, and at least one design in its domain from which a user of the simulation cannot discover the global optimum by varying the attribute characteristics independently. For this reason, at least a portion of the attributes in the domain of the IAVF are "interdependent." The domain can include all of the designs in the attribute-characteristic representation.

Interface: The interface provides the student with a method of communicating with the MTS. It translates the simulated business situation results into business language and translates a student's decision into computer code.

Learning Session: A learning session refers to time during which a student uses an MTS.

Management Training Systems/Management Training Simulations: Management training systems referred to herein include computer programs that are used by students (usually managers and aspiring managers) for learning and practicing management, and, equivalently, management training simulations are the computer programs that, when utilized, enable learning and practicing of decision-making and other management skills. A management training system simulates a sequence of decision situations. The student responds to each situation with a decision. The management training system calculates the result of the decision and displays it for the student. Except when describing a hardware configuration, "MTS" refers to the simulation.

Market: A market is a collection of customers that evaluate, and possibly purchase, the products produced by firms.

Market Manipulator: A market manipulator is a structure in an MTS that contains the demand functions and calculates the sales of products in a simulated market using these functions.

Market Segment: A market segment is a collection of customers within a market who share a preference for a distinctive set of product traits.

Marketplace: The marketplace is the part of an MTSs' computer program that determines the sales of products. It simulates a real "marketplace" where firms and customers meet to trade.

MTS: MTS is an abbreviation for management training systems/simulations. An MTS is a simulated business situation in which users learn business, management, and/or decision-making skills by interacting with the system.

Multipeaked Value Function (MVF): A multipeaked value function is a value function that has multiple optima and has as its domain all products or objects in the simulation.

Perspective: A perspective is a set of product categories that a student uses to select information from the marketplace results to use for the purposes of decision making.

Product: Products have specific instantiations of each attribute in the attribute-characteristic representation. For example, if $a_1=\{0,1\}$, $a_2=\{0,1\}$, and $a_3=\{0,1\}$ then three examples of products are (001), (101), and (110). Products may take the form of devices, services, advertisements, and other objects that define outputs of a firm. The value obtained by the product evaluator 803 for a given product is used by the market manipulator 802 to determine a firm's sales of that product. If the product is a device then the sales are the sales of the device. If the product is an advertisement, then the sales, of course, are sales of some product or service, the performance of such sales in the marketplace being a direct reflection of the value of the advertising campaign.

Product Class: A product class is the set of products consisting of all possible values of a product's traits. A product's traits typically include factors in addition to attributes as used in the attribute-characteristic representation.

Product Category: A product category is a set of products defined upon the appearance or absence of product characteristics in a product's design. Students define product categories throughout a learning session. For example, one product category can be all blue products and another can be all non-blue products. In formal terms, a product category can be narrowly defined to be coextensive with a single product (e.g., (111) from the example used in the definition of "product" above) and broadly defined to be coextensive with the entire product space (e.g., (###) from the example used in the definition of "product" above). Ordinarily, product category is defined between these extremes.

Product Evaluator: A product evaluator is a structure in an MTS that evaluates product designs.

Product Space: A product space is a multidimensional space of products with a distribution of product values over this space. For the purpose of illustration, it is often useful to visualize a product space as in two dimensional space, a Cartesian coordinate system.

Product Traits: Product traits describe products. There are three types of product traits: business process traits (describing the outcome of business processes, such as delivery delays), aggregate traits (describing the whole product, such as quality), and attributes (describing specific features of a product, such as color).

Product Value Function: This is a function that takes a product's design as its input (independent variable) and determines the product's value.

Project: A project is a student's exploration and exploitation of the products in a product category hypothesized by the student.

Reinventing a Firm: Reinventing a business is a term that signifies a firm replacing its core business with a new business that requires new knowledge. Examples of firms reinventing their business are IBM switching from electric typewriters to computers and Motorola switching from car radios to integrated circuits.

Selected Value Function (SVF): The selected value function is the value function being used by the simulation to evaluate object designs. It can be VFMO, MVF, IVF, or IAVF.

Similarity: Similarity is a measure of the distance between two products (see definition of "distance between two products").

Student: A student refers to a person who is using an MTS.

Supply Curve: The supply curve is a function relating the amount of products produced by an industry to the cost of product inputs, such as labor and raw materials.

Topography of the Product Space: The topography of a product space describes how product values vary over the products in the product space.

Union of two sets: The union of two sets is a large set composed of the elements of the two sets.

Valid Product Design: A product design having a set of attributes within the attribute-characteristic representation, each attribute expressing one characteristic from the respective domain of such attribute.

Value (product value): Value denotes the level of a product's value trait.

Value Function With Multiple Optima (VFMO): A value function with multiple optima (VFMO) is a value function that has multiple optima and a domain that includes a subset of designs from the attribute-characteristic representation. The subset can include all of the designs in the attribute-characteristic representation.

APPENDIX

The Prior Art Method of Modeling for Innovation and Technological Advance and for Accounting for Product Design Innovation: In prior art MTSs, innovation either (1) increases the value of an aggregate trait, (2) expands the domain of attributes, (3) increases the number of attributes, or (4) adds an entirely new market to the learning session. Regardless of which effects are included, prior art MTSs use a variation of the following method to simulate innovation: For an example see: Thomas Pray and David Methe, "Modeling Radical Changes in Technology within Strategy-Oriented Business Simulations," *Simulation and Gaming*, vol. 22 (March 1991): pp. 19-35. Firms attempt innovation by allocating capital to "research and development". The allocation purchases a draw from a probability distribution. If the draw exceeds a predetermined threshold, the firm innovates. With this method, students have limited influence over the probability distribution and threshold parameter. The most potent means of influence is investment in research and development. Greater investment increases the probability of innovation.

The prior art method is quite flexible. The frequency of innovation, variation of innovative ability among firms, and firm and industry leaning curves, can all be modeled by adjusting the distribution and the threshold parameter. These capabilities make the method adequate for adding innovation to MTSs in which innovation is not an important aspect of the MTS (for example, MTSs that teach basic accounting, finance, and marketing in established markets). While useful in such MTSs, the prior art method of modeling innovation is inadequate for MTSs in which innovation is an important aspect (for example, MTSs that teach the management of innovation, technological advance, or knowledge). For such MTSs, the prior art is deficient for several reasons. These are:

1. The samples for the probability distribution simulate the outcome of the innovative process. The prior art method does not model the innovation process itself.
2. The method of sampling from a probability distribution does not represent or account for the influence of information, knowledge, or decision making in the innovation process. All these qualities, and all other qualities of the innovation process, are subsumed within the probability distribution and threshold parameters.
3. The probability distributions and threshold parameters are defined exogenously by the MTS designer or administrator. These constructs are not endogenously related to the information produced by the marketplace or to students' knowledge and decisions.

Technological Advance: In some prior art MTSs, technological advance is synonymous with innovation and represented in the same manner. These MTSs suffer from the deficiencies listed above. In other prior art MTSs, technological advances are simulated by introducing new probability distributions for representing innovation. This method also has limitations: It only simulates a small number of new opportunities: those specified by the new probability distributions, whereas real technological advances create a multitude of opportunities. Because of this deficiency, prior art MTSs cannot provide students with practice in managing a firm through technological change. Moreover, because of this limitation, the prior art MTSs cannot properly simulate the market dynamics that follow a technological advance (such as industry life cycles).

The Product Value Function: The prior art calculates a product's value by comparing each product to an ideal product. The ideal product is the product design that customers like best. The ideal product is set at the start of a learning session. If there are multiple markets or market segments, each has its own ideal product. In order to calculate a product's value, the prior art uses an equation that measures a product's similarity to the ideal product. This equation quantifies the notion of similarity into a number called the distance between a product and the ideal product. For this reason, I call the prior art method a "distance value function".

For examples of prior art product value functions, see: Richard Teach, "Demand Equations for Business Simulations with Market Segments," *Simulation and Gaming*, vol. 21 (December 1990): pp. 423-442 and Steven Gold and Thomas Pray, "Technological Change and Intertemporal Movements in Consumer Preferences in the Design of Computerized Business Simulations with Market Segmentation," *Developments in Business Simulations and Experiential Exercises*, vol. 25 (1998): pp. 156-167.

Utilizing this method, product value is a monotonically decreasing function of the distance between two products. Products that have small distances (similar to the ideal) have higher values. Products that have large distances (dissimilar to the ideal) have lower values. This result arises because the distance functions do not represent frustration. The formula for calculating the distance between two points provides an example. Suppose a product class has four quantitative attributes. In prior art MTSs, the distance between a product and the ideal might be calculated as DISTANCE= $(d_1^2 + d_2^2 + \ldots + d_n^2)^{0.5}$, where $d_i = (I_i - a_i)$ and $I_i$ and $a_i$ represent the characteristics expressed by the $i^{th}$ attribute for the ideal product and a product produced by the student. By taking derivatives one can show that when the value function decreases monotonically with distance (1) an improvement in design in one dimension can never cause a decrease in the value of a product (i.e., no strong frustration) and (2) that the value function has only one optimum, which occurs when $d_1 = d_2 = \ldots = d_n = 0$.

The mountain range metaphor helps to illuminate the qualities produced by this method. Because the distance value functions lack frustration, the product space topology of the prior art MTSs are Mount Fuji-like. The topology has a single peak that stands directly over the ideal product. As products become less like the ideal, their design quality decreases, producing broad, gradual slopes. This topology, has significant consequences, including:

1. The characteristic expressed by an attribute in the ideal product remains the best characteristic for that attribute to express (at least as good as any other characteristic) regardless of the characteristics expressed by other attributes. Because of this, a student can address each attribute independently.

2. By making a series of small changes in a product's design, a student can produce a sequence of designs such that (1) each subsequent design increases product quality and (2) the sequence ends with the ideal product. Moreover, this property holds regardless of the order in which a student addresses the attributes.

These qualities do not exist in the present invention described in the foregoing specification. The strong frustration exhibited by multipeaked value functions prevents students from addressing each attribute independently. The strong frustration also prevents students from finding the optimal product via a sequence of products that (1) differ by incremental design changes and (2) produce a monotonically increasing sequence of product values. In the present inventive system and method, continuing improvement in product design eventually must require a more radical change in product design. Metaphorically, the product space topology of the present invention is multipeaked, as opposed to single peaked. Improving a product design that resides beneath the peak of a smaller mountain requires a simultaneous change of several product characteristics; one must travel to a different, taller mountain.

There is another significant quality of the prior art (and one that distinguishes the present system and method from the prior art). This distance value function creates a highly correlated product space. Information about the value of products provides considerable information about other products. The Mount Fuji topology illustrates this property. Once a student discovers the direction of design changes that "climb" the mountain, the student knows a great deal about the entire topology of the product space. This differs from the new method where information is correlated over small areas of the mountain range (among sets of incremental innovations) but uncorrelated across larger areas (areas containing radical innovations).

Some makers of prior art MTSs recognize that the prior art method produces highly reliable information. As a remedy, some prior art MTSs add a random error term to the marketplace information (for example, to the information found in a marketing report). The difference between this modeling of uncertainty and uncertainty in embodiments of the present invention is significant. The prior art adds informational uncertainty exogenously. In the new method, information reliability arises endogenously and produces the proper relationship between information reliability and innovation. Moreover, the problems of the prior art method are compounded by another practice of the prior art: making the reliability of information vary with investment in marketing research. For an example of this, see: Thomas Pray and David Methe, "Modeling Radical Changes in Technology within Strategy-Oriented Business Simulations," *Simulation and Gaming*, vol. 22 (March 1991): pp. 19-35. More expensive marketing reports have more reliable information. In these MTSs, the reliability of information is a function of investment. In the new method, the information's reliability is, appropriately, a function of innovation and perspective.

Because distance value functions exhibit the qualities just described: (1) addressing the attributes independently; (2) optimizing of product value via a sequence of small changes in design that each improve value; and (3) highly correlated—they are suitable only for teaching the management of low uncertainty situations. These situations include, for example, pricing, designing, positioning, and promoting products in established markets (i.e., basic marketing). Prior art MTS largely are not suitable for teaching the management of high uncertainty situations. These situations include, for example, entrepreneurship, developing new core competencies, developing radical innovations, managing technological change, and reinventing one's business.

Finally, it should be noted that the prior art does not provide a method for measuring information and knowledge; relating these measures to the product space topology; or relating these measures to students' decisions. Furthermore, the prior art cannot relate the tasks demanded of students to cognitive functions. Because of these limitations, the prior art cannot usefully illuminate and analyze the role of knowledge and information in students' decisions, marketplace competition, and the simulated industry's dynamics. Moreover, for the same reasons, the prior art must teach through an indirect method, where students test a variety of ideas and, hopefully, induce an improved understanding of management. The prior art cannot teach through the direct method previously described.

I claim:

1. A method of developing decision-making skills of a user through practice in a simulated environment, comprising the steps of:
    a) defining a simulated business situation to be influenced by the user including a set of objects that are represented by an attribute-characteristic representation;
    b) presenting information concerning a current state of the simulation to the user;
    c) obtaining decisions from the user;
    d) evaluating at least one object design using an interacted value function, wherein the obtained decisions at least partially determine the object designs to be evaluated;
    e) updating the simulation with the results from the evaluating step; and
    f) selectively repeating steps b) through e).

2. The method as in claim 1, wherein the value function is a value function with multiple optima.

3. The method as in claim 1, wherein one or more attributes of the attribute-characteristic representation is a qualitatively varying attribute.

4. The method as in claim 1, wherein one or more attributes of the attribute-characteristic representation is a quantitatively varying attribute.

5. The method as in claim 1, wherein the value function evaluates only a portion of an object design.

6. The method as in claim 1, including the additional step of changing the value function having multiple optima the additional step occurring after performing the repeating step at least once.

7. The method as in claim 1, wherein a plurality of objects have multiple values.

8. The method as in claim 1, wherein the attribute-characteristic representation has multiple segments.

9. The method as in claim 8, wherein the decisions obtained from the user include designs for only a portion of the segments of the attribute-characteristic representation.

10. The method as in claim 1, including the additional step of changing a system-set attribute, wherein a computer-implemented system performs the steps in claim 1.

11. The method as in claim 1, wherein the obtaining step is repeated to obtain from the user an object category that is contained in at least one of the previously obtained object categories.

12. The method as in claim 1, wherein the decisions obtained from the user include at least one design object.

13. The method as in claim 1, wherein the information presented to the user includes information derived from the evaluating step.

14. The method as in claim 1, including the additional steps of:

providing one or more directing conditions and a directing condition manipulator; and manipulating the directing conditions with the directing condition manipulator during a simulation to define an enhanced subset of design objects.

15. The method as in claim 14, wherein the directing condition is a set of rules or calculations involving at least one of the attributes and characteristics of the attribute-characteristic representation.

16. The method as in claim 14, wherein the directing condition manipulator alters the value function.

17. The method as in claim 14, wherein the directing condition manipulator changes the characteristics expressed by at least one system-set attribute.

18. The method as in claim 14, wherein the directing condition is at least one restriction on the valid object designs and the directing condition manipulator alters these restrictions by changing at least one of a domain of one or more attributes and the number of attributes of the attribute-characteristic representation.

19. The method as in claim 1, including the additional step of obtaining a query from the user and wherein the step of presenting information includes information that satisfies the query entered.

20. The method as in claim 19, wherein the step of obtaining a query occurs after performing the repeating step at least once.

21. The method as in claim 19, wherein one of the query and the presented information comprises an object category.

22. The method as in claim 1, including the additional steps of:

defining a second attribute-characteristic representation to represent a set of resources and at least one quality of the simulated business situation being influenced by resources;

selecting at least one resource from the set of resources; and calculating the value for at least one influenced quality, wherein the calculation is at least partially determined by the attribute-characteristic representation of the selected resources.

23. The method as in claim 22, including the additional step of selecting at least one object design, wherein the value of the quality being influenced by resources is at least partially determined by the attribute-characteristic representation of the selected object designs and the attribute-characteristic representation of the resources selected from the set of resources.

24. The method as in claim 1, wherein the information is presented through an interface, the method including the additional step of allowing the user to sort the information presented in the interface.

25. The method as in claim 1, wherein the processing step processes at least two object designs.

26. The method as in claim 1, wherein the simulated business situation has multiple users, wherein object have multiple segments, and different users design different segments.

27. The method as in claim 1, wherein there are plural users each representing a competing firm.

28. The method as in claim 1, wherein the step of updating the simulation includes processing the results of the evaluating step with either a market model or a set of market equations.

29. The method in claim 1, including the additional step of obtaining at least one object category from the user, wherein the presenting step presents information concerning at least one obtained object category and the evaluating step evaluates design objects contained in at least one obtained object category.

30. The method as in claim 29, including the additional step of providing resources for the user to allocate to at least one project, wherein the project includes one or more object categories.

31. The method as in claim 1, wherein the value function is an interdependent-attribute value function.

32. A management training system comprising:

a computer processor executing simulation software that simulates a business situation including a set of design objects represented with an attribute-characteristic representation;

at least one terminal in electrical communication with the processor that displays information about the business situation to a user and that permits the user to input decisions;

evaluation software configured to select design objects, wherein the selection is at least partially determined by any decisions input by the user, and to evaluate the selected design objects by applying a value function having multiple optima;

a first communication link means that transfers any decisions input by the user to the evaluation software; and a second communication link for transferring information about the simulated business situation to the terminal.

33. The system as in claim 32, wherein the value function is an interacted value function.

34. The system as in claim 32, wherein any decisions input include design objects, design categories designed by the user, or both.

35. The system as in claim 32, wherein the processor executing the simulation software is further configured to execute the evaluation software.

36. The system as in claim 32, wherein the evaluation software is executed at the terminal.

37. The system as in claim 32, further comprising a directing condition manipulator software that defines enhanced sets of objects.

38. The system as in claim 32, wherein the value function is an interdependent-attribute value function.

39. A method of diagnosing the cognitive approach of a user in responding to a design task presented on a computer, comprising the steps of:

a) defining a set of objects that are represented by an attribute-characteristic representation (ACR);

b) obtaining from the user at least one object design, wherein the object designs comprise at least one of an object represented in the ACR and an object category which represents plural objects represented in the ACR;

c) evaluating one or more of the obtained designs using an interacted value function;

d) presenting the user with information derived from the evaluated designs;

e) repeating steps b) through d) while recording information derived from the evaluated designs; and f) comparing the recorded information to other data to gauge the user's cognitive approach in revising the designs.

40. The method as in claim 39, wherein the value function is one of interdependent-attribute value function and a value function with multiple optima.

41. The method as in claim 39, wherein the value function is an interdependent-attribute value function.

* * * * *